(12) United States Patent
Fantin et al.

(10) Patent No.: US 11,174,325 B2
(45) Date of Patent: Nov. 16, 2021

(54) SURFACTANT ASSISTED FORMATION OF A CATALYST COMPLEX FOR EMULSION ATOM TRANSFER RADICAL POLYMERIZATION PROCESSES

(71) Applicant: CARNEGIE MELLON UNIVERSITY, Pittsburgh, PA (US)

(72) Inventors: Marco Fantin, Pittsburgh, PA (US); Pawel Chmielarz, Pittsburgh, PA (US); Yi Wang, Pittsburgh, PA (US); Francesca Lorandi, Pittsburgh, PA (US); Krzysztof Matyjaszewski, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 56 days.

(21) Appl. No.: 16/475,886

(22) PCT Filed: Jan. 11, 2018

(86) PCT No.: PCT/US2018/013335
§ 371 (c)(1),
(2) Date: Jul. 3, 2019

(87) PCT Pub. No.: WO2018/132582
PCT Pub. Date: Jul. 19, 2018

(65) Prior Publication Data
US 2020/0055967 A1    Feb. 20, 2020

Related U.S. Application Data

(60) Provisional application No. 62/602,219, filed on Apr. 17, 2017, provisional application No. 62/498,981, filed on Jan. 12, 2017.

(51) Int. Cl.
*C08F 2/38* (2006.01)
*C08F 2/26* (2006.01)
(Continued)

(52) U.S. Cl.
CPC ............ *C08F 2/38* (2013.01); *C08F 2/26* (2013.01); *C08F 4/10* (2013.01); *C08F 4/40* (2013.01);
(Continued)

(58) Field of Classification Search
None
See application file for complete search history.

(56) References Cited

U.S. PATENT DOCUMENTS 3,037,004 A    5/1962   Simone et al.
3,096,312 A    7/1963   Henry
(Continued)

FOREIGN PATENT DOCUMENTS

CN    1084199 A    3/1994
CN    1110681 A    10/1995
(Continued)

OTHER PUBLICATIONS

International Preliminary Report on Patentability for International Application No. PCT//US2018/013335 dated Jul. 16, 2019.
(Continued)

*Primary Examiner* — Nicole M. Buie-Hatcher
(74) *Attorney, Agent, or Firm* — K&L Gates LLP

(57) ABSTRACT

Systems and methods for Atom Transfer Radical Polymerization (ATRP) emulsion polymerization are provided. The ATRP emulsion polymerization comprises a suspending medium, a dispersed medium, a surfactant, a transition metal compound in a higher oxidation state, a ligand, and an ATRP initiator. The transition metal compound is capable of forming a catalyst complex in a presence of the ligand. The catalyst complex is soluble in the suspending medium and is capable of forming an ionic complex with the surfactant. The ionic complex is capable of moving between the suspending medium and the dispersed medium. A portion of the
(Continued)

transition metal compound in the higher oxidation state within a portion of the catalyst complex is reduced by a physical and/or a chemical procedure thereby initiating a polymerization of one or more radically (co)polymerizable monomers by reaction with the initiator.

45 Claims, 37 Drawing Sheets

(51) Int. Cl.
  *C08F 4/10* (2006.01)
  *C08F 4/40* (2006.01)
  *C08F 220/18* (2006.01)
(52) U.S. Cl.
  CPC ........ *C08F 220/18* (2013.01); *C08F 2438/01* (2013.01)

(56) References Cited

U.S. PATENT DOCUMENTS

| | | | |
|---|---|---|---|
| 3,183,217 A | 5/1965 | Serniuk et al. | |
| 3,350,374 A | 10/1967 | Fetscher et al. | |
| 3,397,186 A | 8/1968 | Edward et al. | |
| 3,472,826 A | 10/1969 | Potts et al. | |
| 3,546,083 A | 12/1970 | Ort et al. | |
| 3,573,180 A | 3/1971 | Hodes et al. | |
| 3,716,550 A | 2/1973 | Gilligan et al. | |
| 3,753,956 A | 8/1973 | Tuites et al. | |
| 3,862,978 A | 1/1975 | Decker et al. | |
| 3,953,305 A | 4/1976 | Connolly | |
| 3,959,225 A | 5/1976 | Kuntz | |
| 3,963,491 A | 6/1976 | Marsh | |
| 4,007,165 A | 2/1977 | MacLeay et al. | |
| 4,073,870 A | 2/1978 | Saji et al. | |
| 4,145,486 A | 3/1979 | Haag et al. | |
| 4,302,553 A | 11/1981 | Frisch et al. | |
| 4,374,751 A | 2/1983 | Dudgeon | |
| 4,384,093 A | 5/1983 | Culbertson et al. | |
| 4,581,429 A | 4/1986 | Solomon et al. | |
| 4,728,706 A | 3/1988 | Farnham et al. | |
| 4,806,605 A | 2/1989 | Hertler | |
| 4,925,765 A | 5/1990 | Madeleine | |
| 4,940,648 A | 7/1990 | Geiger | |
| 4,940,760 A | 7/1990 | Boettcher et al. | |
| 4,954,416 A | 9/1990 | Wright et al. | |
| 4,978,498 A | 12/1990 | Yoshihiro et al. | |
| 5,026,813 A | 6/1991 | Meder | |
| 5,089,135 A | 2/1992 | Yoneyama et al. | |
| 5,102,967 A | 4/1992 | Meder | |
| 5,169,914 A | 12/1992 | Kaszas et al. | |
| 5,210,109 A | 5/1993 | Tateosian et al. | |
| 5,212,043 A | 5/1993 | Yamamoto et al. | |
| 5,248,746 A | 9/1993 | Shimokawa et al. | |
| 5,254,651 A | 10/1993 | Alexanian et al. | |
| 5,281,681 A | 1/1994 | Austin | |
| 5,294,678 A | 3/1994 | Tse et al. | |
| 5,312,871 A | 5/1994 | Mardare et al. | |
| 5,322,912 A | 6/1994 | Georges et al. | |
| 5,324,879 A | 6/1994 | Hawthorne | |
| 5,331,088 A | 7/1994 | Meister et al. | |
| 5,346,954 A | 9/1994 | Wu et al. | |
| 5,362,813 A | 11/1994 | Antonelli et al. | |
| 5,401,804 A | 3/1995 | Georges et al. | |
| 5,405,913 A | 4/1995 | Harwood et al. | |
| 5,451,647 A | 9/1995 | Faust et al. | |
| 5,459,222 A | 10/1995 | Rodgers et al. | |
| 5,470,928 A | 11/1995 | Harwood et al. | |
| 5,506,312 A | 4/1996 | Arjunan | |
| 5,508,353 A | 4/1996 | Liu et al. | |
| 5,510,212 A | 4/1996 | Delnick et al. | |
| 5,510,307 A | 4/1996 | Narayanan et al. | |
| 5,543,158 A | 8/1996 | Gref et al. | |
| 5,558,954 A | 9/1996 | Morrison | |
| 5,610,250 A | 3/1997 | Veregin et al. | |
| 5,630,906 A | 5/1997 | Boe et al. | |
| 5,656,708 A | 8/1997 | Meister | |
| 5,668,188 A | 9/1997 | Whinnery et al. | |
| 5,700,844 A | 12/1997 | Liao et al. | |
| 5,705,577 A | 1/1998 | Rossi et al. | |
| 5,708,102 A | 1/1998 | Fryd et al. | |
| 5,763,546 A | 6/1998 | Jung et al. | |
| 5,763,548 A | 6/1998 | Matyjaszewski et al. | |
| 5,767,210 A | 6/1998 | Lecomte et al. | |
| 5,773,538 A | 6/1998 | Feiring | |
| 5,789,487 A | 8/1998 | Matyjaszewski et al. | |
| 5,807,937 A | 9/1998 | Matyjaszewski et al. | |
| 5,811,500 A | 9/1998 | Dubois et al. | |
| 5,833,320 A | 11/1998 | Kaneko et al. | |
| 5,854,364 A | 12/1998 | Senninger et al. | |
| 5,886,118 A | 3/1999 | Percec | |
| 5,891,971 A | 4/1999 | Keoshkerian et al. | |
| 5,910,549 A | 6/1999 | Matyjaszewski et al. | |
| 5,945,491 A | 8/1999 | Matyjaszewski et al. | |
| 5,998,537 A | 12/1999 | Good et al. | |
| 6,031,017 A | 2/2000 | Waki et al. | |
| 6,054,507 A | 4/2000 | Funaki et al. | |
| 6,057,042 A | 5/2000 | Shimotsu | |
| 6,083,524 A | 7/2000 | Sawhney et al. | |
| 6,111,022 A | 8/2000 | Matyjaszewski et al. | |
| 6,114,448 A | 9/2000 | Derbes | |
| 6,114,482 A | 9/2000 | Senninger et al. | |
| 6,121,371 A * | 9/2000 | Matyjaszewski | C08F 4/00 522/6 |
| 6,124,411 A | 9/2000 | Matyjaszewski et al. | |
| 6,126,919 A | 10/2000 | Stefely et al. | |
| 6,143,848 A | 11/2000 | Lee et al. | |
| 6,162,882 A | 12/2000 | Matyjaszewski et al. | |
| 6,183,866 B1 | 2/2001 | Yamazaki et al. | |
| 6,191,197 B1 | 2/2001 | Wang et al. | |
| 6,235,822 B1 | 5/2001 | Whetten et al. | |
| 6,254,854 B1 | 7/2001 | Edwards et al. | |
| 6,255,448 B1 | 7/2001 | Grimaldi et al. | |
| 6,288,186 B1 | 9/2001 | Matyjaszewski et al. | |
| 6,310,149 B1 | 10/2001 | Haddleton | |
| 6,319,988 B1 | 11/2001 | Barkac et al. | |
| 6,326,455 B2 | 12/2001 | Vassiliou et al. | |
| 6,342,563 B1 | 1/2002 | McGinniss et al. | |
| 6,407,187 B1 | 6/2002 | Matyjaszewski et al. | |
| 6,451,580 B1 | 9/2002 | Takagi et al. | |
| 6,512,060 B1 | 1/2003 | Matyjaszewski et al. | |
| 6,534,610 B1 | 3/2003 | Wilson et al. | |
| 6,538,091 B1 | 3/2003 | Matyjaszewski et al. | |
| 6,541,580 B1 | 4/2003 | Matyjaszewski et al. | |
| 6,545,095 B1 | 4/2003 | Solomon et al. | |
| 6,565,763 B1 | 5/2003 | Asakawa et al. | |
| 6,592,991 B1 | 7/2003 | Wiesner et al. | |
| 6,598,721 B2 | 7/2003 | Schmidl | |
| 6,620,927 B2 | 9/2003 | Bulpitt et al. | |
| 6,624,262 B2 | 9/2003 | Matyjaszewski et al. | |
| 6,624,263 B2 | 9/2003 | Matyjaszewski et al. | |
| 6,627,314 B2 | 9/2003 | Matyjaszewski et al. | |
| 6,664,312 B2 | 12/2003 | Devonport | |
| 6,670,299 B1 | 12/2003 | Marks et al. | |
| 6,672,717 B2 | 1/2004 | Smith | |
| 6,683,120 B2 | 1/2004 | Munro | |
| 6,686,432 B2 | 2/2004 | Coca et al. | |
| 6,692,914 B1 | 2/2004 | Klaerner et al. | |
| 6,737,488 B2 | 5/2004 | Vanhoorne et al. | |
| 6,759,491 B2 | 7/2004 | Matyjaszewski et al. | |
| 6,784,247 B2 | 8/2004 | Rechenberg et al. | |
| 6,784,248 B2 | 8/2004 | Coca et al. | |
| 6,784,260 B2 | 8/2004 | Yeager et al. | |
| 6,790,919 B2 | 9/2004 | Matyjaszewski et al. | |
| 6,828,025 B2 | 12/2004 | Ali et al. | |
| 6,872,266 B1 | 3/2005 | Ciaramitaro | |
| 6,887,962 B2 | 5/2005 | Matyjaszewski et al. | |
| 6,960,617 B2 | 11/2005 | Omidian et al. | |
| 6,991,652 B2 | 1/2006 | Burg | |
| 6,992,156 B2 | 1/2006 | Parker et al. | |
| 7,018,655 B2 | 3/2006 | Lele et al. | |
| 7,019,082 B2 | 3/2006 | Matyjaszewski et al. | |
| 7,034,079 B2 | 4/2006 | Visger et al. | |

(56) References Cited

U.S. PATENT DOCUMENTS

| | | | |
|---|---|---|---|
| 7,037,992 B2 | 5/2006 | Wilson et al. | |
| 7,049,378 B2 | 5/2006 | Ittel et al. | |
| 7,056,455 B2 | 6/2006 | Matyjaszewski et al. | |
| 7,064,151 B1 | 6/2006 | Berge et al. | |
| 7,105,579 B2 | 9/2006 | Adam et al. | |
| 7,125,938 B2 | 10/2006 | Matyjaszewski et al. | |
| 7,157,530 B2 | 1/2007 | Matyjaszewski et al. | |
| 7,167,354 B2 | 1/2007 | Dietz et al. | |
| 7,186,419 B2 | 3/2007 | Petersen | |
| 7,241,502 B2 | 7/2007 | Anselmann et al. | |
| 7,316,919 B2 | 1/2008 | Childs et al. | |
| 7,332,550 B2 | 2/2008 | Matyjaszewski et al. | |
| 7,407,995 B2 | 8/2008 | Ok | |
| 7,496,456 B2 | 3/2009 | Lai | |
| 7,566,410 B2 | 7/2009 | Song et al. | |
| 7,572,874 B2 | 8/2009 | Matyjaszewski et al. | |
| 7,676,869 B2 | 3/2010 | Matyjaszewski et al. | |
| 7,691,997 B2 | 4/2010 | Khvorova et al. | |
| 7,786,213 B2 | 8/2010 | Maynard et al. | |
| 7,795,355 B2 | 9/2010 | Matyjaszewski et al. | |
| RE41,897 E | 10/2010 | Loveday et al. | |
| 7,812,108 B2* | 10/2010 | Parker | C08F 2/40 526/335 |
| 7,825,199 B1 | 11/2010 | Matyjaszewski et al. | |
| 7,893,173 B2 | 2/2011 | Matyjaszewski et al. | |
| 7,968,085 B2 | 6/2011 | Hersel et al. | |
| 8,048,982 B2 | 11/2011 | Higashimura et al. | |
| 8,114,803 B2 | 2/2012 | Yuasa et al. | |
| 8,252,880 B2 | 8/2012 | Matyjaszewski et al. | |
| 8,273,823 B2* | 9/2012 | Matyjaszewski | C08F 293/00 524/801 |
| 8,318,856 B2 | 11/2012 | Oh et al. | |
| 8,349,410 B2 | 1/2013 | Huang et al. | |
| 8,361,302 B2 | 1/2013 | Grassl et al. | |
| 8,367,051 B2 | 2/2013 | Matyjaszewski et al. | |
| 8,404,788 B2* | 3/2013 | Matyjaszewski | C08F 293/005 526/111 |
| 8,445,610 B2 | 5/2013 | Kwak et al. | |
| 8,497,225 B2 | 7/2013 | Zhamu et al. | |
| 8,652,849 B2 | 2/2014 | Childs et al. | |
| 8,729,173 B2 | 5/2014 | Wang et al. | |
| 8,816,000 B2 | 8/2014 | Rong et al. | |
| 8,828,434 B2 | 9/2014 | Su et al. | |
| 8,865,795 B1 | 10/2014 | Xin et al. | |
| 8,865,797 B2 | 10/2014 | Matyjaszewski et al. | |
| 8,871,831 B2 | 10/2014 | Huang et al. | |
| 8,906,447 B2 | 12/2014 | Zhamu et al. | |
| 8,962,764 B2 | 2/2015 | Matyjaszewski et al. | |
| 9,093,693 B2 | 7/2015 | Zhamu et al. | |
| 9,243,274 B2 | 1/2016 | Mehl et al. | |
| 9,410,020 B2 | 8/2016 | Matyjaszewski et al. | |
| 9,447,042 B2 | 9/2016 | Kita et al. | |
| 9,533,297 B2 | 1/2017 | Matyjaszewski et al. | |
| 10,072,042 B2 | 9/2018 | Matyjaszewski et al. | |
| 2002/0169290 A1 | 11/2002 | Bomaes et al. | |
| 2002/0183473 A1 | 12/2002 | Matyjaszewski et al. | |
| 2003/0004293 A1 | 1/2003 | Dvomic et al. | |
| 2003/0166755 A1 | 9/2003 | Muhlebach et al. | |
| 2003/0216528 A1 | 11/2003 | Matyjaszewski et al. | |
| 2004/0044152 A1 | 3/2004 | Matyjaszewski et al. | |
| 2004/0152821 A1 | 8/2004 | Saegusa et al. | |
| 2004/0171779 A1 | 9/2004 | Matyjaszewski et al. | |
| 2005/0090632 A1 | 4/2005 | Matyjaszewski et al. | |
| 2006/0008490 A1 | 1/2006 | Russell et al. | |
| 2006/0258867 A1 | 11/2006 | Gibson et al. | |
| 2007/0106012 A1 | 5/2007 | Matyjaszewski et al. | |
| 2007/0155926 A1 | 7/2007 | Matyjaszewski et al. | |
| 2007/0276101 A1 | 11/2007 | Matyjaszewski et al. | |
| 2007/0287681 A1 | 12/2007 | Jeong et al. | |
| 2008/0002146 A1 | 1/2008 | Stachowski | |
| 2008/0004398 A1 | 1/2008 | Durrieu et al. | |
| 2008/0114128 A1 | 5/2008 | Destarac et al. | |
| 2008/0176040 A1 | 7/2008 | Ilfrey et al. | |
| 2009/0156771 A1 | 6/2009 | Shen et al. | |
| 2009/0171024 A1 | 7/2009 | Jakubowski et al. | |
| 2009/0176951 A1 | 7/2009 | Matyjaszewski et al. | |
| 2010/0196277 A1 | 8/2010 | DeSimone et al. | |
| 2011/0060107 A1 | 3/2011 | Matyjaszewski et al. | |
| 2011/0065875 A1 | 3/2011 | Matyjaszewski et al. | |
| 2011/0091957 A1 | 4/2011 | Lele et al. | |
| 2012/0213986 A1 | 8/2012 | Matyjaszewski et al. | |
| 2013/0011441 A1 | 1/2013 | Hollinger et al. | |
| 2013/0090442 A1* | 4/2013 | Pugh | C08F 220/40 526/263 |
| 2013/0131278 A1 | 5/2013 | Huang et al. | |
| 2014/0183055 A1* | 7/2014 | Matyjaszewski | C08F 4/40 205/414 |
| 2014/0275420 A1 | 9/2014 | Matyjaszewski et al. | |
| 2015/0087795 A1 | 3/2015 | Matyjaszewski et al. | |
| 2016/0200840 A1* | 7/2016 | Matyjaszewski | C08F 120/28 526/172 |
| 2016/0369027 A1* | 12/2016 | Asandei | C08F 2/38 |
| 2017/0113934 A1 | 4/2017 | Kowalewski et al. | |

FOREIGN PATENT DOCUMENTS

| | | |
|---|---|---|
| EP | 0265091 A1 | 4/1988 |
| EP | 0329873 B1 | 11/1989 |
| EP | 0341012 A2 | 11/1989 |
| EP | 0434438 A | 6/1991 |
| EP | 0457916 A | 11/1991 |
| EP | 0789036 A1 | 8/1997 |
| EP | 0816385 A1 | 1/1998 |
| EP | 0824110 A1 | 2/1998 |
| EP | 0824111 A1 | 2/1998 |
| EP | 0826698 A1 | 3/1998 |
| EP | 0870809 A2 | 10/1998 |
| EP | 0872493 A | 10/1998 |
| EP | 0879832 A1 | 11/1998 |
| EP | 0947527 A1 | 6/1999 |
| EP | 1386935 A | 2/2004 |
| EP | 1469020 A | 10/2004 |
| EP | 1555273 A1 | 7/2005 |
| FR | 2777091 A1 | 10/1999 |
| JP | 64-11114 A | 1/1989 |
| JP | 2003-238609 A | 8/2003 |
| JP | 2011-246620 A | 12/2011 |
| WO | WO 88/00603 A3 | 1/1988 |
| WO | WO 94/13706 A | 6/1994 |
| WO | WO 96/30421 A | 10/1996 |
| WO | WO 97/18247 | 5/1997 |
| WO | WO 97/47661 A1 | 12/1997 |
| WO | WO 98/01480 | 1/1998 |
| WO | WO 98/06758 A1 | 2/1998 |
| WO | WO 98/20050 A2 | 5/1998 |
| WO | WO 98/40415 A | 9/1998 |
| WO | WO 99/28352 A | 6/1999 |
| WO | WO 00/22051 A1 | 4/2000 |
| WO | WO 00/47634 A1 | 8/2000 |
| WO | WO 00/56795 A1 | 9/2000 |
| WO | WO 00/75198 | 12/2000 |
| WO | WO 01/77197 A3 | 10/2001 |
| WO | WO 01/92359 A1 | 12/2001 |
| WO | WO 2002/081372 A2 | 10/2002 |
| WO | WO 2003/097107 A | 11/2003 |
| WO | WO 2004/041972 A | 5/2004 |
| WO | WO 2004/060928 A | 7/2004 |
| WO | WO 2004/087777 A2 | 10/2004 |
| WO | WO 2005/056621 A1 | 6/2005 |
| WO | WO-2005087819 A1 * | 9/2005 ............ C08F 291/00 |
| WO | WO 2005/116097 A1 | 12/2005 |
| WO | WO 2007/021142 A1 | 2/2007 |
| WO | WO 2007/025086 A2 | 3/2007 |
| WO | WO 2007/025310 A | 3/2007 |
| WO | WO 2007/059350 A2 | 5/2007 |
| WO | WO 2008/009997 A1 | 1/2008 |
| WO | WO 2008/057163 A2 | 5/2008 |
| WO | WO 2008/148000 A1 | 12/2008 |
| WO | WO 2009/023353 A9 | 2/2009 |
| WO | WO 2009/065077 A1 | 5/2009 |
| WO | WO 2009/108822 A1 | 9/2009 |
| WO | WO 2009/111725 A1 | 9/2009 |
| WO | WO 2009/132206 A1 | 10/2009 |
| WO | WO 2009/132884 A1 | 11/2009 |

(56) References Cited

FOREIGN PATENT DOCUMENTS

| WO | WO 2010/096422 A1 | 8/2010 |
|---|---|---|
| WO | WO 2010/111708 A1 | 9/2010 |
| WO | WO 2010/131907 A2 | 11/2010 |
| WO | WO 2012/034043 A1 | 3/2012 |
| WO | WO 2012/091965 A1 | 7/2012 |
| WO | WO 2013/063772 A1 | 5/2013 |

OTHER PUBLICATIONS

International Search Report and Written Opinion for International Application No. PCT//US2018/013335 dated Apr. 4, 2018.
Acar et al., "Adventitious Effect of Air in Atom Transfer Radical Polymerization Air-Induced (Reverse) Atom Transfer Radical Polymerization of Methacrylates in the Absence of an Added Initiator," Macromolecules 2000, 33, 7700-7706.
Anderegg et al., "Pyridine Derivatives as Complexing Agents XI. Thermodynamics of Metal Complex Formation with Bis-, Tris- and Tetrakisl(2-pyridyl)methyl]-amines", Helvetica Chimica Acta, 1977, 60(1), pp. 123-140.
Annenkov et al., Poly-C-vinyttetrazoles: A New Type of Polyacid, Journal of Polymer Science Part A: Polymer Chemistry, 1993, pp. 1903-1906, vol. 31(7).
Ashford et al., "First example of the atom transfer radical polymerisation of an acidic monomer: direct synthesis of methacrylic acid copolymers in aqueius media", Chemical Communications—Chemcom, Royal Society of Chemistry, GB (1999), pp. 1285-1286.
Asscher et al., "Chlorine-Activation by Redox-Transfer, Part IV, The Addition of Sulphonyl Chlorides to Vinylic Monomers and Other Olefins," Journal of the Chemical Society, 1964, pp. 4962-4971.
Bamford, "Redox Initiators," Comprehensive Polymer Science (First Supplement), eds., Pergamon: Oxford vol. 3., p. 123-139 (1991).
Baumann et al., "Synthesis of polystyrene-block-poly(styrene-co-acrylonitrile) block copolymers and thermoanalytical studies of nitroxide-termninated poly(styrene-co-acrylonitrile) copolymers," Macromolecular Materials and Engineering (2000), 280/281, 1-6.
Bellus, "Copper-catalyzed additions of organic polyhalides to olefins: a versatile synthetic tool," Pure & Appl. Chem. 57, No. 12, pp. 1827-1838 (1985).
Bledzki et al., "Polymerisation von Methylmethacrylat mit verschiedenen _eiraphenylethanen," Makromol. Chem., 184, pp. 745-754 (1983).
Braunecker et al., "Quantifying Vinyl Monomer Coordination to $Cu^I$ in Solution and the Effect of Coordination on Monomer Reactivity in Radical Copolymerization," Macromolecules 2005, 38, pp. 4081-4088.
Braunecker et al., "Towards understanding monomer coordination in atom transfer radical polymerization: synthesis of $[Cu^I(PMDETA)(\pi-M)][BPh_{4t}$(M=methyl acrylate, styrene, 1-octene, and mthyl methacrylate) and structural studies by FT-IR and $^1H$ NMR spectroscopy and X-ray crystallogrphy," Organometal Chem. 2005, 690, pp. 916-924.
Brittain et al., Makromol. Chem., Macromol. Symp. 67, pp. 373-386 (1993), "Termination Processes in Group Transfer Polymerization".
Buback et al., "Critically evaluated rate coefficients for free-radical polymerization, 1," (1995) Macromol. Chem. Phys. 196, pp. 3267-3280.
Buback et al., "Critically Evaluated Termination Rate Coefficients for Free-Radical Polymerization, 1," (2002) Macromol. Chem. Phys. 203, pp. 2570-2582.
Bywater, Makromol. Chem., Macromol. Symp. 67, pp. 339-350 (1993), "Group Transfer Polymerization—A Critical Overview".
Carnahan et al., "Synthesis and Characterization of Poly(glycerol-succinic acid) Dendrimers," Macromolecules, 2001, pp. 7648-7655, vol. 34(22).
Carter et al., "Polyimide Nanofoams From Phase-Separated Block Copolymers," Electrochemical Society Proceedings, 1997, pp. 32-43, vol. 97(8), Electrochemical Society, Pennington, NJ, US.
Caruso, "Nanoengineering of Particle Surfaces," Adv. Mater. 2001, 13, No. 1, Jan. 5, 11-22—Wiley—VCH Verlag GmbH.D-69469 Weinheim, 2001.
Catala, et al., "Living Radical Polymerization: Kinetic Results," Macromolecules, 1995, 28, pp. 8441-8443.
Chemical Abstracts, vol. 85, 1976, p. 20.
Chen et al., "Pryolytic Behavior and In-Situ Paramagnetism of Star-like C60(CH3)x(PAN)xcopolymers," European Polymer Journal, 1998, pp. 421-429, vol. 34(3-4), Elsevier Science Ltd., Oxford, GB.
Coca et al., "Polymerization of Acrylates by Atom Transfer Radical Polymetization, Homopolymerization of 2-Hydroxyethyl Acrylate," Journal of Polymer Science, Part A: Polymer Chemistry, 1998, pp. 1417-1424, vol. 36.
Cohen et al., "Chromium-Carbon Bonds in Aqueous Solutions. A Pulse Radiolytic Study," Inorg. Chem. 13, pp. 2434-2443 (1974).
Collman et al., "'Clicking' Functionality onto Electrode Surfaces," Langmuir, 2004, pp. 1051-1053, vol. 20.
Curran, et al., "Radical Addition Reactions", Comprehensive Organic Synthesis, Pergamon: Oxford vol. 4, p. 715-777 (1991).
Curran et al., "Group Transfer Addition Reactions of Methyl(phenylseleno)maiononitrile to Alkenes," J. Am. Chem. Soc. 116, pp. 4279-4288 (1994).
Curran et al., "Atom transfer Cyclization Reactions of α-Iodo Esters, Ketones, and Malonates: Examples of Selective 5-Exo, 6-Endo, 6-Exo, and 7-Endo Ring," J. Org. Chem., 54, pp. 3140-3157 (1989).
Curran, "The Design and Application of Free Radical Chain Reactions in Organic Synthesis Part 2," Synthesis, pp. 489-513 (1988).
Darkow et al., "Synthesis, Photomodification and Characterization of Homo- and Copolymers with 2.5-bisaryltetrazolyl Pendant Groups", Reactive and Functional Polymers, 1997, pp. 195-207, vol. 32(2).
Davies, "Reactions of L-ascorbic acid with transition metal complexes," Polyhedron, 1992, 11, 285-321.
De Vries et al., "The Effect of Reducing Monosaccharides on the Atom Transfer Radical Polymerization of Butyl Methacrylate," Macromol. Chem. Phys., 2001, 202, 1645-1648.
Demko et al., "A Click Chemistry Approach to Tetrazoles by Huisgen 1,3-Dipolar Cycloaddition: Synthesis of 5-Acyltetrazoles from Azides and Acyl Cyanides," Angewandte Chemie, International Edition, 2002, pp. 2113-2116, vol. 41(12).
Desmarquest et al., "Électrode Rédox À Hydrazine: Étude de La Réduction Du Chlorure Cuivrique," Electrochim. Acta (1968), 13, pp. 1109-1118.
Dreezen et al., "Nano-Structured Polymer Blends: Phase Structure, Crystallisation Behaviour and Semi-Crystalline Morphology of Phase Separated Binary Blends of Poly(ethyleneoxide) and Poly(ether sulphone)", Polymer, Elsevier Science Publishers B.V., GB, vol. 41, No. 4, Feb. 2000, pp. 1395-1407.
Druliner, "Living Radical Polymerization Involving Oxygen-Centered Species Attached to Propagating Chain Ends," Macromolecules, 24, pp. 6079-6082 (1991).
Endo et al., "Living Radical Polymerization of Styrene with Tetramethylene Disulfide," Macromolecules, 25, pp. 5554-5556 (1992).
Feng, "Synthesis and Free Radical Polymerization of 2-oxo-3-methylene-5-phenyl-1,4-dioxan", Chinese Journal of Polymer Science, 1993, 11, 2, pp. 153-157.
Fischer et al., "Rate Constants for Some Prototype Radical Reactions in Liquids by Kinetic Electron Spin Resonance," Acc. Chem. Res. 20, 200-206 (1987).
Fischer, H., "The Persistent Radical Effect: A Principle for Selective Radical Reactions Living Radical Polymerizations," Chem. Rev. 2001, 101, pp. 3581-3610.
Frackowiak et al., "Supercapacitor electrodes from multiwalled carbon nanotubes", Applied Physics Letters, 77, pp. 2421-2423 (2000).
Fukuda et al, "Mechanism of 'Living' Radical Polymerization Mediated by Stable Nitroxyl Radicals," Chem. Letters, 1996, 4, pp. 293-294.

(56) References Cited

OTHER PUBLICATIONS

Fukuda et al., "Well-Defined Block Copolymers Comprising Styrene-Acrylonitrile Random Copolymer Sequences Synthesized by 'Living' Radical Polymerization," Macromolecules, 1996, 29, pp. 3050-3052.
Gabaston et al., "Synthesis of water soluble homopolymers and block copolymers by living free-radical polymerization", Polymr Preprints (American Chemical Society, Division of Polymer Chemistry), 38(1), pp. 719-720 (1997).
Gaynor et al., "Well Defined Polymers Obtained Through the Use of Controlled Radical Polymerization: The Use of Aklyl Iodides as Degenerative Transfer reagents," Polym. Prep. (Am. Chem. Soc. Polym. Chem. Div.), 36(1), pp. 467-468 (1995).
Georges et al., "Narrow Molecular Weights Resins by a Free-Radical Polymerization Process," Macromolecules 1993, 26, pp. 2987-2988.
Georges et al., "Narrow Polydispersity Polystyrene by a Free-Radical Polymerization Process-Rate Enhancement," Macromolecules 1994, 27, pp. 7228-7229.
Georges et al., "Free Radical Polymerizations for Narrow Polydispersity Resides: Electron Spin Resonance Studies of the Kenetis and Mechanism," Macromolecules, 1993, 26, pp. 5316-5320.
Gilbert & Williams, "Reactivity Ratios of Conjugated Dienes Copolymerized in Emulsion at 5°," J. Am. Chem. Soc. 74, (1952), pp. 4114-4118.
Gnanou et al., "Effect of Phenol and Derivatives on Atom Transfer Radical Polymerization in the Presence of Air," Journal Polymer Science, Part A: Polymer Chemistry, 2004, 42, pp. 351-359.
Granel et al., "Controlled Radical Polymerization of Methacrylic Monomers in the Presence of Bis(ortho-chelated) Arylnickel (II) Complex and Different Activated Alkyl Halides," Macromolecules, 1996, pp. 8576-8582, vol. 29(27).
Grayson et al., "Convergent Dendrons and Dendrimers: From Synthesis to Applications," Chemical Reviews, 2001, pp. 3819-3867, vol. 101(12).
Greszta et al., "Gradient Copolymers of Styrene and Acrylonitrille Via Atom Transfer Radical Polymerization," Polymer Preprints, 1997, pp. 709-710, vol. 38(1).
Gromada et al., "Simultaneous Reverse and Normal Initiation in Atom Transfer Radical Polymerization," Macromolecules, 2001, pp. 7664-7671, 34(22).
Haddleton et al., "Copper-mediated living radical polymerization utilizing biological and end group modified poly(ethylene-co-butylene) macroinitiators", ACS Symposium Series, 768, (Controlled/Living Radical Polymerization), pp. 182-196 (2000).
Hawker, "Molecular Weight Control by a Living Free Radical Polymerization Process", Journal American Chem. Society, 1994, vol. 116, pp. 11185-11186.
Hawker et al., "Well-Defined Random Copolymers by a 'Living' Free-Radical Polymerization Process," Macromolecules, 1996, 29, 2686-2688.
Hayes et al., "Exploratory Studies of the Transition Metal Catalyzed Intrameecular Cyclization of Unsaturated α, α-Dichloro Esters, Acids, and Nitroles." J. Am. Chem. Soc. 110, p. 5533 (1988).
Hedrick et al., "Dendrimer-like Star Block and Amphiphlic Copolymers by Combination of Ring Opening and Atom Transfer Radicat Polymerization," Macromolecules, 1998, 31, pp. 8671-8705.
Helms et al., "Dendronized Linear Polymers via 'Click Chemistry'", Journal of the American Chemical Society, 2004, pp. 15020-15021, vol. 126(46).
Heuts et al., "Atom transfer radical polymerization in the presence of a thiol: more evidence supporting radical intermediates," Macromol. Chem. Phys., 1999, 200, pp. 1380-1385.
Hirao et al., "Synthetic Reactions via Vanadium-Induced One-Electron Redox," J. Synth. Org. Chem. (Japan), 52(3), pp. 197-206 (1994).
Hirao et al., "Vanadium Dichloride Induced Addition of Bromotrichloromethane to Olefinic Compounds," Syn. Lett. pp. 217-218 (1990).
Hong et al., "Synthesis of water-soluble fluorine-containing block copolymers by atom transfer radical polymerization", 25(4), 302 (2001).
Hovestad et al., "Copper(I) Bromide/N-(n-Octyl)-2-pyridylmethanimine-Mediated Living-Radical Polymerization of Methyl Methacrylate Using Carbosilane Dendritic Initiators," Macromolecules 2000, 33, pp. 4048-4052.
Ihre et al., "Fast and Convenient Divergent Synthesis of Aliphatic Ester Dendrimers by Anhydride Coupling," Journal of the American Chemical Society, 2001, pp. 5908-5917, vol. 123(25).
Iqbal et al., "Transition Metal-Promoted Free-Radical Reactions in Organic Synthesis: The Formation of Carbon-Carbon Bonds," Chem. Rev. 94, pp. 519-564 (1994).
Jakubowski et al., "Activators Regenerated by Electron Transfer for Atom Transfer Radical Polymerization of Styrene," Macromolecules, 2006, 39, 39-45.
Jian et al., "Mesoporous carbons with self-assembled high-activity surfaces," Air Force Research Laboratory [Report], Jul. 7, 2006. [Retrieved from http://www.dtic.mil, Search ADA461480].
Jo et al., "Effects of Various Copper Salts and Additives on Polymerization of Acrylonitrile by Atom Transfer Radical Polymerization," Polymer Preprints, 1997, pp. 699-700, vol. 38(1).
Jo et al., "Polyacrylonitrile with Low Polydispersities by Atom Transfer Radical Polymerization," Polymer Preprints, 1997, pp. 697-698, vol. 38(1).
Kamigata et al., "Novel Perfluoroalkylation of Alkenes with Perfluoroalkanesulphonyl Chlorides Catalysed by a Ruthenium (II) Complex," Journal of the Chemical Society, Perkins Transactions 1, 1991, pp. 627-633.
Kato et al., "Polymerization of Methyl Methacrylate with the Carbon Tetrachloride/Dichlorotris(triphenylphosphine)ruthenium(II)/Methylaluminum Bis(2,6-di-tert-butylphenoxide) Initiating System: Possibility of Living Radical Polymerization," Macromolecules, 28, 1721 (1995).
Kawaguchi et al., "Dispersion Polymerization", in Polymer Particles, Masayoshi Okubo, ed., Adv. Polym. Sci., 2005, 175, 299-328.
Kizhnyaev et al., "Vinyltetrazoles: Synthesis and Properties," Russian Chemical Reviews, 2003, pp. 143-164, vol. 72(2).
Kolb et al., "Click Chemistry: Diverse Chemical Function from a Few Good Reactions," Angewandte Chemie, International Edition, 2001, pp. 2004-2021, vol. 40(11).
Kosower, E.M., "Monosubstituted Diazenes (Diimides). Surprising Intermediates," Acc Chem. Res. (1971), 4, pp. 193-198.
Kowalewski et al., "Advances in Nanostructured Carbons from Block Copolymers Prepared by Controlled Radical Polymerization Techniques, in Controlled Radical Polymerization: From Synthesis to Materials," American Chemical Society Division of Polymer Chemistry, 2005, Chapter 21, pp. 295-310, vol. 944.
Kwak et al., "ARGET ATRP of methyl methacrylate in the presence of nitrogen-based ligands as reducing agents," Polym. Int. 2009, 58, 242-247.
Lazzari et al., "Synthesis of Polyacrylonitrile-block-Polystyrene Copolymers by Atom Transfer Radical Polymerization," Macromolecular Chemistry and Physics (2005), 206, pp. 1382-1388.
Leduc et al., "Dendritic initiators for "Living" Radical Polymerizations: A Versatile Approach to the Synthesis of Dendritic-Linear Block Copolymers", J. Am. Chem. Soc. Jun. 26, 1996, 118, 11111.
Lee et al., "Synthesis of carboxylic acid functionalized nanoparticles by reversible addition-fragmentation chain transfer (RAFT) miniemulsion polymerization of styrene", Polymer, Elsevier Science Publishers B.V., GB, vol. 46, No. 11, pp. 3661-3668 (2005).
Lewis et al., "Copolymerization VII, Copolymerization of Some Further Monomer Pairs," Apr. 1948, pp. 1527-1529.
Li et al., "Highly ordered carbon nanotube arrays for electronics applications", Applied Physics Letters, 75 pp. 367-369 (1999).
Li et al., "Snythesis, Characterization, and Evaluation or Initiators for Living Free Radical Polymerization: Synthesis of Polystyrene with Controlled Structure," ASC Polym. Preprints, 1995, 36(1), pp. 469-470.
Lingane, "Interpretation of the Polarographic Waves of Complex Metal Ions," Chem. Rev. 1941, 29, 1.

(56) References Cited

OTHER PUBLICATIONS

Liu et al., "Poly(N-isopropylacrylamide) hydrogels with improved shrinking kinetics by RAFT polymerization", Mar. 22, 2006, Polymer Elsevier Science Publishers, B.V., GB, pp. 2330-2336.

Majoral et al., "Dendrimers Containing Heteroatoms (Si, P, B, Ge, or Bi)," Chemical Reviews, 1999, pp. 845-880, vol. 99(3).

Makino et al., "Controlled Atom Transfer Radical Polymerizations of Methyl Methacrylate Under Micellar Conditions," Polymer Preprints, 1988, pp. 288-289, vol. 39(1).

Mao et al., "Controlled polymerizations of 2-(dialkylamino)ethyl methacrylates and their block copolymers in protic solvents at ambient temperature via ATRP", Journal of Polymer Science, Part A Polymer Chemistry 42(20), pp. 5161-5169(2004).

Maraval et al., "'Lego' Chemistry for the Straightforward Synthesis of Dendrimer," Journal of Organic Chemistry, 2003, pp. 6043-6046, vol. 68(15).

Mardare et al., "Thermal Polymerization of Styrene in the Presence of Stable Radicals and Inhibitors," ACS Polymer Preprints 35(1), pp. 778-779 (1994).

Mardare et al., "'Living' Radical Polymerization of Vinyl Acetate," Macromolecules, 27, pp. 645-649 (1994).

Mardare et al., "Radical Polymerization of Vinyl Acetate and Methyl Methacrylate Using Organochromium Initiators Complexed with Macrocyclic Polyamines," Polym. Prep. (ACS), 36(1), pp. 700-701 (1995).

Marestin et al., "Nitroxide Mediated Living Radical Polymerization of Styrene in Emulsion," Macromolecules, 1998, pp. 4041-4044, vol. 31(12).

Matsumoto et al., "Copper-Catalyzed Aerobic Oxidation of Methoxyphenols," Synth. Commun. (1985) 15, 515.

Matthews et al., "Dendrimers-Branching out from Curiosites into New Technologies," Progress in Polymer Science, 1998, pp. 1-56, vol. 23.

Wang et al., Matyjaszewski ed., Controlled/"Living" Radical Polymerization. Progress in ATRP, NMP, and RAFT, in: ACS Symposium Ser., 2000, "Chapter 19, Reverse Atom Transfer Radical Polymerization Using AIBN or BPO as Initiator," pp. 263-275.

Matyjaszewski et al., (Structural Control of Poly(Methyl Methacrylate)-g-poly(Lactic Acid) Graft Copolymers by Atom Transfer Radical Polymerization (ATRP). Macromolecules 2001, 34, 6243-6248.

Matyjaszewski et al., "Controlled/Living Radical Polymerization. Kinetics of the Homogeneous Atom Transfer Radical Polymerization of Styrene," J. Am. Chem. Soc., 1997, 119, 674-680.

Matyjaszewski et al., "Atom transfer radical polymerization", *Chemical Reviews*, 2001, 101, (9), 2921-2990.

Matyjaszewski et al., "Controlled/"Living" Radical Polymerization of Styrene and Methly Methacrylate Catalyzed by Iron Complexes1," Macromolecules, 1997, pp. 8161-8164, vol. 30(26).

Matyjaszewski et al., "Controlled/Living Radical Polymerization: State of the Art in 2002, in ACS Symposium Series, Advances in Controlled/living Radical Polymerizations," American Chemical Society Division of Polymer Chemistry, 2003, Chapter 1, pp. 2-9, vol. 854.

Matyjaszewski et al., "Controlled/Living Radical Polymerization: State of the Art in 2005, in Controlled Radical Polymerization: From Synthesis to Materials," American Chemical Society Division of Polymer Chemistry, 2006, Chapter 1, pp. 2-12, vol. 944.

Matyjaszewski et al., "Zerovalent Metals in Controlled/"Living" Radical Polymerization," Macromolecules, 1997, pp. 7348-7350, vol. 30(23).

Matyjaszewski, "The Importance of Exchange Reactions in the Controlled/Living Radical Polymerization in the Presence of Alkoxyamines and Transition Metals", Macromolecule Symposium, 1996, vol. 111, pp. 47-61.

Matyjaszewski, "Radical Nature of Cu-Catalyzed Controlled Radical Polymerizations (Atom Transfer Radical Polymerization)," Macromolecules, 1998, 31, 4710-4717.

Matyjaszewski, K., "Overview: Fundamentals of Controlled/Living Radical Polymerization," American Chemical Society, publication date: Jan. 8, 1998, pp. 2-30, downloaded on Sep. 2, 2009, http://pubs.acs.org.

Matyjaszewski et al., "Determination of Activation and Deactivation Rate Constants of Model Compounds in Atom Transfer Radical Polymerization," Macromolecules 34, pp. 5125-5131 (2001).

Matyjaszewski et al., "Observation and Analysis of a Slow Termination Process in the Atom Transfer Radical Polymerization of Styrene," Tetrahedron (1997), 53, p. 15321-15329.

McCarthy et al., "Grafting Chromatographic Stationary Phase Substrates by Atom Transfer Radical Polymerization, in Controlled Radical Polymerization: From Synthesis to Materials," American Chemical Society Division of Polymer Chemistry, 2005, Chapter 18, pp. 252-268, vol. 944.

Min et al, "Atom Transfer Radical Dispersion Polymerization of Styrene in Ethanol", Macromolecules, ACS, Washington, DC, US, vol. 40, No. 20, (Oct. 2, 2007), pp. 7217-7221.

Mitani et al., "Photoaddition of Alkyl Halides to Olefins Catalyzed by Copper(I) Complexes," J. Am Chem. Soc. 105, pp. 6719-6721 (1983).

Nagashima, "Transttion Metal Catalyzed Radical Cyclization: New Preparative Route to γ-Lactams from Allylic Alcohols via the [3.3]-Signatropic Rearrangement of Allylic Trichloroacetimidates and the Subsequent Ruthenium-Cataiyzed Cyclization of N-Allyltrixhloroacetamides," J. Org. Chem. 57, pp. 1682-1689 (1992).

Nagashima, J. "Transition Metal-Catalyzed Radical Cyclizations: A Low Temperature Process for the Cyclization of N-Protected N-Allyltrichloroacetamides to Trichlorinated γ-Lactams and Application to the Stereoselective Preparation of ß,γ-Disubstituted γ-Lactams," Org. Chem. 58, pp. 464-470 (1993).

Navon et al., "Design of Ligans That Stabilize Cu(I) and Shift the Reduction Potential of the $Cu^{II}/I$ Couple Cathodically in Aqueous Solutions," Inorg. Chem. 1999, 38, pp. 3484-3488.

Nishikawa et al., "Evidence for Living Radical Polymerization of Methyl Methacrylate with Ruthenium Complex: Effects of Protic and Radical Compounds and Reinitiation from the Recovered Polymers," Macromolecules, 1997, pp. 2244-2248, vol. 30(8).

Odell et al., "Rate Enhancements of Living Free-Radical Polymerizations by an Organic Acid Salt," Macromolecules, 1995, 28, pp. 8453-8455.

Odian, Principles of Polymerization, Third Edition, John Wiley & Sons, p. 205-233 (1991).

Orochov et al., Redox-Transfer, Part VI, Determination of Hammel's P-Constant for the Oxidation of Cuprous Chloride by Aromatic Sulphonyl Chlorides, Journal of the Chemical Society (B), (1969), pp. 255-259.

Orochov et al., Redox Transfer. Part VIII. Addition of Benzenestlphonyl Chloride Carbon Tetrachloride to Substituted Styreness: a Kinetic Study, J. Chem. Soc., Perkin II, pp. 1000-1002 (1973).

Orr, "Thermochemical Aspects of Butadiene-Styrene Copolymerization," 1960, pp. 74-82.

Otsu et al., "Living Radical Polymerization with Reduced Nickel/Halide Systems as a Redox Iniferter," Chem. Express 5(10), pp. 801-804 (1990).

Otsu et al., "Synthesis, Reactivity, and Role of—Vinylbenzyl N,N-Diethyldithiocarbamate as a Monomer-Iniferter in Radical Polymerization," Macromolecules, 1986, pp. 287-290, vol. 19(2).

Pakula et al., "Polymers, Particles, and Surfaces with Hairy Coatings: Synthesis, Structure, Dynamics, and Resulting Properties, in ACS Symposium Series, Advances in Controlled/living Radical Polymerizations," American Chemical Society Division of Polymer Chemistry, 2003, Chapter 26, pp. 366-382, vol. 854.

Paoletti et al., "Relative Bond Dissociation Energies and Heats of Formation of Two Series of Five-Coordinated Metal Complexes from Manganese(II) to Zinc(II). A Calorimetric Study," Inorg. Chem. 1967, 6, pp. 64-68.

Paoletti et al., "Thermochemistry of Metal-Polyamine Complexes," Inorg. Chim. Acta Rev. 1973, 7, pp. 43-68.

Patten et al., "Atom Transfer Radical Polymerization and the Synthesis of Polymeric Materials," Advanced Materials, 1998, pp. 901-915, vol. 10(12).

(56) References Cited

OTHER PUBLICATIONS

Patten et al., "Polymers with very low polydispersities from atom transfer radical polymerization", Science (Washington, D. C.), 1996, 272, (5263), 866-868.
Percec et al., "'Living' Radical Polymerization of Styrene Initiated by Arenesulfonyl Chlorides and Cu1(bpy)nCl," Macromolecules, 1995, pp. 7970-7972, vol. 28(23).
Percec et al., "Metal-Catalyzed "Living" Radical Polymerization of Styrene Initiated with Arenesulfonyl Chlorides. From Heterogeneous to Homogeneous Catalyses," Macromolecules, 1996, pp. 3665-3668, vol. 29(10).
Pintauer et al., "Toward Structural and Mechanistic Understanding of Transition Metal-Catalyzed Atom Transfer Radical Processes, in ACS Symposium Series, Advances in Controlled/living Radical Polymerizations," American Chemical Society Division of Polymer Chemistry, 2003, Chapter 10, pp. 130-147, vol. 854.
Punna et al., "Click Chemistry in Polymer Synthesis," Polymer Preprints, 2004, pp. 778-779, vol. 45(1).
Puts et al., "Control of Living Free-Radical Polymerization by a New Chiral Nitroxide and Implications for the Polymerization Mechanism," Macromolecules, 1996, 29, pp. 3323-3325.
Qiu et al., "Cyclic Voltammetric Studies of Copper Complexes Catalyzing Atom Transfer Radical Polymerization," Macromolecular Chemistry and Physics, 2000, pp. 1625-1631, vol. 201(14).
Queffelec et al., "Optimization of Atom Transfer Radical Polymerization Using Cu(I)/Tris(2-(dimethylamino)ethyl)amine as a Catalyst," Macromolecules, 2000, pp. 8629-8639, vol. 33.
Quirk et al., Makromol. Chem., Macromol. Symp. 67, pp. 351-363 (1993), "Mechanistic Aspects of Group Transfer Polymerization".
Richard et al., "Acrylate-Based Block Copolymers Prepared by Atom Transfer Radical Polymerization as Matrices for Drug Delivery Applications, in Controlled Radical Polymerization: From Synthesis to Materials," American Chemical Society Division of Polymer Chemistry, 2005, Chapter 17, pp. 234-251, vol. 944.
S.A.F. Bon et al., "Controlled Radical Polymerization in Emulsion," Macromolecules, 1997, pp. 324-326, vol. 30(2).
Samuni et al., "On the cytotoxicity of vitamin C and metal ions," European Journal of Biochemistry, 1983, 137. 119-124.
Schubert et al., "Design of Effective Systems for Controlled Radical Polymerization of Styrene: Application of 4,4'-Dimethyl and 5,5'-Dimethyl 2,2'-Bipyridine Copper(ii) Complexes," Macromolecular Rapid Communication, 1999, pp. 351-355, vol. 20.
Schulz & Milkovich, "Relative Reactivities and Graft Distributions of Polystyrene Macromers in Vinyl Chloride Copolymerization," Polymer International, 1994, pp. 141-149, Great Britain.
Seijas et al., "Synthesis of Pyrrolizidines via Copper(I) Catalyzed Radical Atom Transfer Cyclization," Tetrahedron, 48(9), pp. 1637-1642 (1992).
Shen et al., "Supported Atom Transfer Radical Polymerization of Methyl Methacrylate Mediated by CuBr-Tetraethyldiethylenetriamine Grafted onto Silica Gel," Journal of Polymer Science: Part A: Polymer Chemistry, vol. 39, 1051-1059 (2001); John Wiley & Sons, Inc.
Srivastava et al., "Complexes of Copper(II) with Substituted Hydrazines," J. Inorg. Nucl. Chem. (1980), 42, pp. 47-50.
Stille et al., "Synthesis and Copolymerization of Styryl-Substituted Tetrazoles. Thermal Cross-Linking of Copolymers Containing Dipolarophiles and the Tetrazoles as Nitrile Imine Dipole Precursors," Macromolecules, 1972, pp. 377-384, vol. 5(4).
Sumerlin et al., "Click Functionalization of Well-Defined Copolymers Prepared by Atom Transfer Radical Polymerization, in Controlled Radical Polymerization: From Synthesis to Materials," American Chemical Society Division of Polymer Chemistry, 2005, Chapter 11, pp. 140-152, vol. 944.
Takeichi et al., "Preparation of Porous Carbon Films by the Pyrolysis of Poly(Urethane-imide) Films and Their Pore Characteristics," Carbon, 2001, pp. 257-265, vol. 39(2).
Tang, et al., "Determination of Equilibrium Constants for Atom Transfer Radical Polymerization," J. Am. Chem. Soc., 128, pp. 1598-1604.

Tsarevesky et al., "Factors Determining the Performance of Copper-Based Atom Transfer Radical Polymerization Catalysts and Criteria for Rational Catalyst Selection, in Controlled Radical Polymerization: From Synthesis to Materials," American Chemical Society Division of Polymer Chemistry, 2005, Chapter 5, pp. 56-70, vol. 944.
Tsarevsky et al., "Well-Defined (Co)polymers with 5-Vinyltetrazole Units via Combination of Atom Transfer Radical (Co)polymerization of Acrylonitrile and "Click Chemistry"-Type Postpolymerization Modification," Macromolecules, 2004, pp. 9308-9313, vol. 37(25).
Udding et al., "Transition Metal-Catalyzed, Chlorine-Transfer Radical Cyclizations of 2-(3-Alken-1-oxy)-2-chloroacetates. Formal Total Synthesis of Avenaciolide and Isoavenaciolide," J. Org. Chem. 59, pp. 1993-2003 (1994).
Van Gaal et al., "Trends in Redox Potentials of Transition Metal Complexes," Coord. Chem. Rev. 1982, 47, 41.
Veregin et al., "Mechanism of Rate Enhancement Using Organic Acids in Nitroxide-Mediated Living Free-Radical Polymerizations," Macromolecules, 1996, 29, pp. 4161-4163.
Vidts et al., "Design of water-soluble block copolymers containing poly(4-vinylpyridine) by atom transfer radical polymerization", European Polymer Journal, Pergamon Press Ltd, Oxford, GB, vol. 42, No. 1, pp. 43-50 (2006).
Vlcek, "Ligand Based Redox Series," Coord. Chem. Rev. 1982, 43, 39.
Von Werne et al., "Preparation of Structurally Well-Defined Polymer-Nanoparticle Hybrids with Controlled/living Radical Polymerizations," J. Am. Chem. Soc. 1999, 121, pp. 7409-7410.
Wang et al., "'Living'/Controlled Radical Polymerization, Transition-Metal-Catalyzed Atom Transfer Radical Polymerization in the Presence of a Conventional Radical Initiator," Macromolecules, 1995, pp. 7572-7573, vol. 28.
Wang et al., "Controlled/'Living' Radical Polymerization. Atom Transfer Radical Polymerization in the Presence of Transition-Metal Complexes," Journal of the American Chemical Society, 1995, pp. 5614-5615, vol. 117(20).
Wang et al., "Controlled/'Living' Radical Polymerization. Halogen Atom Transfer Radical Polymerization Promoted by a Cu(I)/Cu(II) Redox Process," Macromolecules, 1995, pp. 7901-7910, vol. 28(23).
Wang et al., "ESR Study and Radical Observation in Transition Metal-Mediated Polymerization: Unified View of Atom Transfer Radical Polymerization Mechanism, in ACS Symposium Series, Advances in Controlled/living Radical Polymerizations," American Chemical Society Division of Poiymer Chemistry, 2003, Chapter 12, pp. 161-179, vol. 854.
Wang et al., "Facile Synthesis of Acidic Copolymers Via Atom Transfer Radical Polymerization in Aqueous Media at Ambient Temperature", Macromolecules, ACS, Washington, DC, vol. 33, No. 2, (Jan. 25, 2000), pp. 255-257.
Wang et al., "Kinetics and Mechanism of Aliphatic Amine Oxidation by Aqueous (batho)$_2$Cu$^{II}$," J. Am. Chem. Soc. (1992), 114, 248-255.
Wang et al., "Controlled Sequential and Random Radical Copolymerization of Styrene and Butyl Acrylate," Polym. Prep. (Am. Chem. Soc. Polym. Chem. Div.), 36(1), 465(1995).
Wayland et al., "Living Radical Polymerization fo Acrylates by Organiocobalt Porphyrin Complexes," Am. Chem. Soc., 116, pp. 7943-7944 (1994).
Webster, "Living Polymerization Methods," Science, 1991, pp. 887-893, vol. 25.
Webster, "Mechanism of GTP: Can all of the Available Data be Accommodated?" Makromol. Chem., Macromol. Symp. 67, pp. 365-371 (1993).
Wei et al., "Atom Transfer Radical Polymerization of Styrene in the Presence of Iron Complexes," Polymer Preprints, 1997, pp. 231-232, vol. 38(2).
Wu et al., "Efficiency and Fidelity in a Click-Chemistry Route to Triazole Dendrimers by the Copper(I)-Catalyzed Ligation of Azides and Alkynes," Angewandte Chemie, International Edition, 2004, pp. 3928-3932, vol. 43(30).

(56) References Cited

OTHER PUBLICATIONS

Xia et al., "Controlled/'Living' Radical Polymerization. Homogenous Reverse Atom Transfer Radical Polymerization Using AIBN as the Initiator," Macromolecules, 1997, pp. 7692-7696, vol. 30.
Xia et al., "Atom Transfer Radical Polymerization of 4-Vinylpyridine," Macromolecules, pp. 3531-3533 (1999).
Zeng et al., "Synthesis and Characterization of Comb-Branched Polyelectrolytes. 1. Preparation of Cationic Macromonomer of 2-(Dimethylamino)ethyl Methacrylate by Atom Transfer Radical Polymerization", Macromolecules, 33(5), pp. 1628-1635 (2000).
Gaynor et al., "Controlled/'Living' Radical Polymerization Applied to Water-Borne Systems," Macromolecules 1998, 31, 5951-5954.
Chambard et al., "Atom Transfer Radical Polymerizsation in Emulsion," Macromol. Symp. 2000, 150, pp. 45-51.
Li et al., "ATRP in Waterborne Miniemulsion via a Simultaneous Reverse and Normal Initiation Process," Macromolecules 2004, 37, 2106-2112.
Min et al., "Preparation of Homopolymers and Block Copolymers in Miniemulsion by ATRP Using Activators Generated by Electron Transfer (AGET)," J. Am. Chem. Soc. 2005, 127, pp. 3825-3830.
Min et al., "Preparation of Gradient Copolymers via ATRP Using a Simultaneous Reverse and Normal Initiation Process. I. Sponteaneous Gradient," J. Polym. Sci., Part A: Polym. Chem. 2005, 43, 3616-3622.
Antonietti et al., "Synthesis and Size Control of Polystyrene Latices via Polymerization in Microemulsion," Macromolecules, 1991, 24, pp. 6636-6643.
Feng et al., "The Preparation of Micropolystyrene Particles by Controlled Microemulsion Polymerization", Polymer Materials Science and Engineering, Jul. 2005, vol. 21, No. 4, 117-120.
Feng, et al., "The Research of RATRP of Styrene in the Microemulsion," J. Appl. Polym. Sci., 2006, 99, pp. 1093-1099.
Min et al., "Atom Transfer Radical Polymerization in Mioroemulsion," Macromolecules 2005, 38, pp. 8131-8134.
Nicolas et al., "Nitroxide-Mediated Controlled Free-Radical Emulsion Polymerization Using a Difunctional Water-Soluble Alkoxyamine Initiator. Toward the Control of Particular Size, Particle Size Distribution, and the Synthesis of Triblock Poiymers," Macromolecules 2005, 38, pp. 9963-9973.
Ferguson et al., "Ab Initio Emulsion Polymerization by RAFT-Controlled Self-Assembly," Macromolecules 2005, 38, pp. 2191-2204.
Gilbert et al., "Molecular Watchmaking: ab initio Emulsion Polymerization by RAFT-controlled Self-assembly," Macromolecular Symposia 2006, 231, pp. 84-93.
Chow et al., "Microemulsion Polymerizations and Reactions," Adv. Polym. Sci. 2005, 175, pp. 257-298.
Chow et al., "Ion-Containing Membranes from Microemulsion Polymerization," Langmuir 1999, 15, pp. 3202-3205.
El-Safty et al., "Design of Highly Stable, Ordered Cage Mesostructured Monoliths with Controllable Pore Giometries and Sizes," Chem. Mater. 2005, 17, 3137-3145.
Stoffer et al., "Polymerization in Water-in-Oil Microemulsion System. I," J. of Polym. Sci. Polym. Chem. Ed. 1980, 18, pp. 2641-2646.
Ferrick et al., "Synthesis and Characterization of Polystyrene Latex Particles," Macromolecules 1989, 22, pp. 1515-1517.
Kuo et al., "Photoinitiated Polymerization of Styrene in Microemulsions," Macromolecules, 1987, 20, pp. 1216-1221.
Jakubowski et al., "Activator Generated by Electron Transfer for Atom Transfer Radical Polymerization," Macromolecules 2005, 38, pp. 4139-4146.
Antonietti et al., "Polymerization in microemulsions—a new approach to ultrafine, highly functionalized polymer dispersons," Macromol. Chem. Phys. 1995, 196, pp. 441-466.
Guo et al., "Microemulsion Polymerization of Styrene," J. Polym. Sci., Part A: Polym. Chem. 1989, 27, pp. 691-710.
Cramer, "The reduction of cupric salts by sugars," W. Proc. Chem. Soc., 1914, 30, (290) p. 293.

Reiner et al., "The Reduction of the Cupric-EDTA Complex by Sugars," Baskerville Chemical Journal 1953, 4, pp. 15-17.
Singh et al., "Kinetics of Oxidation of Dextrose, Galactose and Fructose, /-Arabinose and d-Xylose by Alkaline Bivalent Copper in Presence of Tartarate, Part IV Study of Temperature Coefficient and Activation Energy," Zeitschrift fuer Physikalische Chemie (Leipzig) 1957, 207, pp. 198-204.
Parris et al., "The Properties of Solutions of Copper Salts in Pyridine and Quinoline," Discussions of the Faraday Society 1960, pp. 240-247.
Weiss et al., "Reactions of Triethylamine with Copper Halides. II. Internal Oxidation-Reduction of Dichlorobis(triethylamine)copper(II)," Inorg. Chem. 1964, 3, pp. 1344-1348.
Maeda et al., "The EPR Effect and Polymeric Drugs: A Paradigm Shift for Cancer Chemotherapy in the 21st Century," J. Adv. Polym. Sci. 2006, 193, pp. 103-121.
Brown et al., "Exploiting Tumour Hypoxia in Cancer Treatment," Nature Rev. Cancer 2004, 4, pp. 437-447.
Khelfallah et al., "Synthesis of New PHEMA/PEO Enzymatically Biodegradable Hydrogel", Macromolecular Rapid Communications, 2006, 27, pp. 1004-1008.
Huang, X and T. L. Lowe, "Biodegradable Thermoresponsive Hydrogels for Aqueous Encapsulation and Controlled Release of Hydrophilic Model Drugs", Biomacromolecules, 2005, 6, pp. 2131-2139.
Houk, J. and G. M. Whitesides, "Structure-Reactivity Relations for Thiol-Disulfide interchance", J. Am. Chem. Soc., 1987, 109, pp. 6825-6836.
Tsarevsky et al., "Chapter VI: Synthesis of Well-Defined Polymeric Materials with Diuslfide and Thiol Groups, Their Further Functionalization, and Reversible Cleavage/Coupling Via Redox Processes: Towards functional (Bio)Degradable Materials," Thesis, Carnegie Mellon University, pp. 249-311 (2005).
Li et al., "Synthesis of Reversible Shell Cross-Linked Micelles for Controlled Release of Bioactive Agents", Macromolecules, 2006, 39, pp. 2726-2728.
Gao et al., "Synthesis of Degradable Miktoarm Star Copolymers via Atom Transfer Radical Polymerization", Macromolecules, vol. 38, pp. 5995-6004 (2005).
Schafer et al., "Redox Environment of the Cell as Viewed through the Redox State of the Glutathione Dissulfide/Glutathione Couple," Free Radical Biol. Med. 2001, 30, pp. 1191-1212.
Li, Hongyan, et al., "Transferrin/Transferrin Receptor-Mediated Drug Delivery," Medicinal Research Reviews, 2002, 22, pp. 225-250.
Tsarevsky et al., "Combining Atom Transfer Radical Polymerization and Disulfide/Thiol Redox Chemistry: A Route to Well-Defined (Bio)degradable Polymeric Materials", Macromolecules, 2005, 38, 3087-3092.
Oh et al., "Inverse Miniemulsion ATRP: A New Method for Synthesis and Functionalization of Well-Defined Water-Soluble/Cross-Linked Polymeric Particles", Journal of the American Chemical Society, 2006, 128, 5578-5584.
Oh et al., "Biodegradable Nanogels Prepared by Atom Transfer Radical Polymerization as Potential Drug Delivery Carriers: Synthesis, Biodegradation, in Vitro Release, and Bioconjugation", Journal of the American Chemical Society, 2007, 129 (18): 5939-5945.
Barrett, K.E. et al., "Kinetics of Dispersion Polymerization of Soluble Monomers. I. Methyl Methacrylate," J. Polym. Sci., Polym. Chem. Ed. 1969, 7, pp. 2621-2650.
Tseng, C.M. et al., "Uniform Polymer Particles by Dispersion Polymerization in Alcohol," J. Polym. Sci., Part A: Polym. Chem. 1986, 24, pp. 2995-3007.
El-Aasser, M.S. et al., "Anionic Dispersion Polymerization of Styrene. I. Investigation of Parameters for Preparation of Uniform Micron-Size Polystyrene Particles with Narrow Molecular Weight Distribution," J. Polym. Sci., Part A: Polym. Chem. 1996, 34, pp. 2633-2649.
Kawaguchi et al., "Dispersion Polymerization," Adv. Polym. Sci., 2005, 175, pp. 299-328.

(56) References Cited

OTHER PUBLICATIONS

LaMer, V.K. et al., "Theory, Production and Mechanism of Formation of Monodispersed Hydrosols," J. Am. Chem. Soc. 1950, 72, pp. 4847-4854.
Yang, W. et al., "Dispersion Copolymerization of Styrene and Other Vinyl Monomers in Polar Solvents," J. Polym. Sci., Part A: Polym. Chem. 2001, 39, pp. 555-561.
Song, J. et al., "Two-Stage Dispersion Polymerization toward Monodisperse, Controlled Micrometer-Sized Copolymer Particles," J. Am. Chem. Soc. 2004, 126, pp. 6562-6563.
Song, J. and M. A. Winnik, "Cross-Linked, Monodisperse, Micro-Sized Polystyrene Particles by Two-Stage Dispersion Polymerization," Macromolecules, vol. 38, pp. 8300-8307 (2005).
Song, J. et al., "Monodisperse, Micron-Sized Reactive Low Molar Mass Polymer Microspheres by Two-Stage Living Radical Dispersion Polymerization of Styrene," 2006, 39, pp. 8318-8325.
Hölderle, M. et al., "Comparison of Controlled Radical Styrene Polymerizations in Bulk and Nonaqueous Dispersion," Macromolecules 1997, 30, pp. 3420-3422.
Gabaston et al., "Living Free-Radical Dispersion Polymerization of Styrene," Macromolecules 1998, 31, pp. 2883-2888.
Shim, S.E. et al., "Living radical dispersion photopolymerization of styrene by a reversible addition-fragmentation chain transfer (RAFT) agent," S. Polymer 2003, 44, pp. 5563-5572.
Min, K. et al., "Development of an ab Initio Emulsion Atom Transfer Radical Polymerization: From Microemulsion to Emulson." J. Am. Chem. Soc. 2006, 128(32), pp. 10521-10526.
Min, K. et al., "Atom Transfer Radical Dispersion Polymerization of Styrene in Ethanol" Polymer Preprints, 2007, 48 (2), pp. 260-261.
Patil et al., "Surface modified and Internally cationic polyamidoamine dendrimers for efficient siRNA delivery," 2008, Bioconjugate Chemistry, vol. 19, pp. 1396-1403.
Zhang, Chi, "Transcriptional regulation of bone formation by the osteoblast-specific transcription factor Osz," 2010, Journal of Orthopaedic Surgery and Research, vol. 5:37, pp. 1-8.
Yan et al., "Axin2 controls bone remodeling through the beta-catenin-BMP signaling pathway in adult mice," 2009, Journal of Cell Science, vol. 122, pp. 3566-3578.
Akhtar et al., "Toxicogenomics of non-viral drug delivery systems for RNAi: Potential impact on siRNA-mediated gene silencing activity and specificity", Adv. Drug Delivery Rev., 2007, 59, (2-3), pp. 164-182.
Bencherif et al., "End-group effects on the properties of PEG-co-PGA hydrogels", Acta Biomater, 2009, 5(6): pp. 1872-1883.
Bencherif et al., "Influence of cross-linker chemistry on release kinetics of PEG-co-PGA hydrogels", J. Biomed. Mater. Res., Part A, 2009, 90A(1): pp. 142-153.
Bencherif et al., "Cell-Adhesive Star Polymers Prepared by ATRP", Biomacromolecules, 2009, (10), pp. 1795-1803.
Bencherif et al., "influence of the degree of methacrylation on hyaluronic acid hydrogels properties", Biomaterials, 2008, 29, (12), pp. 1739-1749.
Bencherif et al., "Nanostructured hybrid hydrogels prepared by a combination of atom transfer radical polymerization and free radical polymerization", Biomaterials, 2009, 30, (29), pp. 5270-5278.
Bencherif et al., "Synthesis by AGET ATRP of Degradable Nanogel Precursors for In Situ Formation of Nanostructured Hyaluronic Acid Hydrogel", Biomacromolecules, 2009, 10, (9), pp. 2499-2507.
Birukova et al., "ALK5 and Smad4 are involved in TGF-beta1-induced pulmonary endothelial permeability", FEBS Letters, 2005, 579(18): pp. 4031-4037.
Bober et al., "Delivery of siRNA using cationic star polymers to suppress runt related transcription factor 2 and osterix in vitro", 34th Annual Meeting of the Society for Biomateriais 2010, Giving Life to a World of Materials, Seattle, Washington, USA, Apr. 21-24, 2010, vol. 2 of 2, p. 579.
Braunecker, W. A. and K. Matyjaszewski, "Controlled/living radical polymerization: Features, developments, and perspectives". [Erratum to document cited in CA147:486671], Progress in Polymer Science, 2008, 33, (1), p. 165.

Braunecker, W. and K. Matyjaszewski, "Controlled/living radical polymerization: Features, developments, and perspectives", Progress in Polymer Science, 2007, 32, (1), pp. 93-146.
Brekke, J. H., and Kipling Thacker, "Hyaluronan as a Biomaterial", An Introduction to Biomaterials, The Biomedical Engineering Series, 2006, pp. 219-240.
Chaturvedi, et al., "Noggin maintains pluripotency of human embryonic stem cells grown on Matrigel", Cell Prolif, Aug. 2009, 42, (4), pp. 425-433.
Cho et al., "Synthesis of Biocompatible PEG-Based Star Polymers with Cationic and Degradable Core for siRNA Delivery", Biomacromolecules: 12(10): pp. 3478-3486.
Cho et al., "Preparation of Poly(ethylene glycol) Star Copolymers with a Cationic Core for siRNA Delivery by ATRP", Polym. Prepr., (Am. Chem. Soc., Div. Polym. Chem.), 2011, 52(2): pp. 608-609.
Cho et al., "Rapid Cellular Internalization of Multifunctional Star Polymers Prepared by Atom Transfer Radical Polymerization", Biomacromolecules, 2010, 11 (9): pp. 2199-2203.
Coessens et al., "Functional polymers by atom transfer radical polymerization", Progress in Polymer Science, 2001, 26, (3), pp. 337-377.
Colla et al., "Human myeloma cells express the bone regulating gene Runx2/Cbfa1 and produce osteopontin that is involved in angiogenesis in multiple myeloma patients", Leukemia, 2005, 19, (12), pp. 2166-2176.
Demetriou, et al., "Fetuin/alpha2-HS glycoprotein is a transforming growth factor-beta type II receptor mimic and cytokine antagonist", J Biol Chem, 1996, 271, (22), pp. 2755-12761.
Dong, Hongchen and Krzysztof Matyjaszewski, "ARGET ATRP of 2-(Dimethylamino)ethyl Methacrylate as an Intrinsic Reducing Agent", Macromolecules, 2008, 41, pp. 6868-6870.
Duncan et al., "Dendrimer biocompatibility and toxicity", Adv. Drug Delivery Rev., 2005, 57, (15), pp. 2215-2237.
Duncan et al., "Polymer therapeutics: polymers as drugs, drug and protein conjugates and gene delivery systems: past, present and future opportunities", Adv. Polym. Sci., 2006, 192, (Polymer Therapeutics I), pp. 1-8.
El-Aneed, A., "An overview of current delivery systems in cancer gene therapy", J. Controlled Release, 2004, 94, (1), pp. 1-14.
Fukuda et al., "Generation of a mouse with conditionally activated signaling through the BMP receptor, ALK2", Genesis, 2006, 44, (4), pp. 159-167.
Gao, H. and K. Matyjaszewski, "Synthesis of functional polymers with controlled architecture by CRP of monomers in the presence of cross-linkers: From stars to gels", Prog. Polym. Sci., 2009, 34, (4), pp. 317-350.
Gilmore et al., "The design and exogenous delivery of siRNA for post-transcriptional gene silencing", Journal of Drug Targeting, 2004, 12, (6), pp. 315-340.
Goldring, M. B. and S. R. Goldring, "Skeletal tissue response to cytokines", Clin Orthop Relat Res, 1990, (258), pp. 245-278.
Guimaraes, M. and P. Mourao, "Urinary excretion of sulfated polysaccharides administered to Wistar rats suggests a renal permselectivity to these polymers based on molecular size", Biochim. Biophys. Acta, Gen. Subj., 1997, 1335, (1-2), pp. 161-172.
Gupta et al., "Hydrogels: from controlled release to pH-responsive drug delivery", Drug Discov Today, 2002, 7, (10), pp. 569-579.
Hammond, et al., "An RNA-directed nuclease mediates post-transcriptional gene silencing in Drosophila cells", Nature, 2000, 404, (6775), pp. 293-296.
Hartwell, R. et al., "A Novel Nydrogel-Collagen Composite Improves Functionality of an Injectable Extracellular Matrix", Acta Biomaterialia, 7, 2011, pp. 3060-3069.
Hawker et al., "New polymer synthesis by nitroxide mediated living radical polymerizations", Chem Rev, 2001, 101, (12), pp. 3661-3688.
Heath et al., "Charged polymers via controlled radical polymerization and their implications for gene delivery", Macromol. Chem. Phys., 2007, 208, (12), pp. 1243-1249.
Heggli et al., "Michael-type addition as a tool for surface functionalization", Bioconjugate Chem., 2003, 14, (5), pp. 967-973.
Heldin et al., "TGF-beta signalling from cell membrane to nucleus through SMAD proteins", Nature, 1997, 390. (6659), pp. 465-471.

(56) References Cited

OTHER PUBLICATIONS

Hiemstra et al., "Rapidly in situ-forming degradable hydrogels from dextran thiols through michael addition", Biomacromolecules, 2007, 8, (5), pp. 1548-1556.
Hong et al., "TAZ, a transcriptional modulator of mesenchymal stem cell differentiation", Science, 2005, 309, (5737), pp. 1074-1078.
Hong, et al., "Post-transcriptional gene silencing using siRNA delivered from star nanostructured polymer", Abstracts/Bone, 46, S9-S83, accepted for society for Biomaterials, Seattle, WA, Apr. 21-24, 2010, pp. S49-S50.
Ikeda et al., "The promyelotic leukemia zinc finger promotes osteoblastic differentiation of human mesenchymal stem cells as an upstream regulator of CBFA1", J. Biol. Chem., 2005, 280(9): pp. 8523-8530.
Ikeda et al., "Identification of FAZF as a novel BMP2-induced transcription factor during osteoblastic differentiation", J Cell Biochem, 2007, 101, (1), pp. 147-154.
Iorio, R. et al., "Heterotopic ossification after hip and knee arthroplasty: risk factors, prevention, and treatment", J Am Acad Orthop Surg, 2002, 10, (6), pp. 409-416.
IUCAP Preferred Names, Chapter 2, Sec. 20-24, Sep. 2004, p. 114.
Jazag et al., "Single small-interfering RNA expression vector for silencing multiple transforming growth factor-beta pathway components", Nucleic Acids Research, 2005, 33(15): e131, pp. 1-9.
Kim et al., "Inhibition of ocular angiogenesis by siRNA targeting vascular endothelial growth factor pathway genes: therapeutic strategy for herpetic stromal keratitis", Am J Pathol, 2004, 165, (6), pp. 2177-2185.
Kruk et al., "Well-Defined Poly (ethylene oxide)—Polyacrylonitrile Diblock Copolymers as Templates for Mesoporous Silicas and Precursors for Mesoporous Carbons", Chem Mater., 2006, 18, pp. 1417-1424.
Li et al., "A New Class of Biochemically Degradable, Stilumus-Responsive Triblock Copolymer Gelators", Agnew. Chem. Int. Ed., 2006, 45, pp. 3510-3513.
Lowe, A. and C. McCormick, "Reversible addition-fragmentation chain transfer (RAFT) radical polymerization and the synthesis of water-soluble (co)polymers under homogeneous conditions in organic and aqueous media", Prog. Polym. Sci., 2007, 32, (3), pp. 283-351.
Ma et al., "Structural basis for overhang-specific small interfering RNA recognition by the PAZ domain", Nature (London, U. K.), 2004, 429, (6989), pp. 318-322.
Matyjaszewski et al., "Simple and Efficient Synthesis of Various Alkoxyamines for Stable Free Radical Polymerization", Macromolecules, 1998, 31, (17), pp. 5955-5957.
McCarthy, E.F. and M. Sundaram, "Heterotopic ossification: a review", Skeletal Radiol, 2005, 34: pp. 609-619.
Merkel et al., "Stability of siRNA polyplexes from poly(ethylenimnine) and poly(ethylenimine)-g-poly(ethylene glycol) under in vivo conditions: Effects on pharmacokinetics and biodistribution measured by Fluorescence Fluctuation Spectroscopy and Single Photon Emission Computed Tomography (SPECT) imaging", J. Controlled Release, 2009, 138, (2), pp. 148-159.
Murakami et al., "A WW domain protein TAZ is a critical coactivator for TBX5, a transcription factor implicated in Holt-Oram syndrome", PNAS, USA, 2005, 102(50): pp. 18034-18039.
Naik et al., "Gene delivery to the retina: focus on non-viral approaches", Drug Discovery Today, 2009, 14, (5/6), pp. 306-315.
Nakao et al. "Identification of Smad7, a TGFβ-inducible antagonist of TGF-β signalling", Nature, vol. 389, Oct. 9, 1997, pp. 631-635.
Oh et al., "Synthesis and Biodegradation of Nanogels as Delivery Carriers for Carbohydrate Drugs", Biomacromolecules, 2007, 8, (11), pp. 3326-3331.
Oh et al., "The development of microgels/nanogels for drug delivery applications", Progress in Polymer Science, 2008, 33, (4), 4pp. 48-477.
Ohyama et al., "Spaciotemporal association and bone morphogenetic protein regulation of sclerostin and osterix expression during embryonic osteogenesis", Endocrinology, 2004, 145, (10), pp. 4685-4692.
Park et al., "Photo-Cross-Linkable Thermoresponsive Star Polymers Designed for Control of Cell-Surface interactions", Biomacromolecules, 2010, 11(10): pp. 2647-2652.
Parkinson et al., "Radiation therapy in the prevention of heterotopic ossification after total hip arthroplasty", Hip, 1982, pp. 211-227.
Reddi, et al., "Biochemical sequences in the transformation of normal fibroblasts in adolescent rats", Proc Natl Acad Sci USA, 1972, 69, (6), pp. 1601-1605.
Saina et al., "BMPs and chordin regulate patterning of the directive axis in a sea anemone", Proc Natl Acad Sci USA, 2009, 106, (44), pp. 18592-18597.
Shen, Y., "Advances in the development of siRNA-based therapeutics for cancer", IDrugs, 2008, 11(8): pp. 572-578.
Shore et al., "A recurrent mutation in the BMP type I receptor ACVR1 causes inherited and sporadic fibrodysplasia ossificans progressiva", Nature Genetics, 2006, 38, (5), pp. 525-527.
Shore et al., "Insights from a rare genetic disorder of extra-skeletal bone formation, fibrodysplasia ossificans progressiva (FOP)", Bone, 2008, 43, (3), pp. 427-433.
Sieber et al., "Recent advances in BMP receptor signaling", Cytokine Growth Factor Rev, 2009, 20, (5-6), pp. 343-355.
Siegwart et al., "Solvent induced morphologies of poly(methyl methacrylate-b-ethylene oxide-b-methyl methacrylate) triblock copolymers synthesized by atom transfer radical polymerization," Polymer, 2007, 48(25): pp. 7279-7290.
Siegwart et al., "Biotin-, Pyrene-, and GRGDS-functionalized polymers and nanogels via ATRP and end group modification", Macromol. Chem. Phys., 2008, 209, (21), pp. 2179-2193.
Siegwart et al., "Cellular uptake of functional nanogels prepared by inverse miniemulsion ATRP with encapsulated proteins, carbohydratesmand gold nanoparticles, Biomacromolecules", 2009, 10, (8), pp. 2300-2309.
Siegwart et al., "Synthesis, characterization, and in vitro cell culture viability of degradable poly(N-isopropylacrylamide-co-5,6-benzo-2-methylene-1,3-dioxepane)-based polymers and crosslinked gels", Journal of Biomedical Materials Research, Part A, 2008, 87 A, (2), pp. 345-358.
Srinivasan et al., "Delivery of siRNA Using Cationic Nanostructured Star Polymers to Prevent Myoblast Cell Differentiation to Bone", Carnegie Mellon University, Pittsburgh, Pennsylvania, Dec. 2010, 1 page.
Thomas et al., "Progress and problems with the use of viral vectors for gene therapy", Nat. Rev. Genet., 2003, 4, (5), 346-358.
Turner et al., "RNA targeting with peptide conjugates of oligonucleotides, siRNA and PNA", Blood Cells Mol Dis, 2007, 38, (1), pp. 1-7.
Urist, M. R., "The search for and discovery of bone morphogenetic protein (BMP)," Bone Grafts, Derivatives and Substitutes, Butterworth: London, 1994, pp. 315-362.
Van Ooij et al., "Surgical removal of debilitating neurogenic heterotopic ossifications of the hip", Ned Tijdschr Geneeskd, 2005, 149, (1), pp. 37-41. English abstract.
Vanden Bossche, L. and G. Vanderstraeten, "Heterotopic ossification: a review", J Rehabil Med, 2005, 37, (3), pp. 129-136.
Wang et al., "Delivery of siRNA Therapeutics: Barriers and Carriers", The AAPS Journal, 2010, 12(4): pp. 492-503.
Wang et al., "p53 functions as a negative regulator of osteoblastogenesis, osteoblast-dependent osteoclastogenesis, and bone remodeling", J Cell Biol, 2006, 172(1): pp. 115-125.
Wordinger et al., "Focus on molecules: gremlin", Exp Eye Res, 2008, 87, (2), pp. 78-79.
Xia et al., "Repulsive guidance molecule RGMa alters utilization of bone morphogenetic protein (BMP) type II receptors by BMP2 and BMP4", J Biol Chem, 2007, 282(25): pp. 18129-18140.
Yagi et al., "Bcl-2 positively regulates Sox9-dependent chondrocyte gene expression by suppressing the MEK-ERK1/2 signaling pathway", J Biol Chem, 2005, 280, (34), pp. 30517-30525.
Yan et al., "Regulation of TGF-beta signaling by Smad7", Acta Biochim Biophys Sin (Shanghai), 2009, 41, (4), pp. 263-272.

(56) References Cited

OTHER PUBLICATIONS

Yu et al., "BMP type 1 receptor inhibition reduces heterotopic [corrected] ossification", Nat Med, 2008, 14, (12), pp. 1363-1369.
Zelikin et al., "Disulfide Cross-Linked Polymer Capsules: En Route to Biodeconstructible Systems", Biomacromolecules, 2006, 7, pp. 27-30.
Zhang, et al., "The bone morphogenetic protein signaling pathway is upregulated in a mouse model of total parenteral nutrition", J Nutr 2009, 139, (7), pp. 1315-1321.
Pyun et al., "Synthesis of Well-Defined Block Copolymers Tethered to Polysilsequioxane Nanoparticles and their Nanoscale Morphology on Surfaces", J. Am. Chem. Soc. 123, pp. 9445-9446 (2001).
Pyun et al., Supporting Information, J. Am. Chem. Soc., pp. S1-S8 (2001).
Pyun et al., "Synthesis of Nancomposite Organic/Inorganic Hybrid Materials Using Controlled/'Living' Radical Polymerization," Chem. Mater. 13, pp. 3436-3448 (2001).
Pyun et al., "Synthesis of Polymer Brushes Using Atom Transfer Radical Polymerization", Macromol. Rapid Commun. 24, pp. 1043-1059 (2003).
Pyun et al., "Synthesis and Characterization of Organic/Inorganic Hybrid Nanoparticles: Kinetics of Surface-Initiated Atom Transfer Radical Polymerization and Morphology of Hybrid Nanoparticle Ultrathin Films", Macromolecules 36, pp. 5094-5104 (2003).
Matyjaszewski et al., Chapter 17 Organic-Inorganic Hybrid Polymers from Atom Transfer Radical Polymerization and Poly(dimethylsiloxane), Am. Chemical Soc. Symposia. pp. 270-283 (2000).
Pyun et al. "Organic/Inorganic Hybrid Materials from Polysiloxanes and Polysilsesquioxanes Using Controlled/Living Radical Polymerization", Manuscript submitted for Publication pp. 1-12 (2007).
Bombalski et al., "Quasi-transparent Hybrid Particles Using Atom Transfer Radical Polymerization", Polymeric Materials: Science & Engineering 97, p. 327 (2007).
Bockstaller et al., "Block Copolymer Nanocomposites: Perspectives for Tailored Functional Materials", Adv. Mater. 17, pp. 1331-1349 (2005).
Bombalski et al., "Null-Scattering Hybrid Particles Using Controlled Radical Polymerization", Adv. Mater. 19, pp. 4486-4490 (2007).
Bouvier-Fontes et al., "Seeded Semicontinuous Emulsion Copolymerization of Butyl Acrylate with Cross-Linkers", Macromolecules 38, pp. 1164-1171 (2005).
Kirsch et al., "Control of Particle Morphology and Film Structures of Carboxylated Poly(Methyl Methacrylate)/Poly(n-Butylacrylate) Composite Latex Particles", Journal of Applied Polymer Science, vol. 91, pp. 2610-2623 (2004).
Kirsch et al., "Control of Particle Morphology and Film Structures of Carboxylated Poly(N-Butylacrylate)/Poly(methyl) Composite Latex Particles", Colloids and Surfaces, A Physicochemical and Engineering Aspects, 183-185, pp. 725-737 (2001).
Garnett, "Colours in Metal Glasses and in Metallic Films", Phil. Trans. R. Soc. Lond. A. 203, pp. 385-420 (1904).
Garnett, "Colours in Metal Glasses, in Metallic Films, and in Metal Solutions II", Phil. Trans. R. Soc. Lond. A. 205, pp. 237-238 (1906).
Baysal, et al., Styrene Polymerization with a Macroinitiator Having Siloxane Units, Journal of Applied Polymer Science, May 31, 1996, vol. 60, pp. 1369-1378.
Gaynor et al., "Synthesis of Branched and Hyperbranched Polystyrenes", Macromolecules, 1996, 29, pp. 1079-1081.
Ando et al., "Living Radical Polymerization of Methyl Methacrylate with Ruthenium Complex: Formation of Polymers with Controlled Molecular Weights and Very Narrow Distributions", Macromolecules, 1996, 29, pp. 1070-1072.
Ishizu et al., "Synthesis of star polymers by organized polymerization of macromonomers", *Polymer*, vol. 36, pp. 4155-4157 (1995).
Mirica et al., "Structure and Spectroscopy of Copper-Dioxygen Complexes", Chem. Rev. 2004, 104, pp. 1013-1045.

Bouix et al., "Synthesis of amphiphilic polyelectrolyte block copolymers using "living" radical polymerization, Application as stabilizers in emulsion polymerization", Macromol. Rapid Commun., 1998, 19, pp. 209-213.
Burguiere et al., "Amphiphilic Block Copolymers Prepared via Controlled Radical Polymerization as Surfactants for Emulsion Polymerization", Macromol Symp. 2000, 150, pp. 39-44.
Nicolay et al., "Dibromotrithiocarbonate Iniferter for Concurrent ATRP and RAFT Polymerization. Effect of Monomer, Catalyst, and Chain Transfer Agent Structure on the Polymerization Mechanism," Macromolecules, 2008, 41, pp. 4585-4596.
Nicolay et al., "Synthesis of poly(vinyl acetate) block copolymers by suocessive RAFT and ATRP with a bromoxanthate iniferter," Chem. Commun., 2008, pp. 5336-5338.
Kwak, et al., "Effect of Initiator and Ligand Structures on ATRP of Styrene and Methyl Metacrylate Initiated by Alkyl Dithiocarbamate," Macromolecules, 2008, 41, pp. 6627-6635.
Kwak, et al., "Concurrent ATRP/RAFT of Strene and Methyl Methacrylate with Dithioesters Catalyzed by Copper(I) Complexes," Macromolecules, 2008, 41, pp. 6602-6604.
Wager et al., "A simple method to convert atom transfer radical polymerization (ATRP) Initiators into reversible addition fragmentation chain-transfer (RAFT) mediators." Eur. Polym. J., 2004, 40, pp. 641-645.
Kabachii, et al., "Dithioesters in Atom-Transfer Radical Polymerization," Polym. Sci, Ser. B, 2006, 48, pp. 32-36.
Zhang, et al., "Atom Transfer Radical Polymerizations of Methyl Methacrylate and Styrene with an Iniferter Reagent as the Initiator," J. Appl. Polym. Sci., 2007, 106, pp. 230-237.
Zhang, et al., "Synthesis of Well-Defined Naphthalene and Photolabile Group-Labeled Polystyrene via ATRP," J. Polym. Sci.: Part A: Polym. Chem., 2006, 44, pp. 510-518.
Kwak, et al., "Photoirradiated Atom Transfer Radical Polymerization with an Alkyl Dithiocarbamate at Ambient Tempterature", Macromolecules, 2010, 43, pp. 5180-5183.
Matsuzaki et al., "Stereoregularity of Polystyrene and Mechanism of Polymerization", Die Makromolekulare Chemie, 1975, 176, pp. 3051-3064.
Haddleton et al., "Identifying the Nature of the Active Species in the Polymerization of Methacrylates: Inhibition of Methyl Methacrylate Homopolymerizations and Reactivity Ratios for Copolymerization of Methyl Methacrylate/n-Butyl Methacrylate in Classical Anionic. Alkyllithum/Trialkylaluminum-Initiated, Group Transfer Polymerization, Atom Transfer Radical Polymerization, Catalytic Chain Transfer, and Classical Free Radical Polymerization", Macromolecules, 1997, 30, pp. 3992-3998.
Webster, Owen W., "Group Transfer Polymerization: Mechanism and Comparison with Other Methods for Controlled Polymerization of Acrylic Monomers", Adv Polym Sci, 2004, 167, pp. 1-34.
Azari et al., "Bone morphogenetic proteins: A review for cranial and maxillofacial surgery," Oral and Maxillo. Surg. Clin. of N.A., 14: pp. 1-14, 2002.
Jadlowiec et al., "Bone tissue engineering: recent advances and promising therapeutic agents," Expert Opin. Biol. Ther, 3(3): pp. 409-423, 2003.
Kübler et al., "Effect of different factors on the bone forming properties of recombinant BMPs," Mund Kiefer GesichtsChir, 2000; 4(8): pp. 465-469 (Abstract).
Zilliox et al., "Preparation of star-shaped macromolecules by anionic copolymerization," Journal of Polymer Science, Polymer Symposia, No. 22 (Pt. 1): pp. 145-156, (1968).
Kanaoka et a., "Synthesis of star-shaped poly-vinyl ethers by living cationic polymerization: pathway for formation of star-shaped polymers via polymer linking reactions," Polymer Bulletin (Berlin) 44(5-6): pp. 485-492, (2000).
Shibata, et al., "Quantitative Synthesis of Star-Shaped Poly(vinyl ether)s with a Narrow Molecular Weight Disribution by Living Cationic Polymerization," Journal of the American Chemical Society, 128(23): pp. 7497-7504, (2006).
Qiu et al., "Controlled/Living Radical Polymerization in Aqueous Media: Homogeneous and Heterogeneous Systems," *Prog. Polym. Sci.*, vol. 26, pp. 2083-2134 (2001).

(56) References Cited

OTHER PUBLICATIONS

Ohno, S. and K. Matyjaszewski, "Controlling Grafting Density and Side Chain Length in Poly(n-butyl acrylate) by ATRP (Co)polymerization of Macromonomers," Journal of Polymer Chem. Ed., 2006, 44, pp. 5454-5467 (2006).

Matyjaszewski, K. and J. Xia, "Fundamentals of Atom Transfer Radical Polymerization," Handbook of Radical Polymerization, Chapter 11; John Wiley & Sons, Inc., pp. 523-628 (2002).

Kamigaito et al., "Metal-Catalyzed Living Radical Polymerization," Chem. Rev., 101, pp. 3689-3745(2001).

Gao, H. and K. Matyjaszewski, "Low Polydispersity Star Polymers with Core Functionality by Cross-linking Macromonomers Using Functional ATRP Intiators," Macromolecules, 40, pp. 399-401 (2007).

Gao et al., J. Am. Chem. Soc., "Low Polydispersity Star Polymers via Cross-linking Macromonomers by ATRP," 128, pp. 15111-15113 (2006).

Davis, K. A. and K. Matyjaszewski, "Statistical, Gradient, Block, and Graft Copolymers by Controlled/Living Radical Polymerizations," Adv. Polym. Sci., vol. 159 pp. 1-168 (2002).

Furukawa, T. and K. Ishizu, "Synthesis and Characterization of Poly(ethylene oxide) Star Polymers Possessing a Tertiary Amino Group at Each Ann End by Organized Polymerization Using Macromonomers," Journal of Colloid and Interface Science, 253(2), pp. 465-469, (2002).

Matyjaszewski, K., "Comparison and Classification of Controlled/ Living Radical Polymerizations," American Chemical Society, publication date: Aug. 15, 2000, pp. 2-26, downloaded on Sep. 2, 2009, http://pubs.acs.org.

Le Droumaguet, B. and K. Velonia, "In Situ ATRP-Mediated Hierarchical Formation of Giant Amphiphile Bionanoreactors", Angew. Chem. Int. Ed., 2008, 47(33), pp. 6263-6266.

Tsarevsky et al., "Factors Determining the Performance of Copper-Based Atom Transfer Radical Polymerization Catalysts and Criteria for Rational Catalyst Selection", ACS Symposium Series, 2006, 944, pp. 56-70.

Duncan, R. and M. Vicent "Do HPMA copolymer conjugates have a future as clinically useful nanomedicines? A critical overview of current status and fututre opportunities", Advanced Drug Delivery Reviews, 62, 2010, pp. 272-282.

Enoki et al., "Acid Denaturation and Refolding of Green Fluorescent Protein", Biochemistry, 2004, 43, pp. 14238-14248.

Arakawa et al., "Protein precipitation and denaturation by dimethyl sulfoxide", Biophysical Chemistry, 131, 2007, pp. 62-70.

Li et al., "Thermoresponsive Block Copolymer-Protein Conjugates Prepared by Grafting-from via RAFT Polymerization", Macromol. Rapid Commun., 2011, 32, pp. 354-359.

Li et al., "Thermoresponsive Block Copolymer-Protein Conjugates Prepared by Grafting-from via RAFT Polymerization" Supporting Information for Macromol. Rapid Commun., 2011, 32, pp. 354-359.

Lele et al., "Synthesis of Uniform Protein—Polymer Conjugates", Biomacromolecules, 2005, 6, pp. 3380-3389.

Peschke et al., "C-Terminally PEGylated hGH-derivatives", Bioorganic & Medicinal Chemistry, 15, 2007, pp. 4382-4395.

De Paoli et al., "New insights into the mechanism of activation of atom transfer radical polymerization by Cu(I) complexes", Chem. Commun., 2011, 47, pp. 3580-3582.

Pintauer et al., "Atom Transfer radical addition and polymerization reactions catalyzed by ppm amounts of copper complexes", Chem. Soc. Rev., 2008, 37, pp. 1087-1097.

Grover, G. and H. Maynard, "Protein-polymer conjugates: synthetic approaches by controlled radical polymerizations and interesting applications", Current Opinion in Chemical Biology, 2010, 14(6), pp. 818-827.

Peeler et al., "Genetically Encoded Initiator for Polymer Growth from Proteins", JACS Communications, 2010, 132, pp. 13575-13577.

Tang et al., "Understanding atom Transfer Radical Polymerization: Effect of Ligan and Initiator Structures on the Equilibrium Constants", J. Am. Chem. Soc., 2008, 130, pp. 10702-10713.

Bontempo, D. and H. Maynard, "Streptavidin as a Macroinitiator for Polymerization: In Situ Protein-Polymer Conjugate Formation", J. Am. Chem. Soc., 2005, 127, pp. 6508-6509.

Bontempo et al., "Cysteine-Reactive Polymers Synthesized by Atom Transfer Radical Polymerization for Conjugation to Proteins", J. Am. Chem. Soc., 2004, 126, p. 15372-15373.

Abuchowski et al., "Alteration of Immunological Properties of Bovine Serum Albumin by Covalent Attachment of Polyethylene Glycol", The Journal of Biological Chemistry, 1977, 252, pp. 3578-3581.

Abuchowski et al., "Effect of Covalent Attachment of Polyethylene Glycol on Immunogenicity and Circulating Life of Bovine Liver Catalase", The Journal of Biological Chemistry, 1977, 252, pp. 3582-3586.

Duncan, Ruth, "The Dawning Era of Polymer Therapeutics", Nature Reviews, Drug Discovery, 2003, 2, pp. 347-360.

Tsarevsky et al., "Deactivation Efficiency and Degree of Control over Polymerization in ATRP in Protic Solvents", Macromolecules, 2004, 37, pp. 9768-9778.

Lutz et al., "Biocompatible, Thermoresponsive, and Biodegradable: Simple Preparation of "All-in-One" Biorelevant Polymers," Macromolecules, 2007, 40, pp. 8540-8543.

Braunecker et al., "Thermodynamic Components of the Atom Transfer Radical Polymerization Equilibrium: Quantifying Solvent Effects", Macromolecules, 2009, 42, pp. 6348-6360.

Bortolamei et al., "Thermodynamic Properties of Copper Complexes Used as Catalysts in Atom Transfer Radical Polymerization", Macromolecules, 2010, 43, pp. 9257-9267.

Al-Abboodi et al., "Three-Dimensional Nanocharacterization of Porous Hydrogel With Ion and Electron Beams", Biotechnology and Bioengineering, vol. 110, No. 1, Jan. 2013, pp. 318-326.

Mathur et al., "Methods for Synthesis of Hydrogel Networks: A Review", 1996, Journal of Macromolecular Science, Part C, 36:2, pp. 405-430.

Dimitrov et al., "Continuous Convective Assembling of Fine Particles into Two-Dimensional Arrays on Solid Surfaces", Langmuir, 1996, 12, pp. 1303-1311.

Salerno et al. "Pore Structure and Swelling Behavior of Porous Hydrogels Prepared via a Thermal Reverse-Casting Technique", Journal of Applied Polymer Science, 2011, vol. 122, pp. 3651-3660.

Simakova et al., "Aqueous ARGET ATRP", Macromolecules, 2012, 45, pp. 6371-6379.

Stein et al., "Morphological Control in Colloidal Crystal Templating of Inverse Opals, Hierarchical Structures, and Shaped Particles", Chem. Mater. 2008, 20, pp. 649-666.

Stein et al., "Colloidal crystal templating of three-dimensionally ordered macroporous solids: materials for photonics and beyond", Current Opinion in Solid State and Materials Science, 5(2001) pp. 553-564.

Gates et al., "Fabrication and Characterization of Porous Membranes with Highly Ordered Three-Dimensional Periodic Structures", Chem. Mater., 1999, 11, pp. 2827-2836.

Lange et al., "Functional 3D photonic films from polymer beads", phys. stat. sol. (a) 204, No. 11, 2007, pp. 3618-3635.

Shu et al., "Rational Design of Affinity Ligand for the Oriented Immobilization of Trypsin", Acta Phys. Chim. Sin., 2013, 29 (2), pp. 439-448.

Hwang et al., "Fabrication of three-dimensional porous cell-laden hydrogel for tissue engineering", Biofabrication 2 (2010) 12 pages.

Chen et al., "Macroporous Hydrogel Scaffolds and Their Characterization By Optical Coherence Tomography", Tissue Engineering: Part C vol. 17, No. 1, 2011, pp. 101-112.

Seliktar, Dror, "Designing Cell-Compatible Hydrogels for Biomedical Applications", Science, 336, (2012), pp. 1124-1128.

Behravesh et al., "Evaluation of the in Vitro Degradation of Macroporous Hydrogels Using Gravimetry, Confined Compression Testing, and Microcomputed Tomography", Biomacromolecules, 2002, 3, pp. 1263-1270.

Li et al., "Colloidal Assembly: The Road from Particles to Colloidal Molecules and Crystals", Angew. Chem. Int. Ed. 2011, 50, pp. 360-388.

Marlow et al., "Opals: Status and Prospects", Angew. Chem. Int. Ed. 2009, 48, pp. 6212-6233.

(56) References Cited

OTHER PUBLICATIONS

Meseguer et al., "Synthesis of inverse opals", Colloids and Surfaces A: Physicochemical and Engineering Aspects, 202 (2002) pp. 281-290.
Xu et al., "Facile Trypsin Immobilization in Polymeric Membranes for Rapid, Efficient Protein Digestion", Anal. Chem., 2010, 82, pp. 10045-10051.
Xu et al., "Facile Trypsin Immobilization in Polymeric Membranes for Rapid, Efficient Protein Digestion", Anal. Chem., 2010, 82, 10045-10051, Supporting Information, 17 pages.
Fudouzi et al., "Photonic Papers and Inks: Color Writing with Colorless Materials", Adv. Mater., 2003, 15, No. 11, pp. 892-896.
Hustoft et al., "A Critical Review of Trypsin Digestion for LC-MS Based Proteomics", Integrative Proteomics, http://www.intechopen.com/books/integrative-proteomics/a-critical-review-of-trypsin-digestion-for-lc-ms-basedproteomics, 2012, pp. 73-92.
Oxley et al., "Macroporous hydrogels for biomedical applications: methodology and morphology", Biomaterials, 1993, vol. 14, No. 14, pp. 1064-1072.
Savina, Irina, "Macroporous hydrogels by cryogelation biomedical and environmental applications", abstract, School of Pharmacy and Biomolecular Sciences, University of Brighton, 2012, 1 page.
Savina et al., "Biomimetic Macroporous Hydrogels: Protein Ligand Distribution and Cell Response to the Ligand Architecture in the Scaffold", Journal of Biomaterials Science, 20 (2009), pp. 1781-1795.
Shepard et al., "Hydrogel macroporosity and the prolongation of transgene expression and the enhancement of angiogenesis", Biomaterials, 33 (2012) pp. 7412-7421.
Duan et al., "Versatile fabrication of arbitrarily shaped multi-membrane hydrogels suitable for biomedical applications", J. Mater. Chem. B, 2013, 1, pp. 485-492.
Kopeček, Jindřich, "Hydrogel biomaterials: A smart future?", Biomaterials, 28, 2007, pp. 5185-5192.
Lee et al., "Recent Progress in the Synthesis of Porous Carbon Materials", Adv. Mater. 2006, 18, pp. 2073-2094.
Ma et al., "Organic-Inorganic Hybrid Silica Monolith Based Immobilized Trypsin Reactor with High Enzymatic Activity", Anal. Chem., 2008, 80, pp. 2949-2956.
Ma et al., "Monolith-based immobilized enzyme reactors: Recent developments and applications for proteome analysis", J. Sep. Sci., 2007, 30, pp. 3050-3059.
Zhu et al., "Crystallization of hard-sphere colloids inmicrogravity", Nature, vol. 387, 26, Jun. 1997, pp. 883-885.
Pal et al., "Polymeric Hydrogels: Characterization and Biomedical Applications—A mini review", Designed Monomers and Polymers, 12, 2009, pp. 197-220.
Liu et al., "Hydrogels from Biopolymer Hybrid for Biomedical, Food, and Functional Food Applications", Polymers, 2012, 4, pp. 997-1011.
Woodcock, L.V., "Entropy difference between the face-centered cubic and hexagonal close-packed crystal structures", Nature, vol. 385, 9, Jan. 1997, pp. 141-143.
Dainiak et al., "Biomimetic Macroporous Hydrogel Scaffolds in a High-Throughput Screening Format for Cell-Based Assays", Biotechnol. Prog., 2008, 24, pp. 1373-1383.
Ford et al., "A macroporous hydrogel for the coculture of neural progenitor and endothelial cells to form functional vascular networks in vivo", PNAS, Feb. 21, 2006, vol. 103, No. 8, pp. 2512-2517.
Holgado et al., "Electrophoretic Deposition To Control Artificial Opal Growth", Langmuir, 1999, 15, pp. 4701-4704.
Kato et al., "Monolithic Bioreactor Immobilizing Trypsin for High-Throughput Analysis", Anal. Chem., 2005, 77, pp. 1813-1818.
Peppas et al., "Hydrogels in pharmaceutical formulations", European Journal of Pharmaceutics and Biopharmaceutics, 50, 2000, pp. 27-46.
Annabi et al., "Controlling the Porosity and Microarchitecture of Hydrogels for Tissue Engineering", Tissue Engineering: Part B, vol. 16, No. 4, 2010, pp. 371-383.
Davis et al., "Modular enzymatically crosslinked protein polymer hydrogels for in situ gelation", Biomaterials, 31, 2010, pp. 7288-7297.
Dziornkina et al., "Colloidal crystal assembly on topologically patterned templates", Soft Matter, 2005, 1, pp. 265-279.
Velev et al., "Structured Porous Materials via Colloidal Crystal Templating: From Inorganic Oxides to Metals", Adv. Mater., 2000, 12, No. 7, pp. 531-534.
Velev et al., "Colloidal crystals as templates for porous materials", Current Opinion in Colloid & Interface Science 5, 2000, pp. 56-63.
Jiang et al., "Single-Crystal Colloidal Multilayers of Controlled Thickness", Chem. Mater. 1999, 11, pp. 2132-2140.
Jiang et al., "Template-Directed Preparation of Macroporous Polymers with Oriented and Crystalline Arrays of Voids", J. Am. Chem. Soc., 1999, 121, pp. 11630-11637.
Schroden et al., "Hybrid macroporous materials for heavy metal ion adsorption", J. Mater. Chem., 2002, 12, pp. 3261-3267.
Pusey et al., "Structure of Crystals of Hard Colloidal Spheres", Physical Review Letters, Dec. 18, 1989, vol. 63, No. 25, pp. 2753-2756.
Zhao et al., "Horseradish Peroxidase Immobilized in Macroporous Hydrogel for Acrylamide Polymerization", Journal of Polymer Science: Part A: Polymer Chemistry, 2008, vol. 46, pp. 2222-2232.
Pemites et al., "Patterned Surfaces Combining Polymer Brushes and Conducting Polymer via Colloidal Template Electropolymerization", Adv. Mater., 2011, 23, pp. 1287-1292.
Schroden et al., "Optical Properties of Inverse Opal Photonic Crystals", Chem. Mater., 2002, 14, pp. 3305-3315.
Johnson et al., "Ordered Mesoporous Polymere of Tunable Pore Size from Colloidal Silica Templates", Science, vol. 283, Feb. 12, 1999, pp. 963-965.
Owen et al., "Design of three-dimensional biomimetic scaffolds",Journal of Biomedical Materials Research A, Sep. 15, 2010, vol. 94A, Issue 4, pp. 1321-1331.
Park et al., "Crystallization of Mesoscale Particles over Large Areas", Adv. Mater., 1998, 10, No. 13., pp. 1028-1032.
Park et al., "Macroporous Membranes with Highly Ordered and Three-Dimensionally Interconnected Spherical Pores", Adv. Mater. 1998, 10, No. 13, pp. 1045-1048.
Park et al., "Fabrication of Three-Dimensional Macroporous Membranes with Assemblies of Microspheres as Templates", Chem. Mater., 1998, 10, pp. 1745-1747.
Park et al., "Assembly of Mesoscale Particles over Large Areas and Its Application in Fabricating Tunable Optical Filters", Langmuir, 1999, 15, pp. 266-273.
Ronel et al., "Macroporous hydrogel membranes for a hybrid artificial pancreas. I. Synthesis and chamber fabrication", Journal of Biomedical Materials Research, vol. 17, 1983, pp. 855-864.
Hollister, Scott J., "Porous scaffold design for tissue engineering", Nature Materials, vol. 4, Jul. 2005, pp. 518-524.
Gulrez et al., "Hydrogels: Methods of Preparation, Characterisation and Applications", Progress in Molecular and Environmental Bioengineering—From Analysis and Modeling to Technology Applications, Aug. 2011, pp. 117-150.
Keskar et al., "in Vitro Evaluation of Macroporous Hydrogels to Facilitate Stem Cell Infiltration, Growth, and Mineralization", Tissue Engineering, Part A vol. 15, No. 7, 2009, pp. 1695-1707.
Wu et al., "Design and Preparation of Porous Polymers", Chem. Rev., 2012, 112, pp. 3959-4015.
Wu et al., "A novel organic-inorganic hybrid monolith for trypsin immobilization", Sci China Life Sci, Jan. 2011, vol. 54, No. 1, pp. 54-59.
Zhao et al., "Templating methods for preparation of porous structures", J. Mater. Chem., 2006, 16, pp. 637-648.
Zhang et al., "Gaseous infiltration method for preparation of three-dimensionally ordered macroporous polyethylene", Polymer, 49, 2008, pp. 5446-5451.
Zhang et al., "Inverted-Colloidal-Crystal Hydrohel Matrices as Three-Dimensional Cell Scaffolds", Adv. Funct. Mater., 2005, 15, No. 5, pp. 725-731.
Chung-li et al., "Studies on the preparation and characterisation of monodisperse polystyrene latices", Progr. Colloid & Polymer Sci., 60, 1976, pp. 163-175.

(56) References Cited

OTHER PUBLICATIONS

Huang et al., "A novel immobilized cobalt(II)/copper(II) bimetallic catalyst for atom transfer radical polymerization (ATRP) of methyl methacrylate", Applied Catalysis A: General, vol. 332, Issue 2, Nov. 20, 2007, pp. 192-199.
Nasser-Eddine et al., "Copper removal in atom transfer polymerization through electrodeposition", Macromol. Mater. Eng., 2004, 289, pp. 204-207.
Coullerez et al., "Understanding Copper-Based Atom-Transfer Radical Polymerization in Aqueous Media", The Journal of Physical Chemistry A, Sep. 2, 2004, vol. 108, No. 35, pp. 7129-7131.
Hong et al., "An Immobilized/Soluble Hybrid Catalyst System for Atom Transfer Radical Polymerization", Macromolecules, 2001, vol. 34, No. 15, pp. 5099-5102.
Matyjaszewski, Krzysztof, "Mechanistic Aspects of Atom Transfer Radical Polymerization", ACS Symp. Ser., 1998, Chapter 16, 685, pp. 258-283.
Matyjaszewski, Krzysztof, "Bulk Atom Transfer Radical Polymerization", ACS Symp. Ser., 1998, Chapter 6, 713, pp. 96-112.
Matyjaszewski et al. "The Preparation of Wel-Defined Water Soluble-Swellable (Co)Polymers by Atom Transfer Radical Polymerization", ACS Symp. Ser., 2000, Chapter 4, 765, pp. 52-71.
Matyjaszewski, Krzysztof, "Controlled Radical Polymerization: State of the Art in 2008", ACS Symp. Ser., 2009, Chapter 1, 1023, pp. 3-13.
Konkolewicz et al, "Tuning Polymer Properties through Competitive Processes", ACS Symp. Ser. 2012, 1100, pp. 145-170.
Hansch et al., "A Survey of Hammett Substituent Constants and Resonance and Field Parameters", Chem. Rev. 1991, 91, pp. 165-195.
Tsarevsky et al., ""Green" Atom transfer Radical Polymerization: From Process Design to Preparation of Well-Defined Environmentally Friendly Polymeric Materials", Chem. Rev. 2007, 107, pp. 2270-2299.
Xia et al., "Controlled/"Living" Radical Polymerization Atom Transfer Radical Polymerization of Acrylates at Ambient Temperature", Macromolecules, 1998, 31, pp. 5958-5959.
Xia et al., "Controlled/"Living" Radical Polymerization. Atom Transfer Radical Polymerization Catalyzed by Copper(I) and Picolylamine Complexes", Macromolecules, 1999, 32, pp. 2434-2437.
Braunecker et al., "Origin of Activity in Cu-, Ru-, and Os-Mediated Radical Polymerization", Macromolecules, 2007, 40, pp. 8576-8585.
Seeliger et al., "Temperature Effect on Activation Rate Constants in ATRP: New Mechanistic Insights into the Activation Process", Macromolecules, 2009, 42, pp. 6050-6055.
Magenau et al. "ATRP of Methacrylates Utilizing Cu"X2/L and Copper Wire", Macromolecules, 2010, 43, pp. 9682-9689.
Kwak et al., "ARGET ATRP of Methyl Acrylate with Inexpensive Ligands and ppm Concentrations of Catalyst", Macromolecules, 2011, 44, pp. 811-819.
Zhang et al., "Copper-Mediated CRP of Methyl Acrylate in the Presence of Metallic Copper: Effect of Ligand Structure on Reaction Kinetics", Macromolecules, 2012, 45, pp. 78-86.
Morick et al., "Activation-Deactivation Equilibrium of Atom Transfer Radical Polymerization of Styrene up to High Pressure", Macromol. Chem. Phys., 2011, 212, pp. 2423-2428.
Di Lena et al., "Transition metal catalysts for controlled radical polymerization", Progress in Polymer Science, 35, 2010, pp. 959-1021.
Pintauer et al., "Atom Transfer Radical Polymerization (ATRP) and Addition (ATRA) and Applications", Encyclopedia of Radicals in Chemistry. Biology and Materials, 2012, 4, pp. 1851-1894.
Malkov et al., "Synthesis of New Chiral 2,2'-Bipyridyl-Type Ligands, Their Coordination to Molybdenum(0), Copper(II), and Palladium(II), and Application in Asymmetric Allylic Substitution, Allylic Oxidation, and Cyclopropanation", Organometallics, 2001, 20, pp. 673-690.
Montalti et al., "Luminescent Ruthenium(II) Bipyridyl-Phosphoric Acid Complexes: pH Dependent Photophysical Behavior and Quenching with Divalent Metal Ions", Inorg. Chem., 2000, 39, pp. 76-84.
Nitadori et al., "Enhanced Photocatalytic Activity of $\alpha$-Methylstyrene Oligomerization through Effective Metal-to-Ligand Charge-Transfer Localization on the Bridging Ligand", Inorg. Chem., 2012, 51, pp. 51-62.
Pintauer et al., "Structural aspects of copper catalyzed atom transfer radical polymerization", Coordination Chemistry Reviews, 249, 2005, pp. 1155-1184.
Ding et al., "Atom Transfer Radical Polymerization of N,N-Dimethylacrylamide", Macromol. Rapid Commun., 2004, 25, pp. 632-636.
Kickelbick et al., "Structural comparison of Cu" complexes in atom transfer radical polymerization", New J. Chem., 2002, 26, pp. 462-468.
Magenau et al., "Highly Active Bipyridine-Based Ligands for Atom Transfer Radical Polymerization", ACS Macro Lett., 2012, 1, pp. 508-512.
Schröder et al., "Substituted Tris(2-pyridylmethyl)amine Ligands for Highly Active ATRP Catalysts", ACS Macro Lett., 2012, 1, pp. 1037-1040.
Abreu et al., "Inorganic Sulfites: Efficient Reducing Agents and Supplemental Activators for Atom Transfer Radical Polymerization", ACS Macro Lett., 2012, 1, pp. 1308-1311.
Eckenhoff et al., "Structural characterization and investigation of iron(III) complexes with nitrogen and phosphorus based ligands in atom transfer radical addition (ATRA)", Inorganica Chimica Acta, 382, 2012, pp. 84-95.
Matyjaszewski et al., "Diminishing catalyst concentration in atom transfer radical polymerization with reducing agents", PNAS, Oct. 17, 2006, vol. 103, No. 42, pp. 15309-15314.
Jakubowski et al. "Activators Regenerated by Electron Transfer for Atom-Transfer Radical Polymerization of (Meth)acrylates and Related Block Copolymers", Angew. Chem., 2006, 118, pp. 4594-4598.
Yasuda, et al., "Stereospecific Polymerization of Acetaldehyde by $R_2AlOR'$ Catalyst," Journal of Polymer Science, vol. 11, 1973, pp. 1421-1434.
Poli, et al., "Iron-mediated reversible deactivation controlled radical polymerization," Progress in Polymer Science 39 (2014), pp. 1827-1845.
Saikia, et al., "Reverse Atom Transfer Radical Polymerization of Steary Methacrylate Using 2,2'-Azobisisobutyronitrile as the Initiator," Journal of Applied Polymer Science, vol. 85 (2002), pp. 1236-1245.
Park, Sangwoo, et al., "Simplified Electrochemically Mediated Atom Transfer Radical Polymerization using a Sacrificial Anode," Angew. Chem. Int. Ed, 2015, 54, pp. 2388-2392.
Park, Sangwoo, et al., "Star Synthesis Using Macroinitiators via Electrochemically Mediated Atom Transfer Radical Polymerization," Macromolecules, 2013, 46, pp. 5856-5860.
Samal, Seetanshu K., et al., "Electroinitiated Polymerization of Acrylamide in Acetonitrile Medium," Journal of Polymer Science: Part A: Polymer Chemistry, vol. 26, 1988, pp. 1035-1049.
Magenau, Andrew J., et al., "Investigation of Electrochemically Mediated Atom Transfer Radical Polymerization," Macromolecules, 2013, 46, pp. 4346-4353.
Chmielarz Pawel, et al., "PEO-b-PNIPAM copolymers via SARA ARTP and eATRP in Aqueous Media," Polymer, 71, 2015, pp. 143-147.
Bonometti, Valentina, et al., "Exploring the first steps of an electrochemically-triggered controlled polymerization sequence: Activation of alkyl- and benzyl halide initiators by an electrogenerated $Fe^{II}Salen$ complex," Journal of Electroanalytical Chemistry 633 (2009) pp. 99-105.
Bortolamei, Nicola, et al., "Controlled Aqueous Atom Transfer Radical Polymerization with Electrochemical Generation of the Active Catalyst," Angew. Chem. Int. Ed., 2011, 50, pp. 11391-11394.
Magenau, Andrew J., et al., "Electrochemically Mediated Atom Transfer Radical Polymerization," Science, vol. 332, Apr. 1, 2011, pp. 81-84.

(56) References Cited

OTHER PUBLICATIONS

Fischer, Hanns, et al., "The Persistent Radical Effect In "Living" Radical Polymerization," Macromolecules 1997, 30, pp. 5666-5672.
Haddleton, David M., et al., "Atom Transfer Polymerization of Poly(Ethylene Glycol) Methyl Ether Methacrylate Macromonomer," Polymer Preprints, 2000, 41(1), pp. 415-416.
Abreu C. M. R. et. al.; "Ambient temperature rapid SARA ATRP of acrylates and methacrylates in alcohol-water solutions mediated by a mixed sulfite/Cu$_{(II)}$Br$_2$ catalytic system," Polymer Chemistry 2013, 4, pp. 5629-5636.
Alsubaie, F. et. al.; "Sequence-controlled multi-block copolymerization of acrylamides via aqueous SET-LRP at 0° C," Polym. Chem. 2015, 6, pp. 406-417.
Anastasaki, A.; et. al.; "Aqueous Copper-Mediated Living Radical Polymerisation of N-Acryloylmorpholine, SET-LRP in Water," Macromol Rapid Comm 2014, 35 (10), pp. 965-970.
C. Andrieux et. al., "Homogeneous Redox Catalysis of Electrochemical Reactions, Part I. Introduction," J. Electroanal. Chem. 1978, 87, pp. 39-53.
C. Andrieux et. al., "Homogeneous Redox Catalysis of Electrochemical Reactions, Part II. Rate Determining Electron Transfer. Evaluation of Rate and Equilibrium Parameters," J. Electroanal. Chem. 1978, 87, pp. 55-65.
C. Andrieux et. al., "Homogeneous Redox Catalysis of Electrochemical Reactions, Part IV. Kinetic Controls in the Homogeneous Process as Characterized by Stationary and Quasi-Stationary Electrochemical Techniques," J. Electroanal. Chem. 1980, 113, pp. 1-18.
Bell C. A. et. al.; "A Rapid Electrochemical Method for Determining Rate Coefficients for Copper-Catalyzed Polymerizations," J. Am. Chem. Soc., 2011, 133, pp. 11944-11947.
Buback, M. et al.; "Pressure dependence of propagation rate coefficients in freeradical homopolymerizations of methyl acrylate and dodecyl acrylate," Macromol. Chem. Phys. 1998, 199, pp. 1721-1727.
Buback, M. et. al.; "Termination Kinetics of Methyl Acrylate and Dodecyl Acrylate Free-Radical Homopolymerizations up to High Pressure," Macromol. Chem. Phys. 2002, 203, pp. 1065-1070.
Fischer H. et al., "Factors Controlling the Addition of Carbon-Centered Radicals to Alkenes—An Experimental and Theoretical Perspective," Angew. Chem. Int. Ed. 2001, 40, pp. 1340-1371.
Golub G. et.al.; "The effect of N-methylation of tetra-aza-alkane copper complexes on the axial binding of anions," Inorg. Chim. Acta 1997, 255, pp. 111-115.
Harrisson, S.; et al., "Comproportionation versus Disproportionation in the Initiation Step of Cu(0)-Mediated Living Radical Polymerization," Macromolecules 2012, 45, pp. 7388-7396.
Henderson, et al., "Ionic Effects on the Behavior of Thermoresponsive PEO-PNIPAAm Block Copolymers," J Polym Sci Polym. Phys 2014, 52 (7), pp. 507-516.
Kim K. H.; et al.; "Preparation of hydrogel nanoparticles by atom transfer radical polymerization of N-isopropylacrylamide in aqueous media using PEG macro-initiator," Polymer 2005, 46 (9), pp. 2836-2840.
Konkolewicz, D.; et al.; "Aqueous RDRP in the Presence of Cu$^0$: The Exceptional Activity of Cu$^I$ Confirms the SARA ATRP Mechanism," Macromolecules 2014, 47 (2), pp. 560-570.
Konkolewicz, D.; et. al.; "Visible Light and Sunlight Photoinduced ATRP with ppm of Cu Catalyst," ACS Macro Lett. 2012, 1, pp. 1219-1223.
Konkolewicz, D.; et. al.; "ICAR ATRP with ppm Cu Catalyst in Water," Macromolecules 2012, 45, pp. 4461-4468.
Millard, et al.; "Controlling the Fast ARTP of N-isopropylacrylamide in Water," ACS Symposium Series 2009, 1023, pp. 127-137.
Matyjaszewski, K.; "Atom Transfer Radical Polymerization (ATRP): Current Status and Future Perspectives," Macromolecules. 2012, 45 (10), pp. 4015-4039.
Miyake et al., "Perylene as an Organic Photocatalyst for the Radical Polymerization of Functionalized Vinyl Monomers through Oxidative Quenching with Alkyl Bromides and Visible Light," Macromolecules 2014, 47, pp. 8255-8261.
Nguyen, et. al.; "The Effect of Ligand on the Rate of Propagation of Cu(0)-Wire Catalyzed SET-LRP of MA in DMSO at 25° C," Polym. Sci., Part A: Polym. Chem. 2009, 47, pp. 5629-5638.
Nguyen. et. al.; "SET-LRP of N,N-Dimethylacrylamide and of N-Isopropylacrylamide at 25° C in Protic and in Dipolar Aprotic Solvents," J Polym Sci Polym. Chem 2010, 48 (8), pp. 1752-1763.
Nicholson R. S., "Theory and Application of Cyclic Voltammetry for Measurement of Electrode Reaction Kinetics," Anal. Chem. 1965, vol. 37, pp. 1351-1355.
Onsager, L., "Reciprocal relations in Irreversible Processes.," Phys. Rev. 1931, vol. 37, pp. 405-426.
Peng, C-H.; et al.; "Reversible-Deactivation Radical Polymerization in the Presence of Metallic Copper. Activation of Alkyl Halides by Cu$^0$," Macromolecules 2013, 46, pp. 3803-3815.
Percec, et al.; "Ultrafast Synthesis of Ultrahigh Molar Mass Polymers by Metal-Catalyzed Living Radical Polymerization of Acrylates, Methacrylates, and Vinyl Chloride Mediated by SET at 25° C," J. Am. Chem. Soc. 2006, 128, pp. 14156-14165.
Treat, Nicolas J., et. al., "Metal-Free Atom Transfer Radical Polymerization," J. Am. Chem. Soc. 2014, 136, pp. 16096-16101.
Waldron C et al.; "Absolut "copper catalyzation perfected"; robust living polymerization of NIPAM: Guinness is good for SET-LRP," Polym. Chem. 2014, 5(1): pp. 57-61.
Wang, Yu et. al.; "Reversible-Deactivation Radical Polymerization in the Presence of Metallic Copper. Comproportionation-Disproportionation Equilibria and Kinetics," Macromolecules 2013, 46, pp. 3793-3802.
Wei H. et al.; "One-pot ATRP synthesis of a triple hydrophilic block copolymer with dual LCSTs and Its thermo-induced association behavior," Soft Matter 2012, 8 (37), pp. 9526-9528.
Wever, et. al., "Polymers for enhanced oil recovery: A paradigm for structure-property relationship in aqueous solution," Prog. Polym. Sci. 2011, 36 (11), pp. 1558-1628.
Williams, et al., "A Silver Bullet: Elemental Silver as an Efficient Reducing Agent for Atom Transfer Radical Polymerization of Acrylates," J. Am. Chem. Soc. 2015, 137, pp. 1428-1431.
Zhang, et al. "Aqueous Copper-Mediated Living Polymerization: Exploiting Rapid Disproportionation of CuBr with Me$_6$TREN," J. Am. Chem. Soc. 2013, 135, pp. 7355-7363.
Zhong, et al., "Reversible-Deactivation Radical Polymerization in the Presence of Metallic Copper. Kinetic Simulation," Macromolecules, 2013, 46, pp. 3816-3827.
Averick, et al., "ATRP under Biologically Relevant Conditions: Grafting from a Protein," ACS Macro Lett. 2012, 1, pp. 6-10.
He, et al., "Three-Dimensionally Ordered Macroporous PolymericnMaterials by Colloidal Crystal Templating for Reversible C02 Capture." Advanced Functional Materials 23(37): pp. 4720-4728, Oct. 2013.
Pal, et al., "Preparation and Characterization of Polyvinyl Alcohol—Gelatin Hydrogel Membranes for Biomedical Applications," AAPS PharmSciTech 2007;8(1): Article 21; pp. E1-E5.
Davis, et al., "Disorder-to-Order Transition in Settling Suspensions of Colloidal Silica: X-ray Measurements," Science 1989, vol. 245, pp. 507-510.
Zhao, et al., "Templating Methods for Preparation of Porous Structures," J. Materials Chemistry, 2006;16: pp. 637-648.
Xia, et al., "Monodispersed Colloidal Spheres: Old Materials with New Applications," Adv. Mater. 2000; 12(10): pp. 693-713.
Yue, et al., "Preparation and Characterization of Nanostructured and High Transparent Hydrogel Films with pH Sensitivity and Application," Journal of Applied Polymer Science 2009;112(4): pp. 2261-2269.
Hearnden, et al., "New developments and opportunities in oral mucosal drug delivery for local and systemic disease," Advanced Drug Delivery Reviews 2012; 64: pp. 18-23.
Hongkun He, et al., "Multifunctional Hydrogels with Reversible 3D Ordered Macroporous Structures," Supporting Information for Advanced Science, 2015, 2, pp. S1-S37 (38 pages).
Coca, S., et al., "Block Copolymers by Transformation of "Living" Carbocationic into "Living" Radical Polymerization. II. ABA-Type

(56) References Cited

OTHER PUBLICATIONS

Block Copolymers Comprising Rubbery Polyisobutene Middle Segment," J. Polym. Sci., Part A: Polym. Chem. 1997, 35, pp. 3595-3601.
Coca S., et al., "Block Copolymers by Transformation of "Living" Carbocationic into "Living" Radical Polymerization," American Chemical Society, Macromolecules, vol. 30, No. 9, 1997, pp. 2808-2810.
Matyjaszewski, K., Y. Nakagawa, et al. (1998). "Polymerization of n-butyl acrylate by atom transfer radical polymerization. Remarkable effect of ethylene carbonate and other solvents." Macromolecules 31(5): 1535-1541.
Zapata-Gonzalez, "Mathematical Modeling of the Full Molecular Weight Distribution in ATRP Techniques," AIChE Journal, vol. 62, No. 8, Aug. 2016, pp. 2762-2777.
Fantin, et al., "ATRP in Water: Kinetic Analysis of Active and Super-Active Catalysts for Enhanced Polymerization Control," ACS Publications, Macromol 2017, 50, pp. 2696-2705.
Fantin, et al., "Understanding the Fundamentals of Aqueous ATRP and Defining Conditions for Better Control," ACS Publications, Macromol 2015, 48, pp. 6862-6875.
Konkolewicz et al, "SARA ATRP or SET-LRP. End of controversy?", Polym. Chem., 2014, 5, pp. 4396-4417.
Gao et al.; "In situ growth of a stoichiometric PEG-like conjugate at a protein's N-terminus with significantly improved pharmacokinetics," Proceedings of the National Academy of Sciences, 2009, vol. 106, No. 36, p. 15231-15236.
De et al; Journal of the American Chemical Society, 2008, vol. 130, p. 11288-11289, SI 1-SI21.
Qian et al; Analytical Chemistry, 2009, vol. 81, No. 11, p. 4536-4542.
Wise et al., Electrical and Optical Polymer Systems, Fundamentals, Methods, and Applications, CRC Press, 1998, p. 905.
Merriam-Webster, Definition of Hydrogel, accessed from https://www.merriam-webster.com/dictionary/hydrogel, accessed Jun. 25, 2018, pp. 1-8.
Teo et al., "Successful Miniemulsion ATRP Using an Anionic Surfactant: Minimization of Deactivator Loss by Addition of a Halide Salt", Macromolecules, Sep. 7, 2014, vol. 47, pp. 6230-6237.
Yagci et al., "Visible Light-Induced Atom Transfer Radical Polymerization for Macromolecular Syntheses", Chapter 8, ACS Symposium Series, May 1, 2015, pp. 145-158.
Blencowe et al., "Core cross-linked star polymers via controlled radical polymerisation," Polymer 50 (2009) pp. 5-32.
Matyjaszewski, K., "Architecturally Complex Polymers with Controlled Heterogeneity," Science, Aug. 26, 2011: vol. 333, Issue 6046, pp. 1104-1105. Summary only.
Matyjaszewski, K., "Polymer Science: A Comprehensive Reference", vol. 3, 2012, pp. 377-428. Abstract only.
Bultz et al., "Ferrocene cocatalysis for ruthenium-catalyzed radical miniemulsion polymerization", Polymer, vol. 106, Dec. 2016, pp. 313-319. Abstract only.
Cunningham, M., "Controlled/living radical polymerization in aqueous dispersed systems", Progress in Polymer Science, vol. 33, Issue 4, Apr. 2008, pp. 365-398. Abstract only.
Matyjaszewski et al., "Atom transfer radical polymerization in aqueous dispersed media", Central European Journal of Chemistry, vol. 7, Article No. 657 (2009). Abstract only.
Elsen, et al. "Activators Regenerated by Electron Transfer Atom Transfer Radical Polymerization in Miniemuision with 50 ppm of Copper Catalyst", ACS Macro Lett. 2013, 2, 9, 822-825. Abstract only.
Matyjaszewski et al., "Controlled/"Livng" Radical Polymerization Applied to Water-Borne Systems", Macromol. Symp. 155, 2000, pp. 15-29. Abstract only.
Simms et al., "Reverse atom transfer radical polymerization of butyl methacrylate in a miniemulsion stabilized with a cationic surfactant", J. Polym. Sci., Part A, Polym. Chem., 2006, 44, pp. 1628-1634. Abstract only.
Kagawa et al., "Atom Transfer Radical Polymerization of iso-Butyl Methacrylate in Microemulsion with Cationic and Non-Ionic Emulsifiers", Macromolecular Rapid Communications, vol. 28, Issue 24, 2007, pp. 2354-2360.
Bultz et al., "Shuttling Catalyst for Living Radical Miniemulsion Polymerization: Thermoresponsive Ligand for Efficient Catalysis and Removal", ACS Macro Lett, 4, 6, May 20, 2015, pp. 628-631. Abstract only.
Jakubowski et al., "Activators Regenerated by Electron Transfer for Atom-Transfer Radical Polymerization of (Meth)acrylates and Related Block Copolymers," Angewandte Chemie International Edition, Jun. 28, 2006, vol. 45, Issue 27, pp. 4482-4486.
Fantin, et al., "Electrochemical Atom Transfer Radical Polymerization in Miniemulsion with a Dual Catalytic System," Macromolecules, Nov. 14, 2016, 49, 23, pp. 8838-8847. Abstract only.
Min et al., "High Yield Synthesis of Molecular Brushes via ATRP in Miniemuision", Macromolecules, Aug. 10, 2007, 40, 18, 6557-6563. Abstract only.
Wang, et al., "Temporal control in mechanically controlled atom transfer radical polymerization using low ppm of Cu catalyst", ACS Macro Letters, Apr. 2017, 6, 5, pp. 546-549. Abstract only.
Elsen et al., Active Ligand for Low PPM Miniemuision Atom Transfer Radical Polymerization. Macromolecules, 2012, 45, 18, pp. 7356-7363. Abstract only.
Chmielarz et al., Synthesis of β-cyclodextrin-based star polymers via a simplified electrochemically mediated ATRP, Polymer, vol. 88, Apr. 6, 2016, pp. 36-42. Abstract only.
Chan et al., ARGET ATRP of Methacrylates and Acrylates with Stoichiometric Ratios of Ligand to Copper, vol. 209, Issue 17, Sep. 4, 2008, pp. 1797-1805. Abstract only.
Chmielarz et al., A simplified electrochemically mediated ATRP synthesis of PEO-b-PMMA copolymers, Polymer, vol. 77, Oct. 23, 2015, pp. 266-271. Abstract only.
Guo et al., Kinetic insight into electrochemically mediated ATRP gained through modeling, AiChE Journal, vol. 61, Issue 12, Dec. 2015, pp. 4347-4357. Abstract only.
Chmielarz et al., Synthesis of urethane—acrylic multi-block copolymers via electrochemically mediated ATRP, Chemical Papers, 2016, vol. 70, pp. 1228-1237. Abstract only.
Chmielarz, Synthesis of cationic star polymers by simplified electrochemically mediated ATRP, Express Polymer Letters, vol. 10, Issue 10, Oct. 2016, pp. 810-821. Abstract only.
Asua, Jose M., Miniemulsion polymerization, Progress in Polymer Science vol. 27, Issue 7, Sep. 2002, pp. 1283-1346. Abstract only.
El-Jaby et al., The Advantages of In Situ Surfactant Generation for Miniemulsions, Macromolecular Rapid Communications, vol. 31, Issue 6, Mar. 16, 2010, pp. 558-562.

\* cited by examiner

[Cu] = 793 ppm

| Entry | M/I/AAc/Cu/TPMA | Solvent | Time/h | Conv./% | $M_{n,Th}$ | $M_{n,GPC}$ | Đ |
|---|---|---|---|---|---|---|---|
| LF-4-12 | 280/1/1/0.222/0.266 | DI water | 11 | 25 | 10.2 | 9.6 | 1.24 |

M = BMA, [M] = 20 vol %, I = EBPA, [NaBr] = 100mM, hexadecane = 10.8 wt%, SDS = 4.6 wt, T = 44°C, Feed rate (AAc) = 62 nmol/min

SURFACTANT ASSISTED FORMATION OF A CATALYST COMPLEX FOR EMULSION ATOM TRANSFER RADICAL POLYMERIZATION PROCESSES

CROSS REFERENCE TO RELATED APPLICATIONS

This application claims priority to U.S. Provisional Application 62/498,981 filed on Jan. 12, 2017 and U.S. Provisional Application 62/602,219 filed on Apr. 17, 2017, the disclosures of each of which are entirely incorporated herein by this reference as if fully set forth herein.

GOVERNMENT RIGHTS

This invention was made with government support under CHE1400052 awarded by the National Science Foundation and R01 DE020843 awarded by the National Institute of Health. The government has certain rights in the invention.

TECHNICAL FIELD

The present disclosure relates to a surfactant assisted formation of a catalyst complex for Emulsion Atom Transfer Radical Polymerization (ATRP).

BACKGROUND

ATRP can be a controlled radical polymerization process that allows effective control over the molecular weight (MW) of the formed polymer, preparation of polymers with narrow molecular weight distributions, dispersity (Đ), incorporation of precisely placed functionalities within the polymer, and fabrication of polymers with various architectures in addition to the synthesis of well-defined composite materials.

The basic ATRP process, and a number of variations to the basic ATRP process, have been provided in a number of commonly assigned patents and patent applications. U.S. Pat. Nos. 5,763,546; 5,807,937; 5,789,487; 5,945,491; 6,111,022; 6,121,371; 6,124,411; 6,162,882; 6,624,262; 6,407,187; 6,512,060; 6,538,091; 6,541,580; 6,624,262; 6,627,314; 6,759,491; 6,790,919; 6,887,962; 7,019,082; 7,049,373; 7,064,166; 7,125,938; 7,157,530; 7,332,550; 7,407,995; 7,572,874; 7,678,869; 7,795,355; 7,825,199; 7,893,173; 7,893,174; 8,252,880; 8,273,823; 8,349,410; 8,367,051; 8,404,788; 8,445,610; 8,816,001; 8,865,795; 8,871,831; 8,962,764; 9,243,274; 9,410,020; 9,447,042; 9,533,297; and 9,644,042; Ser. Nos. 13/993,521; 14/239, 181; 14/379,418; all of which are herein incorporated by reference to provide background and definitions for the present disclosure.

ATRP can control polymer composition, topology, and position of functionalities within a copolymer. For example, see [*Prog. Polym. Sci.* 2001, 26, 337; *Advances in Polymer Science*; Springer Berlin/Heidelberg: 2002; Vol. 159; *Prog. Polym. Sci.* 2009, 34, 317-350; *Polymer* 2009, 50, 5-32; *Science* 2011, 333, 1104-1105. *Polymer Science: A Comprehensive Reference*; Editors-in-Chief: Krzysztof, M.; Martin, M., Eds. Elsevier: Amsterdam, 2012; pp 377-428.]

The following scheme shows the generally accepted mechanism for an ATRP.

Scheme 1. Mechanism of ATRP.

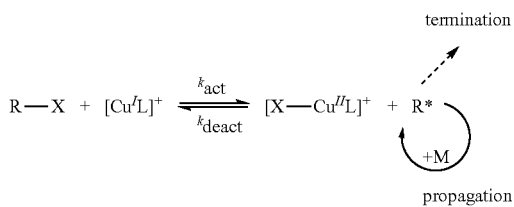

Generally a copper-amine complex in its lower oxidation state, e.g., a copper (I) amine ($Cu^I/L^+$, wherein L is a ligand), activates an alkyl halide initiator (R—X, R is an alkyl group and X is a halide) or dormant polymer chain end ($P_n$—X, wherein $P_n$ is the polymer chain), forming a propagating radical and the higher oxidation state deactivator catalyst, e.g., a halidated copper (II) amine, (X—$Cu^{II}/L^+$). After the addition of a few monomer units, the growing radicals convert back to their dormant state ($P_n$—X) by reaction with the deactivator catalyst, hence minimizing termination reactions and providing concurrent growth of all chains. Nevertheless, during the course of an ATRP there generally can be an accumulation of the deactivator form of the catalyst resulting from a low fraction of termination reactions. This increase in deactivator concentration changes the equilibrium between the dormant and active species and eventually the polymerization rate slows, or even stops, at incomplete conversions if incorrect polymerization conditions are selected. This limitation was initially overcome by addition of high concentrations of relatively less active catalysts but recent developments have allow this phenomenon to be overcome through the use of reducing agents that can reform the activator and allow higher to complete conversions to be realized with much lower concentrations of added active catalyst complexes. This is exemplified in [*Polymer* 2016, 106, 313].

SUMMARY

In one aspect, an Atom Transfer Radical Polymerization (ATRP) emulsion system is provided. The system comprises a suspending medium, a dispersed medium, a surfactant, a transition metal compound in a higher oxidation state, a ligand containing at least two heteroatom containing groups, and an ATRP initiator comprising one or more radically transferable atoms or groups. The transition metal compound is capable of forming a catalyst complex in a presence of the ligand. More specifically, the at least two heteroatom containing groups coordinate with the transition metal compound. The catalyst complex is soluble in the suspending medium and is capable of forming an ionic complex with the surfactant. The ionic complex is capable of moving between the suspending medium and the dispersed medium. A portion of the transition metal compound in the higher oxidation state within a portion of the catalyst complex is reduced by a physical and/or a chemical procedure thereby initiating a polymerization of one or more radically (co)polymerizable monomers by reaction with the initiator.

In another aspect, an ATRP emulsion process is provided. More specifically, a suspending medium, a surfactant, a transition metal compound in a higher oxidation state, a ligand containing at least two heteroatom containing groups, one or more radically (co)polymerizable monomers, and an ATRP initiator containing one or more radically transferable atoms or groups are added to a container. An emulsion is generated in the container including generating one or more dispersed droplets in the container. A catalyst complex is formed with the transition metal compound and the ligand. More specifically, the at least two heteroatom containing groups coordinate with the transition metal compound. The catalyst complex is soluble in the suspending medium. A polymerization of the one or more monomers is initialized by reducing a portion of the transition metal compound in the higher oxidation state within a portion of the catalyst complex by a physical or a chemical procedure. The reduction of the catalyst complex creates an active catalyst complex having the portion of the transition metal compound in a lower oxidation state. The active catalyst complex is shuttled between the suspending medium and the dispersed droplets by a formed ionic complex of the surfactant and the active catalyst complex. The initiator is reacted with the one or more monomers thereby initiating a polymerization and forming a polymer and the reacting is facilitated by the active catalyst complex.

In another aspect, an ATRP emulsion process is provided. More specifically, a suspending medium, an anionic surfactant, a single transition metal compound in a higher oxidation state, a ligand containing at least two heteroatom containing groups, one or more radically (co)polymerizable monomers, and an ATRP initiator are added to a container. The ATRP initiator comprises one or more radically transferable atoms or groups and is soluble in the suspending medium. A catalyst complex is formed with the transition metal compound and the ligand. More specifically, the at least two heteroatom containing groups coordinate with the transition metal compound. The catalyst complex is soluble in the suspending medium. A polymerization of the one or more monomers is initialized utilizing the ATRP initiator. More specifically, a portion of the transition metal compound in the higher oxidation state is reduced within a portion of the catalyst complex by a physical or a chemical procedure. The reduction of the catalyst complex creates an active catalyst complex having the portion of the transition metal compound in a lower oxidation state. A micelle is formed by reacting the initiator with the one or more monomers to form a hydrophobic oligomer which phase separates from the suspending medium. A polymer is formed by increasing the molecular weight of the hydrophobic oligomer. Namely, the active catalyst complex is shuttled between the suspending medium and the micelle by forming an ionic complex of the surfactant and the active catalyst complex. The active catalyst complex facilitates nucleation and growth of the hydrophobic oligomer within the micelle.

In another aspect, a polymer is formed by an ATRP emulsion process. More specifically, a suspending medium, a surfactant, a transition metal compound in a higher oxidation state, a ligand containing at least two heteroatom containing groups, one or more radically (co)polymerizable monomers, and an ATRP initiator containing one or more radically transferable atoms or groups are added to a container. An emulsion is generated in the container including generating one or more dispersed droplets in the container. A catalyst complex is formed with the transition metal compound and the ligand. More specifically, the at least two heteroatom containing groups coordinate with the transition metal compound. The catalyst complex is soluble in the suspending medium. A polymerization of the one or more monomers is initialized by reducing a portion of the transition metal compound in the higher oxidation state within a portion of the catalyst complex by a physical or a chemical procedure. The reduction of the catalyst complex creates an active catalyst complex having the portion of the transition metal compound in a lower oxidation state. The active catalyst complex is shuttled between the suspending medium and the dispersed droplets by a formed ionic complex of the surfactant and the active catalyst complex. The initiator is reacted with the one or more monomers thereby initiating a polymerization and forming the polymer and the reacting is facilitated by the active catalyst complex.

It is understood that the inventions described in this specification are not limited to the examples summarized in this Summary. Various other aspects are described and exemplified herein.

BRIEF DESCRIPTION OF THE DRAWINGS

The features and advantages of the examples, and the manner of attaining them, will become more apparent and the examples will be better understood by reference to the following description of examples taken in conjunction with the accompanying drawings, wherein.

Figure 7A:
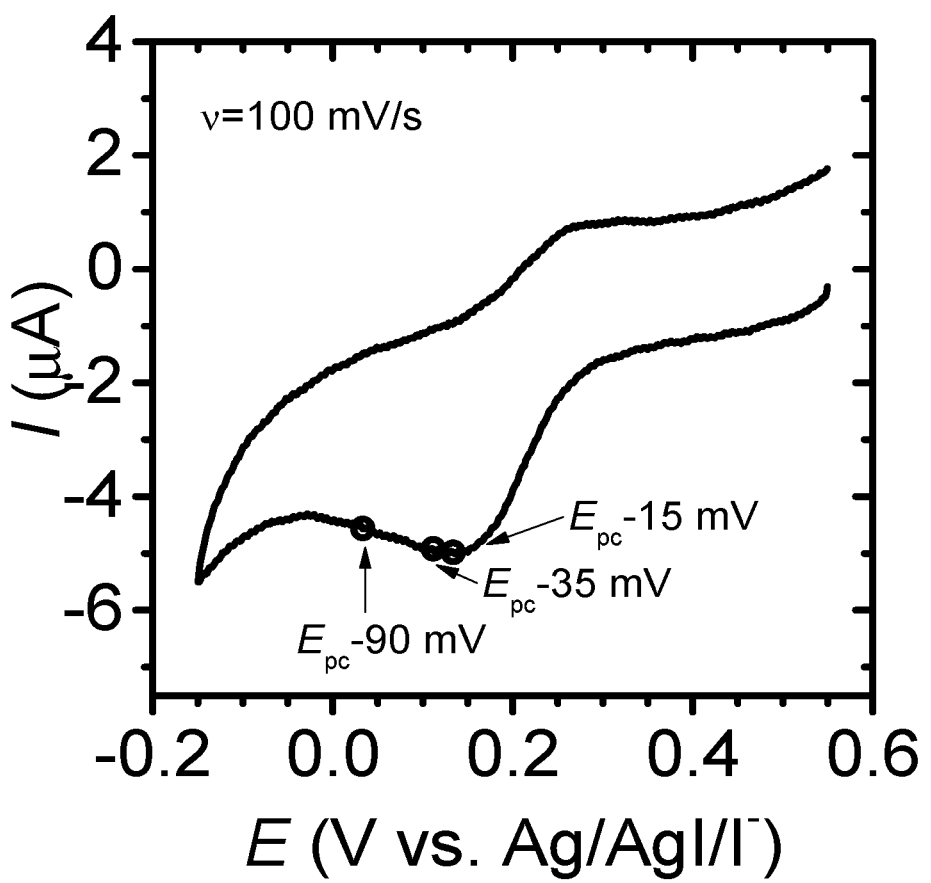
Figure 7B:
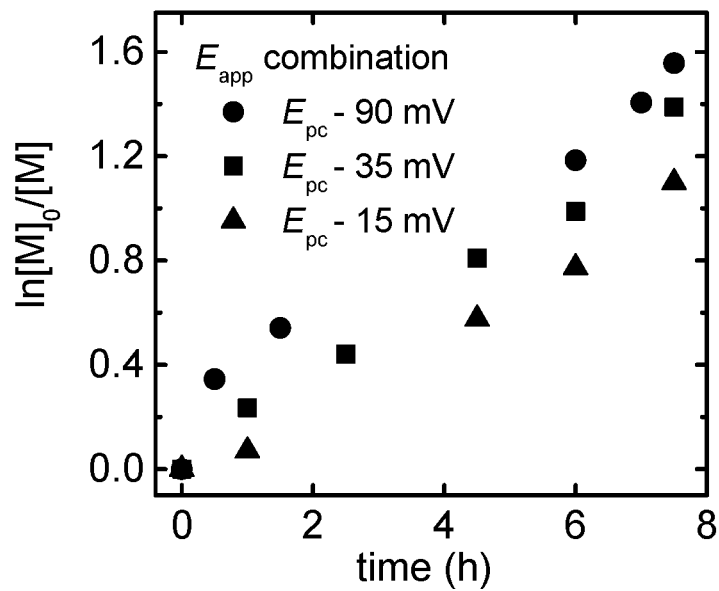
Figure 7C:
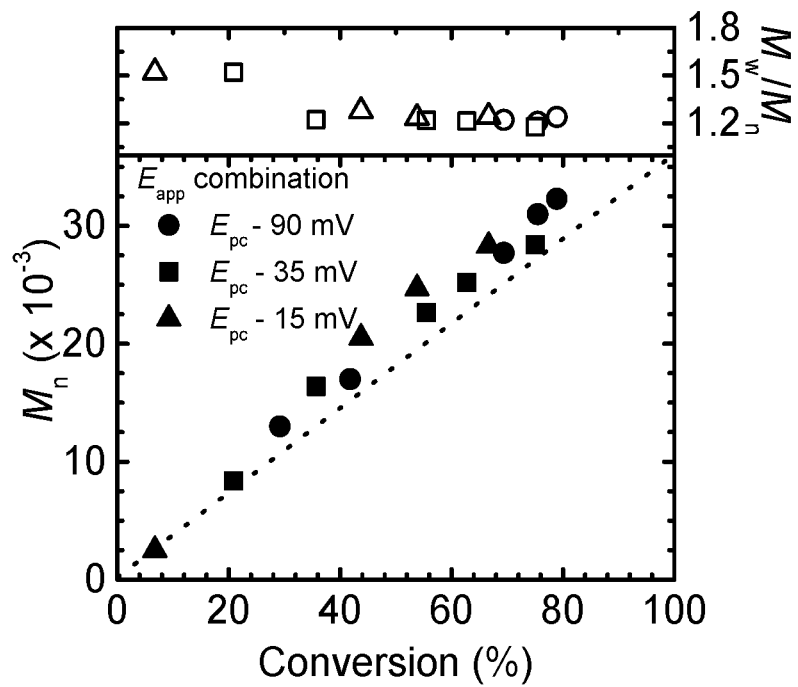
Figure 8A:
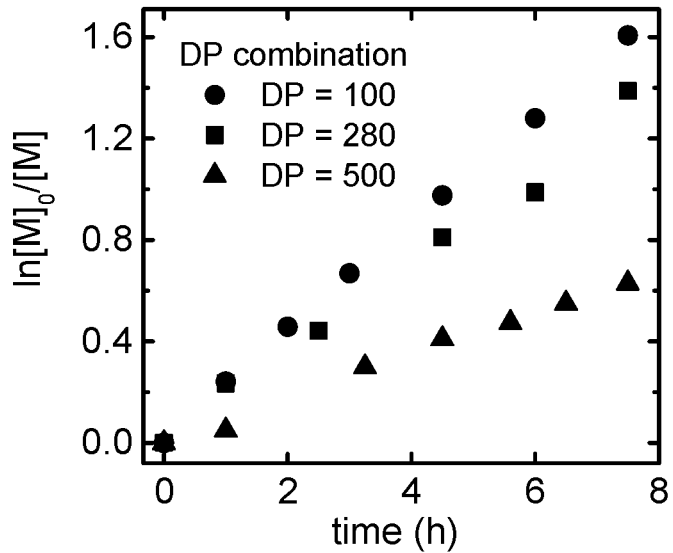
Figure 8B:
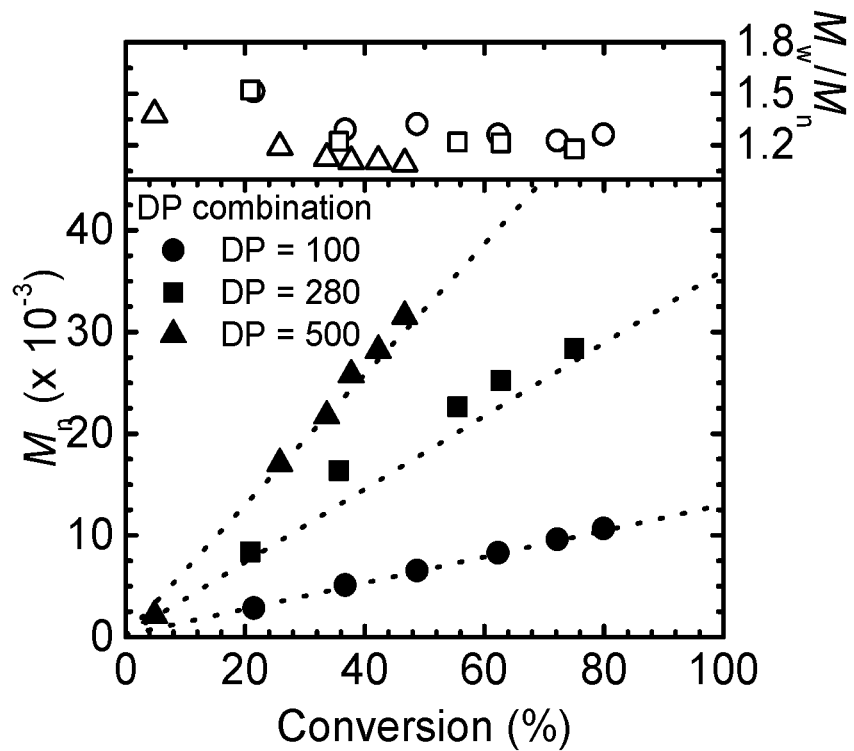
Figure 9A:
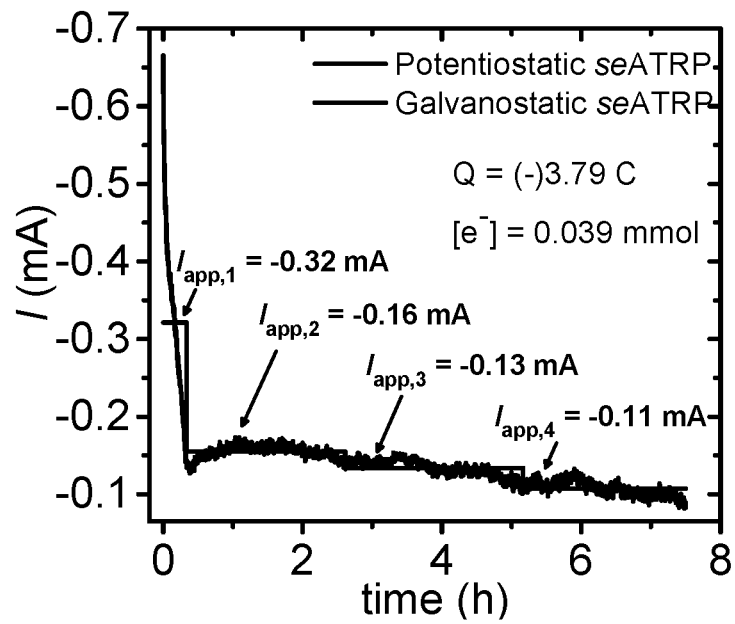
Figure 9B:
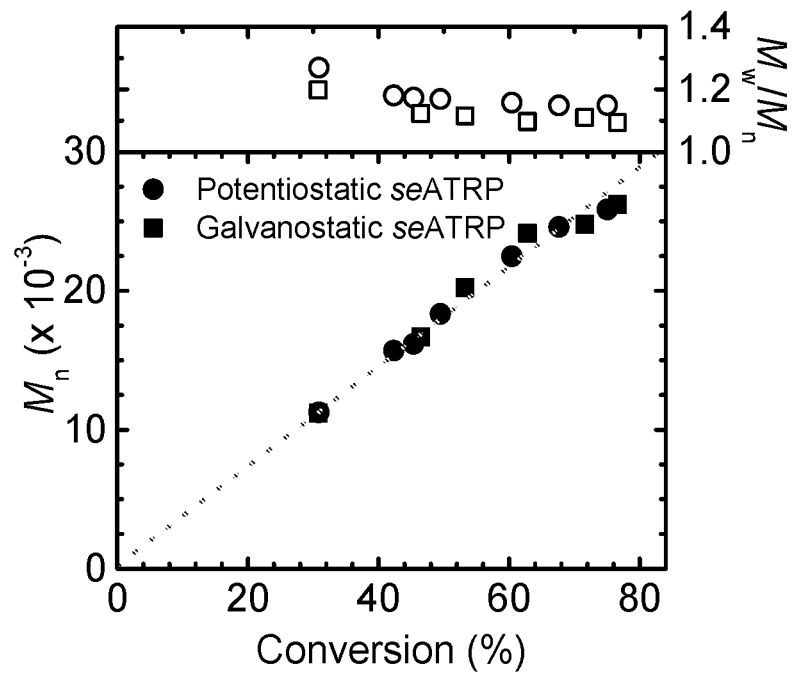
Figure 10A:
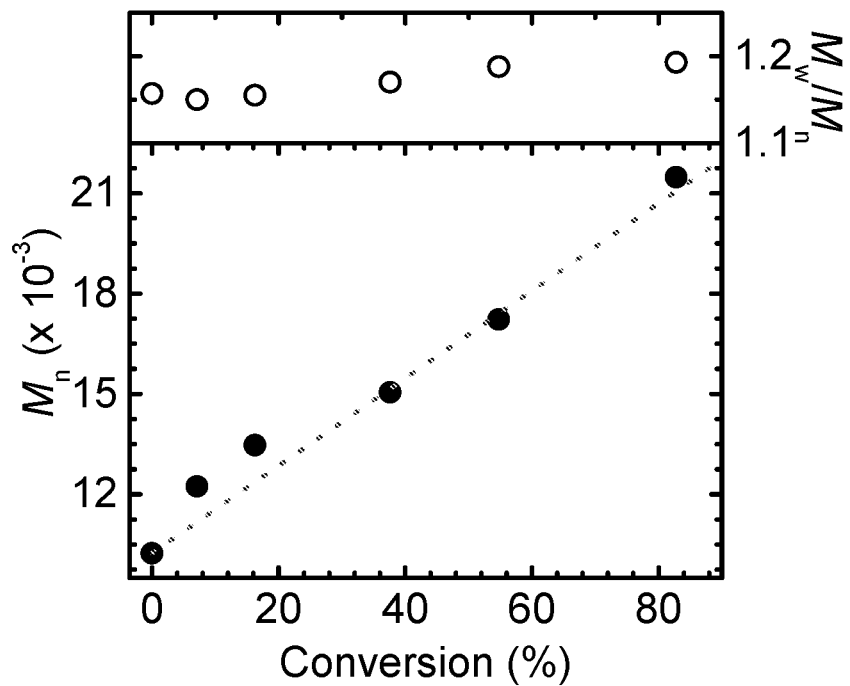
Figure 10B:
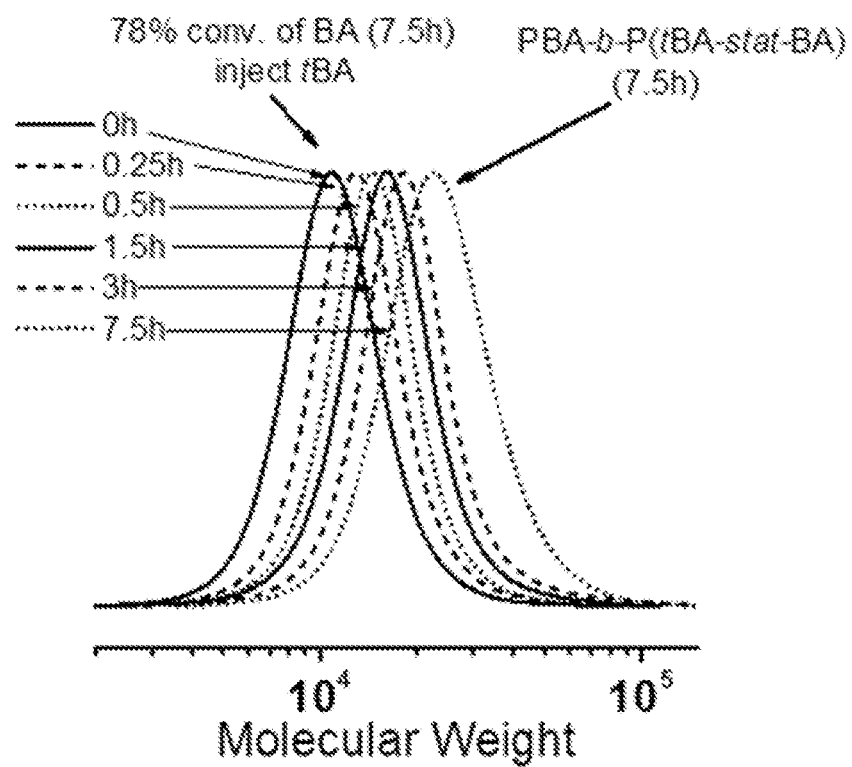
Figure 11A:
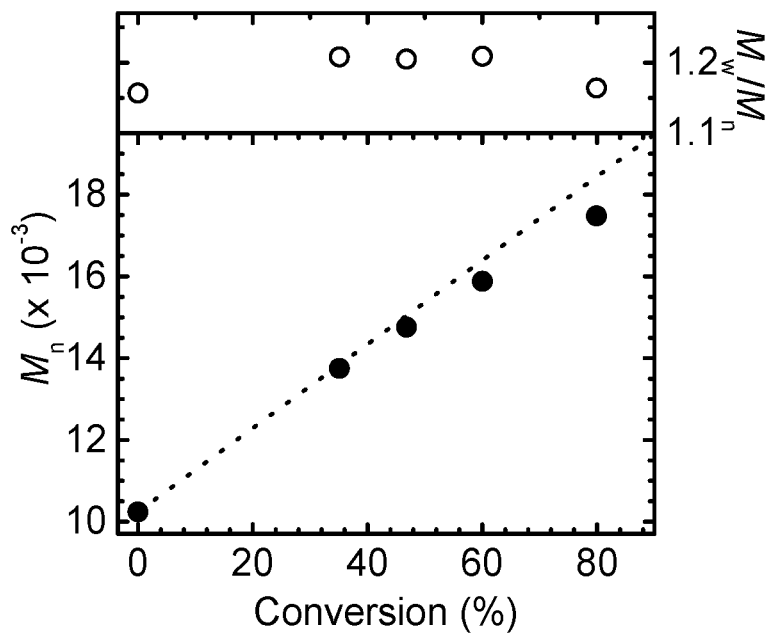
Figure 11B:
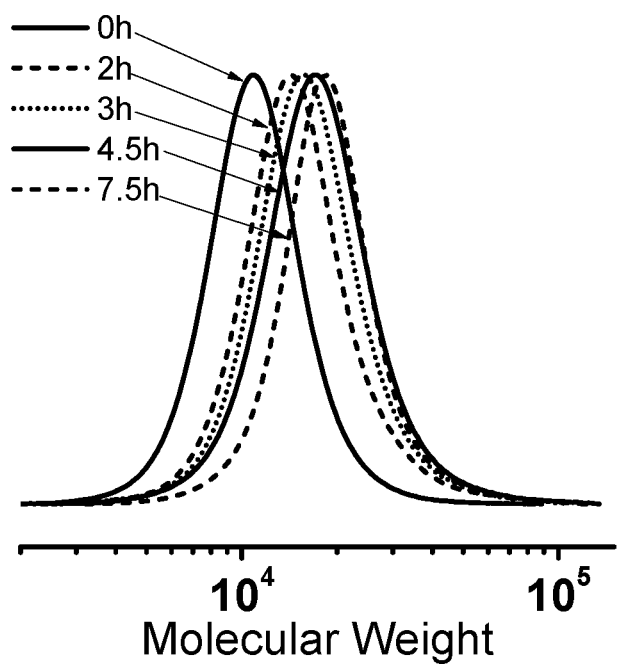
Figure 12:
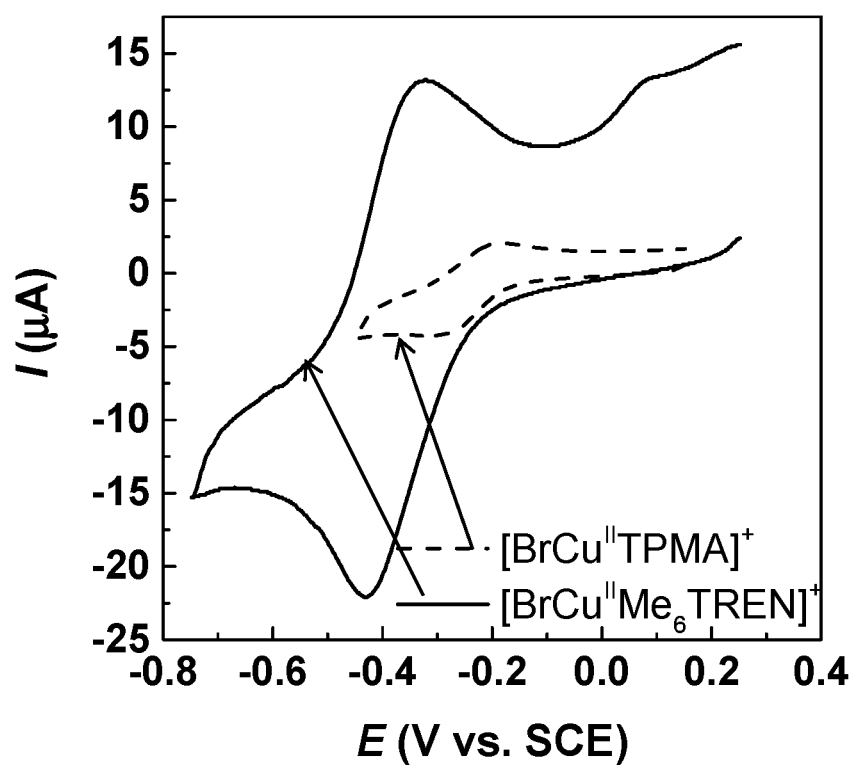
Figure 13A:
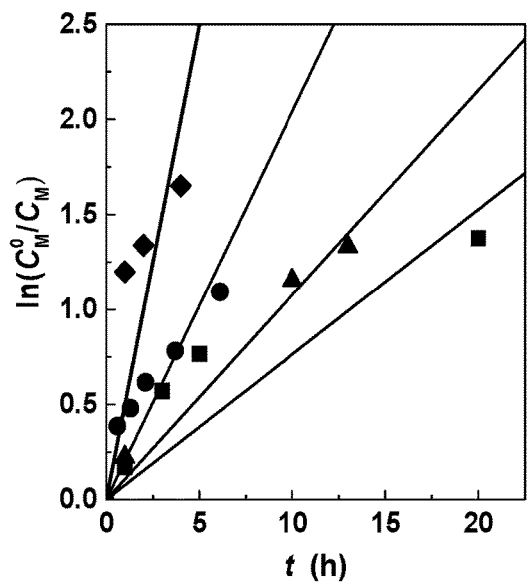
Figure 13B:
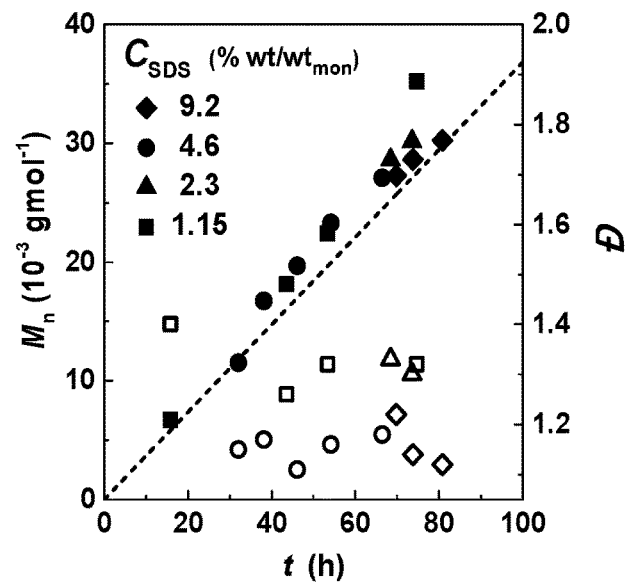
Figure 13C:
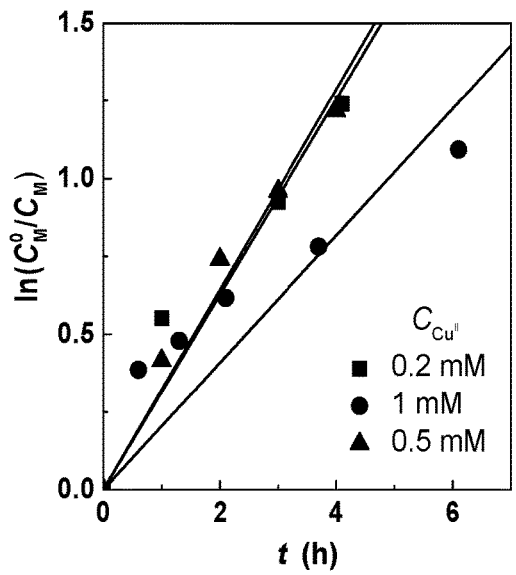
Figure 13D:
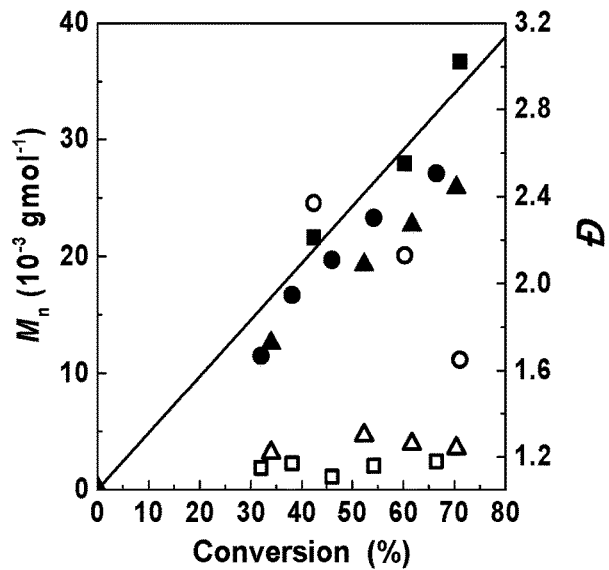
Figure 14A:
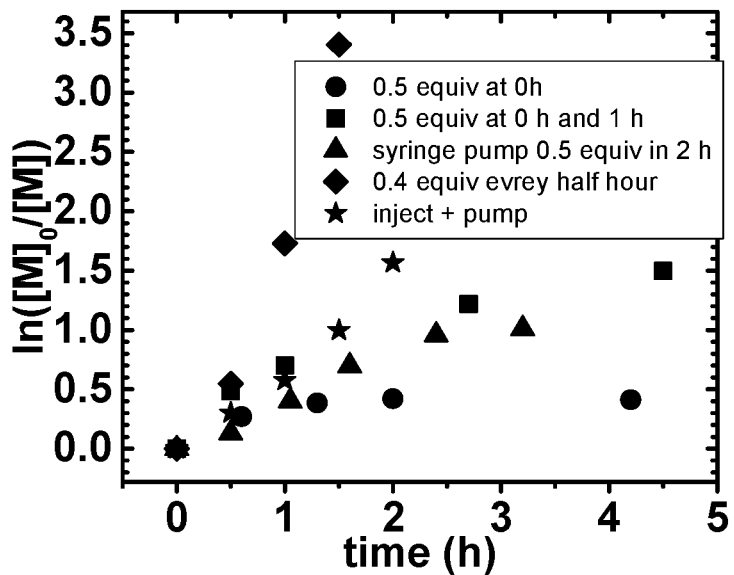
Figure 14B:
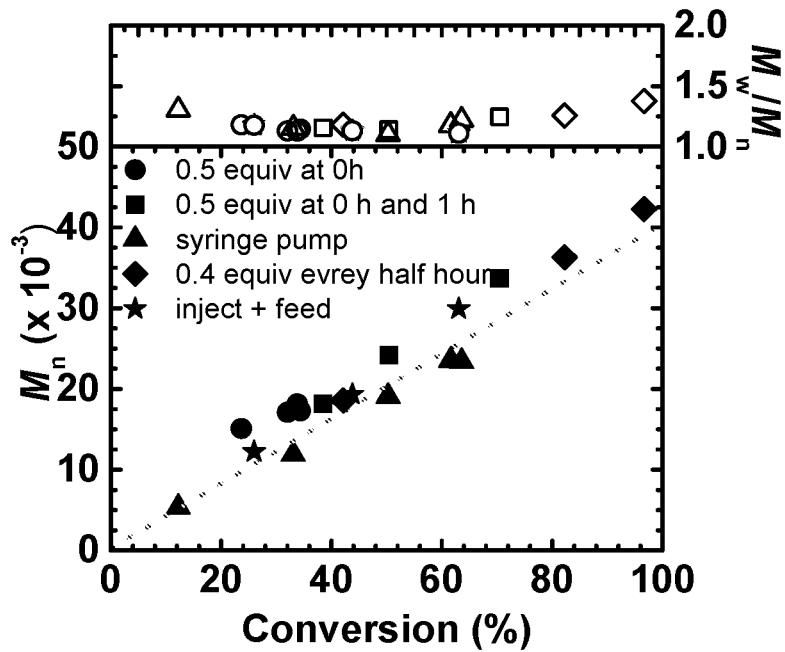
Figure 14C:
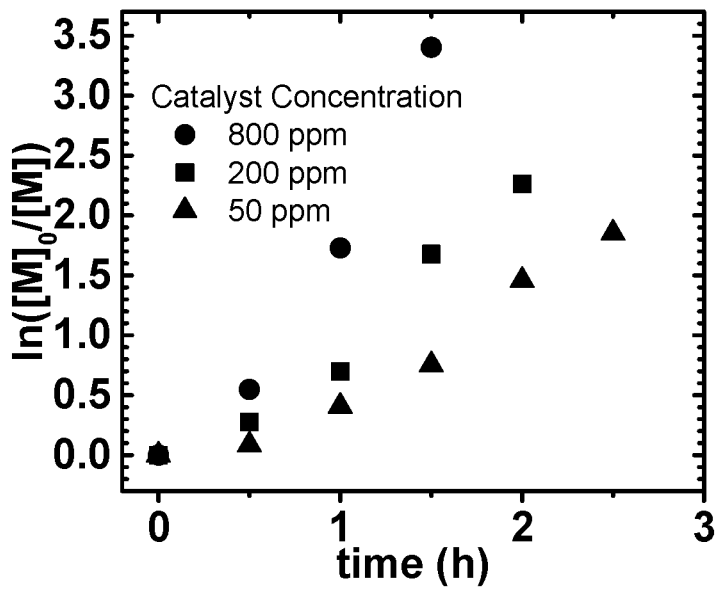
Figure 14D:
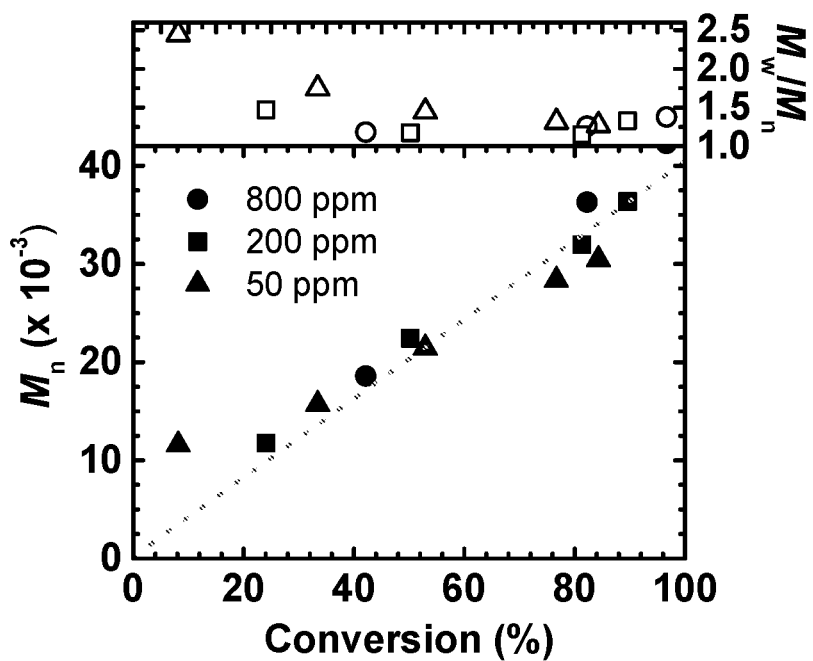
Figure 14E:
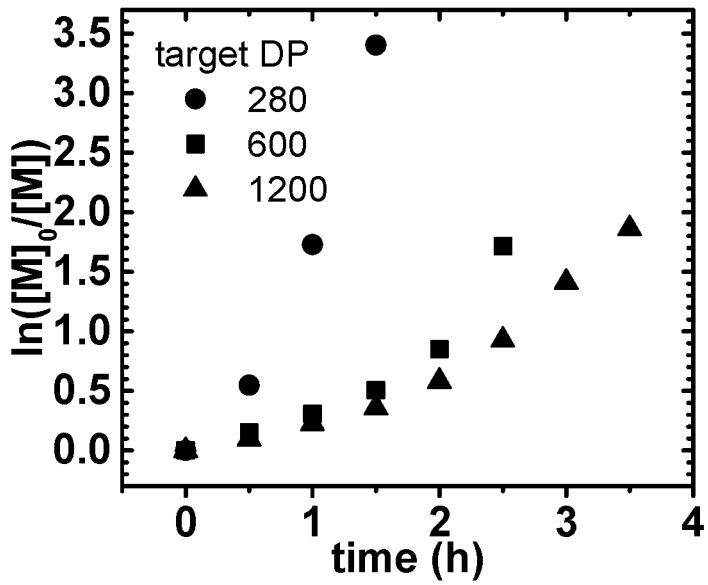
Figure 14F:
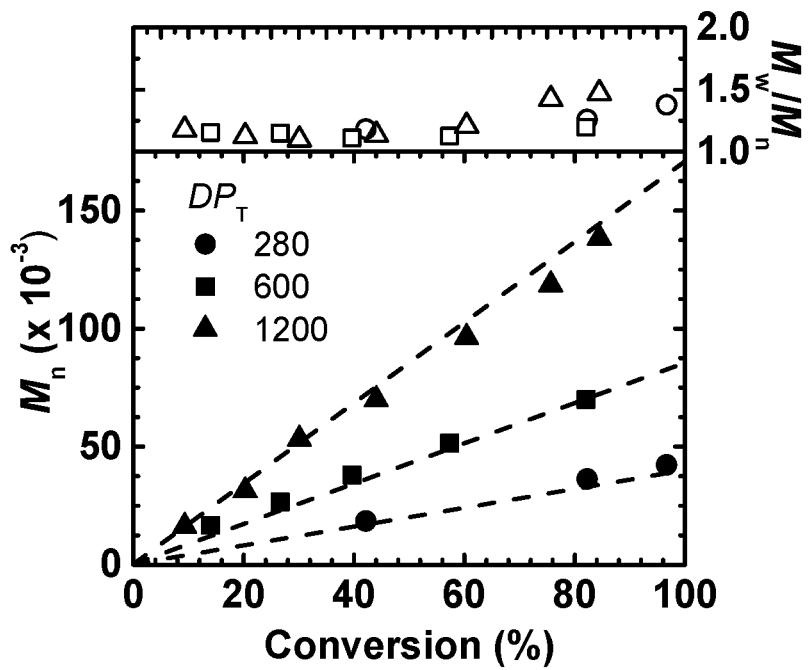
Figure 15A:
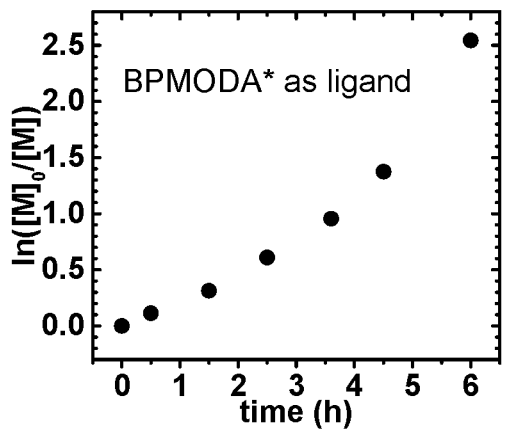
Figure 15B:
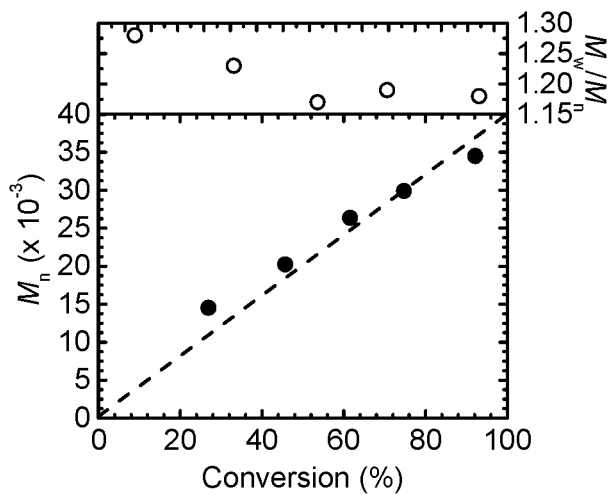
Figure 15C:
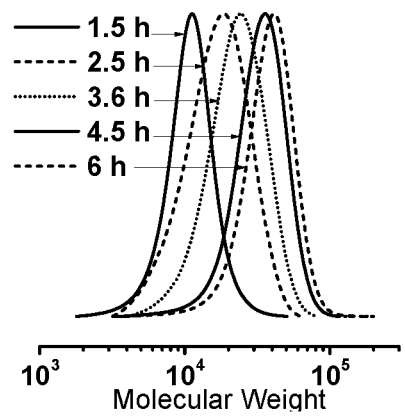
Figures 16A, 16B:
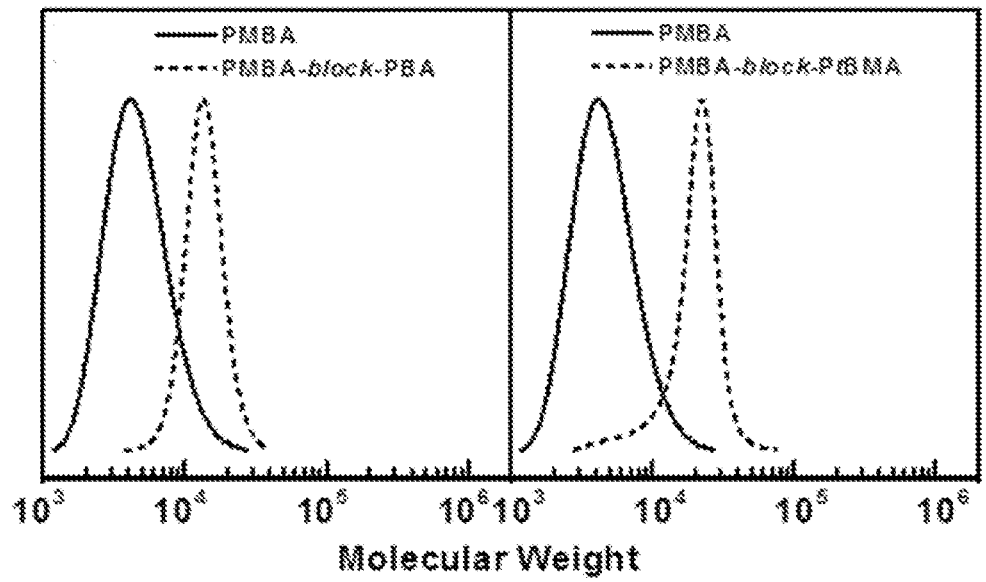
Figures 16C, 16D:
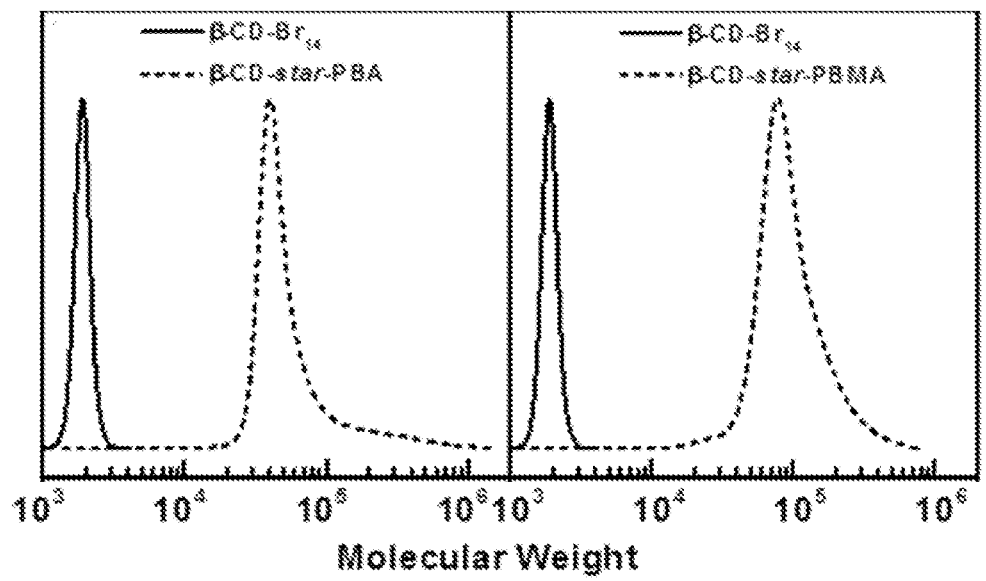
Figures 16E, 16F:
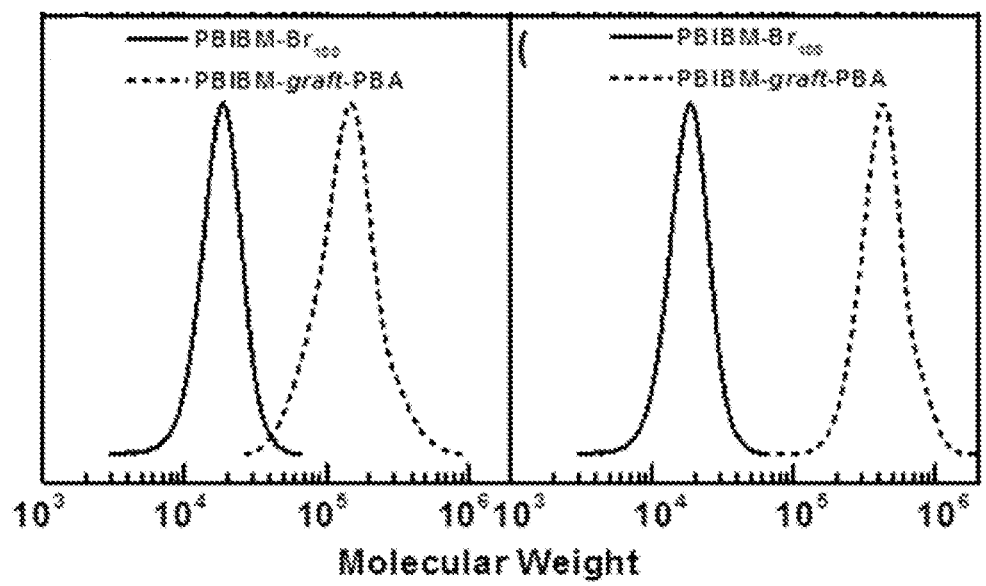
Figure 17A:
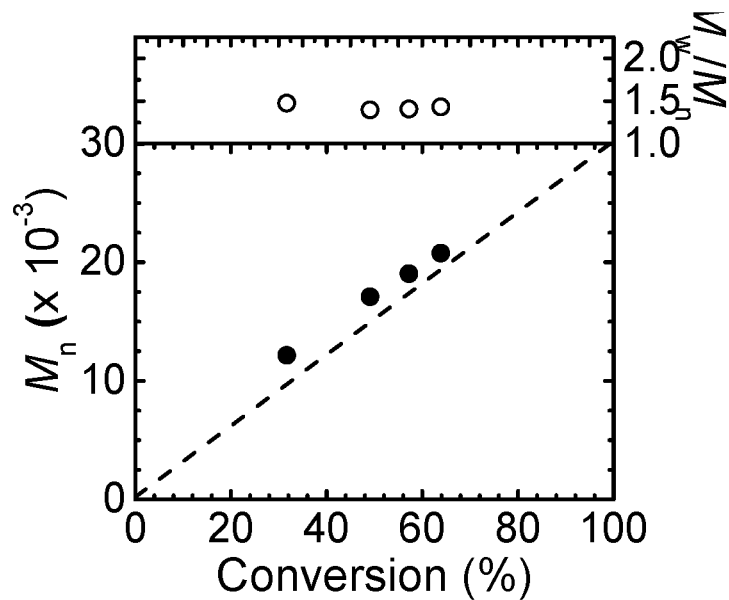
Figure 17B:
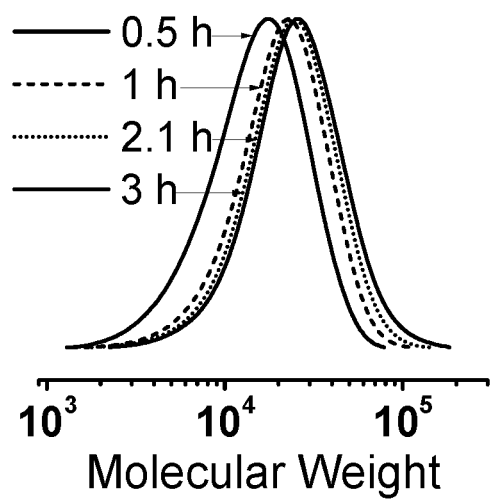
Figure 17C:
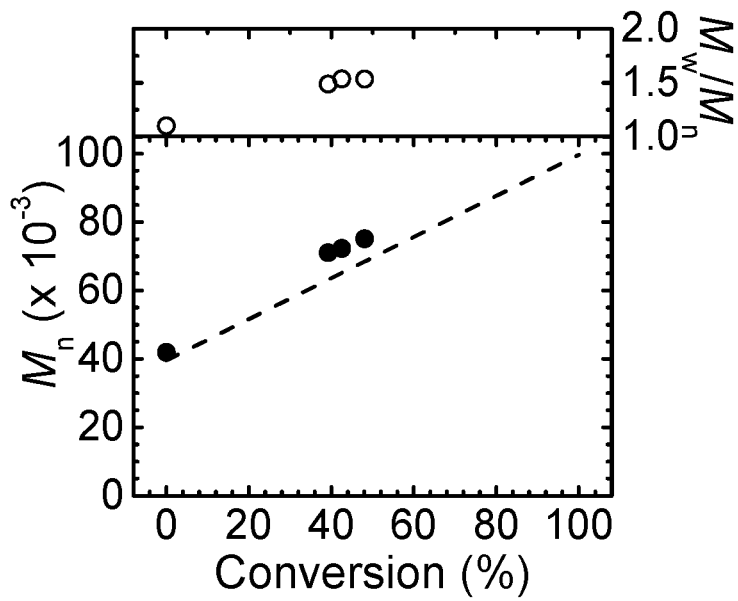
Figure 17D:
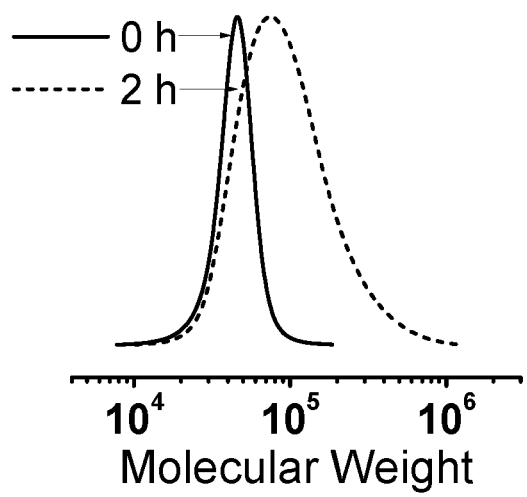
Figure 17E:
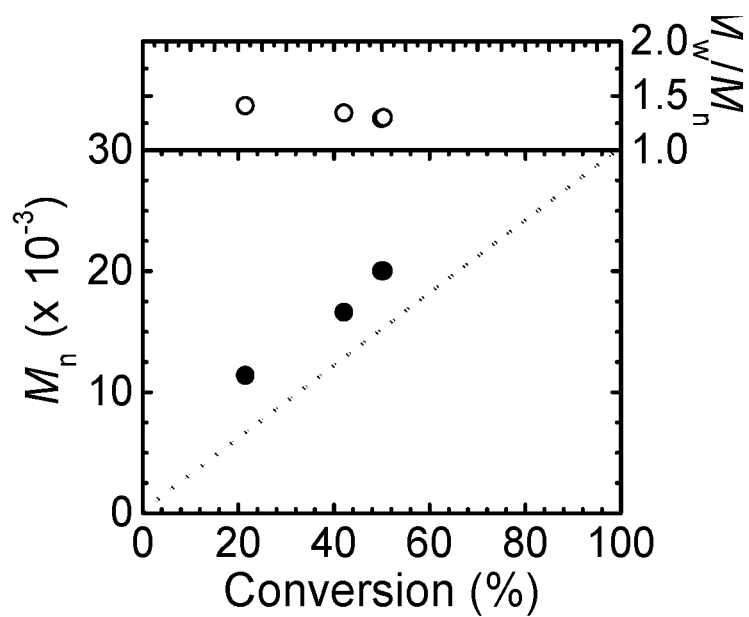
Figure 17F:
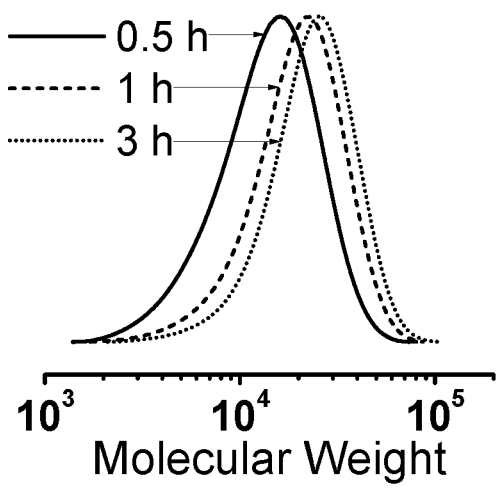
Figure 17G:
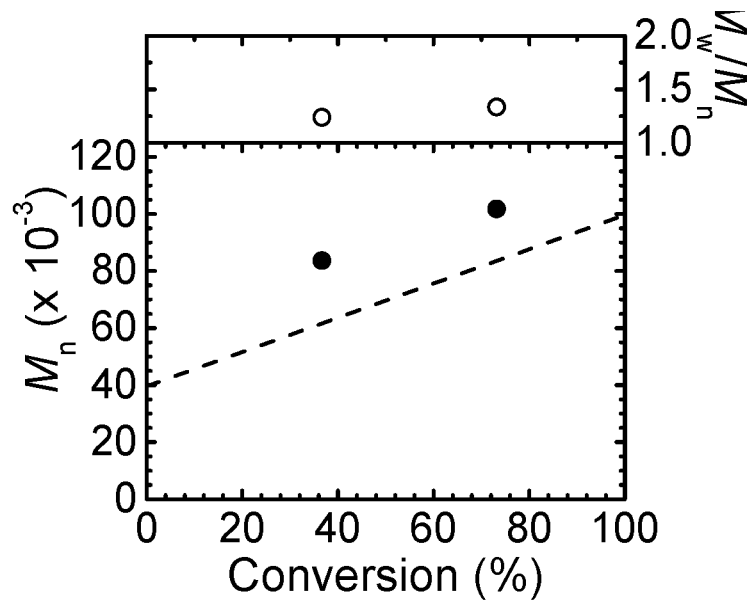
Figure 17H:
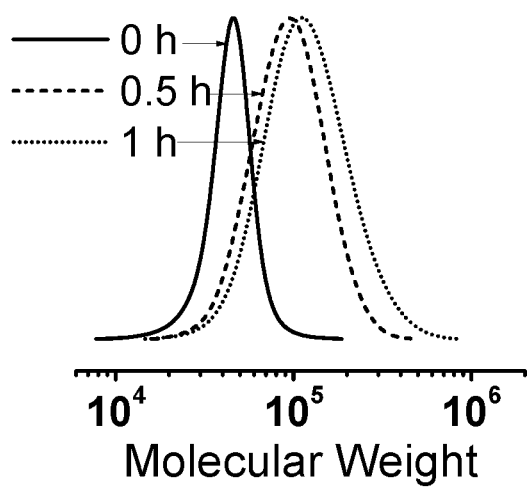
Figure 18A:
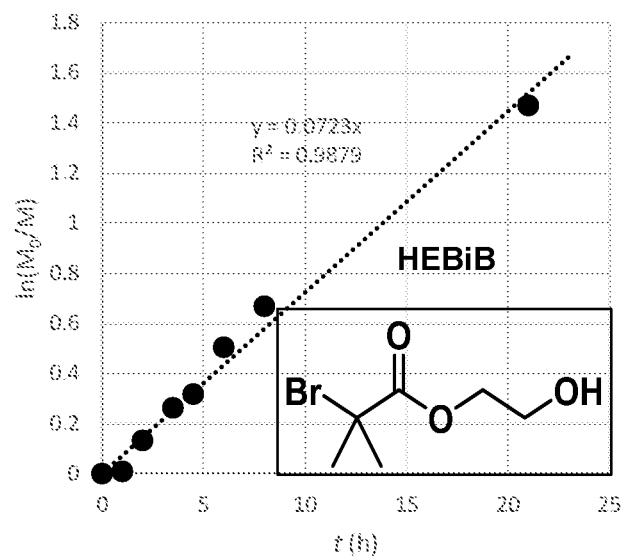
Figure 18B:
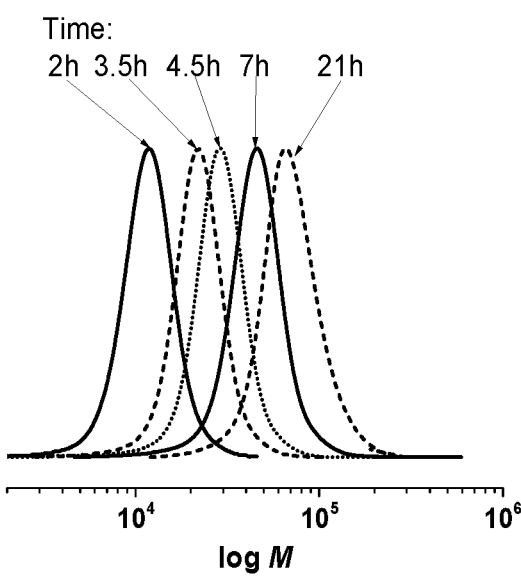
Figure 19A:
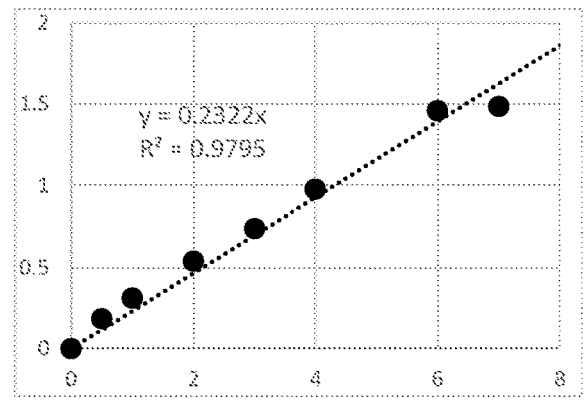
Figure 19B:
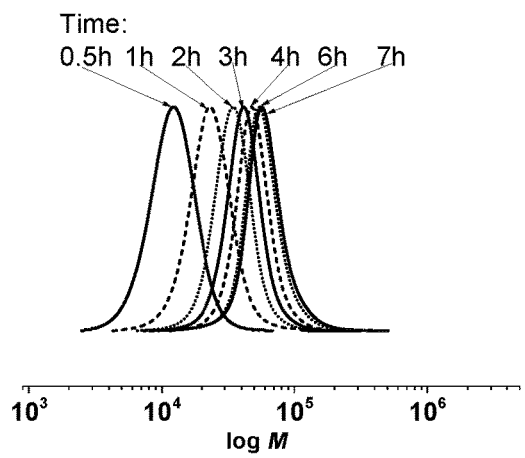
Figure 19C:
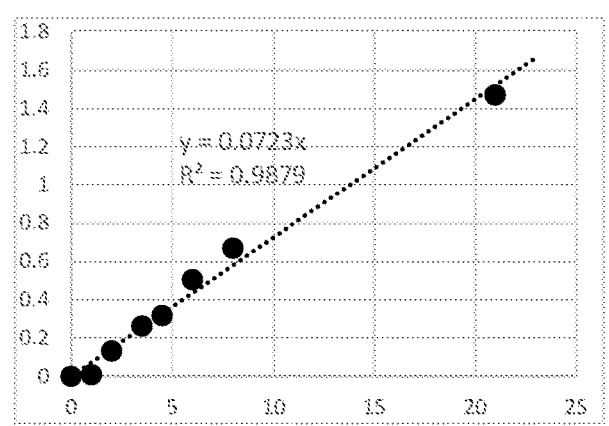
Figure 19D:
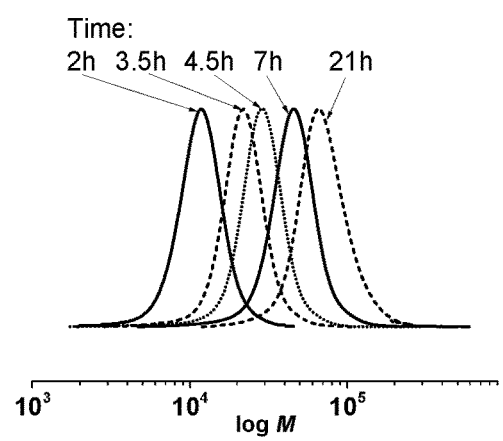
Figure 20:
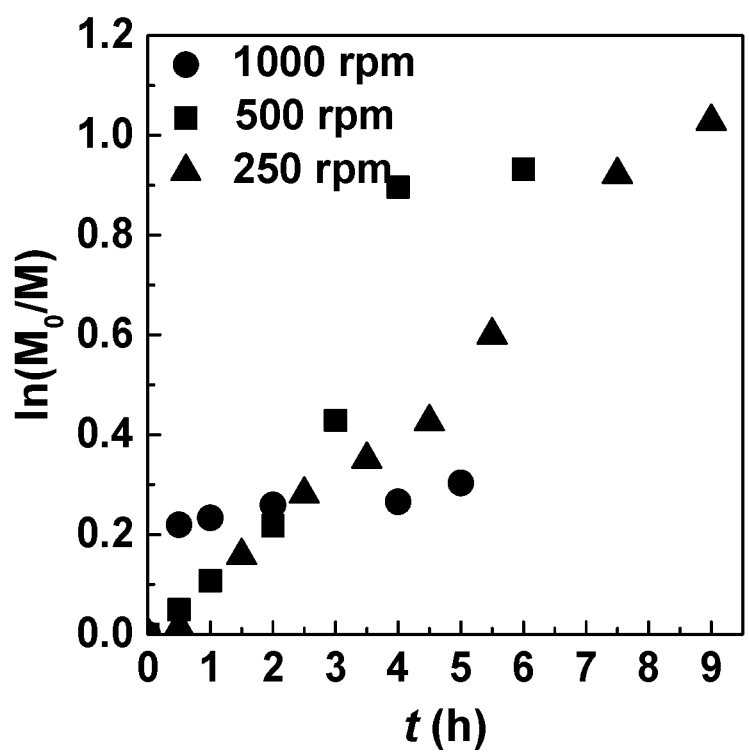
Figure 21A:
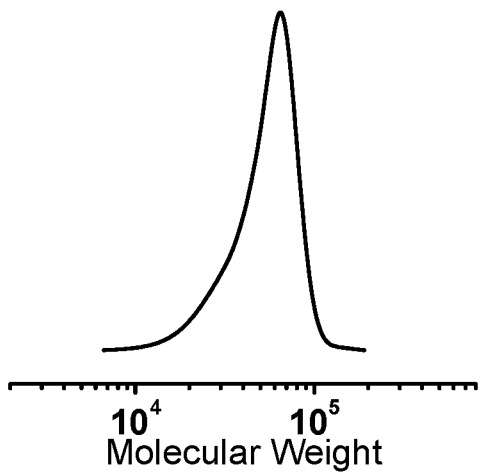
Figure 21B:
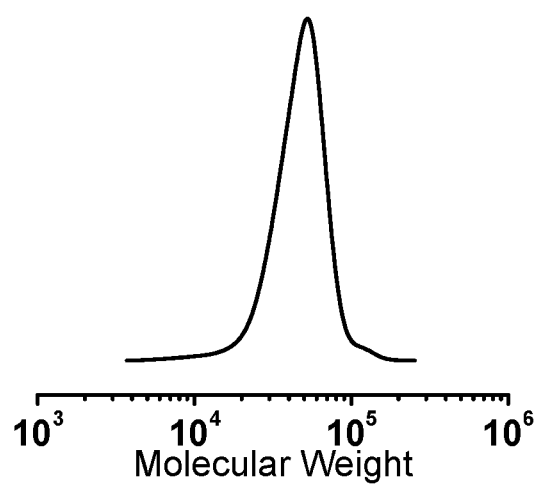
Figure 22A:
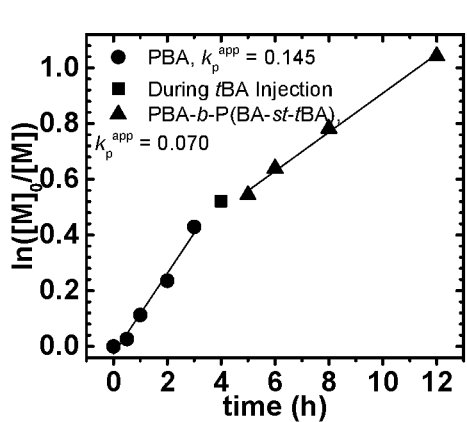
Figure 22B:
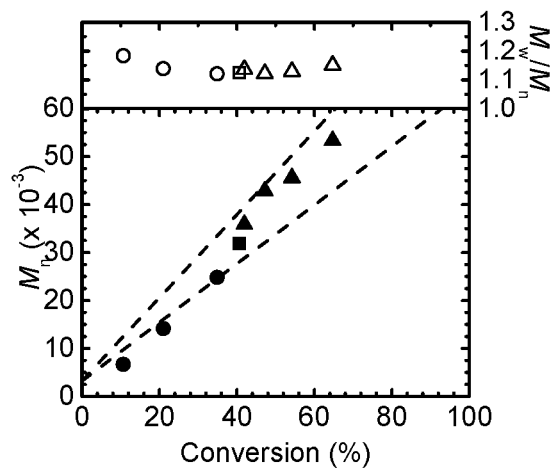
Figure 22C:
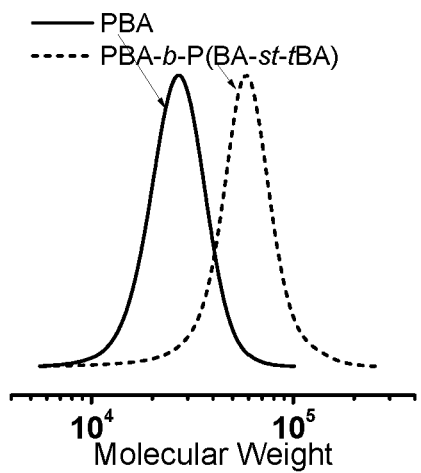
Figure 23A:
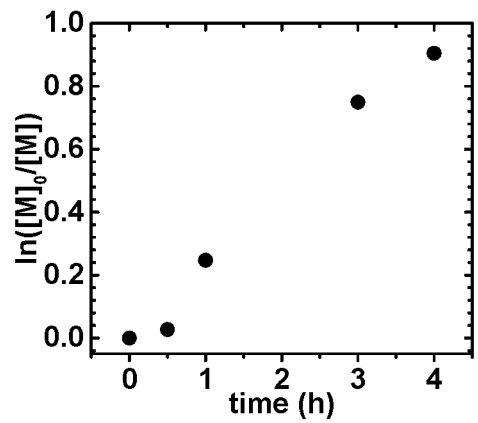
Figure 23B:
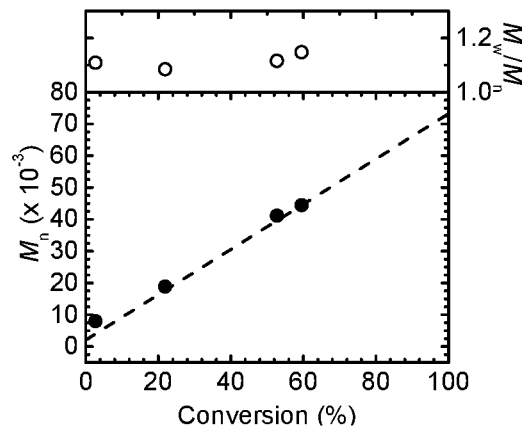
Figure 23C:
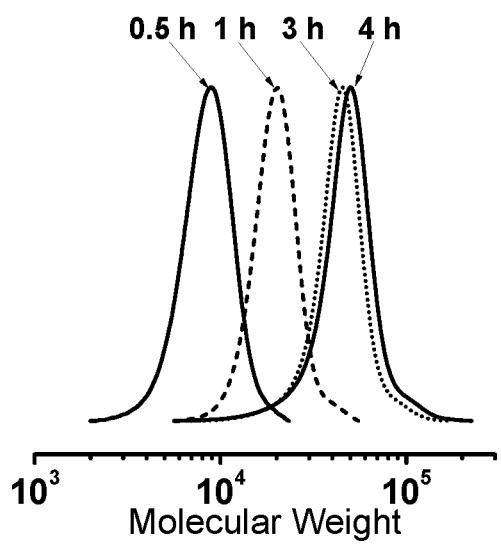
Figure 24A:
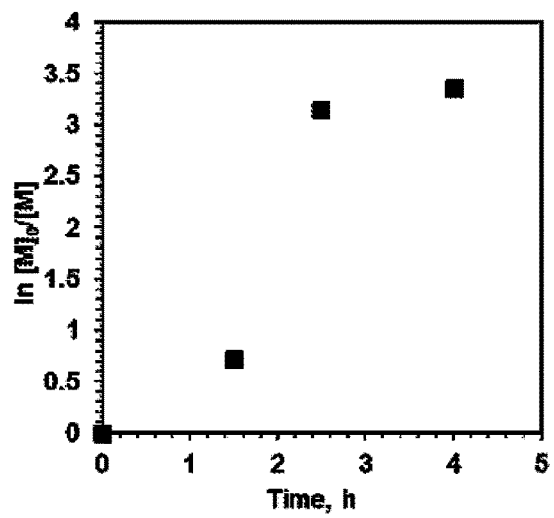
Figure 24B:
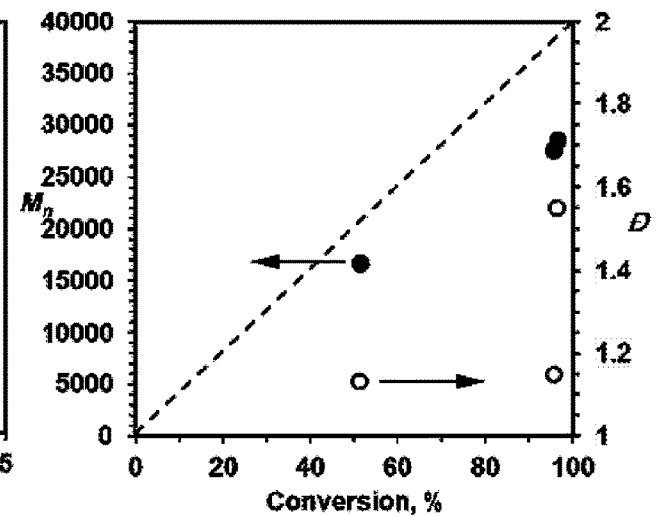
Figure 24C:
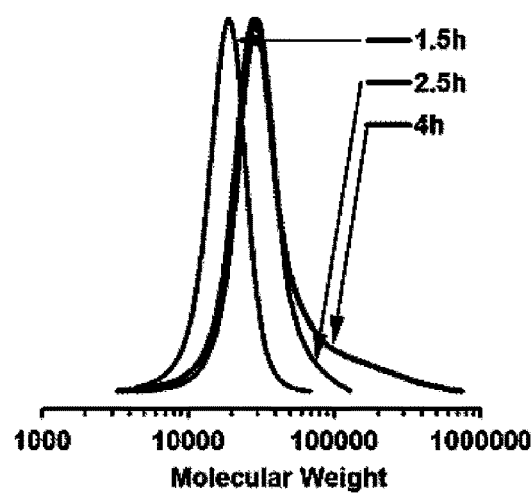
Figure 24D:
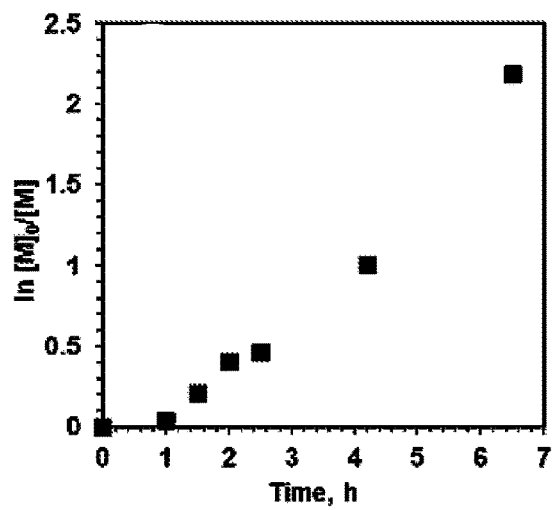
Figure 24E:
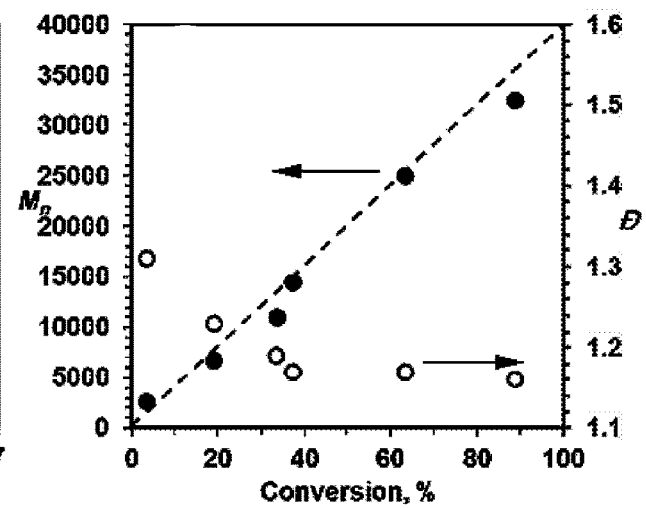
Figure 24F:
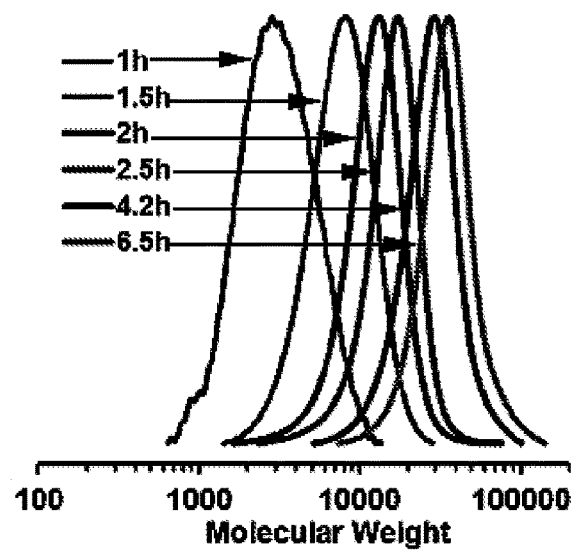
Figure 24G:
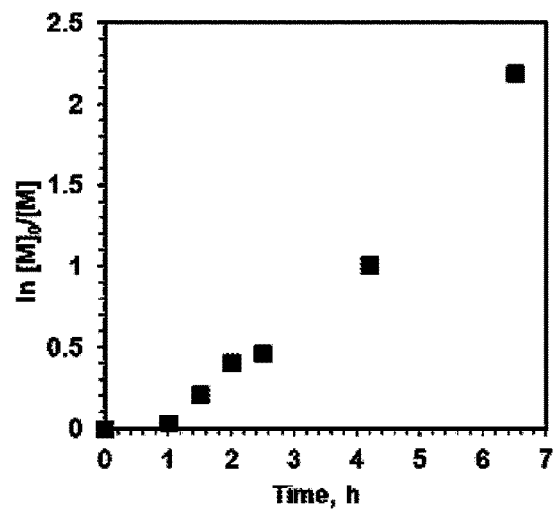
Figure 24H:
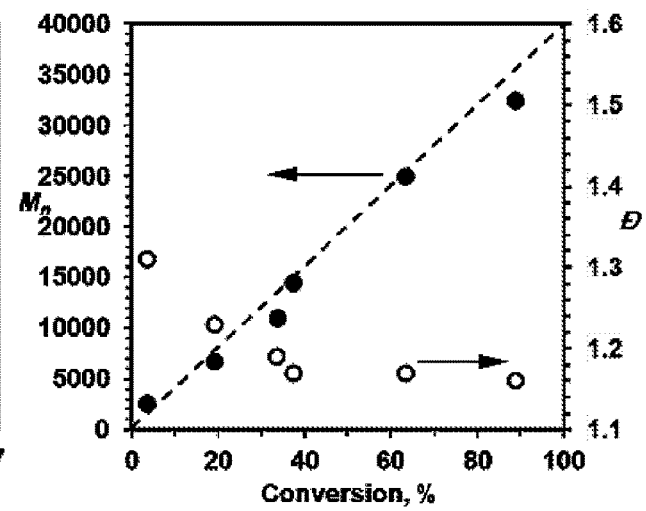
Figure 24I:
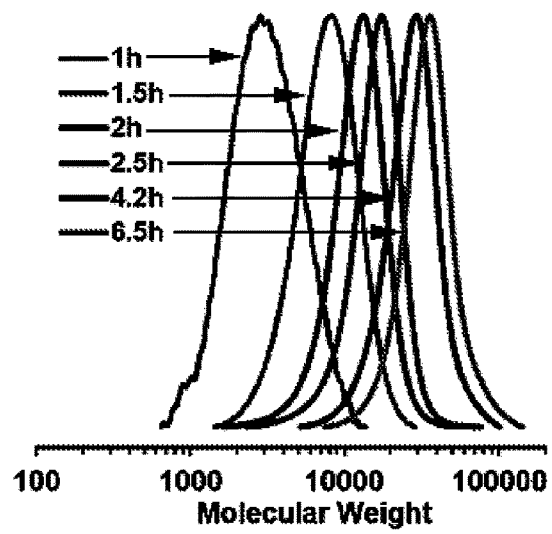
Figure 24J:
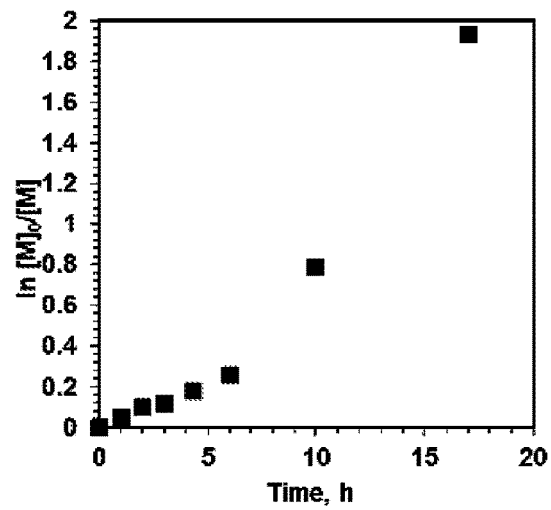
Figure 24K:
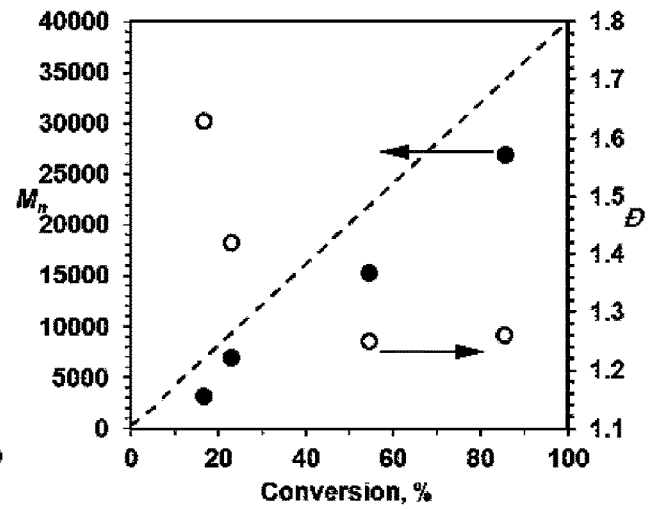
Figure 24L:
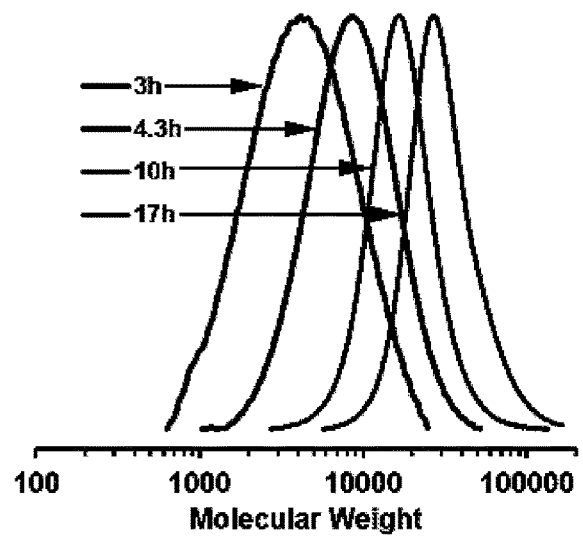
Figure 25A:
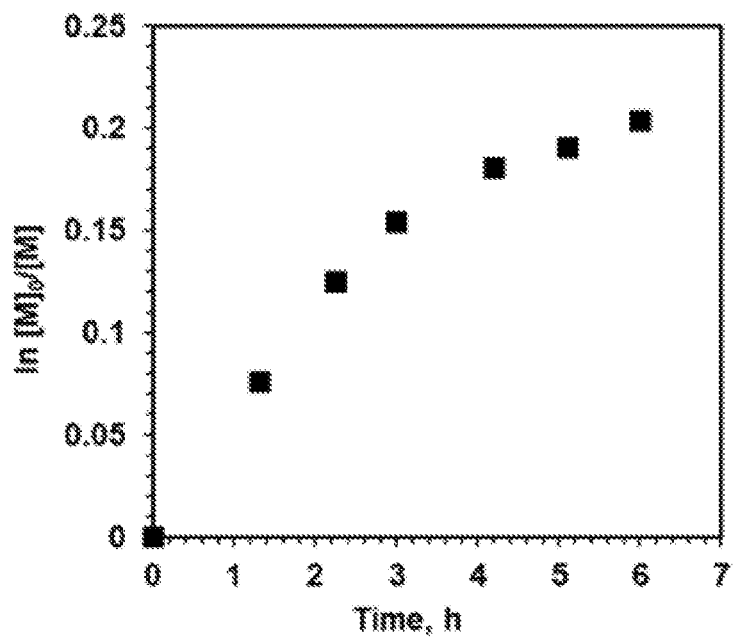
Figure 25B:
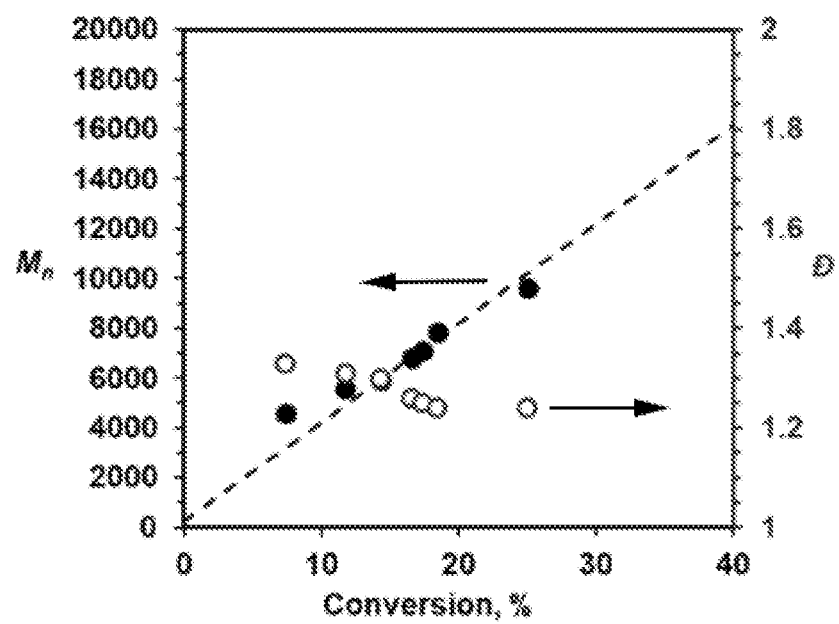
Figure 25C:
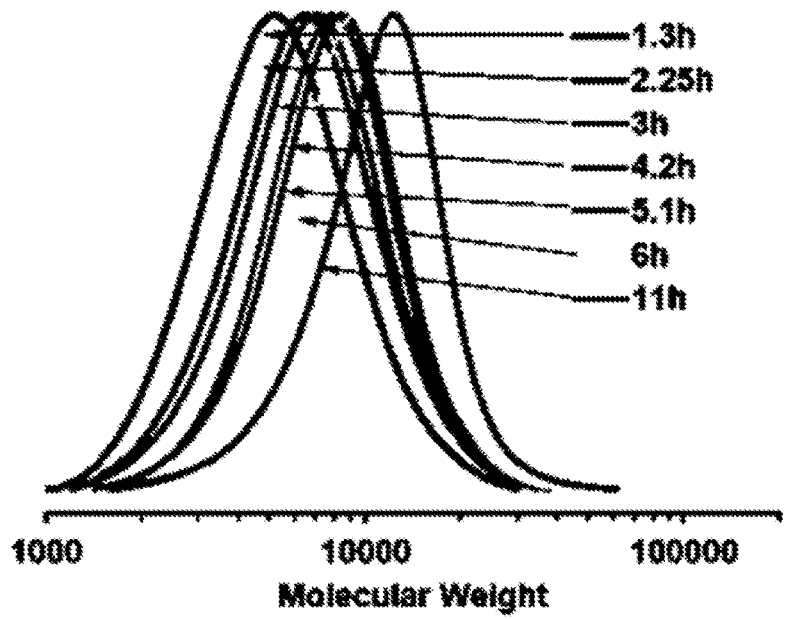
Figure 25D:
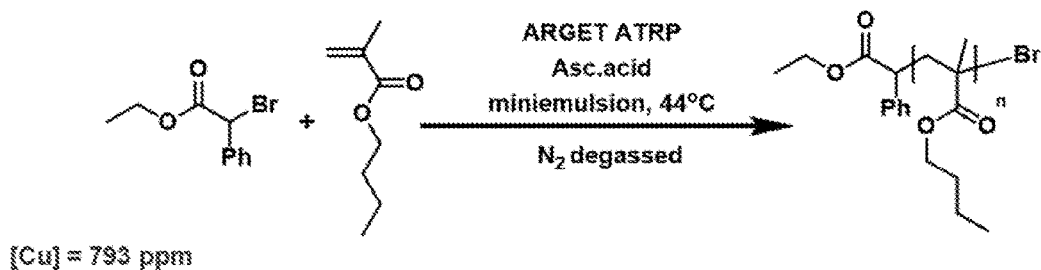

[EBiB]/[Cu$^{II}$Br$_2$/2L]=280/1/x, [n-BuA]=1.4 M, T=65° C., [NaBr]=0.1 M, [SDS]=38 mM, [HD]=85 mM, E$_{app}$=E$_{pc}$−35 mV, x=1.67, 1.00, and 0.43 corresponding to 1201, 717, and 306 ppm catalyst, respectively, Table 3, entries 5-7;

FIG. 7A shows the results of cyclic voltammetry of Cu$^{II}$Br$_2$/2TPMA with initiator (the circles correspond to the selected E$_{app}$ during eATRP) in a miniemulsion eATRP of n-BuA as a function of E$_{app}$;

FIG. 7B is a first-order kinetic plots of a miniemulsion eATRP of n-BuA as a function of different selected E$_{app}$;

FIG. 7C is a MW and Đ evolution vs. monomer conversion for different E$_{app}$ values in a miniemulsion eATRP of n-BuA. For FIGS. 7A-C, the reaction conditions are as follows: [n-BuA]/[EBiB]/[Cu$^{II}$Br$_2$/2TPMA]=280/1/0.20, [n-BuA]=1.4 M, [Cu$^{II}$Br$_2$/2TPMA]=1.00 mM, T=65° C., [NaBr]=0.1 M, [SDS]=38 mM, [HD]=85 mM, E$_{app}$=E$_{pc}$−90 mV, E$_{app}$=E$_p$−35 mV, E$_{app}$=E$_{pc}$−15 mV, Table 3, entries 5, 8 and 9;

FIG. 8A is a kinetic plot of a miniemulsion eATRP of n-BuA with different target DP (100, 280, and 500);

FIG. 8B is a MW and Đ vs. monomer conversion of a miniemulsion eATRP of n-BuA with different target DP (100, 280, and 500); For FIGS. 8A-B the reaction conditions are as follows: [n-BuA]=1.4 M, [Cu$^{II}$Br$_2$/2TPMA]=1.00 mM, T=65° C., [NaBr]=0.1 M, [SDS]=38 mM, [HD]=85 mM, E$_{app}$=E$_{pc}$−35 mV, Table 3, entries 5, 10 and 11;

FIG. 9A is a graph of a current profile versus time of a miniemulsion seATRP of n-BuA under potentiostatic and galvanostatic conditions;

FIG. 9B is a graph of a MW and Đ vs. monomer conversion of a miniemulsion seATRP of n-BuA under potentiostatic and galvanostatic conditions. Reaction conditions: [n-BuA]/[EBiB]/[Cu$^{II}$Br$_2$/2TPMA]=280/1/0.2, [n-BuA]=1.4 M, [Cu$^{II}$Br$_2$/2L]=1.00 mM, T=65° C., [NaBr]=0.1 M, [SDS]=38 mM, [HD]=85 mM, E$_{app}$=E$_{pc}$−35 mV. Table 3 entries, 12 and 13;

FIG. 10A is a graph of MW and Đ vs. monomer conversion during a miniemulsion in situ chain extension by seATRP with a single catalyst Cu$^{II}$Br$_2$/2TPMA;

FIG. 10B displays the results of gel permeation chromatography (GPC) of block copolymer formed during the in situ chain extension by seATRP with a single catalyst Cu$^{II}$Br$_2$/2TPMA. For FIGS. 10A-B, the reaction conditions are as follows: [n-BuA]/[PBA-Br]/[Cu$^{II}$Br$_2$/2TPMA]=80/1/0.06, t-butyl acrylate [tBA]=0.7 M, [Cu$^{II}$Br$_2$/2L]=1.00 mM, T=65° C., [NaBr]=0.1 M, [SDS]=38 mM, [HD]=85 mM, E$_{app}$=E$_{pc}$−35 mV, Table 3, entry 15;

FIG. 11A is a graph of a MW and Đ vs. monomer conversion of a miniemulsion chain extension by seATRP with a single catalyst Cu$^{II}$Br$_2$/2TPMA;

FIG. 11B shows the results of GPC of block copolymers formed during a miniemulsion chain extension by seATRP with a single catalyst Cu$^{II}$Br$_2$/2TPMA. Reaction conditions. [n-BuA]/[PBA-Br]/[Cu$^{II}$Br$_2$/2TPMA]=80/1/0.06, [tBA]=1.1 M, [Cu$^{II}$Br$_2$/2L]=1.00 mM, T=65° C., [NaBr]=0.1 M, [SDS]=38 mM, [HD]=85 mM, E$_{app}$=E$_{pc}$−35 mV. Table 3, entry 16;

FIG. 12 shows the results of CVs of 10$^{-3}$ M [Br-Cu$^{II}$TPMA]$^+$, and [BrCu$^{II}$Me$_6$TREN]$^+$ in miniemulsion, WE=Pt, v=0.1 Vs$^{-1}$, T=65° C. For FIG. 12 the reaction conditions are as follows: C$_{n-BuA}$/C$_{NaBr}$/C$_{[Cu^{II}Br_2]}$/C$_L$=280/20/0.2/0.4, n-BuA 19% (v/v) in H$_2$O, C$_{surf}$=6.2 wt % rel to in-BuA, C$_{HD}$=10.8 wt % rel to n-BuA, V$_{tot}$=20 mL;

FIG. 13A is a kinetic plot of an Activator Regenerator by Electron Transfer (ARGET) ATRP of n-BuA in miniemulsion, T=65° C. in the presence of different concentrations of sodium dodecyl sulfate (SDS);

FIG. 13B shows the evolution of molecular weights and polydispersity of an ARGET ATRP of n-BuA in miniemulsion, T=65° C. in the presence of different concentrations of sodium dodecyl sulfate (SDS);

FIG. 13C is a kinetic plot of an ARGET ATRP of n-BuA in miniemulsion, T=65° C. in the presence of different concentrations of added catalyst;

FIG. 13D shows the evolution of molecular weights and polydispersity with conversion for different concentrations of added Cu$^{II}$ of an ARGET ATRP of n-BuA in miniemulsion, T=65° C.;

FIG. 14A is a graph illustrating the rates of polymerization of butyl methacrylate (BMA) in an ARGET ATRP with different feeding strategies of ascorbic acid;

FIG. 14B is a schematic showing the evolution of the dispersity index(Weight Average Molecular Weight/Number Average Molecular Weight (M$_w$/M$_n$)) and M$_n$ for each procedure;

FIG. 14C is a graph illustrating how the rate of polymerization changes with catalyst concentration;

FIG. 14D is a graph illustrating the evolution of M$_w$/M$_n$ and M$_n$ for each procedure;

FIG. 14E is a graph illustrating how the rate of polymerization changes with a targeted degree of polymerization (DP);

FIG. 14F is a graph illustrating the evolution of M$_w$/M$_n$ and M$_n$ for each procedure;

FIG. 15A is a graph illustrating the rate of polymerization from a miniemulsion ARGET ATRP using hydrophobic catalyst;

FIG. 15B is a graph illustrating the kinetics and M$_w$/M$_n$ from a miniemulsion ARGET ATRP using hydrophobic catalyst;

FIG. 15C is a graph illustrating the evolution of the GPC curves as the polymerization progresses from a miniemulsion ARGET ATRP using hydrophobic catalyst;

FIG. 16A shows the GPC traces of polymers formed during the chain extensions of PBMA-MI with tBMA FIG. 16B shows the GPC traces of polymers formed during the chain extension of PBMA-MI with t-BuA;

FIG. 16C shows the GPC traces of PBA star polymers formed using a β-CD-Br$_{14}$ initiator;

FIG. 16D shows the GPC traces of PBMA star polymers formed using a β-CD-Br$_{14}$ initiator;

FIG. 16E shows the GPC curves of a brush macromolecule with PBA grafted chains with a DP of 25;

FIG. 16F shows the GPC curves of a brush macromolecule with PBA grafted chains with a DP of 100;

FIG. 17A is a graph illustrating kinetics for chain extension miniemulsion ATRP of MMA from MPB initiator;

FIG. 17B shows the GPC curves for polymers formed at different time intervals during chain extension miniemulsion ATRP of MMA from MPB initiator;

FIG. 17C is a graph illustrating kinetics for chain extension miniemulsion ATRP of MMA from Br-PBA-Br macroinitiator using NaCl as halogen exchange agent;

FIG. 17D shows the GPC curves for polymers formed at different time intervals during the chain extension miniemulsion ATRP of MMA from Br-PBA-Br macroinitiator using NaCl as halogen exchange agent;

FIG. 17E is a graph illustrating kinetics for chain extension miniemulsion ATRP of MMA from MPB initiator;

FIG. 17F shows the GPC curves for polymers formed during the chain extension miniemulsion ATRP of MMA from MPB initiator;

FIG. 17G is a graph illustrating kinetics of a chain extension miniemulsion ATRP of MMA from Br-PBA-Br macroinitiator using TEACl as halogen exchange agent;

FIG. 17H shows the GPC curves for polymers formed at different time intervals during the chain extension miniemulsion ATRP of MMA from Br-PBA-Br macroinitiator using TEACl as halogen exchange agent;

FIG. 18A is a graph illustrating the kinetics of formation of PBA during an emulsion ARGET ATRP with HEBiB as hydrophilic initiator;

FIG. 18B shows the GCP traces of PBA formed at different time intervals during an emulsion ARGET ATRP with HEBiB as hydrophilic initiator;

FIG. 19A is a graph illustrating kinetics of formation of PBA in an emulsion ARGET ATRP;

FIG. 19B shows the GCP traces of PBA formed at different time intervals during an emulsion ARGET ATRP using conditions listed in Entry 2 of Table 10;

FIG. 19C is a graph illustrating kinetics of PBA formation during an emulsion ARGET ATRP using conditions provided in Entry 5 of Table 10;

FIG. 19D shows the GCP traces of PBA formed during an emulsion ARGET ATRP using conditions provided in Entry 5 of Table 10;

FIG. 20 illustrates the effect of stirring rate on the kinetics on an emulsion ARGET ATRP of n-butylacrylate carried out with HEBiB as water soluble ATRP initiator, with $C_{SDS}$=4.6 wt %, at T=65° C.;

FIG. 21A shows the GPC curve of $PEO_{2k}$-b-PBMA formed by emulsion ARGET ATRP;

FIG. 21B shows the GPC curve of $PEO_{2k}$-b-PBMA formed by emulsion ICAR ATRP;

FIG. 22A is a graph illustrating of kinetics of one pot chain extended segmented copolymer;

FIG. 22B is a graph illustrating conversion of monomers of chain extended segmented copolymer;

FIG. 22C shows the GPC curves of the macroinitiator and chain extended segmented copolymer;

FIG. 23A is a graph illustrating kinetics of polymer prepared under oxygen scavenging emulsion ATRP conditions;

FIG. 23B is a graph illustrating conversion of monomers of polymer prepared under oxygen scavenging emulsion ATRP conditions;

FIG. 23C shows the GPC curves of polymer prepared under oxygen scavenging emulsion ATRP conditions with increasing time;

FIG. 24A is a graph illustrating kinetics rate of polymer prepared in run LF-4-3;

FIG. 24B is a graph illustrating conversion of polymer prepared in run LF-4-3;

FIG. 24C shows the GPC curves of polymer prepared in run LF-4-3;

FIG. 24D is a graph illustrating kinetics, conversion and GPC curves of polymer prepared in run LF-4-9;

FIG. 24E is a graph illustrating conversion of polymer prepared in run LF-4-9;

FIG. 24F shows the GPC curves of polymer prepared in run LF-4-9;

FIG. 24G is a graph illustrating kinetics of polymer prepared in run LF-4-11;

FIG. 24H is a graph illustrating conversion of polymer prepared in run LF-4-11;

FIG. 24I shows the GPC curves of polymer prepared in run LF-4-11;

FIG. 24J is a graph illustrating kinetics of polymer prepared in run LF-4-10;

FIG. 24K is a graph illustrating conversion of polymer prepared in run LF-4-10;

FIG. 24L shows the GPC curves of polymer prepared in run LF-4-10;

FIG. 25A is a graph illustrating kinetics of polymer prepared under ARGET ATRP conditions in run LF-4-12;

FIG. 25B is a graph illustrating conversion of polymer prepared under ARGET ATRP conditions in run LF-4-12;

FIG. 25C shows the GPC curves of polymer prepared under ARGET ATRP conditions in run LF-4-12; and FIG. 25D illustrates the conditions for a control experiment LF-4-12.

Figure 26:
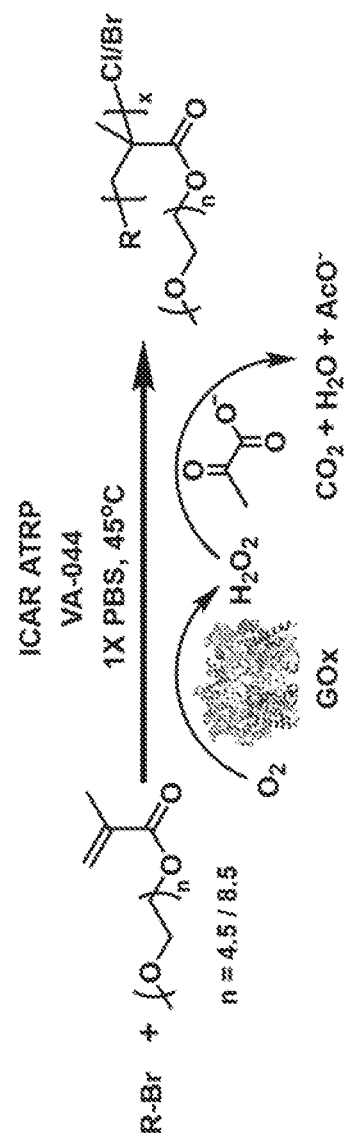

FIG. 26 illustrates oxygen scavenging by application of glucose, GOx and pyruvate.

The exemplifications set out herein illustrate certain examples, in one form, and such exemplifications are not to be construed as limiting the scope of the examples in any manner.

DETAILED DESCRIPTION

Certain exemplary aspects of the present disclosure will now be described to provide an overall understanding of the principles of the structure, function, manufacture, and use of the systems and methods disclosed herein. One or more examples of these aspects are illustrated in the accompanying drawings. Those of ordinary skill in the art will understand that the systems and methods specifically described herein and illustrated in the accompanying drawings are non-limiting exemplary aspects and that the scope of the various examples of the present invention is defined solely by the claims. The features illustrated or described in connection with one exemplary aspect may be combined with the features of other aspects. Such modifications and variations are intended to be included within the scope of the present invention.

Reference throughout the specification to "various aspects," "some aspects," "one aspect," or "an aspect", or the like, means that a particular feature, structure, or characteristic described in connection with the example is included in at least one aspect. Thus, appearances of the phrases "in various aspects," "in some aspects," "in one aspect", or "in an aspect", or the like, in places throughout the specification are not necessarily all referring to the same aspect. Furthermore, the particular features, structures, or characteristics may be combined in any suitable manner in one or more aspects. Thus, the particular features, structures, or characteristics illustrated or described in connection with one aspect may be combined, in whole or in part, with the features structures, or characteristics of one or more other aspects without limitation. Such modifications and variations are intended to be included within the scope of the present aspects.

In this specification, unless otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification such that amending to expressly recite any such sub-ranges would comply with the requirements of 35 U.S.C. § 112 and 35 U.S.C. § 132(a).

An emulsion polymerization can be of great industrial interest and has been utilized in batch, semi-batch and continuous processes since the 1920's for the preparation of rubbers, latex paints and plastics in large volume. [Odian, G, *Principles of Polymerization* (Chapter 4), Wiley, New York]. Oil-in-water miniemulsion polymerizations, can be eco-friendly systems, since they are less toxic and less expensive than most organic solvents. [*Prog. Polym. Sci;* 2008, 33, 365-398; *Central Eu. J. Chem.* 2009, 7, 657.]. A typical miniemulsion polymerization system uses water as the continuous phase with dispersed nano-sized hydrophobic droplets prepared by use of a high shear device prior to the polymerization. Thereby forming surfactant stabilized dispersed droplets that can act as mini-bulk polymerization systems. Miniemulsion polymerizations are industrially important as they can reduce the amount of volatile organic compounds, such as solvents in the polymerization medium, and can have the added benefits of better heat transfer and lower reaction viscosities.

Prior to the present disclosure conducting an Atom Transfer Radical Polymerization (ATRP) in dispersed organic media typically required carefully selected conditions. For example, specific super-hydrophobic catalysts may have to be synthesized, [*ACS Macro Letters* 2013, 2, 822-825.]. But while such hydrophobic catalysts are located in the dispersed monomer droplets and activate an ATRP, they may be difficult to separate from the produced polymer. Additionally, non-ionic surfactants can be required, because ATRP catalysts were believed to be poisoned by the presence of anionic surfactants, such as the efficient and inexpensive sodium dodecyl sulfonate, (SDS).

It was previously believed that ATRP could not be conducted in the presence of anionic surfactants. For example, see [Matyjaszewski, K.; et al. *Macromol. Symp.* 2000, 155, 15-29.]. Although, cationic surfactants had been used, for example, see [*J. Polym. Sci., Part A: Polym. Chem.* 2006, 44 1628; *Macromol. Rapid Commun.* 2007, 28 2354.] This incompatibility may have originated from the anionic surfactant displacing the halide ligand from the deactivator. A later paper indicated that a miniemulsion ATRP can be successfully conducted in the presence of an anionic surfactant, such as sodium dodecyl sulfate (SDS) by judicious addition of a halide salt, such as sodium bromide to minimize the loss/replacement of the transferable halogen from the deactivator by interaction with the surfactant by the addition of an additional source of halide ions thereby providing stabilization of the deactivator, for example, see [*Macromol.* 2014, 47, 6230-6237]. This stabilization of the deactivator can enable an ATRP to proceed in aqueous dispersed systems using commonly available and inexpensive anionic surfactants such as SDS. However, the procedure employed a "high" concentration of catalyst, e.g., more then 1000 ppm as moles of catalyst to moles of monomer. The catalyst was a low activity hydrophobic catalyst (e.g., soluble in the monomer), which would result in a high concentration of residual catalyst, e.g., copper, in the final product comprising the dispersed latex droplets. Catalyst concentration in the polymerization mixture is expressed as "ppm" (moles of catalyst to moles of monomer) throughout the application.

A wide range of commercially available monomers, including various styrenes, (meth)acrylates, (meth)acrylamides, N-vinylpyrrolidone, acrylonitrile, and vinyl acetate as well as vinyl chloride can be polymerized using ATRP.

ATRP can be conducted in aqueous dispersions such as, for example, miniemulsion and ab initio emulsion systems. [*J. Am. Chem. Soc.*, 2006, 128, 10521]. However, typical processes employed catalyst complexes preferentially located in the dispersed phase. A thermoresponsive ligand for the ATRP of butyl methacrylate (BMA) in miniemulsion may be used. [*Polymer* 2016, 106, 313; *ACS Macro Lett.* 2015, 4, 628]. A phosphine-ligand-functionalized polyethylene glycol chain (PPEG) in conjunction with a Cp*-based ruthenium complex (Cp*: pentamethylcyclopentadienyl) may provide thermoresponsive character to the transition metal complex as well as act as a catalyst for a living polymerization, such as ATRP. In this example, the complex migrated from the water phase to the oil phase for polymerization upon heating and then migrated from the oil phase back to the water phase when the temperature was reduced to quench the polymerization. However, the thermoresponsive process may not be not industrially scalable.

As known in the art, ARGET ATRP, may use co-catalysts, ligands, and/or additives, to increase the rate of polymerization and the effectiveness of catalysts in ATRP, while also allowing for a reduction in the catalyst concentration. ARGET ATRP utilizes chemical reducing agents that continuously regenerate the lower oxidation state catalyst complex. [*Angew. Chemie Int. Ed.* 2006, 45, 4482-4486].

Electro-ATRP (eATRP) under heterogeneous conditions can be challenging, [US Application 2014/0183055] because in a miniemulsion system the electrode and reactants are separated by two interfaces: the electrode can be in contact with the continuous phase (e.g., aqueous phase), while polymerization reactants (monomer, initiator, and radicals) are in the dispersed phase (e.g., organic phase). Therefore, to trigger polymerization the electrochemical stimulus may have to first reach the aqueous phase (crossing a first electrode/liquid interface) and then shuttle to the dispersed phase (crossing a second liquid/liquid interface). Moreover, miniemulsion electrochemical mediated ATRP (eATRP) can pose an additional challenge in comparison to most organic reactions, because radicals may be continuously activated/deactivated after the electrochemical stimulus has reached the organic phase. eATRP system can be characterized by the presence of two heterogeneous interfaces, i.e., an oil/water and an electrode/water interface. These challenges can be lessened, with the formulation of a satisfactory miniemulsion eATRP which may require reduced reaction temperatures (60-65° C.) and use of a dual catalytic system, composed of an aqueous phase catalyst ($Mt^m/L_{aq}$, wherein $Mt^m$ is a transition metal and $L_{aq}$ is a ligand that can be soluble in the aqueous phase) and an organic phase catalyst ($Mt^m/L_{org}$, wherein $L_{org}$ is a ligand that can be soluble in the organic phase). For example, see [*Macromol.* 2016, 49 (23), pp 8838-8847].

Among the tested dual catalyst systems, satisfactory results for n-butyl acrylate (n-BuA) polymerization can be obtained with copper complexes formed with $L_{aq}$=N,N-bis (2-pyridylmethyl)-2-hydroxyethylamine and $L_{org}$=bis[2-(4-methoxy-3,5-dimethyl)pyridylmethyl]octadecylamine. This dual catalyst system can produce stable latexes and result in the preparation of well-defined polymers with different targeted degree of polymerization (DP). The addition of the second hydrophobic copper complex can allow electron transfer (ET) from the catalyst complex that was soluble in the aqueous phase to the hydrophobic catalyst present in the organic phase (droplet). The aqueous soluble $Mt^m/L_{aq}$ complex can play the role of an electron messenger, transporting electrons from the working electrode (WE) surface to the organic phase. In contrast to classic ATRP systems, the reactivity of the dual catalytic system may not depend on the redox potential of the catalysts, but may instead depend on the hydrophobicity and partition coefficient of the aqueous phase catalyst. In such a miniemulsion eATRP, catalyst partition and interfacial dynamics are important new parameters that can be controlled to regulate the process. The process also retained the hydrophobic catalyst complex in the formed polymer latex particles.

Figure 1:
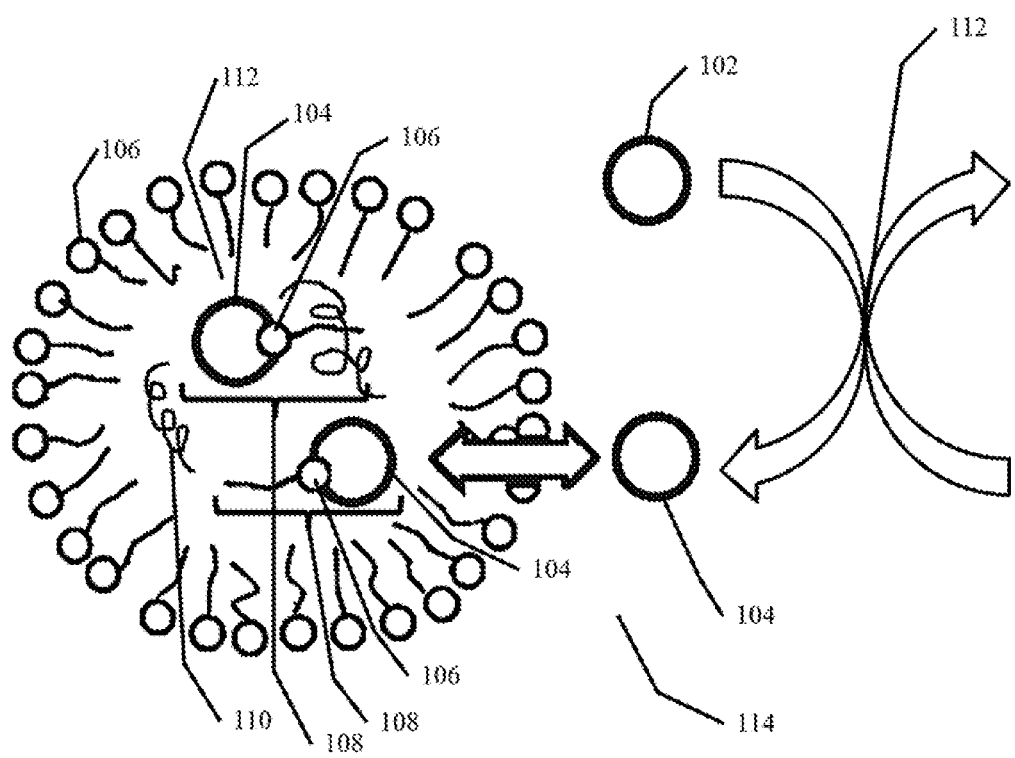
FIG. 1 is a schematic that illustrates how the interaction between the catalyst complex and the anionic surfactant allows the catalyst complex to enter the dispersed monomer droplets in a miniemulsion polymerization.

In one aspect, as illustrated in FIG. 1, an eATRP miniemulsion procedure can harness the interaction between a surfactant 106 and a suspending medium 114 soluble catalyst complex 102 to control an eATRP miniemulsion polymerization with low parts per million (ppm) levels of the catalyst complex (102) (e.g., less than 1000 ppm catalyst, such as 50 ppm catalyst). The catalytic system for an emulsion system (e.g., oil-in-water, water-in-oil, etc.) can be assembled in situ by mixing the surfactant 106, which may be an anionic surfactant, and the catalyst complex 102, such as, for example, a hydrophilic copper complex (e.g., $Cu^{II}/L$). The applied electrical charge 112 reduces a fraction of the catalyst complex 102 to an activated catalyst complex 104 (e.g., $Cu^I/L$) in the suspending medium 114 which directly activates an ATRP within the dispersed phase 112. In certain aspects, the surfactant 106 (e.g., an anionic complex) and the catalyst complexes, 102 and 104, (e.g., a cationic complex) interact to form an ionic complex 108. In contrast to prior work, that concluded an interaction between the catalyst complex and anionic surfactants precluded the use of anionic surfactants in a miniemulsion ATRP, such as, for example, a miniemulsion eATRP, it was surprisingly determined that the ionic complex 108 shuttled the catalyst complex 104 to the surface of the dispersed phase 112 and can enable a controlled polymerization of a monomer 110 within the dispersed phase 112 by use of, for example, eATRP to control the ratio of $Cu^I/L$ to $Cu^{II}/L$.

In one aspect, a complex formed between a tris(2-pyridylmethyl)amine (TPMA) ligand based catalyst and SDS, the Br—$Cu^{II}TPMA^+$/SDS system, analysis determined that ~1% of the catalyst was inside the hydrophobic droplets as ionic complexes, while 95% was bound to the surfactant at the monomer/water interface, and ~4% was in the continuous aqueous phase. Therefore, a combination of interfacial and soluble ionic complex catalysis allowed for the successful eATRP of n-BuA. A low amount of Cu (e.g., less than 15 ppm) was detected inside the final latex after centrifugation.

In one aspect, the low amount of residual copper confirms that eATRP miniemulsion polymerization with Br—$Cu^{II}TPMA^+$/SDS catalyst can be an efficient system for ATRP of hydrophobic monomers. After the polymerization reaches the desired conversion, catalyst removal can be simple because the hydrophilic surfactant ionic copper complexes easily leave the surface of the hydrophobic polymer particles. Low concentrations of copper, such as, for example between 10 and 1000 ppm, and in certain aspects, between 50 and 500 ppm, formed hydrophilic transition metal complexes that interacted with the added surfactant and formed ionic complex interfacial catalysts which allowed a fast and well controlled polymerization of alkyl (meth)acrylate monomers in the dispersed media. The catalyst was compatible with different anionic surfactants, including sulfonate, phosphate and carboxylate based surfactants, and with different low catalyst concentration ATRP techniques (AGET, ARGET, SARA, ICAR, photoATRP, and the recently developed oxygen tolerant ATRP, in addition to the initial exemplifying eATRP) suitable for activator regeneration ATRP, that are discussed in incorporated references.

Figure 2A:
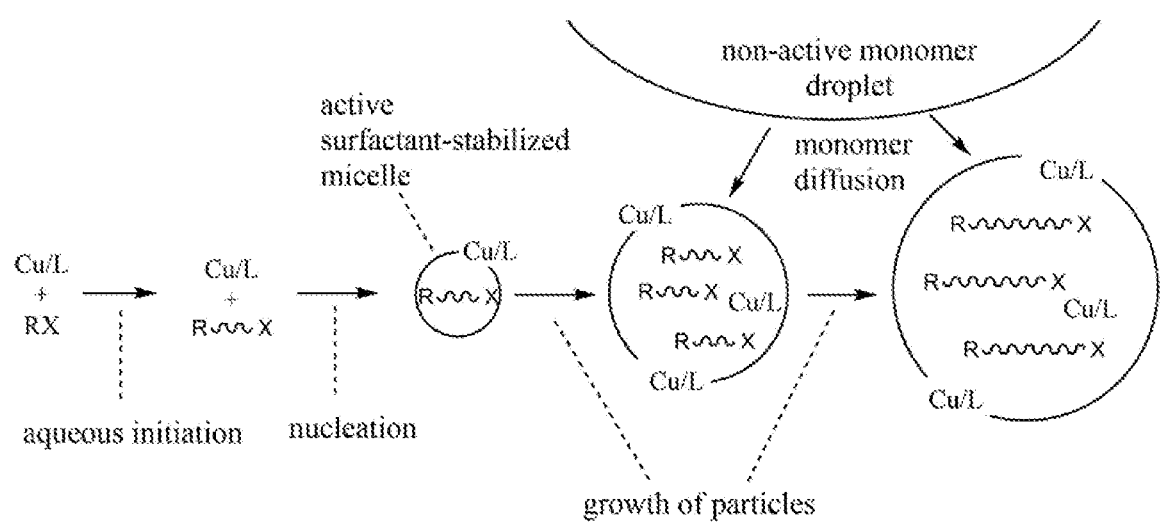
FIG. 2A is a schematic illustrating the formation and progression of an emulsion ATRP, employing an interfacial ionic complex to conduct the polymerization initiated in the suspending medium.
Figure 2B:
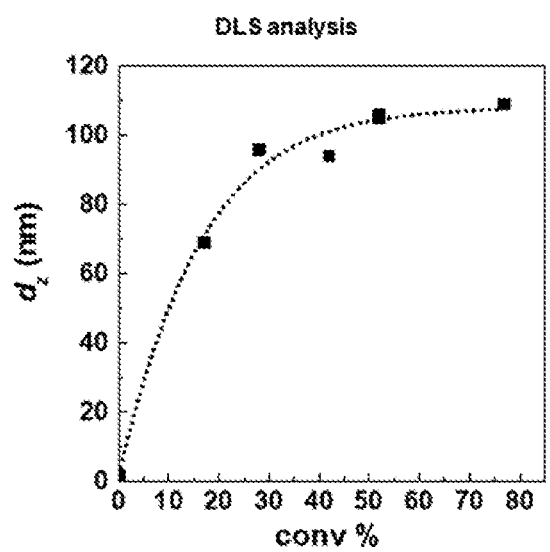
FIG. 2B is a graph of a dynamic light scattering (DLS) analysis of the growth of the dispersed particles as the conversion increased.

A catalyst complex (e.g., $Mt^m/L$) can form between the transition metal catalyst and the anionic surfactant which can enable a pathway to accomplish a controlled radical polymerization in a "standard" emulsion procedure e.g., where the polymerization takes place in active particles that form spontaneously (e.g., micelles) in the first few minutes of an ATRP process after initiating the polymerization of a hydrophobic monomer(s) from a hydrophilic ATRP initiator. In certain aspects, the spontaneous formation of the micelles includes forming hydrophobic oligomers from the hydrophobic monomer(s) which phase separate from the suspending medium. After activation by the ATRP utilizing the ionic complex, the growing polymer chains (e.g., hydrophobic oligomers) preferentially reside within active surfactant stabilized micelles, leaving other monomer droplets (e.g., non-active droplets) minimally impacted, and in various aspects, untouched. Monomers from the non-active droplets can diffuse to the active particles as illustrated in FIG. 2A. In one aspect, the active particles are latex particles which increase in size as the polymerization progresses, FIG. 2B.

An ionic complex catalyst comprising hydrophilic ligands for controlled radical polymerization in surfactant stabilized dispersed media may be provided. Catalyst hydrophilicity and reactivity can be tuned by changing the type of surfactant and/or the transition metal ligand and concentration of the formed complex. Additionally, the size of dispersed phase particles (e.g., active particle, non-active particle, active surfactant stabilized micelles, and the like) can be controlled by controlling the ratio of one or more surfactants to the monomers in the dispersed phase. In certain aspects, the ratio of surfactant to monomer(s) (e.g., concentration) controls the size of the initial dispersed monomer particle(s) which affect the size of the final polymer particle(s). Moreover, the procedure can be utilized in a normal emulsion polymerization by selecting a hydrophilic ATRP initiator. A reverse emulsion polymerization (e.g., water soluble monomers in an organic suspending medium) can be accomplished by changing the phylicity of each reagent in the reaction.

In various aspects, an industrial scalable emulsion ATRP can be conducted with a single ionic complex that resides on the interfacial boundary between the dispersed medium, e.g., organic phase, and the suspending medium, e.g., aqueous phase. The aqueous phase containing a salt with a halide counterion, a catalyst complex formed with a hydrophilic ligand, an anionic surfactant and a hydrophilic ATRP initiator can be mixed by low shear stirring with an oil phase containing one or more monomers and the polymerization can be activated by application of an external, or addition of chemical, reducing agent. The initially formed growing polymer chains aggregate into micelles as the phylicity of the growing polymer chains change as the polymerization progresses and they are stabilized by the surfactant and a low fraction of the single ionic complex. The particles grow as the polymerization progresses by monomer diffusion from dispersed monomer droplets, FIG. 2B, increasing the size of the particles as the polymerization progresses.

The use of electro-synthesis can be extended to the field of heterogeneous polymerization in a dispersed media, since the eATRP of n-BuA in miniemulsion with a single hydrophilic catalytic system may predominately remain in the suspending medium. As disclosed herein the proper balance between a redox potential and a hydrophilic property of the single catalytic system and selection of a specific class of surfactant can provide a catalyst complex for efficient electro-catalysis that produces well-defined polymers by eATRP in a miniemulsion polymerization. Additionally, the eATRP with the catalyst complex can provide particles with very low residual catalyst within the formed polymers after precipitation, such as, for example, less then 100 milligrams (mg) metal (e.g., copper)/kilogram (kg) of formed polymer, and in certain aspects, less than 0.3 mg metal/kg formed polymer.

Miniemulsion eATRP with a single catalyst complex procedure can generate a well-controlled polymerization in the dispersed monomer droplets. Other procedures for regeneration of the activator catalyst complex in the predominately soluble aqueous catalyst complex may be used such as, for example, a photoATRP, an Activators Generated by Electron Transfer (AGET) ATRP, an Activators Regenerated by Electron Transfer (ARGET) ATRP, a Supplemental Activator and Reducing Agent (SARA) ATRP, and an Initiators for Continuous Activator Regeneration (ICAR) ATRP.

Ascorbic acid can be used as a chemical reducing agent. The catalyst concentration can be reduced to minimize impurities, while high (1200) and low (200) degrees of polymerization (DP) were targeted. The livingness of the process was confirmed by chain-extending an in situ formed poly(n-butyl methacrylate)-Br macroinitiator (PBMA-MI) with both acrylic and methacrylic monomers thereby confirming high retained chain end functionality.

In various aspects, a low catalyst concentration ARGET ATRP procedure can be executed by the preparation of block copolymers and polymers with different architectures, such a star molecules and molecular brushes. The good livingness of the ARGET ATRP allowed for the preparation of well-controlled star and molecular-brush polymers. Synthesis of these complex architectures strongly benefited from the miniemulsion system, due to radical compartmentalization and reduced viscosity. [*Macromolecules*, 2007, 40 (18), 6557]

In various aspects, the miniemulsion ATRP system can be extended to an ab initio emulsion polymerization by addition of a second monomer to the ongoing miniemulsion ATRP.

The eATRP and ARGET ATRP miniemulsion polymerization systems disclosed in the aspects can provide a single catalyst emulsion ATRP procedure based on addition of a suspending medium soluble ATRP initiator for initiation of a hydrophobic monomer. In certain aspects, the polymerization results can result in self-assembled formation of latex particles, as in a standard FRP emulsion procedure.

An ATRP emulsion system may comprise a suspending medium, a dispersed medium, a surfactant, S, an ATRP initiator, a radically (co)polymerizable monomer, a transition metal compound in a higher oxidation state, $Mt^{m+1}$, and a ligand, L, containing at least two heteroatom containing groups. The transition metal compound, $Mt^{m+1}$, can form a catalyst complex, $Mt^{m+1}/L$, with the ligand, L, wherein the at least two heteroatom containing groups coordinate with the transition metal compound e.g., utilizing an ionic bond, a π-bond, a σ-bond, and the like. The catalyst complex, $Mt^{m+1}/L$, can be soluble in the suspending medium and can be oxidavetely stable. The ATRP initiator may comprise one or more radically transferable atoms or groups. The catalyst complex, $Mt^{m+1}/L$, may be reduced to form an active catalyst complex, $Mt^{m}/L$. Namely, a portion of the transition metal compound, $Mt^{m+1}$, in the higher oxidation state within a portion of the catalyst complex, $Mt^{m+1}/L$, may be reduced by a physical and/or a chemical procedure which, in certain aspects, occurs in the suspending phase. The catalyst complex, $Mt^{m+1}/L$, and/or active catalyst complex, $Mt^{m}/L$, can be capable of forming an ionic complex, $Mt^{m+1}/L/S$ or $Mt^{m}/L/S$, respectively, with the surfactant, S. The ionic complex, $Mt^{m+1}/L/S$ and/or $Mt^{m}/L/S$, can move between the suspending medium and the dispersed medium through interaction with the dispersed medium which can be surfactant stabilized dispersed particles. The active catalyst complex, $Mt^{m}/L/S$, may initiate a polymerization of the radically (co)polymerizable monomers by reaction with the ATRP initiator. Namely, the ionic complex, $Mt^{m}/L/S$, may be formed in the suspending phase, travels into the dispersed phase, and initiates the polymerization. In certain aspects, the concentration of the catalyst complex, $Mt^{m+1}/L$, within the ATRP emulsion system can be between 10 and 1000 ppm. In certain aspects, the concentration of the catalyst complex, $Mt^{m+1}/L$, within the ATRP emulsion system can be between 50 and 500 ppm.

In various aspects, an ATRP emulsion process comprises adding a suspending medium, a surfactant, S, a transition metal compound in a higher oxidation state, $Mt^{m+1}$, a ligand, L, containing at least two heteroatom containing groups, one or more radically (co)polymerizable monomers, and an ATRP initiator containing one or more radically transferable atoms or groups to a container. An emulsion may be generated in the container. The emulsion contains one or more dispersed droplets. A catalyst complex, $Mt^{m+1}/L$, can be formed with the transition metal compound, $Mt^{m+1}$, and the ligand, L. Namely, at least two heteroatom containing groups of the ligand, L, may coordinate with the transition metal compound, $Mt^{m+1}$. The catalyst complex, $Mt^{m+1}/L$, can be soluble in the suspending medium and can form an ionic complex with the surfactant, S.

A polymerization with the monomers may be initiated by reducing at least a portion of the catalyst complex, $Mt^{m+1}/L$, by a physical or chemical procedure. The reducing may include, reducing a portion of the transition metal compound in the higher oxidation state, $Mt^{m+1}$, within the portion of the catalyst complex, $Mt^{m+1}/L$. The reducing creates an active catalyst complex, $Mt^{m}/L$, having the portion of the transition metal compound in a lower oxidation state, $Mt^{m}$. The active catalyst complex, $Mt^{m}/L$, can be shuttled between the suspending medium and the dispersed droplets by forming an ionic complex, $Mt^{m}/L/S$, with the surfactant, S, and the active catalyst complex, $Mt^{m}/L$. In certain aspects, there is a molar excess of the surfactant, S, as compared to the catalyst complex, $Mt^{m+1}/L$, and substantially all of the catalyst complex, $Mt^{m+1}/L$, forms the ionic complex, $Mt^{m+1}/L/S$. The initiator may be reacted with the one or more monomers thereby forming a polymer (e.g., polymer particles), wherein the reacting can be facilitated by the active catalyst complex, $Mt^{m}/L$. In various aspects, a dimension of the polymer particles can be controlled by adjusting an amount of the surfactant, S. In various aspects, a second surfactant can be added wherein the second surfactant participates in control over the dimension of the polymer particles. In various aspects, the ATRP emulsion process can be controlled utilizing the ionic complex, $Mt^{m}/L/S$. In various aspects, the formed polymer can be removed from the container and the removed formed polymer has a residual amount of the catalyst complex in the higher oxidation state, $Mt^{m+1}/L$, and the active catalyst complex, $Mt^m/L$, that can be at least 20 fold less than an amount of the initially added catalyst complex with the transition metal in the higher oxidation state, $Mt^{m+1}/L$, and the active catalyst complex, $Mt^m/L$, in the container. Accordingly, a polymer may be formed by the ATRP emulsion process.

In certain aspects, the physical procedure can be, for example, applying an electrical current, applying a sound, and a initiating a photo procedure such as, for example, applying an light, such as ultra-violet light, to the catalyst complex. The chemical procedure can include, for example, adding a reducing agent wherein the reducing agent reduces the catalyst complex to the active catalyst complex. The reducing agent may be, for example, ascorbic acid, hydrazine, a phenol, a sugar, a metal, a metal compound, a sulfur compound, an alkylamine, an excess quantity of the ligand, a free radical initiator, or a nitrogen containing monomer, derivatives thereof, and combinations thereof. In certain aspects, the metal may be a zero valent metal such as copper, silver, magnesium, zinc and/or iron. In some aspects, the metal compound may be unable to initiate a polymer chain. In certain aspects, the reducing agent may be an inorganic salt comprising a metal ion such as, for example, tin (e.g., $Sn^{2+}$), iron (e.g., $Fe^{2+}$), chromium (e.g., $Cr^{3+}$), aluminum ($Al^{3+}$), and titanium (e.g., $Ti^{3+}$ and $Ti^{4+}$). In certain aspects, the reducing agent may be, a sodium hydrogen sulfite, an alkylthiol, a mercapoethanol, a carbonyl, acetyl acetonate, camphosulfonic acid, hydroxy acetone, reducing sugars, monosaccarides, glucose, aldehydes, derivatives thereof, and combinations thereof.

The monomer may be, for example, a styrene, a (meth)acrylate, a (meth)acrylamide, an acrylonitrile, and combinations thereof. In certain aspects, an ATRP initiator may be, for example, an alkyl halide such as, for example, an alkyl bromide, an alkyl chloride, an alkyl iodide, and combinations thereof.

In certain aspects, the suspending medium may be aqueous or organic. For example, when the suspending medium is an aqueous medium and the dispersed medium is an organic medium, the ligand can be, for example, (4-methoxy-3,5-dimethyl-pyridin-2-ylmethyl)-bis(pyridin-2-ylmethyl)-amine (TPMA*-1), bis(4-methoxy-3,5-dimethyl-pyridin-2-ylmethyl)-pyridin-2-ylmethyl-amine (TPMA*-2), tris[(4-methoxy-3,5-dimethyl)-pyrid-2-ylmethyl]amine (TPMA*-3), (4-methoxy-pyridin-2-ylmethyl)-bis(pyridin-2-ylmethyl)-amine (TPMA-OMe), bis(4-methoxy-pyridin-2-ylmethyl)-pyridin-2-ylmethyl-amine (TPMA-OMe-2), tris((4-methoxy)-pyridin-2-yl)methyl)-amine (TPMA-OMe-3), (4-(N,N-dimethylamino)-pyridin-2-ylmethyl)-bis(pyridin-2-ylmethyl)-amine (TPMA-NMe2), bis(4-(N,N-dimethylamino)-pyridin-2-ylmethyl)-pyridin-2-ylmethyl-amine (TPMA-NMe2-2), tris(4-(N,N-dimethylamino)-pyridin-2-yl)methyl)-amine (TPMA-NMe2-3), and combinations thereof The transition metal compound may comprise, for example, copper, titanium, molybdenum, rhenium, osmium, rhodium, palladium, iron, nickel, and/or ruthenium. In certain aspects, where the transition metal comprises copper, the catalyst complex can be $Cu^{II}/L$ and the active catalyst complex can be $Cu^{I}/L$. In certain aspects, the transition metal compound in the higher oxidation state can be copper (II) bromide and the transition metal compound in the lower oxidation state can be copper (I) bromide.

In another aspect, when the suspending medium can be an organic medium and the dispersed medium can be an aqueous medium. In this case, the phylicity of each reagent in the reaction can be reversed as compared to when the suspending medium is an aqueous medium and the dispersed medium is an organic medium. In certain aspects, the ligand can be, for example, bis(pyrid-2-ylmethyl)-octadecylamine (BPMODA), bis((4-methoxy-3,5-dimethyl)-pyrid-2-ylmethyl)-octadecylamine (BPMODA*), and combinations thereof. In certain aspects, the surfactant is anionic and the ionic complex is a hydrophobic ionic complex.

When the surfactant is an anionic surfactant and the ionic complex is a hydrophilic ionic complex, the surfactant can be, for example, sodium alkyl sulphate, sodium alkyl laurate, sodium alkyl stearate, sodium dodecanoate, and combinations thereof.

The ATRP emulsion can be, for example, a standard emulsion, a reverse emulsion, a miniemulsion, a microemulsion, a seeded emulsion, an ab initio emulsion, and combinations thereof.

In various aspects, the ATRP can be, for example, an electro-ATRP (eATRP), a photoATRP, a mechanoATRP, an Activator Generated by Electron Transfer (AGET) ATRP, an Activators Regenerated by Electron Transfer (ARGET) ATRP, a Supplemental Activator and Reducing Agent (SARA) ATRP, an Initiators For Continuous Activator Regeneration (ICAR) ATRP, an oxygen tolerant ATRP, or other procedures employing similar reagents but with differing abbreviations, and combinations thereof. Mechano-ATRP was recently disclosed in Matyjaszewski, K., et. al., Temporal Control in Mechanically Controlled Atom Transfer Radical Polymerization Using Low ppm of Cu Catalyst. *ACS Macro Letters* 2017, 6 (5), 546-549.

The ATRP emulsion system and process can include addition of a halide salt such as, for example, organic halide salt and an inorganic halide salt. In certain aspects, the halide salt may be, for example, sodium bromide, sodium chloride, tetraethylammonium chloride, potassium chloride, and combinations thereof. The addition of the halide salt can limit a halogen displacement interaction between the catalyst complex with the transition metal compound in the higher oxidation state and the surfactant.

In various aspects, the formed polymer may have a residual amount of the transition metal compound in the higher oxidation state and lower oxidation state less than 400 parts per billion (ppb). In certain aspects, the formed polymer may have a residual amount of metal (e.g., copper) of less than 0.4 mg metal/kg of formed polymer.

In various aspects, the ATRP initiator can be soluble in the dispersed medium. When the ATRP initiator is soluble in the dispersed medium, for example, the emulsion can be a miniemulsion and the dispersed medium may be formed prior to the initiating of the polymerization. In various aspects, the ATRP initiator can be soluble in the suspending medium. When the ATRP initiator is soluble in the suspending medium, for example, the dispersed medium can be self-formed around a portion of the one or more monomers after initiating of the polymerization.

EXAMPLES AND DISCUSSION OF EXAMPLES

Various polymerization parameters were examined in a series of experiments designed to identify a system that can use a single catalyst complex, preferentially soluble in the suspending medium, thereby leaving a very low concentration of the catalyst complex (e.g., transition metal within the catalyst complex) in the dispersed polymeric product that would allow one to conduct an ATRP in a typical emulsion or miniemulsion polymerization. The study included structure of the ligand and surfactant, surfactant concentration, catalyst concentration, and a monomer/initiator molar ratio (providing different target DPs) to determine the best reaction conditions during miniemulsion eATRP for comparison with a dual catalyst system, $Cu^{II}/L_{aq}+Cu^{II}/L_{org}$ developed earlier. For example, see [*Macronol.* 2016, 49 (23), 8838.].

In one aspect, the miniemulsion was prepared by ultrasonic treatment at 0° C. to prevent undesirable side reactions. Preparation of the catalyst complex for the miniemulsion ATRP can require a smaller quantity of a single ligand to be added to the reaction medium than a dual catalyst system. Sodium dodecyl sulfonate (SDS) was used as the exemplary anionic active surfactant, which can require addition of, sodium bromide (NaBr) (or sodium chloride (NaCl) in the case where halogen transfer can be desired) to prevent competitive complexation between SDS and the Br—$Cu^{II}$/$L^+$ deactivator in addition to increasing solution conductivity, without destabilizing the dispersed particles within the miniemulsion. [*Macromol.* 2014, 47, 6230-6237.] The results of experiments utilizing the NaBr are shown in Table 3 below wherein entry 1 is an uncontrolled reaction without NaBr and entry 5 has NaBr.

Figure 3:
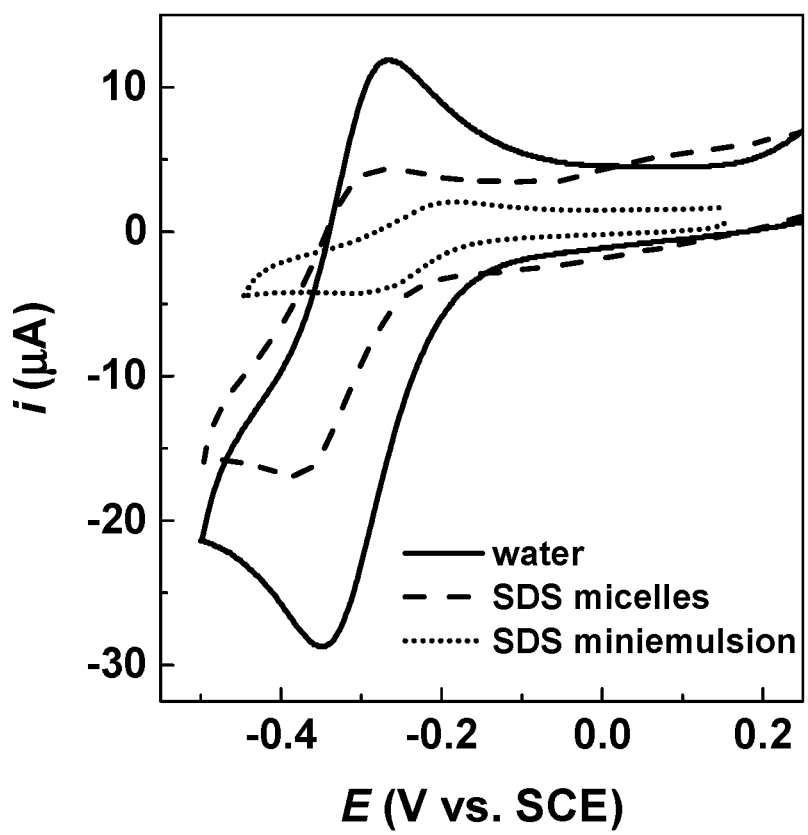
FIG. 3 displays the results of cyclic voltammetry (CV) of Br—$Cu^{II}TPMA^+$ in water+0.1 M NaBr, in water+0.1 NaBr+0.028 M SDS, and in a miniemulsion as described in Table 1, but without added EBiB initiator. $v=0.1$ V $s^{-1}$, T=65° C.

The effect of SDS concentration on the cyclic voltammetry (CV) response of $[Cu^{II}L]^{2+}$ was also examined. In the case of $[Br—Cu^{II}TPMA]^+$ it was determined that by increasing a concentration of SDS, the intensity of the CV signal decreased and the two peaks shifted towards a more negative potential as illustrated in FIG. 3. Below the critical micelle concentration (CMC) the peak cathodic current, $i_{p,c}$, quickly decreased while above the CMC the peak cathodic current, $i_{p,c}$, remained more or less constant. Conversely, the reduction potential began to change only in proximity of the CMC. The voltammograms may indicate that there is an interaction between the SDS and the copper complex. In one aspect, the decrease in the signal intensity can be due to the lower diffusion coefficients of the new species, which has a more hindered structure because $[Br—Cu^{II}TPMA]^+$ can be bound to the micelles or dispersed droplets.

The development of a successful eATRP miniemulsion procedure indicated that various chemical reducing agents could be used to conduct a miniemulsion polymerization with a single catalyst complex and/or an external stimulation and/or chemical reduction to control the ratio of activator to deactivator during the polymerization.

The addition of an ATRP initiator that was soluble in the aqueous medium in the presence of an aqueous soluble ionic complex can result in initiation of the inherent low concentration of hydrophobic monomers present in the suspending medium resulting in nucleation of micelles and subsequent particle growth similar to a standard emulsion polymerization as illustrated in FIG. 2A.

Oxygen scavenging ATRP can enable well-controlled aqueous ATRP to be conducted in the open air as reported in [Angew. Chem. Int. Ed. published online Dec. 15, 2017]. The open air ATRP can be enabled by the continuous conversion of oxygen to carbon dioxide catalyzed by glucose oxidase (GOx), in the presence of glucose and sodium pyruvate as sequential sacrificial substrates. The glucose oxidase can remove oxygen from the reaction medium and the pyruvate can remove the formed hydrogen peroxide from the reaction medium as illustrated in FIG. 26.

The oxygen scavenging ATRP enables ATRP processes to be conducted in the presence of air since oxygen can be continuously removed from the reaction medium. The range of glucose in the reaction can range between 0.05 and 1 moles (M), while the pyruvate can accordingly range between 0.01 M and 0.1 M.

The following series of examples, and discussion of examples, provides details of the parameter(s) that can be controlled in order to conduct these industrially viable, scalable procedures for the preparation of well-defined polymers under emulsion polymerization conditions.

Polymers suitable for several exemplary applications are prepared to demonstrate the broad utility of the developed processes. They include telechelic copolymers suitable for post-polymerization functionalization/chain extension/crosslinking, block copolymers targeting application as thermoplastic elastomers and polymers incorporating functional groups suitable for development of pressure sensitive adhesives.

In one aspect, a miniemulsion polymerization can be conducted in the presence of a low concentration of a catalyst complex capable of participating in an ATRP of radically (co)polymerizable monomers. For example, in certain aspects, a low concentration of catalyst complex can be 10 to 1000 ppm catalyst complex. In some aspects, a low concentration of catalyst complex can be 20 to 500 ppm of catalyst complex, such as, for example, less than 50 ppm catalyst complex. The monomers can preferentially reside in the suspending medium and interact with an anionic surfactant. The anionic surfactant stabilizes the dispersed medium (e.g., monomer droplets). In certain aspects, an interaction between the anionic surfactant and the catalyst complex generates an ionic complex that can transfer the catalyst complex into the dispersed medium. In certain aspects, a portion of the ionic complex resides in the monomer droplets and assists in stablization of the dispersed medium. Several procedures can be utilized to (re)activate the added and in situ formed higher oxidation state deactivator catalyst complex to activate the added low molecular weight initiator or macroinitiator including eATRP, a photoATRP, an AGET ATRP, an ARGET ATRP, SARA ATRP, ICAR ATRP, and an oxygen scavenging ATRP. Examples are provided below for ARGET ATRP, ICAR ATRP and photoATRP and oxygen scavenging ATRP to confirm the general applicability of the disclosed procedure(s) to all known ATRP initiation procedures.

In another aspect, a standard emulsion polymerization can be conducted in the presence of a hydrophilic catalyst complex in its higher oxidation state, a hydrophilic ATRP initiator molecule, an anionic surfactant, and hydrophobic monomer(s) wherein the polymerization can be initiated by addition of a water soluble reducing agent to the stirred mixture of the two liquids forming hydrophobic growing polymer chains that aggregate to form micelles wherein the controlled polymerization of the monomers continues forming molecules with predetermined molecular weight (MW) and narrow dispersity index (Đ) within the growing dispersed micelles FIG. 2A.

Defining Parameters for an eATRP Miniemulsion Polymerization Utilizing a Single Catalyst Complex that is Soluble in the Suspending Medium.

Materials. Tetrabutylammonium hexafluorophosphate ($TBAPF_6$, 98%), copper(II) bromide ($CuBr_2$, 99%), methylated cellulose (Tylose, MH=300), sodium dodecyl sulfate (SDS, 99%), hexadecane (HD, 99%), tetrahydrofuran (THF, >99%), ethyl α-bromoisobutyrate (EBiB, 98%), 2-Hydroxyethyl 2-bromoisobutyrate (HEBiB 95%) and tetraethylammonium chloride (TEACl 99%) were purchased from Sigma-Aldrich. N,N-dimethylformamide (DMF), sodium bromide (NaBr, 99%) and polyoxyethylene (20) oleyl ether (Brij 98) were purchased from Acros. Platinum (Pt) wire, Pt gauge mesh and Pt disk (3 mm diameter, Gamry) were purchased from Alfa Aesar. Tris(2-pyridylmethyl)amine (TPMA) was prepared according to a published procedure.[*Macromol.* 1999, 32 (8), 2434-2437] Bis(4-methoxy-3,5-dimethyl-pyridin-2-ylmethyl)-pyridin-2-ylmethyl-amine (TPMA*2) was prepared according to a previously published procedure. [*ACS Macro Letters* 2012, 1 (8), 1037-1040] Tris(2-(dimethylamino)ethyl)amine (Me$_6$TREN) was synthesized according to literature procedures and stored under nitrogen prior to use. For example, see [*Macromol.* 1999, 32 (8), 2434-2437; *Macromol* 2000, 33 (23), 8629-8639] Bis(2-pyridylmethyl)octadecylamine (BPMODA) and bis[2-(4-methoxy-3,5-dimethyl)pyridylmethyl]octadecylamine (BPMODA*) were prepared according to a published procedure, for example, [*Macromol.* 2012, 45, 7356-7363; *Macromol.* 2016, 49, 8838-8847.] n-Butyl acrylate (BA, 99%, Aldrich) and was passed through a column filled with basic alumina prior to use to remove polymerization inhibitors.

Partition coefficients. Table 1 summarizes composition of the organic and aqueous phases that were subsequently combined prior to sonication and conducting a typical eATRP miniemulsion polymerization. Typical eATRP polymerization conditions: T=65° C.; WE=Pt mesh: CE=Pt mesh (separated from reaction mixtures by a methylated cellulose gel saturated with supporting electrolyte) or in seATRP an Al wire directly immersed in the reaction medium; RE=Ag/AgI/I$^-$.

TABLE 1

Composition of Organic and Aqueous Phases in a Typical Miniemulsion Polymerization

| components | weight (g) | comments |
|---|---|---|
| organic phase | | |
| n-BuA | 7.12 | 19 vol % (17 wt %) to total |
| EBiB | 0.039$^b$ | [n-BuA]/[EBiB] = 280/1 |
| HD | 0.77 | 10.8 wt % to n-BuA |
| aqueous phase | | |
| Water | 32 | Distilled water |
| SDS | 0.44 | 6.2 wt % top n-BuA |
| NaBr | 0.41 | [NaBr] = 0.1 M |
| Cu$^{II}$Br$_2$ | 8.9 × 10$^{-3}$ | 1 mM with respect to V$_{tot}$ |
| TPMA$^c$ | 0.023 | [Cu$^{II}$Br$_2$]/[L] = 1/2 |

$^b$amount of EBiB was varied depending on target degree of polymerization (DP);
$^c$bpy, BPMEA, Me$_6$TREN, TPMA$^{*2}$, Cu$^{II}$Br$_2$/TPMA were also used as aqueous phase catalysts.

(N,N-bis(2-pyridylmethyl)-2-hydroxyethylamine (BPMEA) was synthesized by a modified literature procedure as reported in [*Macromol.* 2016, 49, 8838.])

Selection of an Appropriate Single Catalyst Complex.

Initially it was believed that selecting a single catalytic system for an eATRP miniemulsion required selection of a catalyst with a suitable level of solubility in each phase of the emulsion that allowed distribution of sufficient concentration of the complex in both the aqueous and organic phases to allow a controlled polymerization to occur. Retrospectively it was determined that the distribution may not be a requirement and surprisingly it was determined that the interaction of the catalyst complex with a selected anionic surfactant provided an ionic complex that was self-transportable between the aqueous and organic phases. Polymerization conditions: T=65° C.; WE=Pt mesh; CE=Pt mesh (separated from reaction mixtures methylated cellulose gel saturated with supporting electrolyte) or Al wire directly immersed in the reaction medium; RE=Ag/AgI/I$^-$.

Typical Procedure Employed to Measure Catalyst Distribution in a Partition Experiment.

Aqueous solutions of Cu$^{II}$Br$_2$/TPMA, Cu$^{II}$Br$_2$/TPMA*2 and Cu$^{II}$Br$_2$/Me$_6$TREN (1/2 by mole) were prepared at various concentrations, i.e., 0.1, 1, 2.5, 5 and 10 mM. Catalyst absorbance was recorded by UV-Vis spectroscopy, maximum wavelength, $\lambda_{max}$, 867 nm. A linear calibration was obtained from the correlation between absorbance and catalyst concentration curves. Solutions of the copper complex in water were prepared at various concentrations and then mixed with n-BuA to obtain 70/30 and 85/15 water/n-BuA ratios, by v/v. The mixtures were vigorously stirred using a Vortex Mixer at either room temperature (e.g., between 18° C. and 22° C.) or 60° C. The aqueous phase was collected and $\lambda_{max}$ absorbance was measured by a UV-Vis spectrometer to determine how the catalysts were distributed between the aqueous phase and the n-BuA droplets, which depended on the hydrophobicity of the copper complexes. Results are provided in Table 2.

TABLE 2

Partition of Cu$^{II}$Br$_2$/L Catalysts between water and n-BuA

| | [Cu$^{II}$Br$_2$/L]$_{water}$/[Cu$^{II}$Br$_2$/L]$_{tot}$ | | | |
|---|---|---|---|---|
| | 15 vol % n-BuA$^b$ | | 30 vol % n-BuA$^c$ | |
| Ligand | RT | 60° C. | RT | 60° C. |
| BPMODA | N/A | N/A | 0.30 | N/A |
| BPMEA$^d$ | 0.54 | 0.88 | 0.73 | 0.98 |
| Me$_6$TREN | 0.94 | 0.98 | 0.94 | 0.97 |
| TPMA*2 | 1.00 | 1.00 | 0.99 | 0.98 |
| TPMA$^d$ | 1.00 | 1.04 | 1.00 | 1.00 |

$^a$[Cu$^{II}$Br$_2$/L]$_{tot}$ = 2.5 mM. Ratios of [Cu$^{II}$Br$_2$/L]$_{water}$/[Cu$^{II}$Br$_2$/L]$_{tot}$ were determined by calibration curve in water;
$^b$13.5 wt % of n-BuA;
$^c$27.8 wt % of n-BuA.
$^d$from ref. [Macromol. 2016, 49 (23), 8838].

The partition experiments indicated that catalyst complexes Cu$^{II}$Br$_2$/tris[2-(dimethylamino)ethyl]amine (Me$_6$TREN), Cu$^{II}$Br$_2$/bis(4-methoxy-3,5-dimethyl-pyridin-2-ylmethyl)-pyridin-2-ylmethyl-amine (TPMA*2), and Cu$^{II}$Br$_2$/tris(2-pyridylmethyl)amine (TPMA) strongly preferred the aqueous phase, and therefore these catalyst complexes were selected as aqueous phase catalysts (Cu$^{II}$/L$_{aq}$).

Cyclic Voltammetry (CV) Analysis of Catalysts.

Figure 4:
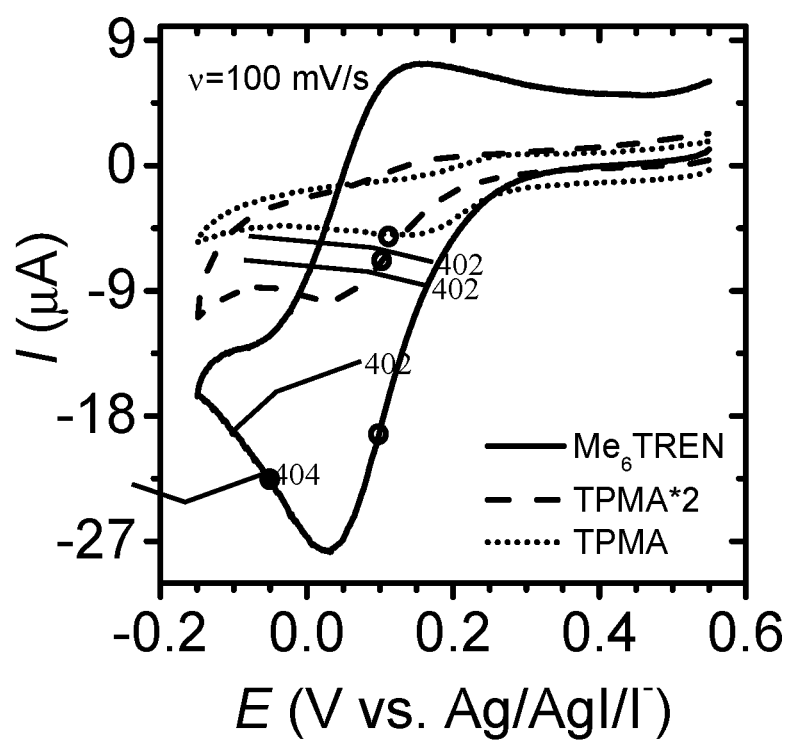
FIG. 4 shows the results of CV of 1 mM $Cu^{II}Br_2/L$ complexes in a miniemulsion in the presence of 5.0 mM EBiB, recorded on Pt disk electrode at $v=0.1$ V $s^{-1}$ and T=65° C. (concentrations referred to $V_{tot}$). Circles 402 represent $E_{app}$ during each eATRP ($E_{app}=E_{pc}-35$ mV for $Cu^{II}Br_2/TPMA*2$ and $Cu^{II}Br_2/TPMA$ complexes and $E_{app}=E_{pc}+120$ mV for $Cu^{II}Br_2/Me_6TREN$ complex). Circle 404 represents $E_{app}$ during eATRP with $Cu^{II}Br_2/Me_6TREN$ complex ($E_{app}=E_{pc}-35$ mV). CV conditions: [n-BuA]/[EBiB]/[$Cu^{II}Br_2/2L$]=280/1/0.2, [n-BuA]=1.4 M, [$Cu^{II}Br_2/2L$]=1.00 mM, T=65° C., [NaBr]=0.1 M, [SDS]=38 mM, [HD]=85 mM.

CV was performed on 1 mM Cu$^{II}$Br$_2$/L catalyst solutions (L=BPMEA, Me$_6$TREN, TPMA*2 or TPMA; CuBr$_2$/L mole ratio=1/2). 0.1 M of NaBr (0.63 g, 3 mmol) was used as a supporting electrolyte in a total volume of 30 mL. CV spectra were recorded at a Pt disk working electrode (WE) with a Pt mesh counter electrode (CE) and a saturated calomel (SCE) reference electrode (RE). Scan rate (v) was 100 mV/s. The cyclic voltammetry curves (CV) recorded in a miniemulsion under polymerization conditions, as illustrated in FIG. 4, were used to select the potential applied during the eATRP. Under such conditions, the CV was made irreversible, or less reversible, by the occurrence of the electrochemical catalytic cycle in which the electro-generated Cu$^I$ complex was oxidized by participation in the ATRP reaction, and the produced X—Cu$^{II}$/L that was further reduced at the electrode surface. This electrochemical cycle increased the cathodic current proportionally to the activity of the catalyst, which followed the same order provided by analysis of the redox potentials.

Apparatus Configuration and Characterization.

Sonication treatment for preparation of the miniemulsion was carried out using Ultrasonics W-385 sonicator. UV-Vis spectra were recorded by Agilent 8453 with a glass cuvette (length=1 cm). $M_n$ and $M_w/M_n$ were determined by GPC equipped with Polymer Standards Services (PSS) columns (guard, $10^5$, $10^3$, and $10^2$ Å) and a differential refractive index detector (Waters, 2410), with THF as eluent at a flow rate 1.00 mL/min (T=35° C.). GPC traces were processed by WinGPC 8.0 software (PSS) using a calibration based on linear polystyrene (PS) standards. Electrolysis experiments were carried out under $N_2$ atmosphere using a Pt disk (A~6 cm$^2$) and Pt mesh (for chronoamperometry (CA)) working electrodes. The Pt mesh counter electrode was prepared using a glass frit and a salt bridge made of Tylose gel saturated with TBAPF$_6$ to separate the cathodic and anodic compartments. CV spectra were recorded at a Pt disk WE with a Pt mesh CE and a Ag/AgI/I$^-$ RE (Gamry Ref 600). Scan rate (v) was 100 mV/s. During the simplified eATRP (seATRP), a condenser was connected to the reaction cell and maintained at −10° C. using a circulating chiller (NE-SLAB Inc., RTE-111). Particle size and size distribution were determined by using a Zetasizer Nano from Malvern Instruments, Ltd. Samples for inductively coupled plasma-mass spectrometry (ICP-MS) were prepared by digesting 0.2 g of polymer in 10 mL of HCl:HNO$_3$ 3:1 at 95° C. for 2 hours. The concentrations of aluminum (Al) and copper (Cu) in purified polymers were determined using Thermo-Finnigan Element XR ICP-MS. The instrument was calibrated for each element. The samples were analyzed immediately after the initial calibration, and the elemental results were within the calibration range.

Example 1: Development of Conditions for an eATRP Miniemulsion Polymerization of Butyl Acrylate in the Presence of a Single Catalyst Complex Under Potentiostatic Conditions 1 A) Examination of Different Catalysts.

A stock solution of n-BuA (8 mL, 55.55 mmol), EBiB (29 µL, 1.98×10$^{-1}$ mmol) to target a degree of polymerization (DP)=280; (the amount of EBiB was adjusted for different targeted DPs ranging from 10 to 1000), and hexadecane (HD) (between 3 and 30 wt % to monomer) specifically HD (1 mL, 3.40 mmol) was prepared. Cu$^{II}$Br$_2$ (8.9 mg, 0.04 mmol), TPMA (23.1 mg, 0.08 mmol), NaBr ([NaBr] range 0.01 to 1 M) specifically (412 mg, 4 mmol), and surfactant SDS range between 1 wt % and 20 wt % to monomer, specifically in this example (440 mg, 0.38 mmol) were dissolved in 32 mL of distilled water. The organic and aqueous solutions were mixed (total volume 40 mL), placed in an ice bath, and dispersed by a probe sonicator, amplitude=70% for 15 min; with an application and rest time of 1 s each. Nitrogen was bubbled through the miniemulsion solution for 40 min, prior to recording a CV at 100 mV/s with a Pt disk WE, and the same Pt mesh/Al wire CE and RE described above. The CV allowed for accurate selection of the applied potential ($E_{app}=E_{pc}-35$ mV). A Pt mesh (geometrical area 6 cm$^2$) WE was used for electrolysis under proper $E_{app}$. Samples were withdrawn periodically to follow the monomer conversion by gravimetric analysis, while $M_n$ and $M_w/M_n$ were determined by GPC.

In the experiments conducted with Cu$^{II}$Br$_2$/Me$_6$TREN as the catalyst complex an applied current of $E_{app}=E_{pc}-35$ mV was selected, which allowed a relatively fast reduction of Cu$^{II}$ to Cu$^{I}$ in the aqueous phase (Table 3, entry 2). In a different polymerization, $E_{app}=E_{pc}+120$ mV was applied, which allowed for a relatively slow reduction of Cu$^{II}$ to Cu$^{I}$ in the aqueous phase (Table 3, entry 3).

Figure 5A:
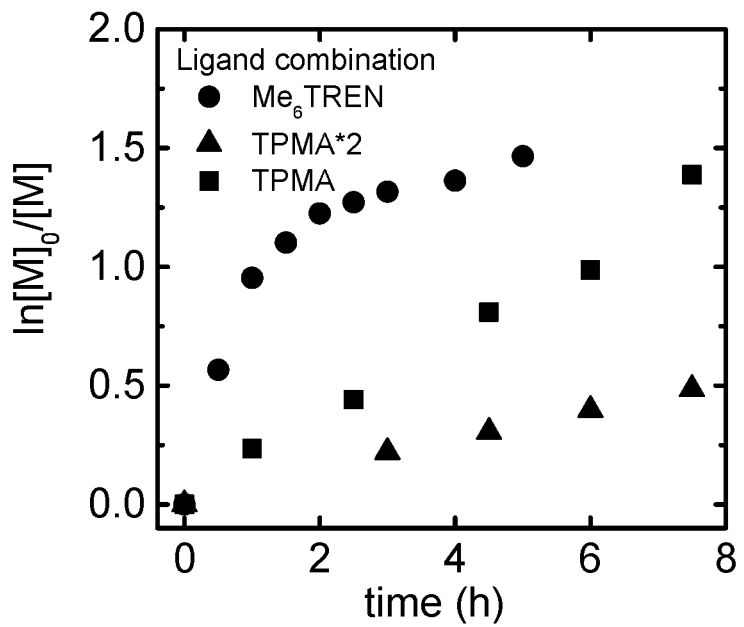
FIG. 5A is a graph of logarithmic kinetic plot of a miniemulsion electro-ATRP (eATRP) of n-butyl acrylate (n-BuA) with three different ligands (L=$Me_6TREN$, TPMA*2, and TPMA)
Figure 5B:
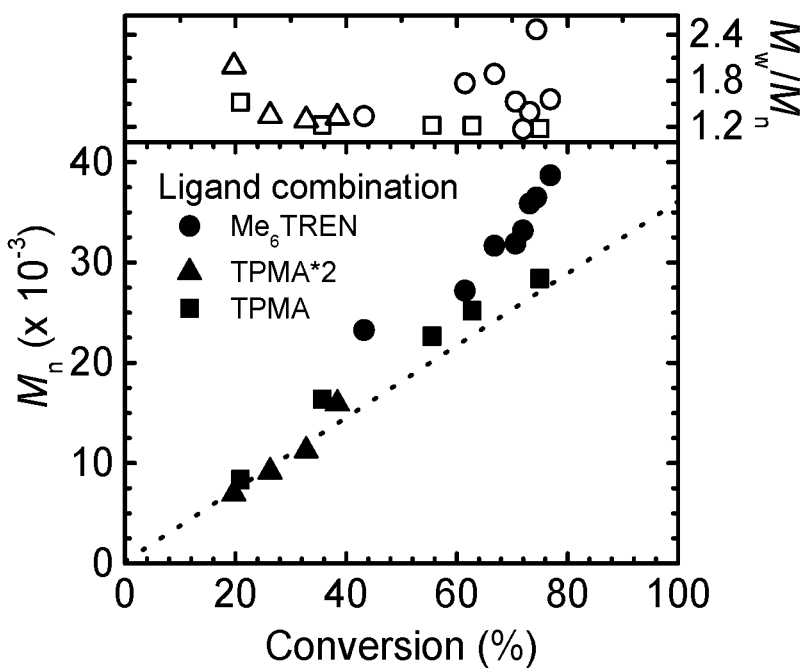
FIG. 5B is graph of a molecular weight (MW) and dispersity (Đ) evolution vs. monomer conversion of a miniemulsion electro-ATRP (eATRP) of n-butyl acrylate (n-BuA) with three different ligands (L=$Me_6TREN$, TPMA*2, and TPMA). For FIGS. 5A-B, the reaction conditions are as follows: [n-BuA]/[EBiB]/[$Cu^{II}Br_2/2L$]=280/1/0.2, [n-BuA]=1.4 M, [$Cu^{II}Br_2/2L$]=1.00 mM, T=65° C., [NaBr]=0.1 M, [SDS]=38 mM, [HD]=85 mM, $E_{app}=E_{pc}-35$ mV (except $Cu^{II}Br_2/Me_6TREN$ complex: $E_{app}=E_{pc}+120$ mV), Table 3, entries 3-5, (Ratio of Catalyst:SDS=1:38)

As shown in FIG. 5A, the rate of polymerization may be dependent on the selected ligand and resulting catalyst complex structure. It was determined that a miniemulsion eATRP could be controlled, at differing levels, using only a hydrophilic catalyst system (Table 3, FIGS. 5A-B). The catalysts interacted with SDS to form an ionic complex that could enter the hydrophobic monomer droplets.

TABLE 3 eATRP of n-BuA in Miniemulsion with Different Catalysts (Shown in landscape orientation)

| Entry | Time (h) | [M]/[R-X]$^a$/ [Cu$^{II}$Br$_2$]/ [L$_{aq}$]$^b$/[L$_{org}$]$^c$ | L$_{aq}$$^b$ | L$_{org}$$^c$ | $E_{app}$$^d$ (vs. Ag/AgI/I$^-$) | Q$^e$ (C) | Conv$^f$ (%) | k$_p^{app\,g}$ (h$^{-1}$) | M$_{n,app}$$^h$ (× 10$^{-3}$) | M$_{n,th}$$^i$ (× 10$^{-3}$) | Đ$^h$ |
|---|---|---|---|---|---|---|---|---|---|---|---|
| 1 | 7.5 | 280/1/0.20/0.40/- | TPMA | — | $E_{pc}$ − 35 mV | 16.2 | 90 | 0.604 | 27.8 | 32.7 | 4.77 |
| 2 | 1.5 | 280/1/0.20/0.40/- | Me$_6$TREN | — | $E_{pc}$ − 35 mV | 7.3 | 93 | n/a$^i$ | 59.5 | 33.8 | 1.94 |
| 3 | 5 | 280/1/0.20/0.40/- | Me$_6$TREN | — | $E_{pc}$ + 120 mV | 4.6 | 77 | 0.548 | 38.7 | 27.9 | 1.56 |
| 4 | 7.5 | 280/1/0.20/0.40/- | TPMA*2 | — | $E_{pc}$ − 35 mV | 3.3 | 38 | 0.066 | 15.9 | 14.1 | 1.32 |
| 5 | 7.5 | 280/1/0.20/0.40/- | TPMA | — | $E_{pc}$ − 35 mV | 3.9 | 75 | 0.178 | 28.4 | 27.3 | 1.18 |
| 6 | 7.5 | 280/1/0.34/0.67/- | TPMA | — | $E_{pc}$ − 35 mV | 4.8 | 87 | 0.272 | 33.7 | 31.9 | 1.16 |
| 7 | 7.5 | 280/1/0.09/0.17/- | TPMA | — | $E_{pc}$ − 35 mV | 2.6 | 60 | 0.144 | 24.6 | 21.8 | 1.19 |
| 8 | 7.5 | 280/1/0.20/0.40/- | TPMA | — | $E_{pc}$ − 90 mV | 7.9 | 79 | 0.206 | 32.3 | 28.7 | 1.24 |
| 9 | 7.5 | 280/1/0.20/0.40/- | TPMA | — | $E_{pc}$ − 15 mV | 0.9 | 68 | 0.137 | 28.6 | 24.5 | 1.24 |
| 10 | 7.5 | 100/1/0.07/0.14/- | TPMA | — | $E_{pc}$ − 35 mV | 4.9 | 80 | 0.217 | 10.7 | 10.6 | 1.26 |
| 11 | 7.5 | 500/1/0.36/0.72/- | TPMA | — | $E_{pc}$ − 35 mV | 1.8 | 47 | 0.086 | 31.6 | 30.2 | 1.09 |
| 12 | 7.5 | 280/1/0.20/0.40/- | TPMA | — | $E_{pc}$ − 35 mV | 3.8 | 75 | 0.199 | 25.9 | 27.3 | 1.15 |
| 13 | 7.5 | 280/1/0.20/0.40/- | TPMA | — | Galvanostatic Conditions$^k$ | — | 77 | 0.226 | 26.2 | 27.8 | 1.09 |
| 14 | 7.5 | 100/1/0.07/0.14/- | TPMA | — | $E_{pc}$ − 35 mV | 12.1 | 78 | 0.212 | 10.2 | 10.3 | 1.16 |
| 15 | 7.5 | 80$^1$/1/0.06/0.12/- | TPMA | — | $E_{pc}$ − 35 mV | 2.1 | 83 | 0.242 | 21.5 | 21.1 | 1.19 |
| 16 | 7.5 | 80$^1$/1/0.06/0.12/- | TPMA | — | $E_{pc}$ − 35 mV | 4.8 | 80 | 0.211 | 17.5 | 18.4 | 1.16 |
| 17 | 24 | 283/1/0.28/0.32/0.28 | BPMEA | BPMODA* | $E_{pc}$ − 80 mV | 5.8 | 61 | 0.038 | 31.8 | 22.6 | 1.25 |

Entries 1-10 and 13 were carried out under conventional eATRP potentiostatic conditions (WE=Pt mesh, CE=Pt mesh separated from the reaction solution by the supporting electrolyte saturated Tylose gel, RE=Ag/AgI/I⁻); entries 11, 14 and 15 were carried out under seATRP under potentiostatic conditions (WE=Pt mesh, CE=Al wire (l=10 cm, d=1 mm), RE=Ag/AgI/I⁻): Entry 13 is a seATRP conducted under galvanostatic conditions. General reaction conditions: T=65° C. (except entry 17: T=60° C.); $V_{tot}$=40 mL, [n-BuA]=1.4 M (except entry 15: [tBA]=0.7 M and entry 16: [tBA]=1.1 M), [Cu$^{II}$Br$_2$/2L]=1.00 mM (except entry 6: [Cu$^{II}$Br$_2$/2L]=1.67 mM, entry 7: [Cu$^{II}$Br$_2$/2L]=0.43 mM, and entry 17: [Cu$^{II}$Br/L$_{aq}$]=1.40 mM, [Cu$^{II}$Br$_2$/L$_{org}$]=1.00 mM), [NaBr]=0.1 M (except entry 1: [Brij 98]=9.6 mM), [SDS]=38 mM (except entry 1: [Brij 98]=9.6 mM and entry 17: [SDS]=29 mM), [HD]=85 mM (except entry 17: [HD]=43 mM). $^a$[R—X]=EBiB (except entry 15 and 16: [R—X]=PBA-Br macroinitiator ($M_n$=10 240, Đ=1.16)). $^b$Ligand used to prepare the aqueous phase catalyst. $^c$Ligand used to prepare the organic phase catalyst. $^d$E$_{app}$ were selected based on CV analysis (v=100 mV/s). $^e$Determined from the chronoamperometry recorded during electrolysis. $^f$Determined by gravimetric analysis. $^g$The slope of the ln([M]$_0$/[M]) vs. time plot. $^h$Determined by THF GPC with polystyrene standards. $^i$M$_{n,th}$=[M]/[EBiB]×MM$_M$×conversion+MM$_{EBiB}$. $^j$n/a=not available. $^k$I$_{app}$=(−) 0.32 mA, (−) 0.16 mA, (−) 0.13 mA, and (−) 0.11 mA for each steps. $^l$M=tBA. Entry 17 from *Macromol.* 2016, 49 (23) 8838 reference.

1 B) Influence of Catalyst Concentration.

Figure 6A:
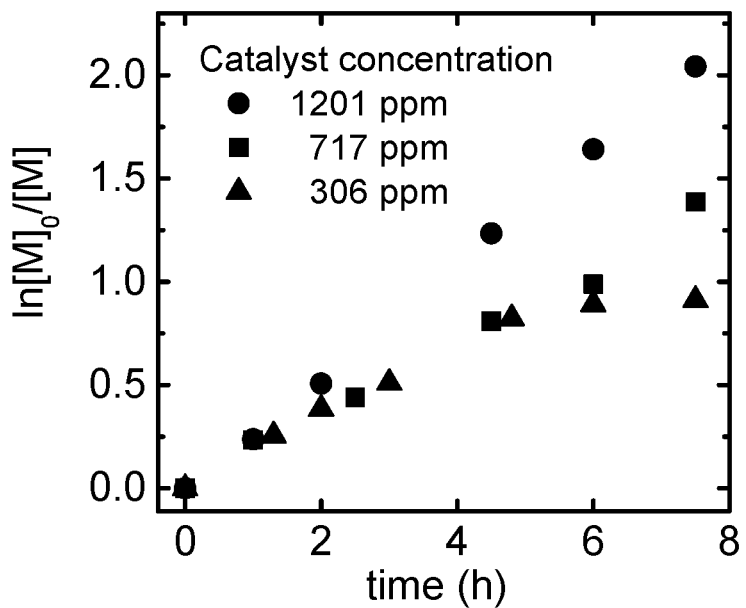
FIG. 6A is a graph of a logarithmic kinetic plot of a miniemulsion eATRP of n-BuA as a function of catalyst concentration, [Br—$Cu^{II}/2TPMA$]
Figure 6B:
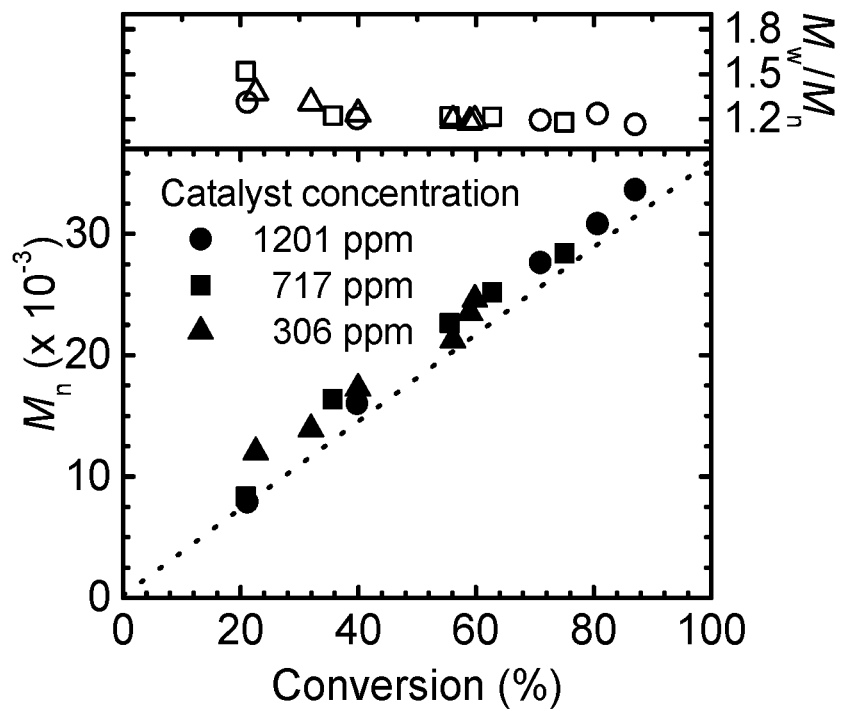
FIG. 6B is a MW and Đ evolution vs. monomer conversion of a miniemulsion eATRP of n-BuA as a function of catalyst concentration, [Br—$Cu^{II}/2TPMA$]. For FIGS. 6A-B, the reaction conditions are as follows: [n=BuA]/

The next series of polymerizations were designed to examine the influence of the concentration of X—Cu$^{II}$/TPMA in a single catalyst complex miniemulsion eATRP over the range from 1201 to 306 ppm catalyst, calculated for the molar ratio in entries 5-7 in Table 3, with the results shown in FIGS. 6A-B. Higher concentrations of copper catalyst should yield a faster polymerization rate, R$_p$, in electrochemically mediated ATRP methods, because the R$_p$ is proportion to the square root of [X—Cu$^{II}$/L] according to equation 1.

$$R_p = k_p[M][P\cdot] = k_p[M]K_{ATRP}\frac{[P-X][Cu^I/L]}{[X-Cu^{II}/L]},\quad \text{Equation (1)}$$

where $$[P\cdot] = \sqrt{\frac{k_{red}[X-Cu^{II}/L]}{k_t}},$$

(k$_{red}$ denotes reduction rate constant).

An increase in R$_p$ reflects a higher [P*], which may be a result of faster reduction rates generating more Cu$^I$/L. [*Polymer* 2016, 88, 36-42.] Similar to other literature accounts, [*Macromol.* 2013, 46, 4346-4353; *Macromol. Chem. Phys.* 2008, 209, 1797-1805; *Macromolecules* 2010, 43, 9682-9689; *Science* 2011, 332 (6025), 81; *Polymer* 2015, 77, 266-271; *AIChE Journal* 2015, 61, 4347-4357; *Chemical Papers* 2016, 70, 1228-1237; *Express Polymer Letters* 2016, 10, 810-821.] it was observed that as the initial [X—Cu$^{II}$/L]$_0$ increases, the rate of polymerization increases with an approximately square root dependence on the catalyst concentration, as illustrated in FIG. 6A. Higher catalysts loadings showed narrower molecular weight distributions as illustrated in FIG. 6B, because the polymer's dispersity may be inversely proportional to [X—Cu$^{II}$L] in agreement with equation 2.

$$\frac{M_w}{M_n} = 1 + \left(\frac{k_p[P-X]}{k_{da}[Cu^{II}]}\right)\left(\frac{2}{p} - 1\right)\quad \text{Equation (2)}$$

where p denotes monomer conversion.

1 C) Effect of E$_{app}$ on Miniemulsion eATRP.

The polymerization rate could also be modulated by changing the energy of the electrode/water interface, which can be achieved by changing E$_{app}$. Therefore, a series of miniemulsion polymerizations was carried out at different E$_{app}$; Table 3, entries 5, 8 and 9 and shown in the different positions in the CV in FIG. 7A. Regardless of the applied potential, a fast decay of the current was observed in the early stages of polymerization under potentiostatic conditions. This indicated effective conversion of X—Cu$^{II}$/L to Cu$^I$/L until the [Cu$^{II}$]/[Cu$^I$] ratio in the contacting stirred solution reached the steady state. A more negative E$_{app}$ produced larger initial currents and faster reduction rates, however, once steady-state conditions were reached, where [P$_n$—X], [P$_n$*], [Cu$^I$L], and [X—Cu$^{II}$/L] are all at equilibrium, and fairly constant currents were observed. For each of the three selected E$_{app}$, M$_n$ increased linearly with monomer conversion and matched the theoretical values (M$_{n,th}$). Polymers with narrow molecular-weight distributions were obtained, indicating uniform growth of all polymer chains, as illustrated in FIGS. 7B-C. As expected, more reducing conditions resulted in an increased reaction rate: k$_p^{app}$ gradually increased with decreasing E$_{app}$ (k$_p^{app}$=0.137, 0.178, and 0.206 h$^{-1}$ for E$_{pc}$−15 mV, E$_{pc}$−35 mV, and E$_{pc}$−90 mV, respectively; Table 3, entries 5, 8, and 9.)

1 D) Effect of Targeting Different DPs.

To test the versatility of miniemulsion eATRP, polymerizations with different targeted DP were carried out by varying the amount of initiator with X—Cu$^{II}$/TPMA at E$_{app}$=E$_{pc}$−35 mV; entries 5, 10 and 11 in Table 3, with the results summarized in FIGS. 8A-B. These polymerizations were performed at three different ratios of [M]$_0$/[EBiB]$_0$=100, 280, and 500, targeting different DPs. The polymerizations were well-controlled and showed linear first-order kinetics as illustrated in FIG. 8A, with M$_n$ matching the theoretical values, and low Đ as illustrated in FIG. 8B. In each case, GPC traces showed a clear peak shift from low to high molar mass as the polymerization progressed. A slightly higher k$_p^{app}$ and 77% of monomer conversion was obtained for the polymerizations carried out with the highest concentration of EBiB (DP=100; compare k$_p^{app}$; Table 3, entry 10 vs. entries 5 and 11), in agreement with equation 1.

1 E) Simplification of the eATRP Reaction Setup (seATRP). Miniemulsion Polymerization by seATRP: i.e. with a Single Catalyst Complex Conducted Under Potentiostatic Conditions.

A stock solution of n-BuA (8 mL, 55.55 mmol), EBiB (29 µL, 1.98×10$^{-1}$ mmol, to target degree of polymerization (DP)=280; the amount of EBiB was adjusted for different targeted DPs), and HD (1 mL, 3.40 mmol) was prepared. Cu$^{II}$Br$_2$ (8.9 mg, 0.04 mmol; (the amount of Cu$^{II}$Br$_2$ was adjusted to provide different catalyst concentrations) TPMA (23.1 mg, 0.08 mmol; (other ligands were also examined: TPMA*2 and Me$_6$TREN), NaBr (412 mg, 4 mmol), and SDS (440 mg, 1.53 mmol) were dissolved in 32 mL of distilled water. The organic and aqueous solutions were mixed, total volume≈40 mL, then the mixture was placed in an ice bath, and dispersed by a probe sonicator, amplitude=70% for 15 min; application and rest time of 1 s each. Nitrogen was bubbled through the miniemulsion suspension for 40 min, prior to recording a CV at 100 mV/s with a Pt disk WE, and the same Pt mesh/Al wire CE and RE described above. The CV allowed for accurate selection of the correct applied potential ($E_{app}=E_{pc}-90$ mV, $E_{pc}-35$ mV or $E_{pc}-15$ mV). A Pt mesh (geometrical area ca. 6 cm$^2$) WE was used for electrolysis under proper $E_{app}$. Samples were withdrawn periodically to follow the monomer conversion by gravimetric analysis, while $M_n$ and $M_w/M_n$ were determined by GPC.

1 F) Miniemulsion Polymerization by seATRP with Single Catalyst Under Galvanostatic Conditions.

The first seATRP polymerization was carried out under potentiostatic conditions and the passed charge, (Q) value, was determined by utilizing the Gamry Echem Analysis program and the proper applied current values were calculated based on 1=Q/t for each step. An identical reaction mixture was prepared and seATRP was carried out under multiple applied currents ((−) 0.32 mA, (−) 0.16 mA, (−) 0.13 mA, and (−) 0.11 mA). Samples were withdrawn periodically to follow the monomer conversion by gravimetric analysis, while $M_n$ and $M_w/M_n$ were determined by GPC. The results of a simplified polymerization under potentiostatic conditions with a Pt mesh WE, a sacrificial Al CE, and Ag/AgI/I$^-$ RE are shown in Table 3 entry 12, and in FIGS. 9A-B. A first-order kinetic plot was observed with linear MW evolution as the polymerization progressed forming polymers with a narrow molecular weight distribution (MWD) as illustrated in FIG. 9B.

The theoretical amount of Al$^{3+}$ in the reaction mixture calculated from chronoamperometry, (CA), i.e., [Al$^{3+}$]=Q/F/3, corresponds to the maximal concentration of Al in solution which should be 47 ppm The Cu concentration, calculated from the initial catalyst loading, was 218 mg Cu/kg polymer. According to UV-Vis spectra, the residual amount Cu in isolated polymers was 11 and 10 mg Cu/kg polymer, respectively. These values are significantly lower than the initial amount of Cu, indicating significant reduction of residual metals during simplified polymer purification by passing through alumina column and/or precipitation in methanol/water mixtures. Furthermore, these results demonstrate the advantage of single catalyst method in relation to the dual catalyst method in which the initial Cu concentration was 532 ppm, and the residual Cu in isolated polymer was 77 mg Cu/kg polymer.

A multi-step current procedure was developed and applied to the reaction mixture in order to improve control, and avoid undesirable Cu deposition. Four constant $I_{app}$ values were used for the polymerization under galvanostatic conditions; $I_{app,1}$=(−) 0.32 mA (for 0.33 h), $I_{app,2}$=(−) 0.16 mA (for 2.28 h), $I_{app,3}$=(−) 0.13 mA (for 2.56 h), and $I_{app,4}$=(−) 0.11 mA (for 2.33 h) (Table 3 entries 12 vs. 13 and FIGS. 9A-B. The values for MW evolution and MWD observed for seATRP under galvanostatic conditions as compared to polymerizations conducted under potentiostatic conditions were similar.

1 G) Chain Extension from PBA Macroinitiator with Tert-Butyl Acrylate (BA).

The PBA-Br macroinitiator was prepared via seATRP method as described above, with single catalyst under potentiostatic conditions. Polymerization conditions: [n-BuA]/[EBiB]/[Cu$^{II}$Br$_2$/2TPMA]=100/1/0.07, [n-BuA]=1.4 M, [Cu$^{II}$Br$_2$/2L]=1.00 mM, T=65° C., [NaBr]=0.1 M, [SDS]=38 mM, [HD]=85 mM, $E_{app}=E_{pc}-35$ mV (vs. Ag/AgI/I$^-$), WE=Pt mesh, CE=Al wire, and RE=Ag/AgI/I$^-$.

The polymerization was stopped after 7.5 h of reaction, and the reaction mixture was divided into 2 parts. The first part was used for in situ chain extension with tBA (section 1 G a), while the second part of the macroinitiator was obtained after precipitation, dried at 100° C. for 1 day, dissolved in THF, precipitation in methanol/water mixture three times, passed through a neutral alumina column in order to remove catalyst, and dried under vacuum for 2 days and then was used for chain extension with tBA (section 1 G b).

1 G a)

For the in situ chain extension experiment, the miniemulsion sample containing the macroinitiator and tBA solutions were mixed (total volume≈40 mL), placed in an ice bath, and dispersed by a probe sonicator, amplitude=70% for 15 min; (application and rest time of 1 s each). Nitrogen was bubbled through the miniemulsion solution for 40 min. The chain extension with tBA was carried out under the following reaction conditions: [n-BuA]/[PBA-Br]/[Cu$^{II}$Br$_2$/2TPMA]=80/1/0.06, [tBA]=0.7 M, [Cu$^{II}$Br$_2$/2L]=1.00 mM, T=65° C., [NaBr]=0.1 M, [SDS]=38 mM, [HD]=85 mM, $E_{app}=E_{pc}-35$ mV, WE=Pt mesh, CE=Al wire, and RE=Ag/AgI/I$^-$. The polymerization was continued for 7.5 h. Samples were withdrawn periodically to follow the monomer conversion by gravimetric analysis, while $M_n$ and $M_w/M_n$ were determined by GPC. The conversion of the second block reached 83% after 7.5 h. The chain extended block copolymer, PBA$_{78}$-b-P(tBA$_{67}$-stat-BA$_{18}$), had a $M_{n,app}$ of 21,500 and a $M_w/M_n$ of 1.19 ($M_{n,theory}$=21,100). Linear first-order kinetics was observed as illustrated in FIG. 10A, and GPC traces indicated successful incorporation of the second monomer, as a clean shift in the MW peak toward higher MW was observed as illustrated in FIG. 10B. The MW evolution with conversion closely followed theoretical MW indicating high initiation efficiency. This result confirms that the halogen end groups were preserved during the single catalyst miniemulsion eATRP of n-BuA.

Addition of the second monomer without sonication would set up the procedure discussed in references *J. Am. Chem. Soc.* 2006, 128, 10521-10526 and WO2007025086 that was named an ab initio emulsion system and used to form block copolymers.

1 G b)

The second chain extension experiment was carried out via seATRP method as described above (see procedure for seATRP with single catalyst under potentiostatic conditions) under the following reaction conditions: [n-BuA]/[PBA-Br]/[Cu$^{II}$Br$_2$/2TPMA]=80/1/0.06, [tBA]=1.1 M, [Cu$^{II}$Br$_2$/2L]=1.00 mM, T=65° C., [NaBr]=0.1 M, [SDS]=38 mM, [HD]=85 mM, $E_{app}=E_{pc}-35$ mV (vs. Ag/AgI/I$^-$), WE=Pt mesh, CE=Al wire, and RE=Ag/AgI/I$^-$. The polymerization was stopped after 7.5 h. Samples were withdrawn periodically to follow the monomer conversion by gravimetric analysis, while $M_n$ and $M_w/M_n$ were determined by GPC. A first-order kinetic plot was observed indicating linear evolution of $M_n$ as illustrated in FIG. 11A, with low $M_w/M_n$ values as the symmetrical GPC curves illustrated in FIG. 11B which also show a clean shift to higher MW as the polymerization progresses further indicating high retention of chain end functionality.

In one example, electrochemically mediated miniemulsion ATRP of n-BuA was investigated using eATRP in dispersed media under a variety of conditions, including ligand structure, catalyst concentration, and monomer to macroinitiator molar ratio providing targeted DP, in addition to confirming high retention of chain end functionality by chain extension to form a block copolymer.

Selection of the proper single catalyst systems combination was necessary to obtain a fast and controlled miniemulsion eATRP. The best polymerization results were obtained with a ratio of $Cu^{II}Br_2$/TPMA of 1:2, which interacted with an added anionic surfactant and produced stable latexes and produced well-defined polymers with different targeted DPs in the dispersed surfactant stabilized particles. The reaction rate was enhanced and modulated by changing $E_{app}$, i.e. by changing the energy of the electrode/water interface.

The polymers were also prepared via seATRP under both potentiostatic and galvanostatic conditions. The use of a multi-step current galvanostatic two electrode procedure provided identical results to polymerizations carried out under potentiostatic conditions, with both cases giving polymers with molecular weight evolution close to theoretical values and generating polymers with narrow molecular weight distribution.

Chain extension and formation of the block copolymers confirmed the living nature of the seATRP of acrylates in miniemulsion system.

Particle/droplet size analysis, discussed below, showed that miniemulsion particles were stable during the eATRP and seATRP and are polymerizing in a miniemulsion manner under the influence of the hydrophilic catalyst based ionic complex.

1 H) Particle Diameter Analysis.

Dynamic light scattering (DLS) analysis showed that miniemulsion particles were stable during the (s)eATRP, Table 4 shows that particle size was very similar before and after the polymerization, consistent with a miniemulsion polymerization mechanism whereby, ideally, each monomer droplet can be converted to the corresponding polymer particle.

TABLE 4

Particle diameters measured by DLS.

| Entry (according to Table 1) | Before polymerization $d_n$ (nm) | Before polymerization $d_v$ (nm) | After polymerization $d_n$ (nm) | After polymerization $d_v$ (nm) |
|---|---|---|---|---|
| 1 | 177 ± 7 | 350 ± 13 | 179 ± 3 | 327 ± 15 |
| 2 | 60 ± 4 | 102 ± 1 | 69 ± 4 | 403 ± 30 |
| 3 | 72 ± 2 | 117 ± 2 | 69 ± 4 | 115 ± 1 |
| 4 | 34 ± 2 | 248 ± 5 | 51 ± 5 | 437 ± 10 |
| 5 | 65 ± 2 | 132 ± 1 | 63 ± 2 | 126 ± 2 |
| 6 | 106 ± 1 | 184 ± 4 | 108 ± 5 | 186 ± 2 |
| 7 | 65 ± 2 | 105 ± 1 | 67 ± 1 | 105 ± 1 |
| 8 | 115 ± 2 | 156 ± 1 | 122 ± 3 | 156 ± 2 |
| 9 | 111 ± 7 | 183 ± 4 | 114 ± 1 | 174 ± 1 |
| 10 | 63 ± 3 | 115 ± 1 | 66 ± 2 | 117 ± 1 |
| 11 | 54 ± 2 | 97 ± 3 | 57 ± 1 | 100 ± 1 |
| 12 | 95 ± 5 | 153 ± 2 | 96 ± 4 | 155 ± 2 |
| 13 | 60 ± 2 | 91 ± 1 | 56 ± 2 | 89 ± 2 |
| 14 | 73 ± 3 | 126 ± 4 | 63 ± 3 | 120 ± 1 |
| 15 | 64 ± 20 | 115 ± 13 | 70 ± 3 | 130 ± 1 |
| 16 | 63 ± 5 | 115 ± 5 | 65 ± 0 | 115 ± 1 |
| 17 | 52 ± 4 | 91 ± 2 | 98 ± 22 | 101 ± 25 |

In practice, it is known, that an ideal system, a so-called "one-to-one copy", can be extremely difficult to achieve [*Progress in Polymer Science* 2002, 27, 1283-1346.] although there are claims in the literature of systems that may come close. [*Macromol.* 2014, 47, 6230-6237; *Macromol.* 2010, 43, 7905-7907; *Macromol Rapid Comun.* 2010, 31, 558-562.] This system may be close to ideal even with the presence of a dynamic surfactant/catalyst latex particle interphase.

Example 2. Activator Regenerated by Electron Transfer (ARGET) ATRP of n-BuA in a Miniemulsion Polymerization General Procedure:

The desired amount of NaBr, surfactant, water, $[Cu^{II}L]^{2+}$, n-butyl acrylate (n-BuA) (purified by passing through a column filled with active basic $Al_2O_3$), hexadecane (HD), EBiB were put in a vial. Stock aqueous solutions of the copper complexes with the selected ligands were previously prepared. The final mixture of the two solutions ($V_{tot}$=10 mL) was placed in an ice bath and subjected to ultrasonication using a sonicator with a microtip at 70% amplitude for 30 minutes. Three drops of the sonicated emulsion dissolved in 1 mL of water were used for the DLS measurement of the particles size. The remaining solution was moved into a Schlenk flask and purged with nitrogen for 30 minutes. Meanwhile, a stock solution of ascorbic acid (AA) in water (0.02 M) (the AA solution was freshly prepared every week to avoid decomposition and evaporation problems) was also degassed. After 30 minutes the sealed Schlenk flask was placed in an oil bath set at T=65° C. The selected amount of AA was withdrawn from the stock solution with a syringe and injected dropwise (over 3 minutes) into the miniemulsion suspension to begin the polymerization.

TABLE 5

ARGET ATRP of n-BuA in miniemulsion, with AA as reducing agent, T = 65° C.[a] (Pictured in landscape orientation).

| Entry | Ligand | $C_{AA}/C_{Cu(II)}$ | [b]Surfactant | t (h) | Conv. (%) | $k_p^{app}$ ($h^{-1}$) | $M_{n,th}$ | $M_n$ | Đ | $d_{Z-ave}$ (nm)[b] |
|---|---|---|---|---|---|---|---|---|---|---|
| 1 | TPMA | 0.5 | SDS | 6 | 66 | 0.25 | 24.4 | 30.9 | 1.17 | 116.8 ± 1.9 |
| 2 | TPMA[c] | 0.5 | SDS | 5 | 70 | 0.31 | 25.7 | 24.1 | 1.14 | 151.6 ± 1.1 |
| 3 | TPMA | 0.5 | SDBS | 3 | 84 | 0.63 | 30.7 | 29.8 | 1.32 | 153.4 ± 0.5 |
| 4 | TPMA | 0.5 | SDS + SDA[d] | 5 | 74 | 0.31 | 27.2 | 27.4 | 1.25 | 272.6 ± 3.2 |
| 5 | **TPMA *2** | 0.5 | SDS | 3 | 40 | 0.21 | 9.79 | 10.0 | 1.22 | 114.5 ± 0.9 |
| 6 | PMDETA | 0.5 | SDS | 2 | 79 | 1.42 | 29.1 | 38.5 | 5.02 | 161.3 ± 1.3 |
| 7 | Me$_6$TREN | 0.5 | SDS | 1.1 | 87 | 2.21 | 32.5 | 32.8 | 2.78 | 152.2 ± 1.9 |

TABLE 5-continued

ARGET ATRP of n-BuA in miniemulsion, with AA as reducing agent, T = 65° C.[a] (Pictured in landscape orientation).

| Entry | Ligand | $C_{AA}/C_{Cu(II)}$ | [b]Surfactant | t (h) | Conv. (%) | $k_p^{app}$ ($h^{-1}$) | $M_{n,th}$ | $M_n$ | Đ | $d_{Z-ave}$ (nm)[b] |
|---|---|---|---|---|---|---|---|---|---|---|
| 8 | Me$_6$TREN | 0.25 | SDS | 1 | 93 | 3.29 | 35.1 | 38.4 | 1.82 | 143.7 ± 1.6 |
| 9 | Me$_6$TREN | 0.125 | SDS | 2 | 87 | 1.30 | 32.0 | 32.1 | 2.36 | 132.6 ± 0.4 |

[a]$C_{n\text{-}BuA}/C_{EBiB}/C_{NaBr}/C_{[Cu}{}^{II}{}_L]^{2+}$ = 278/1/20/0.2, n-BuA 20% (v/v) in H$_2$O, $C_{surf}$ = 4.6 wt % rel to n-BuA, $C_{HD}$ = 10.8 wt % rel to n-BuA, $V_{tot}$ = 10 mL. AA added dropwise in 3 min.
[b]Particles size at the end of the polymerization, measured by DLS.
[c]Et$_4$NBr used instead of NaBr.
[d]$C_{surf}$ = $C_{SDS}$ + $C_{DA}$ = 4.6 + 0.5 wt % rel to n-BuA. (Sodium dodceylbenzenesulfonate (SDBS) and Sodium dodecanoate (SDA))

In one aspect, the surfactant has to be anionic in order to effectively interact with the cationic catalyst, therefore, different anionic surfactants were evaluated for ionic complex formation: SDS, sodium dodecylbenzene sulfonate (SDBS), and sodium dodecanoate (SDA).

SDBS provided a fast polymerization, reaching 84% conversion in 3 h (Table 5 entry 3), albeit with slightly higher Đ=1.32, than with SDS under identical conditions. The higher polymerization rate and the slight decrease in control may be caused by a weaker interaction between Br—Cu$^{II}$TPMA$^+$ and SDBS, leading to a lower amount of the Cu$^{II}$ species inside the droplets.

SDA alone could not stabilize the n-BuA miniemulsion, therefore a combination of SDS and SDA was tested (4.6 wt % SDS+0.5 wt % SDA relative to n-BuA. The obtained miniemulsion was stable, but particle size increased to 270 nm (almost twice larger than with other surfactants). Polymerization was slightly faster than with SDS alone, with Đ=1.25. Therefore, SDA can be used to tune the particle size without destabilizing the final latex.

Finally, the amount of SDS was varied to change latex properties and polymerization kinetics. By lowering SDS, $k_p^{app}$ decreased and first-order kinetics deviated from linearity. However, a controlled polymerization was obtained with SDS as low as 1.15 wt % relative to monomer, which is below the CMC of the surfactant in the polymerization media; CMC=8.9 mM for SDS in water+0.1 M NaBr, T=65° C., which corresponds to 1.46 wt % relative to BA. However, reducing SDS resulted in decreased control because less ion complexes were formed and less catalyst was bound the surface of the droplets. Polymerization rate decreased because the droplets size increased, lowering the overall interfacial area, which slowed down the kinetics of mass transport. Nevertheless, the process remained controlled (Đ=1.1-1.3) and the final latexes were stable, meaning that the amount of SDS can be varied to tune particles dimension.

Similar rates and acceptable levels of control were observed with TPMA and TPMA*2 as ligands; whereas control with PMDETA and Me$_6$TREN was poor and the resulting polymers had higher dispersity. It follows that catalyst activity may not be a critical parameter under these conditions; conversely, catalyst interaction with the surfactant to form a stable catalyst ionic complex, and the consequent partition of the catalyst between the organic and aqueous phases are more important parameters. Three different anionic surfactants were tested and each provided good complexation with the catalyst generating an ionic complex capable of transporting a sufficient concentration of catalyst into the dispersed phase to provide a well-controlled ARGET ATRP.

In order to determine the reason for the poor performance of the active Me$_6$TREN catalyst the partition of the catalyst between pure water and SDS stabilized micelles was studied. The same electrochemical analysis was not performed in miniemulsion to evaluate the partition of the catalyst complex between water and monomer droplets in the eATRP procedure due to the rapid passivation of the electrode surface. However, it may be possible to estimate the repartition of the catalysts between the water phase and the surfactant molecules absorbed on the droplets or even inside the monomer droplets, by comparing the diffusion coefficients of the Cu complexes in miniemulsion and in pure water. The diffusion coefficient of the probe in miniemulsion environment can be experimentally determined by means of the Randles-Sevick equation. Considering the mentioned low reproducibility, the electrode surface was cleaned before any measure with different scan rate.

The diffusion coefficients of [BrCu$^{II}$TPMA]$^+$ and [BrCu$^{II}$Me$_6$TREN]$^+$ are reported in Table 6, Entries 2 and 3, in both pure water and in a miniemulsion, together with the corresponding computed fraction of the complex in the droplets. As expected from CVs shown in FIG. 12, the fraction of [BrCu$^{II}$TPMA]$^+$ interacting with the droplet is extremely high, as a result the signal intensity is dramatically low. Whereas the signal from the [BrCu$^{II}$Me$_6$TREN]$^+$ indicates that the complex may be less apt to enter the droplets and this may be in accordance with the higher polymerization rate and poor degree of control observed with this catalyst. Indeed, since the amount of the deactivating form of the catalyst complex inside the droplets may be small, radicals are not efficiently deactivated and high propagation rates and polymers with higher Đ are observed.

TABLE 6

Computed physical-chemical parameters for 1 mM [BrCu$^{II}$L]$^+$ in pure water, SDS micelles and in miniemulsion, T = 65° C.

| Entry | L | Environment | $10^6 D_{exp}$ (cm$^2$s$^{-1}$) | $10^6 D_w$ (cm$^2$s$^{-1}$) | $f_{d(m)}$ |
|---|---|---|---|---|---|
| 1 | TPMA | Micelles[a] | 3.44 | 60.3 | (0.96) |
| 2 | TPMA | Miniemulsion[b] | 0.44 | 60.3 | 0.99 |
| 3 | Me$_6$TREN | Miniemulsion[b] | 17.1 | 36.4 | 0.53 |

[a]water + 0.1 M NaBr + 10$^{-3}$ M [BrCu$^{II}$TPMA]$^+$ + 0.028 M SDS (measured in the previous month).
[b]$C_{n\text{-}BuA}/C_{NaBr}/C_{[Cu}{}^{II}{}_{Br_2]}/C_L$ = 280/20/0.2/0.4, n-BuA 19% (v/v) in H$_2$O, $C_{surf}$ = 6.2 wt % rel to n-BuA, $C_{HD}$ = 10.8 wt % rel to n-BuA, $V_{tot}$ = 20 mL.

The effect of changing the concentration of the surfactant in an ARGET ATRP miniemulsion was also examined and the results are provided in Table 7.

TABLE 7

Effect of changing the amount of SDS added to a miniemulsion ARGET ATRP of n-BuA, T = 65° C.[a]

| Entry | $C_{SDS}$ wt % rel to n-BuA | t (h) | Conv. (%) | $k_p^{app}$ (h$^{-1}$) | $M_{n,th}$ (kg mol$^{-1}$) | $M_n$ (kg mol$^{-1}$) | Đ | $d_{Z\text{-}ave}$ (nm)[b] |
|---|---|---|---|---|---|---|---|---|
| 1 | 9.2 | 4 | 81 | 0.50 | 29.7 | 30.2 | 1.12 | 105.9 ± 1.7 |
| 2[c] | 4.6 | 6 | 66 | 0.25 | 24.4 | 30.9 | 1.17 | 116.8 ± 1.9 |
| 3[c] | 2.3 | 13 | 74 | 0.11 | 27.0 | 30.2 | 1.30 | 161.2 ± 0.8 |
| 4[c] | 1.15 | 20 | 74 | 0.07 | 27.4 | 35.2 | 1.32 | 206.7 ± 2.3 |
| 5[d] | 4.6 | 4 | 96 | 0.76 | 35.1 | 44.0 | 1.46 | 4273 ± 24 |

[a]$C_{n\text{-}BuA}/C_{EBiB}/C_{NaBr}/C_{[Cu^{II}TPMA]^{2+}}$ = 280/1/20/0.2, n-BuA 20% (v/v) in H$_2$O, $C_{HD}$ = 10.8 wt % rel to n-BuA, $V_{tot}$ = 10 mL. AA added dropwise in 3 min, $C_{AA}/C_{Cu(II)}$ = 0.5.
[b]Particles size at the end of the polymerization, measured by DLS.
[c]syntheses performed prior month.
[d]no HD.

Particle size increased by lowering the amount of SDS and, while the initial rate of polymerizations were almost identical, the rate of polymerization slowed down as the reactions progressed for reactions with lower $C_{SDS}$, confirming the role of the surfactant in transferring the active catalyst complex into the dispersed droplets as illustrated in FIGS. 13A-B. Polymerizations with the two lowest $C_{SDS}$ provided polymers with slightly higher Đ but still good control over $M_n$. This can be attributed to slightly lower concentrations of the deactivator in the dispersed particles and hence addition of more monomer units during each activation cycle. Therefore, in one aspect, the amount of surfactant added to the reaction medium can be varied to tune the size of the final particles dimensions and Đ of the formed copolymers with lower concentrations of surfactant providing larger particles.

The role of the concentration of the soluble catalyst complex in the reaction medium and targeted degree of polymerization (DP) on reaction kinetics and level of control were also examined and the results are provided in Table 8.

TABLE 8

The effect of reducing $C_{Cu(II)}$ and increasing targeted DP in ARGET ATRP of n-BuA in miniemulsion at T = 65° C.[a]

| Entry | $C_{Cu(II)}$ (ppm) | DP | t (h) | Conv. (%) | $k_p^{app}$ (h$^{-1}$) | $M_{n,th}$ (kg mol$^{-1}$) | $M_n$ (kg mol$^{-1}$) | Đ | $d_{Z\text{-}ave}$ (nm)[b] |
|---|---|---|---|---|---|---|---|---|---|
| 1 | 360 | 283 | 4 | 70 | 0.34 | 25.9 | 34.1 | 1.24 | 125.6 ± 2.2 |
| 2[b] | 360 | 283 | 4 | 72 | 0.35 | 26.6 | 25.1 | 1.46 | 129.9 ± 3.0 |
| 3 | 144 | 283 | 4 | 71 | 0.31 | 26.1 | 36.7 | 1.65 | 121.3 ± 0.9 |
| 4 | 719 | 1000 | 20 | 71 | 0.07 | 91.6 | 101.8 | 1.25 | 126.4 ± 0.6 |

[a]$C_{n\text{-}BuA}/C_{EBiB}/C_{NaBr}$ = 278/1/20, n-BuA 20% (v/v) in H$_2$O, $C_{SDS}$ = 4.6 wt % rel to n-BuA, $C_{HD}$ = 10.8 wt % rel to n-BuA, $C_{AA}$ = 5 × 10$^{-3}$ M, $V_{tot}$ = 10 mL. AA added dropwise in 3 min, $C_{AA}/C_{Cu(II)}$ = 0.5.
[b]AA feedint rate: 0.74 μmol h$^{-1}$. $C_{AA}/C_{Cu(II)}$ = 1.

A relatively high Đ was observed in the experiment employing feeding of the AA, entry 2, which could be attributed to the higher $C_{AA}$ nevertheless, in this example, MW was well controlled. Interestingly, the final particles size can be almost the same when the targeted MW was higher but control was poor for the experiment with the lowest $C_{Cu(II)}$>=144 ppm (0.2 mM), entry3.

2 B) Determination of Particles Size.

The problems initially observed with the measurement of the particle size by DLS were decreased after polymerization, high dispersity and large volumes, by diluting the samples, 3 drops in 2 mL of water. Final particles sizes are reported in the following table, expressed by the Z-average value. Every measurement returned a dispersity value between 0.1 and 0.3. As an example of the general trend in Z-ave, particles number and volume, before and after the polymerization, is reported the complete set of parameters measured by DLS for the ARGET ATRP of n-BuA with 0.5 mM [Cu$^{II}$TPMA]$^{2+}$.

TABLE 9

DLS measurements of droplets/particles diameters for samples in Table 7a

| Before polymerization | | | | After polymerization | | |
|---|---|---|---|---|---|---|
| $d_{Z\text{-}ave}$ (nm) | $d_n$ (nm) | $d_v$ (nm) | Conv. (%) | $d_{Z\text{-}ave}$ (nm) | $d_n$ (nm) | $d_v$ (nm) |
| 114.1 ± 1.8 | 48.0 ± 7.3 | 97.3 ± 6.7 | 70 | 125.6 ± 2.2 | 79.0 ± 4.1 | 119.1 ± 1.0 |

The kinetic curves for the polymerizations conducted as part of the studies discussed in Tables 8 and 9 are shown in FIGS. 14A-F.

Example 3. ARGET ATRP of Butyl Methacrylate (BMA) in Miniemulsion Using a Single Catalyst Complex 3 A) Use of a Hydrophilic Catalyst, TPMA.

A series of experiments were conducted in order to identify the optimal initiator, ligand and conditions for addition of the reducing agent in order to attain a well-controlled polymerization.

The reaction conditions were: oil phase: [OIL]–[BMA]/[Initiator]=280/1/0.3/0.3 with 20 vol % BMA, HD—10.8 wt % (to BMA), SDS—4.6% (to BDA) and the aqueous phase [water]–[CuBr$_2$]=[TPMA]=1 nM (800 ppm to monomer); [NaBr]=0.1 M and T=65° C.

TABLE 10

ARGET ATRP of BMA in miniemulsion. (Shown in landscape orientation).

| Entry | Ligand/AA strategy/[Cu$^{II}$Br$_2$]/DP | Time (h) | [M]/[R-X] | [AA]/[Cu$^{II}$Br$_2$] | Conv[e] (%) | $k_p^{app\,f}$ (h$^{-1}$) | $M_{n,app}$ (× 10$^{-3}$) | $M_{n,th}$ (× 10$^{-3}$) | Đ[g] |
|---|---|---|---|---|---|---|---|---|---|
| 1 | EBiB | 20 | 280/1 | 0.5 | 2 | 0.002 | n/a | 1.0 | n/a |
| 2 | BPN | 3 | 280/1 | 0.5 | 48 | 0.220 | 97.0 | 19.4 | 1.95 |

TABLE 10-continued

ARGET ATRP of BMA in miniemulsion. (Shown in landscape orientation).

| Entry | Ligand/AA strategy/[Cu$^{II}$Br$_2$]/DP | Time (h) | [M]/[R-X] | [AA]/[Cu$^{II}$Br$_2$] | Conv$^e$ (%) | $h_p^{app\,f}$ (h$^{-1}$) | M$_{n,app}$ (× 10$^{-3}$) | M$_{n,th}$h (× 10$^{-3}$) | Đ$^g$ |
|---|---|---|---|---|---|---|---|---|---|
| 3 | EBPA | 2 | 280/1 | 0.5 | 34 | 0.249 | 14.6 | 13.8 | 1.13 |
| 4 | BPMODA* | 4.5 | 280/1 | 0.5 | 75 | 0.278 | 29.9 | 30.1 | 1.19 |
| 5 | Pump | 3 | 280/1 | 0.5 | 64 | 0.346 | 23.4 | 25.8 | 1.22 |
| 6 | 0.5 + 0.5 | 3 | 280/1 | 1 | 70 | 0.414 | 33.7 | 28.1 | 1.25 |
| 7 | Inj + pump | 2 | 280/1 | 0.8 | 79 | 0.975 | 32.0 | 31.7 | 1.25 |
| 8 | 0.4 per half hour | 1 | 280/1 | 0.8 | 82 | 1.602 | 36.3 | 32.9 | 1.26 |
| 9 | 200 ppm | 2 | 280/1 | 1.6 | 90 | 1.051 | 36.3 | 36.1 | 1.33 |
| 10 | 50 ppm | 2 | 280/1 | 1.6 | 77 | 0.716 | 31.6 | 30.9 | 1.31 |
| 11 | DP600 | 2.5 | 600/1 | 2 | 82 | 0.519 | 70.0 | 70.2 | 1.20 |
| 12 | DP1200 | 4 | 1200/1 | 3 | 76 | 0.375 | 118.6 | 129.3 | 1.42 |

General reaction conditions:
T = 65° C.; V$_{tot}$ = 10 mL, [BMA] = 1.4 M, [Cu$^{II}$Br$_2$/L] = 1.00 mM (except entry 9: [Cu$^{II}$Br$_2$/L] = 0.25 mM, entry 10: [Cu$^{II}$Br$_2$/2] = 0.0625 mM), [NaBr] = 0.1 M, [SDS] = 28 mM (4.6 wt % to monomer), [HD] = 85 mM (10.8 wt % to monomer).
$^e$Determined by gravimetric analysis.
$^f$The flope of the ln([M]$_0$/[M]) vs. time plot.
$^g$Determined by THF GPC with polystyrene standards.
$^h$M$_{n,th}$ = [M]/[I] × MM$_M$ × conversion + MM$_I$.

Sodium dodecyl sulfate (SDS) was used as active surfactant, as the presence of SDS facilitates the catalyst transfer from the aqueous phase to the organic phase (e.g., oil droplets). An excess of Br$^-$ in the aqueous phase suppresses the coordination between Cu$^{II}$ and the dodecyl sulfate anion, which helps maintain the concentration of the Cu$^{II}$Br$_2$/L deactivator and ensures the livingness of this polymerization.

3 B) Selection of the Appropriate Initiator.

Three different initiators, ethyl α-bromoisobutyrate (EBiB), α-bromopropionitrile (BPN), and ethyl α-bromophenylacetate (EBPA) were tested. Matching monomer with initiator can be essential in an ATRP since fast and quantitative initiation ensures that all the polymer chains start to grow in the same time. When employing low ppm (e.g., less than 1000 ppm) catalyst systems for solution ATRP the activity of initiator should be higher than that of the monomer. Under this condition, the propagated chain end can be less reactive than the initiator, so the monomer preferably adds to the initiator site, thus providing uniformity of initiation and low dispersity. EBPA, which can be a much more reactive initiator than EBiB, provided a polymer with the MW in excellent agreement with theoretical values indicating EBPA can work as a suitable initiator for BMA miniemulsion polymerization.

Several strategies for addition of ascorbic acid were examined and it was determined that periodic addition of ascorbic acid provided a controlled polymerization at an acceptable rate as illustrated in FIGS. 14A-B. The actual concentration of ascorbic acid (AA) should not exceed 0.5 equivalents of the added Cu$^{II}$ or the catalyst complex can be reduced too rapidly leading to a high concentration of radicals and thus high dispersity, due to termination reactions, therefore the upper limit of AA added to the reaction was 0.5 equivalents.

The effect of adding several different concentrations of copper were examined as illustrated in FIGS. 14C-D, in addition to targeting different degrees of polymerization as illustrated in FIGS. 14E-F.

In all examples polymers with narrow dispersity were obtained confirming that a single hydrophilic based ionic complex can be employed for a miniemulsion ARGET ATRP.

3 C) Comparison Example, Use of a Hydrophobic Catalyst BPMODA*.

A comparison experiment using a hydrophobic catalyst, BPMODA* was carried out under the following conditions: [Oil]–[BMA]/[EBPA]=280/1 (20 vol % BMA), [CuBr$_2$]=[BPMODA*]=0.01 mM, HD—10.8 wt % (to BMA), SDS—4.6 wt %/o (to BMA); [Water]–[NaBr]=0.1 M: T=65° C. The results are shown in FIGS. 15A-C. The experiment was conducted with 0.5 equivalents of ascorbic acid (AA), and gave clean shift of MW and low dispersity. However, the rate of polymerization may be slower than the situation where TPMA was selected as a hydrophilic ligand. This may be attributed to the slow reduction of Cu$^{II}$ since the reductant predominately resides in another phase. 0.5 equivalents of AA was added when using a hydrophobic catalyst and the reducing agent can be added at one time. The success of this approach with a hydrophobic catalyst complex can be attributed to the fact that AA and Cu$^{II}$/BPMODA* resided in different phases and the reduction was much slower than the reaction of AA with a hydrophilic catalyst complex, Cu$^{II}$/TPMA, which occurs in the aqueous phase. This relatively slow reaction between reductant and catalyst also provides a controlled polymerization, but the catalyst complex preferentially resides in the "product" and would have to be removed after post isolation of the polymer. ICP-MS measurements determined 4 mg Cu/kg polymer in the precipitated products, ten times higher than when Br—Cu$^{II}$TPMA$^+$/SDA (0.4 mg Cu/kg polymer) was employed.

3 D) Chain Extension Experiments.

To test the chain-end fidelity of the obtained polymers, a PBMA macroinitiator (PBMA-MI) was prepared by miniemulsion ARGET ATRP with Br—Cu$^{II}$TPMA$^+$/SDS. After purification, the macroinitiator had M$_{n,app}$=4000 and Đ=1.31. Chain extensions were performed with both n-BuA (Table 11, entry 1) and tert-butyl methacrylate (tBMA) (Table 11, entry 2). FIGS. 16A-B show the clean shift of MWs in both cases, with monomodal MW distributions, confirming the retention of chain-end functionality in the first macroinitiator block. The second block was also well-controlled, with Đ$_2$=1.34 for tBMA and Đ$_2$=1.15 for n-BuA, calculated as Đ−1=w$_1^2$(Đ$_1$−1)+w$_2^2$(Đ$_2$−1), where w is weight fraction and the subscripts indicate either the first or the second block. Thus, the PBMA-MI was successfully chain extended with both methacrylates and acrylates.

High chain-end fidelity indicated a well-controlled polymerization had occurred and motivated synthesis of 11 entry 4, with $M_{n,app}$ slightly higher than $M_{n,th}$. As discussed above, EBiB-type initiators are less efficient for methacrylates, which hamper simultaneous growth of all of the arms from the star core.

TABLE 11

Preparation of polymers with complex structures by ARGET ATRP in miniemulsion.[a]

| Entry | Initiator | Polymer | t (h) | Conv (%) | $k_p^{app}$ [b] ($h^{-1}$) | $M_{n,app}$ (× $10^{-3}$) | $M_{n,th}$ (× $10^{-3}$) | Đ | $d_Z$ [c] (nm) |
|---|---|---|---|---|---|---|---|---|---|
| 1[d] | PBMA-Br | PBMA-block-PBA | 2 | 30 | 0.195 | 13.0 | 11.7 | 1.10 | 118 ± 1 |
| 2[e] | PBMA-Br | PBMA-block-PtBMA | 1 | 30 | 0.35 | 16.1 | 12.6 | 1.19 | 119 ± 1 |
| 3[e] | β-CD-Br$_{14}$ | β-CD-star-PBA | 2 | 73 | 0.700 | 47.7 | 65.7 | 1.39 | 118 ± 2 |
| 4[e] | β-CD-Br$_{14}$ | β-CD-star-PBMA | 2 | 76 | 0.947 | 82.2 | 78.1 | 1.54 | 138 ± 2 |
| 5[f] | PBiBM$_{100}$ | PBiBM$_{100}$-graft-PBA | 4 | 94 | 0.44 | 357 | 125 | 1.29 | 194 ± 2 |
| 6[f] | PBiBM$_{100}$ | PBiBM$_{100}$-graft-PBA | 7 | 57 | 0.15 | 775 | 347 | 1.28 | 155 ± 1 |

[a] General conditions: monomer 20% v/v in $H_2O$ + 0.1 M NaBr, T = 65° C.; $V_{tot}$ = 10 mL, [Cu$^{II}$Br$_2$/TPMA] = 1 mM, [SDS] = 4.6 wt %, [hexadecane] = 10.8 wt % relative to monomer.
[b] The slope of the ln([M]$_0$/[M]) vs. time plot.
[c] Z-Average particle diameter by DLS before polymerization.
[d] AA feeding rate = 3 μmol/h.
[e] AA feeding rate = 2 μmol/h.
[f] AA feeding rate = 50 nmol/h.

polymers more complex architecture by miniemulsion ARGET ATRP, such as star and brush-like polymers. Exemplary multifunctional initiators for formation of star like and brush like macromolecules are shown below.

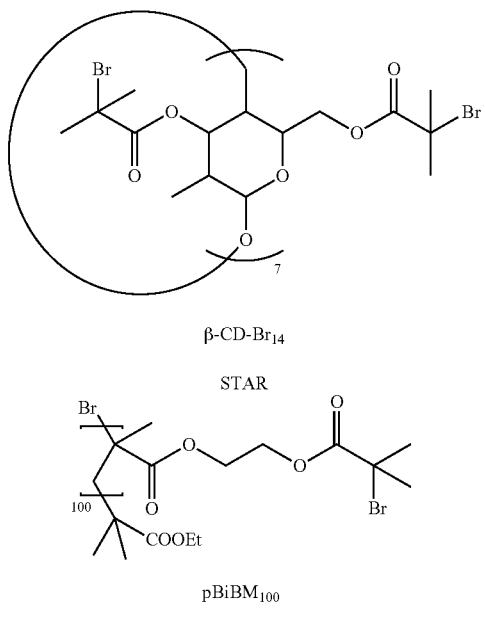

β-CD-Br$_{14}$
STAR pBiBM$_{100}$
BRUSH

3 E) Synthesis of Star Polymers.

PBA and PBMA stars were prepared by grafting from a β-cyclodextrin core functionalized with 14 ATRP initiators, (β-CD-Br$_{14}$). The structure of β-CD-Br$_{14}$ is illustrated above, and a grafting from ARGET ATRP in a miniemulsion polymerization with both n-BuA and BMA displayed a clean shift of MW in the GPC traces, FIGS. 16C-D. The PBA star polymer was well-defined, Table 11, entry 3, although the $M_{n,app}$<$M_{n,th}$ because the hydrodynamic volume of a star polymer can be lower than its linear analogue with the same MW. The PBMA star polymer was less well-defined, Table, 3 F) Synthesis of Polymer Brushes.

Molecular brushes were successfully prepared in miniemulsion by grafting n-BuA from a PBiBM$_{100}$ macroinitiator, which can be a methacrylate backbone functionalized with 100 EBiB-like initiating sites. The structure of PBiBM$_{100}$ is shown in the above schematic. Synthesis of molecular brushes requires providing polymerization conditions that result in minimal termination to avoid coupling between macromolecules. In fact, direct injection of AA at the beginning of the reaction produced too many radicals and resulted in many coupled chains. Therefore, concentration of radicals was lowered by i) decreasing SDS concentration and ii) gradually feeding AA to slowly reduce Cu$^{II}$ to the active Cu$^I$ state, Table 11, entries 5 and 6. Slightly larger particles were obtained according to DLS, as expected from the lower $C_{SDS}$; the final miniemulsion was stable, however, and no gelation was observed. Molecular brushes with brush length of DP 24 and 57 were prepared. In both cases, radical termination by coupling was minimal, according to the small high MW shoulders in the GPC traces as illustrated in FIGS. 16E-F. As expected the $M_{n,app}$<$M_{n,th}$ due the very compact nature of molecular brushes.

3 G) Preparation of α,ω-Telechalic Macroinitiators (Br-PBA-Br)

α,ω-Telechalic macroinitiators are the precursors of ABA block copolymers which can find utility as thermoplastic elastomers among multiple potential applications. Br-PBA-Br was prepared from bifunctional EBiB using miniemulsion ARGET ATRP. Conditions: [Oil]−[n-BuA]/[per Br]/[CuBr$_2$/TPMA]=300/1/0.2 (20 vol % n-BuA), HD—5.4 wt % (to n-BuA); [Water]−[CuBr$_2$]=[TPMA]=1 mM; [NaBr]=0.1 M; SDS—4.6 wt % (to n-BuA); T=65° C.; AA was fed into the reaction medium via syringe pump at a rate of 40 μmol/h. The polymerization was well-controlled providing 51% conversion after 3 h. with the resulting polymer MW=39.4 k (DP=300) and MWD=1.09. After purification, the polymer had MW=39.6 k and Đ=1.09.

However, if one desires to prepare a difunctional macroinitiator, e.g., for preparation of an acrylate based thermoplastic elastomer, two additional requirements may have to be met: one if preparation of a higher MW telechelic macroinitiator and the second is demonstration of chain extension with a monomer that provides a high Tg in the second blocks. If the second block is selected to be methylmethacrylate (MMA) then halogen exchange would be required during the chain extension step. Halogen exchange can be induced by addition of a soluble salt comprising the desired second halide ion, exemplified below by addition of sodium chloride (NaCl), sodium bromide (NaBr), and triethyammonium chloride (TEACl) an exemplary organic chloride.

3 H) Halogen Exchange in a Miniemulsion ATRP

3 H a) Chain Extension of Br-PBA-Br Using NaCl as Halogen Exchange Reagent

Table 12 summarizes the chain extension using NaCl an the halogen exchange agent for both a model reaction from MBP and real experiment from MI.

TABLE 12

Chain extension using halogen exchange startegy in miniemulsion.

| Entry | Exp # | RX | Time (h) | Conv (%) | $k_p^{app}$ ($h^{-1}$) | $M_{n,th}$ (× $10^{-3}$) | $M_{n,app}$ (× $10^{-3}$) | Đ |
|---|---|---|---|---|---|---|---|---|
| 1 | 4-9 | MBP | 3 | 64 | 0.389 | 19.4 | 20.8 | 1.43 |
| 2 | 4-16 | Br-PBA-Br | 2 | 48 | 0.403 | 68.4 | 75.1 | 1.53 |

Conditions:
[Oil] – [MMA]/[per Br] = 300/1 (20 vol % MMA), HD-5.4 wt % (to MMA + RX); [Water] – [CuBr$_2$] = [TPMA] = 1 mM; [NaCl] = 0.1 M; SDS-4.6 wt % (to MMA + RX); [AA] = 0.5 mM; V$_{tot}$10 mL; T = 65° C.

The kinetics of the model reaction using the low MW initiator was linear and there was a clean shift in the GPC curves but the dispersity of the formed polymer was not low, as illustrated in FIGS. 17A-B. This could be attributed to the development of a concurrent —Cl and —Br based ATRP.

In the chain extension from the di-functional macroinitiator, although monomodal GPC curves were observed as illustrated in FIGS. 17C-D, a large proportion of the initiator was not chain extended successfully. The possible reason is that —Br still caps a fraction of the chain ends due to the lack of —Cl in the organic phase thereby leading to low initiation efficiency.

Therefore a more efficient halogen exchange agent had to be identified.

3 H b) Chain Extension of Br-PBA-Br Using TEACl as Halogen Exchange Reagent.

Tetraethylammonium chloride (TEACl) was used as the chain transfer agent as the concentration of the more hydrophobic transfer agent would be higher in the dispersed droplets and hence enhance the transfer process. The kinetics of the model reaction using the low MW initiator was linear and there was a clean shift in the GPC curves and the dispersity of the formed polymer was lower, 1.3, than when NaCl was used as illustrated in FIGS. 17 E-F. In the chain extension from the di-functional macroinitiator there was a deviation from the theoretical values in the kinetics as illustrated in FIG. 17G. However, this can be attributed to the fact that neither PS or poly(methyl methacrylate) (PMMA) GPC standards provide a good representation of the MW of a triblock copolymer, and there was a clean chain extension in the GPC curves as illustrated in FIG. 17F.

3 I) Preparation of Macroinitiators (MIs) Targeting Different DPs.

The final dual functional macroinitiators had MW of 70 k and 115 k, respectively. Conditions: [Oil]–[n-BuA]/[bis BriB]=1000/1 or 1500/1 (20 vol % n-BuA), HD—5.4 wt % (to n-BuA); [Water]–[CuBr$_2$]=[TPMA]=1 mM; [NaBr]=0.1 M; SDS—4.6 wt % (to n-BuA); [AA]=0.5 mM: V$_{tot}$=100 mL: T=65° C. When the reaction was conducted for 8 hr the resulting polymer after the miniemulsion was precipitated into MeOH/water (1/1 by vol) and centrifuged and the polymer was redissolved in THF then dried in vacuum the MW was 70K, and after 17 hr reaction and the MW was 115K each displaying a Đ below 1.2.

Example 4. Emulsion ARGET ATRP with a Single Hydrophilic Catalyst Complex

4 A) Selection of Appropriate Hydrophilic Initiators.

Three representative initiators were selected to evaluate the degree of hydrophilicity required for the initiator in order to activate an emulsion polymerization of a hydrophobic monomer in the presence of an ionic complex formed with an anionic surfactant. They were ethylbromoisobutyrate (EBIB), 2-hydroxyethyl 2-bromoisobutyrate (HEBiB) and polyethylenoxidebromoisobutyrate (PEO)$_{23}$BiB whose structures are shown below:

1

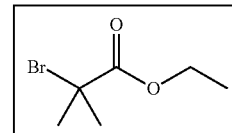

EBiB

2

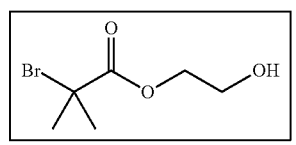

HEBiB

3

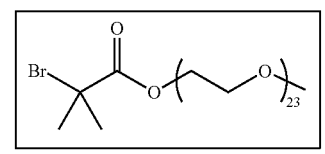

(PEO)$_{23}$BiB

TABLE 13

Emulsion ARGET ATRP of n-BuA, with different hydrophilic initiators conducted at T = 65° C.$^a$

| Initiator | t(h) | Conv.(%) | $K_p^{app}$ ($h^{-1}$) | $M_{n,th}$ | $M_n$ | Đ |
|---|---|---|---|---|---|---|
| 1 | 6 | 13 | 0.02 | 7300 | 46600 | coagulation |
| 2 | 7 | 82 | 0.23 | 51900 | 55800 | 1.15 |
| 3 | 7 | 67 | 0.11 | 43200 | 50900 | 1.15 |

Polymerization conditions:
$C_{n-BuA}/C_{RX}/C_{NaBr}/C_{[Cu^{II}TPMA]^{+2}}$ = 500/1/20/0.2, n-BuA 20% (v/v) in H$_2$O, V$_{tot}$ = 10 mL. 800 nmol AA at t = 0 + feeding rate = 800 nmol/h. 0.8% SDS. T = 65° C.

As shown in FIGS. 18A-B the kinetics of the polymerization with HEBiB as initiator was well controlled forming polymers with narrow GPC traces as conversion increased. Similar results were also obtained using a PEO initiator with a DP=23. This indicates an active water soluble initiator may be desired.

4 B) Exemplary ARGET Emulsion ATRP with a Single Ionic Complex.

The desired amount of NaBr, surfactant, water, [Cu$^{II}$TPMA]$^{2+}$, initiator, listed in Table 14 were added to a Schlenk flask. The solution was stirred and degassed for 30 minutes at ambient temperature, while the monomer, (n-BuA, BMA or STY) previously purified by passing through a column filled with active basic Al$_2$O$_3$, was degassed in a separated flask. Table 14 provides details on the polymerization of n-BuA, 2 mL of monomer were withdrawn with a syringe and injected into the water phase without stirring. The flask was immersed in an oil bath heated at T=65° C. and the mixture was stirred at 500 rpm. The polymerization was started by adding AA. 40 µL of AA were injected dropwise at the beginning of the reaction, while additional AA was added with a syringe pump. The feeding rate is indicated within the data listed in Table 14. The feeding rate should be slow enough that Cu(II) is slowly reduced. Ideally AA:Cu=1:1 at the end of the reaction. In each of the entries the $[Cu^{II}TPMA]^{2+}$ was previously prepared in stock aqueous solutions and a stock solution of AA in water (0.02 M AA, freshly prepared every week to avoid decomposition and evaporation problems) was used and carefully degassed each time.

TABLE 14

Emulsion ARGET ATRP of n-BuA, with different hydrophilic initiators (RX) conducted at T = 65° C.[a] (Shown in landscape orientation).

| Entry | RX | $C_{SDS}$[b] | DP | t (h) | Conv. (%) | $k_p^{app}$ ($h^{-1}$) | $M_{n,th}$ (kg mol$^{-1}$) | $M_n$ (kg mol$^{-1}$) | Đ | $d_{Z-ave}$ (nm)[c] |
|---|---|---|---|---|---|---|---|---|---|---|
| 1 | HEBiB | 18.4 | 280 | 5 | 82 | 0.33 | 30.0 | 30.4 | 1.59 | 182.2 ± 1.3 |
| 2 | HEBiB | 18.4 | 500 | 7 | 77 | 0.23 | 49.9 | 55.8 | 1.15 | 109.2 ± 0.5 |
| 3 | HEBiB | 9.2 | 500 | 8 | 75 | 0.17 | 48.1 | 62.0 | 1.13 | 122.4 ± 0.3[d] |
| 4 | HEBiB | 4.6 | 500 | 6 | 61 | 0.16 | 39.2 | 55.8 | 1.21 | 158.4 ± 2.1[d] |
| 5[e] | HEBiB | 4.6 | 500 | 21 | 77 | 0.07 | 49.7 | 64.2 | 1.16 | 176.6 ± 0.2 |
| 6 | PEO$_{23}$BiB | 18.4 | 280 | 4 | 63 | 0.22 | 24.7 | 20.9 | 1.28 | 81 ± 16 |
| 7[f] | PEO$_{23}$BiB | 18.4 | 280 | 7 | 67 | 0.16 | 26.1 | 33.0 | 1.10 | 159 ± 33 |

[a]$C_{n-BuA}/C_{RX}/C_{NaBr}/C_{[Cu^{II}TPMA]^{2+}}$ = 500/1/20/0.2, n-BuA 20% (v/v) in H$_2$O, V$_{tot}$ = 10 mL. 800 nmol AA injected at t = 0, then AA was fed with a syringe pump, feeding rate = 800 nmol/h. Stirring rate = 500 rpm.
[b]wt % relative to monomer,
[c]Particles size at the end of the polymerization, measured by DLS.
[d]coagulated.
[e]Stirring rate = 250 rpm, with a larger magnetic stirrer (a diameter of 2 centimeters (cm)).
[f]Feeding rate = 500 nmol/h.

Through the use of a larger magnetic stirrer and a slower stirring rate (250 rpm instead of 500) it was possible to obtain a stable emulsion even with a low concentration of surfactant; $C_{SDS}$=4.6 wt % relative to monomer as shown in Entry 5, Table 14. The stirring rate plays a significant role on the outcome of the process. The data in Table 14 was obtained with the smaller magnetic stirrer. A stirring rate of 500 rpm destabilized the system with the larger magnetic stirrer. FIGS. 19A-D show the kinetics and GPC traces of the polymers formed after specified times in the polymerization: FIGS. 19A-B are the results from entry 2; and FIGS. 19C-D are from entry 5. The polymerizations displayed linear kinetics and a clean shift in the MW of the GPC curves are observed as the conversion increased with time.

4 C) Effect of Stirring Rate in ARGET Emulsion ATRP.

The following Table 15 provides information on the effect of stirring rate on the level of control over the emulsion polymerization.

TABLE 15

Effect of stirring rate in an emulsion ARGET ATRP of n-BuA:RX = HEBiB, $C_{SDS}$ = 4.6 wt % relative to n-BuA, T = 65° C.[a]

| Entry | Stirring rate | t (h) | Conv. (%) | $k_p^{app}$ ($h^{-1}$) | $M_{n,th}$ (kg mol$^{-1}$) | $M_n$ (kg mol$^{-1}$) | Đ | $d_{Z-ave}$ (nm)[b] |
|---|---|---|---|---|---|---|---|---|
| 1 | 1000 | 5 | 26 | 0.07 | 17.0 | 14.7 | 1.45 | — |
| 2 | 500 | 6 | 61 | 0.16 | 39.2 | 55.8 | 1.21 | 158.4 ± 2.1 |
| 3 | 250 | 9 | 64 | 0.11 | 41.5 | 50.9 | 1.15 | 153.3 ± 0.8 |

[a]$C_{n-BuA}/C_{RX}/C_{NaBr}/C_{[Cu^{II}TPMA]^{2+}}$ = 500/1/20/0.2, n-BuA 20% (v/v) in H$_2$O, V$_{tot}$ = 10 mL. 800 nmol AA injected at t = 0, then AA was fed with a syringe pump, feeding rate = 800 nmol/h.
[b]Particles size at the end of the polymerization, measured by DLS.

FIG. 20 shows the evolution of kinetics of the polymerizations conducted under different stirring rates and clearly indicates that the slower stirring rate, 250 rpm, provided the best control with the polymerization displaying linear kinetics with conversion whereas at higher rpm a plateau formed as conversion increased.

When the polymer is isolated from the emulsion, the concentration of copper in the solid polymer was less than 0.4 mg Cu/kg polymer. This can be attributed to the ionic interaction between the surfactant and the catalyst complex resulting in 99% of the hydrophilic catalyst remaining in the aqueous phase. [Macromol. 2017, 50, 3726]

4 D) ARGET Emulsion Polymerization of an Alkyl Methacrylate.

The emulsion polymerization of butyl methacrylate (BMA) was examined to confirm the broad applicability of the developed procedure. The need of a water-soluble initiator suitable for methacrylate polymerization was overcome by using NaCl instead of NaBr as the added salt as this created the option of halogen exchange during the initial activation of the added water soluble initiator. The first attempt, Entry 1 Table 16, gave an uncontrolled polymerization and enhanced coagulation. The polymerization rate was about 3 times faster than n-BuA under the same conditions. Therefore, the feeding rate of the ascorbic acid solution was reduced by a factor of three, which provided a slower and controlled polymerization. The stirring rate was 250 rpm. GPC traces showed a clean shift to higher MW with monomer conversion and confirmed that a slower rate of addition of ascorbic acid provided a polymer with lower Đ.

TABLE 16

Emulsion ARGET ATRP of BMA.[a]

| Entry | RX | NaX | SDS wt % | T (° C.) | AA feeding (nmol/h) | Time (h) | Conv. (%) | $k_p^{app}$ ($h^{-1}$) | $M_{n,th}$ (× $10^{-3}$) | $M_{n,app}$ (× $10^{-3}$) | Đ |
|---|---|---|---|---|---|---|---|---|---|---|---|
| 1 | HEBiB | NaCl | 4.6 | 65 | 800 | 5.5 | 74 | 0.24 | 53.3 | 59.4 | 1.72 |
| 2 | HEBiB | NaCl | 4.6 | 65 | 266 | 9 | 78 | 0.14 | 45.2 | 56.1 | 1.28 |
| 3 | HEBiB | NaCl | 4.6 | 65 | 133 | 7 | 60 | 0.12 | 44.8 | 44.8 | 1.26 |
| 4 | $PEO_{2k}$-BPA | NaBr | 18.4 | 45 | 800 | 8 | 52 | 0.094 | 38.9 | 34.8 | 1.20 |

[a]$C_{mon}/C_{RX}/C_{NaBr}/C_{[Cu^{II}TPMA]^{2+}}$ = 500/1/20/0.2, monomer 20% (v/v) in $H_2O$, $V_{tot}$ = 10 mL. 800 nmol AA injected at t = 0, then AA was fed with a syringe pump. Stirring rate = 250 rpm. AA feeding rate (nmol/h).
[c]Particles size at the end of the polymerization, measured by DLS.
[2]No drops added at the beginning.

Taking into consideration the high hydrophobicity of BMA the amount of SDS added to the reaction medium was increased in order to hasten the migration of BMA to the aqueous phase and ensure that the slightly soluble Br—$Cu^{II}TPMA^+$ was transported to the micelle to deactivate the active radicle. In addition, a more active water soluble initiator, $PEO_{2k}BPA$ was employed. The reaction conditions were: [BMA]/[$PEO_{2k}BPA$]/[NaBr]/[CuTPMA]=500/1/20/0.2, BMA 20% (v/v) in $H_2O$, SDS was 18.4 wt % to BMA. $V_{tot}$=10 mL. 800 nmol AA injected at t=0, then AA was fed with a syringe pump, feeding rate=800 nmol/h. Stirring rate=250 rpm. The aqueous phase turned turbid after about 1 h, and the organic phase disappeared after 5 h. This procedure was slower than previous observations, where the organic phase fully migrated into the aqueous phase in 2 h. At 5 h, conversion was 68%, $M_n$=47,400, Đ=1.20. (see GPC curves in FIG. 21A) The final product did not phase separate on standing, possibly due to higher amount of SDS gave the latexes more stability.

4 E) In Situ Chain Extension of PBA with t-Butyl Acrylate

The same procedure employed in the above experiments was employed for the preparation of the first segment in the block copolymer. [n-BuA]/[HEBiB]/[NaBr]/[CuTPMA]=500/1/20/0.2, n-BuA 20% (v/v) in $H_2O$, SDS was 18.4 wt % to n-BuA. $V_{tot}$=10 mL. T=65° C. 800 nmol AA injected at t=0, then AA was fed with a syringe pump, feeding rate=800 nmol/h. Stirring rate=250 rpm. After 2 h, the monomer layer disappeared then the reaction continued for another 1 h for the nucleation step to be complete. At 3 h, conversion reached 35% and tBA was injected into the reaction at the rate of 0.4 mL/h for 2 h. During feeding of tBA, the needle was immersed in the emulsion and was near the stirrer bar, so tBA could diffuse into the micelles quickly and evenly. FIG. 22A illustrates the kinetics of the polymerization before and after the addition of tBA and FIG. 22B illustrates the increase in molecular weight and $M_w/M_n$ of the formed polymer. FIG. 22C illustrates the GPC curves for the first formed PBA macroinitiator and the final chain extended segmented copolymer and confirms that there was a clean chain extension.

A second reaction run under the same conditions as the first step resulted in 75% conversion of the first monomer after 8 h.

Example 5. ICAR Emulsion Polymerization of an Alkyl Methacrylate

Since HEBiB was a successful as hydrophilic initiator in an ARGET emulsion ATRP it was decided to confirm that ICAR ATRP can be also employed for an emulsion ATRP. The use of a standard free radical initiator can be the procedure used in a standard free radical emulsion polymerization. VA-044 was used as the exemplary thermal free radical initiator.

Initial reaction conditions: [n-BuA]/[HEBiB]/[VA-044]/[NaBr]/[CuTPMA]=500/1/0.3/20/0.2, n-BuA 20% (v/v) in $H_2O$, SDS was 18.4 wt % to n-BuA. $V_{tot}$=10 mL. 800 nmol AA injected at t=0, then AA was fed with a syringe pump, feeding rate=800 nmol/h. Stirring rate=250 rpm. After 24 h, conversion was 74%, $M_{n,th}$=48 k, $M_n$=42 k, Đ=1.19 (see GPC in FIG. 21B). The 14% lower molecular weight than the theoretical value may be attributable to the excess chains generated from VA-044.

Example 6. photoATRP Emulsion Polymerization of BMA

Application of photo-based CRP to dispersed media makes the polymerization more environmentally benign and feasible to tune. The average temperature under the UV lamp where the Schlenk flask was inserted is about 40° C. The conditions were adjusted from bulk ARGET ATRP of BMA with [TPMA]/[Cu]=6/1 to provide reducing agent. [BMA]/[HO-PA]/[NaBr]/[Cu]/[TPMA]=500/1/20/0.2/1.2, BMA 20% (v/v) in $H_2O$, SDS was 18.4 wt % to BMA. $V_{tot}$=10 mL. Stirring rate=250 rpm. The UV light had a $\lambda_{max}$=370 nm and intensity 5 milliwatts (mW)/$cm^2$. 94% conversion was achieved after 8 h, and the molecular weight was well-controlled providing a polymer with Đ=1.15.

Example 7. Oxygen Scavenging ATRP Emulsion Polymerizations

7 A) Emulsion Polymerization.

ARGET ATRP in emulsion using GOx-pyruvate oxygen scavenging system for oxygen removal, see scheme 2. Initial reaction condition: [BMA]/[$PEO_{2k}BPA$]/[NaBr]/[CuTPMA]=500/1/20/0.2, BMA 20% (v/v) in $H_2O$, SDS was 18.4 wt %/o to BMA. $V_{tot}$=10 mL. T=45° C. 800 nmol AA injected at t=0, then AA was fed with a syringe pump, feeding rate=800 nmol/h. Stirring rate=250 rpm. The polymerization reached 60% conversion in 4 hr providing a polymer with a Đ=1.16.

7 B) Development of Miniemulsion Conditions for GOx-Degassed ATRP

The polymerization of butylmethacrylate was carried out using ARGET conditions and a temperature kept at 44° C. Ascorbic acid (7.91 mg in 600 μL) was injected to the reaction over 6 hours. There was 793 ppm copper in the reaction feed mixture. The reaction was carried out in deionized (DI) water.

TABLE 17

ARGET ATRP Miniemulsion of BMA.

| Entry | M/I/AAc/Cu/TPMA | Solvent | Time/h | Conv./% | $M_{n,Th}$ | $M_{n,GPC}$ | Đ |
|---|---|---|---|---|---|---|---|
| LF-4-3 | 280/1/1/0.222/0.266 | DI water | 2.5 | 96 | 38.3 | 27.6 | 1.18 |

M = BMA, [M] = 20 vol %, I = EPBA, [NaBr] = 100 mM, hexadecane = 10.8 wt %, SDS = 4.6 wt %, [glucose] = 200 mM, [GOx] = 2_82 M, [Sodium pyruvate] = 100 mM, T = 44° C., Feed rate (AAc) = 125 nmol/min The reaction was carried out for 2.5 h providing 96% conversion with $M_{n,th}$=38.3 and $M_{n,GPC}$=27.6 and Đ=1.18. The kinetics of the polymerization and regular increase in MW with conversion are shown in FIGS. 23A-B. The clean movement of the GPC curves with increasing conversion, without any sign of tailing, is shown in FIG. 23C. Together they show that a well-controlled emulsion polymerization occurred. Nevertheless using the ARGET approach accelerated the rate of the polymerization. In 1.5 h, the conversion reached 53% and after 2.5 h at almost 100%. MW are close to the theoretical values and dispersities remained low (<1.2) until approaching 100% conversion, when chain-chain coupling might have occurred and there was a slight high molecular weight tailing in the GPC curves.

7 C) A Reaction with a Reduced Rate of Ascorbic Acid.

As shown in Table 18 the reaction conditions a rate of 62 nm/min was employed. There was 793 ppm copper in the reaction feed mixture.

TABLE 18

ATRP of BMA with Reduced AA.

| Entry | M/I/AAc/Cu/TPMA | Solvent | Time/h | Conv./% | $M_{n,Th}$ | $M_{n,GPC}$ | Đ |
|---|---|---|---|---|---|---|---|
| LF-4-9 | 280/1/1/0.222/0.266 | DI water | 6.5 | 89 | 35.6 | 32.4 | 1.16 |

M = BMA, [M] = 20 vol %, I = EPBA, [NaBr] = 100 mM, hexadecane = 10.8 wt %, SDS = 4.6 wt %, [glucose] = 200 mM, [GOx] = 2_82 M, [Sodium pyruvate] = 100 mM, T = 44° C., Feed rate (AAc) = 62 nmol/min By slowing down the addition of ascorbic acid, the polymerization was controlled to a much higher degree. The curves in FIGS. 24 D-F illustrate that the MW matched with the theoretical values, conversion reached 89% after 6.5 h. The MW matched with the theoretical values and the GPC traces evolved nicely while showing low Đ=1.16. Note the absence of high MW tailing in the higher conversion GPC curves.

7 D) Reaction with Reduced Concentration of Copper.

The polymerization of BMA was then carried out with a reduced level of copper, 100 ppm. The reaction conditions are listed below. In accordance with the lower concentration of copper catalyst the rate of addition of ascorbic acid was also reduced, in this case to 21 nmol/min.

TABLE 19

ATRP of BMA with Reduced Copper.

| Entry | M/I/AAc/Cu/TPMA | Solvent | Time/h | Conv./% | $M_{n,Th}$ | $M_{n,GPC}$ | Đ |
|---|---|---|---|---|---|---|---|
| LF-4-11 | 280/1/0.28/0.028/0.034 | DI water | 6 | 94 | 37.8 | 25.6 | 1.25 |

M = BMA, [M] = 20 vol %, I = EPBA, [NaBr] = 100 mM, hexadecane = 10.8 wt %, SDS = 4.6 wt %, [glucose] = 200 mM, [GOx] = 2_82 M, [Na pyruvate] = 100 mM, T = 44° C., Feed rate (AAc) = 21 nmol/min The kinetic curve, conversion and GPC traces of samples taken from the reaction as the polymerization progressed are shown in FIGS. 24 G-I. There was a slow initiation/deactivation at the beginning of the polymerization, as a consequence of the low coper concentration, but conversion reached 94% after 6 h and overall the $M_n$ and Đ are still acceptable.

7 E) Polymerization of Butyl Acrylate.

As shown in the reaction conditions a rate of 62 nm/min was employed. There was 793 ppm copper in the reaction feed mixture.

TABLE 20

ATRP of n-BuA.

| Entry | M/I/AAc/Cu/TPMA | Solvent | Time/h | Conv./% | $M_{n,Th}$ | $M_{n,GPC}$ | Đ |
|---|---|---|---|---|---|---|---|
| LF-4-10 | 280/1/0.222/0.266 | DI water | 17 | 85 | 34.2 | 27.0 | 1.26 |

M = n-BuA, [M] = 20 vol %, I = EBiB, [NaBr] = 100 mM, hexadecane = 10.8 wt %, SDS = 4.6 wt As expected, polymerization of n-BuA with EBiB would be slower. The kinetic plot, conversion curves and GPC traces are shown in FIGS. 24J-L where it can be observed that it took 17 hours to reach 84% conversion while MWs were slightly offset with theoretical values, however, the dispersity still remained low (~1.25). From In-time plot, it seems like the first 6 hours are relatively slower than 6-17 hours.

FIG. 25s. A-D illustrates a Control experiment, LF-4-12, (vs. 4-9) without Glucose (glu), glucose oxidase (GOx) and pyruvate (pyr). The control experiment was conducted to check the reaction rate at 44° C. without the glu+GOx+pyr addition. Not surprisingly, the reaction rate was slower than previous reaction carried out at 65° C. (3 h 90%). Although the $M_n$ matches perfectly with the theoretical value and dispersity well controlled, the reaction rate was much slower. It took 11 hours to reach 25% conversion while comparing with LF-4-9 (6 h, 89% conversion).

This increase in reaction rate was observed in several polymerizations with glu+GOx+pyr. Therefore a CV analysis of 1 mM Cu-TPMA was conducted with the addition of glu/pyr. Upon the addition of pyruvate, a slight left shift of $E_{1/2}$ was observed, corresponding to a 0.3 order of increasing of the activity of the catalyst complex. Addition of glucose did not shift the curve any further to the left. This explains the observation that Glu-GOx-pyr accelerates reactions through the interaction of the pyruvate.

The grammatical articles "a", "an", and "the", as used herein, are intended to include "at least one" or "one or more", unless otherwise indicated, even if "at least one" or "one or more" is expressly used in certain instances. Thus, the articles are used herein to refer to one or more than one (i.e., to "at least one") of the grammatical objects of the article. Further, the use of a singular noun includes the plural, and the use of a plural noun includes the singular, unless the context of the usage requires otherwise.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various examples have been described herein, many modifications, variations, substitutions, changes, and equivalents to those examples may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed examples. The following claims are intended to cover all such modification and variations.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more examples has been presented for purposes of illustration and description. It is not intended to be exhaustive or limiting to the precise form disclosed. Modifications or variations are possible in light of the above teachings. The one or more examples were chosen and described in order to illustrate principles and practical application to thereby enable one of ordinary skill in the art to utilize the various examples and with various modifications as are suited to the particular use contemplated. It is intended that the claims submitted herewith define the overall scope.

ASPECTS OF THE INVENTION

Aspects of the invention include, but are not limited to, the following numbered clauses.
1. An Atom Transfer Radical Polymerization (ATRP) emulsion system comprising.
   a suspending medium and a dispersed medium;
   a surfactant;
   a transition metal compound in a higher oxidation state capable of forming a catalyst complex in a presence of a ligand containing at least two heteroatom containing groups that coordinate with the transition metal compound;
   the catalyst complex is soluble in the suspending medium and is capable of forming an ionic complex with the surfactant;
   the ionic complex is capable of moving between the suspending medium and the dispersed medium;
   an ATRP initiator comprising one or more radically transferable atoms or groups; and
   a portion of the transition metal compound in the higher oxidation state within a portion of the catalyst complex is reduced by a physical and/or a chemical procedure thereby initiating a polymerization of one or more radically (co)polymerizable monomers by reaction with the ATRP initiator.
2. The system of clause 1, wherein the suspending medium is an aqueous medium and the dispersed medium is an organic medium.
3. The system of clauses 1 and/or 2, wherein the ligand is selected from the group consisting of (4-methoxy-3,5-dimethyl-pyridin-2-ylmethyl)-bis(pyridin-2-ylmethyl)-amine, bis(4-methoxy-3,5-dimethyl-pyridin-2-ylmethyl)-pyridin-2-ylmethyl-amine, tris[(4-methoxy-3,5-dimethyl)-pyrid-2-ylmethyl]amine, (4-methoxy-pyridin-2-ylmethyl)-bis(pyridin-2-ylmethyl)-amine, bis(4-methoxy-pyri din-2-ylmethyl)-pyridin-2-ylmethyl-amine, tris((4-methoxy)-pyridin-2-yl)methy)l-amine, (4-(N,N-dimethylamino)-pyridin-2-ylmethyl)-bis(pyridin-2-ylmethyl)-amine, bis(4-(N,N-dimethylamino)-pyridin-2-ylmethyl)-pyridin-2-ylmethyl-amine, tris(4-(N,N-dimethylamino)-pyridin-2-yl)methyl)-amine, and combinations thereof.
4. The system of clauses 1, 2, and/or 3, wherein the surfactant is an anionic surfactant and the ionic complex is a hydrophilic ionic complex.
5. The system of clauses 1, 2, 3, and/or 4, wherein the surfactant is selected from the group consisting of sodium alkyl sulphate, sodium alkyl laurate, sodium alkyl stearate, sodium dodecanoate, and combinations thereof.
6. The system of clause 1, wherein the suspending medium is an organic medium and the dispersed medium is an aqueous medium.
7. The system of clauses 1 and/or 6, wherein the ligand is a hydrophobic ligand.
8. The system of clauses 1, 6, and/or 7, wherein the surfactant is an anionic surfactant and the ionic complex is a hydrophobic ionic complex.
9. The system of clauses 1, 2, 3, 4, 5, 6, 7, and/or 8, wherein the emulsion is selected from the group consisting of: a standard emulsion, a reverse emulsion, a miniemulsion, a microemulsion, a seeded emulsion, an ab initio emulsion, and combinations thereof.
10. The system of clauses 1, 2, 3, 4, 5, 6, 7, 8, and/or 9, wherein the ATRP system is selected from the group consisting of: an electro-ATRP, a photoATRP, a mechanoATRP, an Activator Generated by Electron Transfer ATRP, an Activators Regenerated by Electron Transfer ATRP, a Supplemental Activator and Reducing Agent ATRP, an Initiators For Continuous Activator Regeneration ATRP, an oxygen tolerant ATRP, and combinations thereof.
11. The system of clauses 1, 2, 3, 4, 5, 6, 7, 8, 9, and/or 10, wherein a concentration of the catalyst complex is between 10 and 1000 parts per million.
12. The system of clauses 1, 2, 3, 4, 5, 6, 7, 8, 9, 10, and/or 11, further comprising a halide salt.
13. The system of clauses 1, 2, 3, 4, 5, 6, 7, 8, 9, 10, 11, and/or 12, wherein the portion of the transition metal compound in the higher oxidation state is reduced by the physical procedure, wherein the physical procedure is selected from the group of an applied electrical current, an applied sound, and an applied light.

14. The system of clause 1, 2, 3, 4, 5, 6, 7, 8, 9, 10, 11, and/or 12, wherein the portion of the transition metal compound in the higher oxidation state is reduced by the chemical procedure.

15. The system of clause 1, 2, 3, 4, 5, 6, 7, 8, 9, 10, 11, 12, and/or 14, wherein the chemical procedure comprises application of a reducing agent selected from the group consisting of an ascorbic acid, a hydrazine, a phenol, a sugar, a metal, a metal compound, a sulfur compound, an alkylamine, an excess quantity of the ligand, a free radical initiator, a nitrogen containing monomer, derivatives thereof, and combinations thereof.

16. The system of clause 1, 2, 3, 4, 5, 6, 7, 8, 9, 10, 11, 12, 13, 14, and/or 15 wherein the ATRP initiator is soluble in the dispersed medium.

17. The system of clause 1, 2, 3, 4, 5, 6, 7, 8, 9, 10, 11, 12, 13, 14, 15, and/or 16, wherein the emulsion is a miniemulsion and the dispersed medium is formed prior to the initiating of the polymerization.

18. The system of clause 1, 2, 3, 4, 5, 6, 7, 8, 9, 10, 11, 12, 13, 14, and/or 15, wherein the ATRP initiator is soluble in the suspending medium.

19. The system of clause 1, 2, 3, 4, 5, 6, 7, 8, 9, 10, 11, 12, 13, 14, 15, and/or 18, wherein the dispersed medium is self-formed around a portion of the one or more monomers after the initiating of the polymerization.

20. An Atom Transfer Radical Polymerization (ATRP) emulsion process comprising:
  adding a suspending medium, a surfactant, a transition metal compound in a higher oxidation state, a ligand containing at least two heteroatom containing groups, one or more radically (co)polymerizable monomers, and an ATRP initiator containing one or more radically transferable atoms or groups to a container;
  generating an emulsion in the container, including generating one or more dispersed droplets;
  forming a catalyst complex with the transition metal compound and the ligand wherein the at least two heteroatom containing groups coordinate with the transition metal compound, the catalyst complex is soluble in the suspending medium; and
  initiating a polymerization of the one or more monomers by:
    reducing a portion of the transition metal compound in the higher oxidation state within a portion of the catalyst complex by a physical or a chemical procedure thereby creating an active catalyst complex having the portion of the transition metal compound in a lower oxidation state;
    shuttling the active catalyst complex between the suspending medium and the dispersed droplets by forming an ionic complex with the surfactant and the active catalyst complex; and
    reacting the ATRP initiator with the one or more monomers thereby initiating a polymerization and forming a polymer, wherein the reacting is facilitated by the active catalyst complex.

21. The process of clause 20, further comprising controlling a dimension of a polymer particle formed by the polymerization by adjusting an amount of the surfactant.

22. The process of clauses 20 and/or 21, further comprising adding a second surfactant, wherein the second surfactant facilitates controlling the dimension of the polymer particle.

23. The process of clauses 20, 21, and/or 22, wherein the suspending medium is an aqueous medium and the one or more dispersed droplets are an organic medium.

24. The process of clauses 20, 21, 22, and/or 23, wherein the ligand is selected from the group consisting of (4-methoxy-3,5-dimethyl-pyridin-2-ylmethyl)-bis(pyridin-2-ylmethyl)-amine, bis(4-methoxy-3,5-dimethyl-pyridin-2-ylmethyl)-pyridin-2-ylmethyl-amine, tris[(4-methoxy-3,5-dimethyl)-pyrid-2-ylmethyl]amine, (4-methoxy-pyridin-2-ylmethyl)-bis(pyridin-2-ylmethyl)-amine, bis(4-methoxy-pyridin-2-ylmethyl)-pyridin-2-ylmethyl-amine, tris((4-methoxy)-pyridin-2-yl)methyl)-amine, (4-(N,N-dimethylamino)-pyridin-2-ylmethyl)-bis(pyridin-2-ylmethyl)-amine, bis(4-(N,N-dimethylamino)-pyridin-2-ylmethyl)-pyridin-2-ylmethyl-amine, tris(4-(N,N-dimethylamino)-pyridin-2-yl)methyl)-amine, and combinations thereof.

25. The process of clauses 20, 21, 22, 23, and/or 24, wherein the surfactant is an anionic surfactant and the ionic complex is a hydrophilic ionic complex.

26. The process of clauses 20, 21, 22, 23, 24, and/or 25, wherein the surfactant is selected from the group consisting of sodium alkyl sulphate, sodium alkyl laurate, sodium alkyl stearate, sodium dodecanoate, and combinations thereof.

27. The process of clauses 20, 21, and/or 22, wherein the suspending medium is an organic medium and the one or more dispersed droplets are an aqueous medium.

28. The process of clauses 20, 21, 22, and/or 27, wherein the ligand is a hydrophobic ligand.

29. The process of clauses 20, 21, 22, 27, and/or 28, wherein the surfactant is an anionic surfactant, and the ionic complex is a hydrophobic ionic complex.

30. The process of clauses 20, 21, 22, 23, 24, 25, 26, 27, 28, and/or 29, wherein the emulsion is selected from the group consisting of: a standard emulsion, a reverse emulsion, a miniemulsion, a microemulsion, a seeded emulsion, an ab initio emulsion, and combinations thereof.

31. The process of clauses 20, 21, 22, 23, 24, 25, 26, 27, 28, 29, and/or 30, wherein the ATRP process is selected from the group consisting of: an electro-ATRP, a photoATRP, a mechanoATRP, an Activator Generated by Electron Transfer ATRP, an Activators Regenerated by Electron Transfer ATRP, a Supplemental Activator and Reducing Agent ATRP, an Initiators For Continuous Activator Regeneration ATRP, an oxygen tolerant ATRP, and combinations thereof.

32. The process of clauses 20, 21, 22, 23, 24, 25, 26, 27, 28, 29, 30, and/or 31, further comprising controlling the ATRP emulsion process utilizing the ionic complex.

33. The process of clauses 20, 21, 22, 23, 24, 25, 26, 27, 28, 29, 30, 31, and/or 32, further comprising limiting a halogen displacement interaction between the catalyst complex with the transition metal compound in the higher oxidation state and the surfactant by adding a halide salt.

34. The process of clauses 20, 21, 22, 23, 24, 25, 26, 27, 28, 29, 30, 31, 32, and/or 33, wherein the polymer has a residual amount of the catalyst complex with the transition metal compound in the higher oxidation state and the active catalyst complex of less than 0.4 milligrams per kilogram of formed polymer.

35. The process of clauses 20, 21, 22, 23, 24, 25, 26, 27, 28, 29, 30, 31, 32, 33, and/or 34, further comprising removing the polymer from the container, wherein the polymer has a residual amount of the catalyst complex with the transition metal in the higher oxidation state and the active catalyst complex that is at least 20 fold less than an amount of the catalyst complex with the transition metal in the higher oxidation state and the active catalyst complex formed in the container.

36. The process of clauses 20, 21, 22, 23, 24, 25, 26, 27, 28, 29, 30, 31, 32, 33, 34, and/or 35, wherein reducing the portion of the transition metal compound in the higher oxidation state further comprising applying an electrical current, a sound, or light.

37. The process of clauses 20, 21, 22, 23, 24, 25, 26, 27, 28, 29, 30, 31, 32, 33, 34, and/or 35, wherein reducing the portion of the transition metal compound in the higher oxidation state further comprising adding a reducing agent selected from the group consisting of an ascorbic acid, a hydrazine, a phenol, a sugar, a metal, a metal compound, a sulfur compound, an alkylamine, an excess quantity of the ligand, a free radical initiator, a nitrogen containing monomer, derivatives thereof, and combinations thereof to the container.

38. The process of clauses 20, 21, 22, 23, 24, 25, 26, 27, 28, 29, 30, 31, 32, 33, 34, 35, 36, and/or 37, wherein reducing the portion of the transition metal compound in the higher oxidation state occurs in the suspending medium.

39. The process of clauses 20, 21, 22, 23, 24, 25, 26, 27, 28, 29, 30, 31, 32, 33, 34, 35, 36, 37, and/or 38, further comprising a single type of ionic complex.

40. The process of clauses 20, 21, 22, 23, 24, 25, 26, 27, 28, 29, 30, 31, 32, 33, 34, 35, 36, 37, 38, and/or 39, wherein the ATRP initiator is soluble in the dispersed medium.

41. The process of clauses 20, 21, 22, 23, 24, 25, 26, 27, 28, 29, 30, 31, 32, 33, 34, 35, 36, 37, 38, 39, and/or 40, wherein the emulsion is a miniemulsion and further comprising forming a dispersed medium comprising the one or more dispersed droplets prior to the initiating of the polymerization.

42. The process of clauses 20, 21, 22, 23, 24, 25, 26, 27, 28, 29, 30, 31, 32, 33, 34, 35, 36, 37, 38, and/or 39, wherein the ATRP initiator is soluble in the suspending medium.

43. The process of clauses 20, 21, 22, 23, 24, 25, 26, 27, 28, 29, 30, 31, 32, 33, 34, 35, 36, 37, 38, 39, and/or 42, further comprising:
   forming a micelle by reacting the ATRP initiator with the one or more monomers to form a hydrophobic oligomer which phase separates from the suspending medium; and
   shuttling the active catalyst complex between the suspending medium and the micelle utilizing the ionic complex, wherein the active catalyst complex facilitates nucleation and particle growth of the hydrophobic oligomer within the micelle thereby forming the polymer.

44. An Atom Transfer Radical Polymerization (ATRP) emulsion process comprising:
   adding a suspending medium, an anionic surfactant, a single transition metal compound in a higher oxidation state, a ligand containing at least two heteroatom containing groups, one or more radically (co)polymerizable monomers, and an ATRP initiator to a container, the ATRP initiator comprises one or more radically transferable atoms or groups and is soluble in the suspending medium;
   forming a catalyst complex with the transition metal compound and the ligand wherein the at least two heteroatom containing groups coordinate with the transition metal compound, the catalyst complex is soluble in the suspending medium; and
   initiating a polymerization of the one or more monomers utilizing the ATRP initiator, the initiating comprising:
      reducing a portion of the transition metal compound in the higher oxidation state within a portion of the catalyst complex by a physical or a chemical procedure thereby creating an active catalyst complex having the portion of the transition metal compound in a lower oxidation state;
      forming a micelle by reacting the ATRP initiator with the one or more monomers to form a hydrophobic oligomer which phase separates from the suspending medium; and
      forming a polymer by increasing a molecular weight of the hydrophobic oligomer by shuttling the active catalyst complex between the suspending medium and the micelle by forming an ionic complex with the anionic surfactant and the active catalyst complex, wherein the active catalyst complex facilitates nucleation and particle growth of the hydrophobic oligomer within the micelle.

45. A polymer formed by an Atom Transfer Radical Polymerization (ATRP) emulsion process comprising:
   adding a suspending medium, a surfactant, a transition metal compound in a higher oxidation state, a ligand containing at least two heteroatom containing groups, one or more radically (co)polymerizable monomers, and an ATRP initiator containing one or more radically transferable atoms or groups to a container;
   generating an emulsion in the container, including generating one or more dispersed droplets;
   forming a catalyst complex with the transition metal compound and the ligand wherein the at least two heteroatom containing groups coordinate with the transition metal compound, the catalyst complex is soluble in the suspending medium; and
   initiating a polymerization of the one or more monomers by:
      reducing a portion of the transition metal compound in the higher oxidation state within a portion of the catalyst complex by a physical or a chemical procedure thereby creating an active catalyst complex having the portion of the transition metal compound in a lower oxidation state;
      shuttling the active catalyst complex between the suspending medium and the dispersed droplets by forming an ionic complex with the surfactant and the active catalyst complex; and
      reacting the ATRP initiator with the one or more monomers thereby initiating a polymerization and forming the polymer, wherein the reacting is facilitated by the active catalyst complex.

While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed, and not as more narrowly defined by particular illustrative aspects provided herein.

What is claimed is:

1. An Atom Transfer Radical Polymerization (ATRP) emulsion system comprising:
   a suspending medium and a dispersed medium;
   a surfactant;
   a transition metal compound in a higher oxidation state capable of forming a catalyst complex in a presence of a ligand containing at least two heteroatom containing groups that coordinate with the transition metal compound;

the catalyst complex is soluble in the suspending medium and is capable of forming an ionic complex with the surfactant;

the ionic complex is capable of moving between the suspending medium and the dispersed medium;

an ATRP initiator comprising one or more radically transferable atoms or groups, wherein the ATRP initiator is soluble in the dispersed medium; and a portion of the transition metal compound in the higher oxidation state within a portion of the catalyst complex is reduced by a physical and/or a chemical procedure thereby initiating a polymerization of one or more radically (co)polymerizable monomers by reaction with the ATRP initiator.

2. The system of claim 1, wherein the suspending medium is an aqueous medium and the dispersed medium is an organic medium.

3. The system of claim 2, wherein the ligand is selected from the group consisting of (4-methoxy-3,5-dimethyl-pyridin-2-ylmethyl)-bis(pyridin-2-ylmethyl)-amine, bis(4-methoxy-3,5-dimethyl-pyridin-2-ylmethyl)-pyridin-2-ylmethyl-amine, tris[(4-methoxy-3,5-dimethyl)-pyrid-2-ylmethyl]amine, (4-methoxy-pyridin-2-ylmethyl)-bis(pyridin-2-ylmethyl)-amine, bis(4-methoxy-pyridin-2-ylmethyl)-pyridin-2-ylmethyl-amine, tris((4-methoxy)-pyridin-2-yl)methyl)-amine, (4-(N,N-dimethylamino)-pyridin-2-ylmethyl)-bis(pyridin-2-ylmethyl)-amine, bis(4-(N,N-dimethylamino)-pyridin-2-ylmethyl)-pyridin-2-ylmethyl-amine, tris(4-(N,N-dimethylamino)-pyridin-2-yl) methyl)-amine, and combinations thereof.

4. The system of claim 1, wherein the surfactant is an anionic surfactant and the ionic complex is a hydrophilic ionic complex.

5. The system of claim 4, wherein the surfactant is selected from the group consisting of sodium alkyl sulphate, sodium alkyl laurate, sodium alkyl stearate, sodium dodecanoate, and combinations thereof.

6. The system of claim 1, wherein the suspending medium is an organic medium and the dispersed medium is an aqueous medium.

7. The system of claim 6, wherein the ligand is a hydrophobic ligand.

8. The system of claim 6, wherein the surfactant is an anionic surfactant and the ionic complex is a hydrophobic ionic complex.

9. The system of claim 1, wherein the ATRP emulsion system is selected from the group consisting of: a standard emulsion, a reverse emulsion, a miniemulsion, a microemulsion, a seeded emulsion, an ab initio emulsion, and combinations thereof.

10. The system of claim 1, wherein the ATRP system is selected from the group consisting of: an electro-ATRP, a photoATRP a mechanoATRP, an Activator Generated by Electron Transfer ATRP, an Activators Regenerated by Electron Transfer ATRP, a Supplemental Activator and Reducing Agent ATRP, an Initiators For Continuous Activator Regeneration ATRP, an oxygen tolerant ATRP, and combinations thereof.

11. The system of claim 1, wherein a concentration of the catalyst complex is between 10 and 1000 parts per million.

12. The system of claim 1, further comprising a halide salt.

13. The system of claim 1, wherein the portion of the transition metal compound in the higher oxidation state is reduced by the physical procedure, wherein the physical procedure is selected from the group of an applied electrical current, an applied sound and an applied light.

14. The system of claim 1, wherein the portion of the transition metal compound in the higher oxidation state is reduced by the chemical procedure.

15. The system of claim 14, wherein the chemical procedure comprises application of a reducing agent selected from the group consisting of an ascorbic acid, a hydrazine, a phenol, a sugar, a metal, a metal compound, a sulfur compound, an alkylamine, an excess quantity of the ligand, a free radical initiator, a nitrogen containing monomer, derivatives thereof, and combinations thereof.

16. The system of claim 1, wherein the emulsion is a miniemulsion and the dispersed medium is formed prior to the initiating of the polymerization.

17. An Atom Transfer Radical Polymerization (ATRP) emulsion process comprising:

adding a suspending medium, a surfactant, a transition metal compound in a higher oxidation state, a ligand containing at least two heteroatom containing groups, one or more radically (co)polymerizable monomers, and an ATRP initiator containing one or more radically transferable atoms or groups to a container;

generating an emulsion in the container, including generating one or more dispersed droplets;

forming a catalyst complex with the transition metal compound and the ligand wherein the at least two heteroatom containing groups coordinate with the transition metal compound, the catalyst complex is soluble in the suspending medium; and initiating a polymerization of the one or more monomers by:

reducing a portion of the transition metal compound in the higher oxidation state within a portion of the catalyst complex by a physical or a chemical procedure thereby creating an active catalyst complex having the portion of the transition metal compound in a lower oxidation state;

shuttling the active catalyst complex between the suspending medium and the dispersed droplets by forming an ionic complex with the surfactant and the active catalyst complex; and reacting the ATRP initiator with the one or more monomers thereby initiating a polymerization and forming a polymer, wherein the reacting is facilitated by the active catalyst complex, wherein the ATRP initiator is soluble in the dispersed medium.

18. The process of claim 17, further comprising controlling a dimension of a polymer particle formed by the polymerization by adjusting an amount of the surfactant.

19. The process of claim 18, further comprising adding a second surfactant, wherein the second surfactant facilitates controlling the dimension of the polymer particle.

20. The process of claim 18, wherein the ligand is a hydrophobic ligand.

21. The process of claim 20, wherein the surfactant is an anionic surfactant, and the ionic complex is a hydrophobic ionic complex.

22. The process of claim 17, wherein the suspending medium is an aqueous medium and the one or more dispersed droplets are an organic medium.

23. The process of claim 22, wherein the ligand is selected from the group consisting of (4-methoxy-3,5-dimethyl-pyridin-2-ylmethyl)-bis(pyridin-2-ylmethyl)-amine, bis(4-methoxy-3,5-dimethyl-pyridin-2-ylmethyl)-pyridin-2-ylmethyl-amine, tris[(4-methoxy-3,5-dimethyl)-pyrid-2-ylmethyl]amine, (4-methoxy-pyridin-2-ylmethyl)-bis(pyridin-2-ylmethyl)-amine, bis(4-methoxy-pyridin-2-ylmethyl)-pyridin-2-ylmethyl-amine, tris((4-methoxy)-pyridin-2-yl)methy)-amine, (4-(N,N-dimethylamino)-pyridin-2-ylmethyl)-bis(pyridin-2-ylmethyl)-amine, bis(4-(N,N-dimethylamino)-pyridin-2-ylmethyl)-pyridin-2-ylmethyl-amine, tris(4-(N,N-dimethylamino)-pyridin-2-yl)methyl)-amine, and combinations thereof.

24. The process of claim 17, wherein the surfactant is an anionic surfactant and the ionic complex is a hydrophilic ionic complex.

25. The process of claim 24, wherein the surfactant is selected from the group consisting of sodium alkyl sulphate, sodium alkyl laurate, sodium alkyl stearate, sodium dodecanoate, and combinations thereof.

26. The process of claim 17, wherein the suspending medium is an organic medium and the one or more dispersed droplets are an aqueous medium.

27. The process of claim 17, wherein the emulsion is selected from the group consisting of: a standard emulsion, a reverse emulsion, a miniemulsion, a microemulsion, a seeded emulsion, an ab initio emulsion, and combinations thereof.

28. The process of claim 17, wherein the ATRP process is selected from the group consisting of: an electro-ATRP, a photoATRP, a mechanoATRP, an Activator Generated by Electron Transfer ATRP, an Activators Regenerated by Electron Transfer ATRP, a Supplemental Activator and Reducing Agent ATRP, an Initiators For Continuous Activator Regeneration ATRP, an oxygen tolerant ATRP, and combinations thereof.

29. The process of claim 17, further comprising controlling the ATRP emulsion process utilizing the ionic complex.

30. The process of claim 17, further comprising limiting a halogen displacement interaction between the catalyst complex with the transition metal compound in the higher oxidation state and the surfactant by adding a halide salt.

31. The process of claim 17, wherein the polymer has a residual amount of the transition metal compound in the higher oxidation state and the transition metal in the lower oxidation state of less than 0.4 milligrams per kilogram of formed polymer.

32. The process of claim 17, further comprising removing the polymer from the container, wherein the polymer has a residual amount of the catalyst complex with the transition metal in the higher oxidation state and the active catalyst complex that is at least 20 fold less than an amount of the catalyst complex with the transition metal in the higher oxidation state and the active catalyst complex formed in the container.

33. The process of claim 17, wherein the reducing the portion of the transition metal compound in the higher oxidation state further comprises applying an electrical current, a sound, or light.

34. The process of claim 17, wherein the reducing the portion of the transition metal compound in the higher oxidation state further comprises adding a reducing agent selected from the group consisting of an ascorbic acid, a hydrazine, a phenol, a sugar, a metal, a metal compound, a sulfur compound, an alkylamine, an excess quantity of the ligand, a free radical initiator, a nitrogen containing monomer, derivatives thereof, and combinations thereof to the container.

35. The process of claim 17, wherein the reducing the portion of the transition metal compound in the higher oxidation state occurs in the suspending medium.

36. The process of claim 17, further comprising a single type of ionic complex.

37. The process of claim 17, wherein the emulsion is a miniemulsion and further comprising forming a dispersed medium comprising the one or more dispersed droplets prior to the initiating of the polymerization.

38. An Atom Transfer Radical Polymerization (ATRP) emulsion process comprising:
  adding a suspending medium, an anionic surfactant, a single transition metal compound in a higher oxidation state, a ligand containing at least two heteroatom containing groups, one or more radically (co)polymerizable monomers, and an ATRP initiator to a container, the ATRP initiator comprises one or more radically transferable atoms or groups and is soluble in the suspending medium;
  forming a catalyst complex with the transition metal compound and the ligand wherein the at least two heteroatom containing groups coordinate with the transition metal compound, the catalyst complex is soluble in the suspending medium; and
  initiating a polymerization of the one or more monomers utilizing the ATRP initiator, the initiating comprising:
    reducing a portion of the transition metal compound in the higher oxidation state within a portion of the catalyst complex by a physical or a chemical procedure thereby creating an active catalyst complex having the portion of the transition metal compound in a lower oxidation state;
    forming a micelle by reacting the ATRP initiator with the one or more monomers to form a hydrophobic oligomer which phase separates from the suspending medium; and
    forming a polymer by increasing a molecular weight of the hydrophobic oligomer by shuttling the active catalyst complex between the suspending medium and the micelle by forming an ionic complex with the anionic surfactant and the active catalyst complex, wherein the active catalyst complex facilitates nucleation and particle growth of the hydrophobic oligomer within the micelle, wherein the ATRP initiator is soluble in the hydrophobic oligomer.

39. A polymer formed by an Atom Transfer Radical Polymerization (ATRP) emulsion process comprising:
  adding a suspending medium, a surfactant, a transition metal compound in a higher oxidation state, a ligand containing at least two heteroatom containing groups, one or more radically (co)polymerizable monomers, and an ATRP initiator containing one or more radically transferable atoms or groups to a container;
  generating an emulsion in the container, including generating one or more dispersed droplets;
  forming a catalyst complex with the transition metal compound and the ligand wherein the at least two heteroatom containing groups coordinate with the transition metal compound, the catalyst complex is soluble in the suspending medium; and
  initiating a polymerization of the one or more monomers by:
    reducing a portion of the transition metal compound in the higher oxidation state within a portion of the catalyst complex by a physical or a chemical procedure thereby creating an active catalyst complex having the portion of the transition metal compound in a lower oxidation state;
    shuttling the active catalyst complex between the suspending medium and the dispersed droplets by forming an ionic complex with the surfactant and the active catalyst complex; and reacting the ATRP initiator with the one or more monomers thereby initiating a polymerization and forming the polymer, wherein the reacting is facilitated by the active catalyst complex, wherein the ATRP initiator is soluble in the dispersed droplets.

40. An Atom Transfer Radical Polymerization (ATRP) emulsion system comprising:
- a suspending medium and a dispersed medium, wherein the suspending medium is an aqueous medium and the dispersed medium is an organic medium;
- a surfactant;
- a transition metal compound in a higher oxidation state capable of forming a catalyst complex in a presence of a ligand containing at least two heteroatom containing groups that coordinate with the transition metal compound;
- the catalyst complex is soluble in the suspending medium and is capable of forming an ionic complex with the surfactant;
- the ionic complex is capable of moving between the suspending medium and the dispersed medium;
- an ATRP initiator comprising one or more radically transferable atoms or groups; and
- a portion of the transition metal compound in the higher oxidation state within a portion of the catalyst complex is reduced by a physical and/or a chemical procedure thereby initiating a polymerization of one or more radically (co)polymerizable monomers by reaction with the ATRP initiator.

41. The system of claim 40, wherein the ATRP initiator is soluble in the suspending medium.

42. The system of claim 41, wherein the dispersed medium is self-formed around a portion of the one or more monomers after the initiating of the polymerization.

43. An Atom Transfer Radical Polymerization (ATRP) emulsion process comprising:
- adding a suspending medium, a dispersed medium, a surfactant, a transition metal compound in a higher oxidation state, a ligand containing at least two heteroatom containing groups, one or more radically (co)polymerizable monomers, and an ATRP initiator containing one or more radically transferable atoms or groups to a container;
- generating an emulsion in the container, including generating one or more dispersed droplets from the dispersed medium, wherein the suspending medium is an aqueous medium and the dispersed medium is an organic medium;
- forming a catalyst complex with the transition metal compound and the ligand wherein the at least two heteroatom containing groups coordinate with the transition metal compound, the catalyst complex is soluble in the suspending medium; and
- initiating a polymerization of the one or more monomers by:
  - reducing a portion of the transition metal compound in the higher oxidation state within a portion of the catalyst complex by a physical or a chemical procedure thereby creating an active catalyst complex having the portion of the transition metal compound in a lower oxidation state;
  - shuttling the active catalyst complex between the suspending medium and the dispersed droplets by forming an ionic complex with the surfactant and the active catalyst complex; and
  - reacting the ATRP initiator with the one or more monomers thereby initiating a polymerization and forming a polymer, wherein the reacting is facilitated by the active catalyst complex.

44. The process of claim 43, wherein the ATRP initiator is soluble in the suspending medium.

45. The process of claim 44, further comprising:
- forming a micelle by reacting the ATRP initiator with the one or more monomers to form a hydrophobic oligomer which phase separates from the suspending medium; and
- shuttling the active catalyst complex between the suspending medium and the micelle utilizing the ionic complex, wherein the active catalyst complex facilitates nucleation and particle growth of the hydrophobic oligomer within the micelle thereby forming the polymer.

* * * * *